(12) United States Patent
Conger et al.

(10) Patent No.: US 9,516,858 B2
(45) Date of Patent: Dec. 13, 2016

(54) RODENT CONTAINMENT CAGE MONITORING APPARATUS AND METHODS

(71) Applicant: Innovive, Inc., San Diego, CA (US)

(72) Inventors: Dee L. Conger, La Jolla, CA (US); Cory Spivey, Escondido, CA (US); Michael A. Roes, San Diego, CA (US); Francesca McGuffie, San Diego, CA (US); Leroy Jenson, La Mesa, CA (US)

(73) Assignee: INNOVIVE, INC., San Diego, CA (US)

( * ) Notice: Subject to any disclaimer, the term of this patent is extended or adjusted under 35 U.S.C. 154(b) by 0 days.

(21) Appl. No.: 13/776,645

(22) Filed: Feb. 25, 2013

(65) Prior Publication Data

US 2013/0228134 A1    Sep. 5, 2013

Related U.S. Application Data

(63) Continuation of application No. 13/270,165, filed on Oct. 10, 2011.

(60) Provisional application No. 61/541,859, filed on Sep. 30, 2011, provisional application No. 61/495,855, filed on Jun. 10, 2011, provisional application No. 61/391,972, filed on Oct. 11, 2010.

(51) Int. Cl.
*A01K 1/03* (2006.01)
*A01K 1/00* (2006.01)

(52) U.S. Cl.
CPC ............. *A01K 1/031* (2013.01); *A01K 1/0047* (2013.01)

(58) Field of Classification Search
CPC ..................... A01K 1/031; A01K 1/03
USPC .. 119/416–19, 421, 452, 455, 456; 312/234, 234.1, 234.3; 109/38, 39; 340/573.3, 568.1
IPC ....................................................... A01K 1/03
See application file for complete search history.

(56) References Cited

U.S. PATENT DOCUMENTS

| | | |
|---|---|---|
| 513,557 A | 1/1894 | Cobb |
| 1,909,611 A | 5/1933 | Charavay |
| 2,554,086 A | 5/1951 | Block |
| 2,988,044 A | 6/1961 | Adelberg et al. |
| 3,002,492 A | 10/1961 | Naturale |
| 3,084,850 A | 4/1963 | Engalitcheff, Jr. |
| 3,087,458 A | 4/1963 | Bennett |
| 3,096,933 A | 7/1963 | Bora |
| 3,122,127 A | 2/1964 | Shechmeister et al. |
| 3,127,872 A | 4/1964 | Finkel |
| 3,163,149 A | 12/1964 | Ivey |
| 3,212,474 A | 10/1965 | Higgins et al. |

(Continued)

FOREIGN PATENT DOCUMENTS

| | | |
|---|---|---|
| EP | 0160336 | 11/1985 |
| EP | 0233134 | 8/1987 |

(Continued)

OTHER PUBLICATIONS

Office Action mailed on Sep. 18, 2013 in U.S. Appl. No. 13/775,080, filed Feb. 22, 2013 and published as US 2013/0160716 on Jun. 27, 2013.

(Continued)

*Primary Examiner* — Lisa Tsang
(74) *Attorney, Agent, or Firm* — Grant IP, Inc.

(57) ABSTRACT

Methods, apparatuses and systems for convenient management of animals within a rodent containment cage system that includes labeling components, receiving data, associating the data, reporting the data and/or associations and locating components within the cage system. The manage- (Continued)

ment of the system may be self-contained, networked through a controller, local server and/or main server.

28 Claims, 95 Drawing Sheets

(56) References Cited

U.S. PATENT DOCUMENTS

| | | | |
|---|---|---|---|
| 3,225,738 A | 12/1965 | Palencia |
| 3,302,615 A | 2/1967 | Tietje |
| 3,334,614 A | 8/1967 | Gass et al. |
| 3,397,676 A | 8/1968 | Barney |
| 3,465,722 A | 9/1969 | Duff |
| 3,500,831 A | 3/1970 | Schaar |
| 3,518,971 A | 7/1970 | Gass et al. |
| 3,524,431 A | 8/1970 | Graham et al. |
| 3,537,428 A | 11/1970 | Montgomery |
| 3,547,309 A | 12/1970 | Pusey et al. |
| 3,649,464 A | 3/1972 | Feeman |
| 3,662,713 A | 5/1972 | Sachs |
| 3,698,360 A | 10/1972 | Rubricius |
| 3,718,120 A | 2/1973 | Schwarz |
| 3,731,657 A | 5/1973 | Alessio |
| 3,765,374 A | 10/1973 | Kolste |
| 3,768,546 A | 10/1973 | Shipes |
| 3,771,686 A | 11/1973 | Brison |
| 3,776,195 A | 12/1973 | Willinger |
| 3,791,346 A | 2/1974 | Willinger et al. |
| 3,924,571 A | 12/1975 | Holman |
| 3,958,534 A | 5/1976 | Perkins |
| 3,965,865 A | 6/1976 | Kundikoff |
| 4,022,159 A | 5/1977 | Salvia |
| 4,023,529 A | 5/1977 | Landy |
| 4,043,256 A | 8/1977 | VanHuis |
| 4,075,618 A | 2/1978 | Montean |
| 4,161,159 A | 7/1979 | Leong |
| 4,177,761 A | 12/1979 | Bellocchi, Jr. |
| 4,252,080 A | 2/1981 | Gioia et al. |
| 4,343,261 A | 8/1982 | Thomas |
| 4,365,590 A | 12/1982 | Ruggieri et al. |
| 4,367,728 A | 1/1983 | Mutke |
| 4,402,280 A | 9/1983 | Thomas |
| 4,448,150 A | 5/1984 | Catsimpoolas |
| 4,480,587 A | 11/1984 | Sedlacek |
| 4,528,941 A | 7/1985 | Spengler |
| 4,551,311 A | 11/1985 | Lorenz |
| 4,593,650 A | 6/1986 | Lattuada |
| 4,640,228 A | 2/1987 | Sedlacek et al. |
| 4,690,100 A | 9/1987 | Thomas |
| 4,699,088 A | 10/1987 | Murray et al. |
| 4,699,188 A | 10/1987 | Baker et al. |
| 4,728,006 A | 3/1988 | Drobish et al. |
| 4,774,631 A | 9/1988 | Okuyama et al. |
| 4,779,566 A | 10/1988 | Morris et al. |
| 4,798,171 A | 1/1989 | Peters et al. |
| 4,844,018 A | 7/1989 | Niki |
| 4,892,209 A | 1/1990 | Dorfman et al. |
| 4,907,536 A | 3/1990 | Chrisler |
| 4,940,017 A | 7/1990 | Niki et al. |
| 4,941,431 A | 7/1990 | Anderson et al. |
| 4,976,219 A | 12/1990 | Goguen et al. |
| 4,991,635 A | 2/1991 | Ulm |
| 5,000,120 A | 3/1991 | Coiro, Sr. et al. |
| 5,003,922 A | 4/1991 | Niki et al. |
| 5,031,515 A | 7/1991 | Niemela et al. |
| 5,044,316 A | 9/1991 | Thomas |
| 5,048,459 A | 9/1991 | Niki et al. |
| 5,081,955 A | 1/1992 | Yoneda et al. |
| 5,148,766 A | 9/1992 | Coiro, Sr. et al. |
| 5,163,380 A | 11/1992 | Duffy |
| 5,165,362 A | 11/1992 | Sheaffer et al. |
| 5,213,059 A | 5/1993 | Krantz |
| 5,287,414 A * | 2/1994 | Foster ............... G06K 7/10079 |
| | | | 235/383 |
| 5,307,757 A | 5/1994 | Coiro, Sr. et al. |
| 5,316,172 A | 5/1994 | Apps et al. |
| 5,328,049 A | 7/1994 | Ritzow |
| 5,331,920 A | 7/1994 | Coiro, Sr. et al. |
| 5,349,923 A | 9/1994 | Sheaffer et al. |
| 5,385,118 A | 1/1995 | Coiro, Sr. et al. |
| 5,400,744 A | 3/1995 | Coiro, Sr. et al. |
| 5,407,129 A | 4/1995 | Carey et al. |
| 5,407,648 A | 4/1995 | Allen et al. |
| 5,429,800 A | 7/1995 | Miraldi et al. |
| 5,447,118 A | 9/1995 | Huff |
| 5,471,950 A | 12/1995 | White |
| 5,474,024 A | 12/1995 | Hallock |
| 5,513,596 A | 5/1996 | Coiro, Sr. et al. |
| 5,567,364 A | 10/1996 | Philipps |
| 5,572,403 A | 11/1996 | Mills |
| 5,572,953 A | 11/1996 | Phelan et al. |
| 5,605,240 A | 2/1997 | Guglielmini |
| 5,608,209 A | 3/1997 | Matsuda |
| 5,624,037 A | 4/1997 | Kozo |
| 5,635,403 A | 6/1997 | Bailey |
| 5,655,478 A | 8/1997 | Kiera |
| 5,657,891 A | 8/1997 | Bilani et al. |
| 5,664,704 A | 9/1997 | Meadows et al. |
| 5,694,885 A | 12/1997 | Deitrich et al. |
| 5,706,761 A | 1/1998 | Mayer |
| 5,717,202 A | 2/1998 | Matsuda |
| 5,745,041 A | 4/1998 | Moss |
| 5,771,841 A | 6/1998 | Boor |
| 5,780,130 A | 7/1998 | Hansen et al. |
| 5,797,350 A | 8/1998 | Smith |
| 5,823,144 A * | 10/1998 | Edstrom et al. ............... 119/475 |
| 5,832,876 A | 11/1998 | Brown et al. |
| 5,865,144 A | 2/1999 | Semenuk |
| 5,893,338 A | 4/1999 | Campbell |
| 5,894,816 A | 4/1999 | Coiro, Sr. et al. |
| 5,905,653 A * | 5/1999 | Higham ............... G07F 17/0092 |
| | | | 312/215 |
| 5,915,332 A | 6/1999 | Young |
| 5,924,384 A | 7/1999 | Deitrich et al. |
| 5,954,013 A | 9/1999 | Gabriel et al. |
| 5,954,237 A | 9/1999 | Lampe et al. |
| 5,996,535 A | 12/1999 | Semenuk et al. |
| 6,021,042 A | 2/2000 | Anderson et al. |
| 6,029,604 A | 2/2000 | de Vosjoli |
| 6,092,487 A | 7/2000 | Niki et al. |
| 6,112,701 A | 9/2000 | Faith et al. |
| 6,138,610 A | 10/2000 | Niki |
| 6,142,732 A | 11/2000 | Chou et al. |
| 6,144,300 A | 11/2000 | Dames |
| 6,158,387 A | 12/2000 | Gabriel et al. |
| 6,164,311 A | 12/2000 | Momont |
| 6,217,437 B1 | 4/2001 | Murray et al. |
| 6,227,146 B1 | 5/2001 | Gabriel et al. |
| 6,237,800 B1 | 5/2001 | Barrett |
| 6,257,171 B1 | 7/2001 | Rivard |
| 6,293,227 B1 | 9/2001 | Ver Hage |
| 6,295,826 B1 | 10/2001 | Lee |
| 6,295,950 B1 | 10/2001 | Deitrich et al. |
| 6,302,059 B1 | 10/2001 | Faith et al. |
| 6,305,324 B1 | 10/2001 | Hallock et al. |
| 6,308,660 B1 | 10/2001 | Coiro, Sr. et al. |
| 6,311,644 B1 | 11/2001 | Pugh |
| 6,336,427 B1 | 1/2002 | Gabriel et al. |
| 6,341,581 B1 | 1/2002 | Gabriel et al. |
| 6,357,393 B1 | 3/2002 | Coiro, Sr. et al. |
| 6,361,962 B1 | 3/2002 | Lentini et al. |
| 6,392,872 B1 | 5/2002 | Doustou et al. |
| 6,394,032 B1 | 5/2002 | Coiro, Sr. et al. |
| 6,396,688 B1 | 5/2002 | Davies et al. |
| 6,407,918 B1 | 6/2002 | Edmunds et al. |
| 6,408,794 B1 | 6/2002 | Coiro, Sr. et al. |
| 6,423,118 B1 | 7/2002 | Becerra et al. |
| 6,427,958 B1 | 8/2002 | Looney |
| 6,457,437 B1 | 10/2002 | Frasier et al. |
| 6,460,486 B1 | 10/2002 | Powers |
| 6,463,397 B1 | 10/2002 | Cohen |
| 6,517,428 B1 | 2/2003 | Murray et al. |
| 6,532,901 B2 | 3/2003 | Isley |
| 6,543,387 B1 | 4/2003 | Stein |

(56) References Cited

U.S. PATENT DOCUMENTS

| | | | |
|---|---|---|---|
| 6,553,939 B1 | 4/2003 | Austin et al. | |
| 6,556,437 B1 | 4/2003 | Hardin | |
| 6,561,129 B1 | 5/2003 | Cheng | |
| 6,571,738 B2 | 6/2003 | Rivard | |
| 6,572,819 B1 | 6/2003 | Wu et al. | |
| 6,584,936 B2 | 7/2003 | Rivard | |
| 6,588,373 B1 | 7/2003 | Strzempko et al. | |
| 6,592,448 B1 | 7/2003 | Williams | |
| 6,612,260 B1 | 9/2003 | Loyd et al. | |
| 6,714,121 B1* | 3/2004 | Moore | 340/10.3 |
| 6,718,912 B2 | 4/2004 | Pappas | |
| 6,729,266 B1 | 5/2004 | Gabriel et al. | |
| 6,739,846 B2 | 5/2004 | Stoddard et al. | |
| 6,810,833 B2 | 11/2004 | Bonner et al. | |
| 6,813,152 B2 | 11/2004 | Perazzo | |
| 6,853,946 B2 | 2/2005 | Cohen et al. | |
| 6,878,874 B2 | 4/2005 | Osborn et al. | |
| 6,998,980 B2 | 2/2006 | Ingley, III | |
| 7,031,157 B2 | 4/2006 | Horng et al. | |
| 7,086,350 B2 | 8/2006 | Tecott | |
| 7,114,463 B2 | 10/2006 | Donohoe | |
| 7,126,471 B2* | 10/2006 | Ahmed et al. | 340/539.13 |
| 7,131,398 B2 | 11/2006 | Cohen et al. | |
| 7,146,931 B2 | 12/2006 | Gabriel et al. | |
| 7,191,734 B2 | 3/2007 | Strzempko et al. | |
| 7,237,509 B2 | 7/2007 | Bonner | |
| 7,320,294 B2 | 1/2008 | Irwin et al. | |
| 7,389,744 B2 | 6/2008 | Zhang | |
| 7,487,744 B1 | 2/2009 | Goldberg et al. | |
| 7,527,020 B2 | 5/2009 | Conger | |
| 7,665,419 B2 | 2/2010 | Conger et al. | |
| 7,734,381 B2 | 6/2010 | Conger et al. | |
| 7,739,984 B2 | 6/2010 | Conger | |
| 7,874,268 B2 | 1/2011 | Conger | |
| 7,887,146 B1* | 2/2011 | Louie et al. | 312/209 |
| 7,913,650 B2 | 3/2011 | Conger | |
| 7,954,455 B2 | 6/2011 | Conger | |
| 7,970,495 B2 | 6/2011 | Conger et al. | |
| 8,082,885 B2 | 12/2011 | Conger et al. | |
| 8,156,899 B2 | 4/2012 | Conger et al. | |
| 8,171,887 B2 | 5/2012 | Conger et al. | |
| 8,499,719 B2* | 8/2013 | Brocca et al. | 119/57.92 |
| 8,739,737 B2 | 6/2014 | Conger et al. | |
| 2001/0054394 A1 | 12/2001 | Marchioro | |
| 2002/0022991 A1 | 2/2002 | Sharood et al. | |
| 2002/0094283 A1 | 7/2002 | Salmen et al. | |
| 2002/0100429 A1 | 8/2002 | Wade | |
| 2002/0180588 A1* | 12/2002 | Erickson et al. | 340/10.2 |
| 2002/0190845 A1* | 12/2002 | Moore | 340/10.3 |
| 2002/0195060 A1 | 12/2002 | Dollahan | |
| 2003/0051676 A1 | 3/2003 | Rivard | |
| 2003/0130809 A1 | 7/2003 | Cohen et al. | |
| 2003/0131802 A1* | 7/2003 | Murray et al. | 119/455 |
| 2003/0170145 A1 | 9/2003 | Smith et al. | |
| 2003/0200933 A1 | 10/2003 | Park | |
| 2004/0018105 A1 | 1/2004 | Stoddard et al. | |
| 2004/0185770 A1 | 9/2004 | Soeholm et al. | |
| 2004/0191437 A1 | 9/2004 | Asayama et al. | |
| 2004/0211745 A1 | 10/2004 | Murray | |
| 2005/0024211 A1* | 2/2005 | Maloney | 340/572.1 |
| 2005/0066908 A1 | 3/2005 | Park | |
| 2005/0076852 A1 | 4/2005 | Campiotti et al. | |
| 2005/0145191 A1 | 7/2005 | Cohen et al. | |
| 2005/0166860 A1 | 8/2005 | Austin et al. | |
| 2005/0193957 A1 | 9/2005 | Oshima et al. | |
| 2005/0241591 A1* | 11/2005 | Ingley et al. | 119/455 |
| 2005/0256591 A1 | 11/2005 | Rule et al. | |
| 2006/0000422 A1 | 1/2006 | Cheng | |
| 2006/0011143 A1 | 1/2006 | Drummond et al. | |
| 2006/0071774 A1* | 4/2006 | Brown et al. | 340/522 |
| 2006/0111680 A1 | 5/2006 | Spada et al. | |
| 2006/0124072 A1 | 6/2006 | Conger | |
| 2006/0185614 A1 | 8/2006 | Van Fleet, Jr. | |
| 2006/0236951 A1 | 10/2006 | Gabriel et al. | |
| 2006/0254528 A1 | 11/2006 | Malnati et al. | |
| 2006/0278171 A1 | 12/2006 | Conger et al. | |
| 2007/0011950 A1 | 1/2007 | Wood | |
| 2007/0040682 A1* | 2/2007 | Zhu et al. | 340/572.1 |
| 2007/0044799 A1 | 3/2007 | Hete et al. | |
| 2007/0159040 A1 | 7/2007 | Fernandez et al. | |
| 2007/0169714 A1 | 7/2007 | Conger et al. | |
| 2007/0169715 A1 | 7/2007 | Conger et al. | |
| 2007/0169716 A1 | 7/2007 | Conger et al. | |
| 2007/0169717 A1 | 7/2007 | Conger et al. | |
| 2007/0169718 A1 | 7/2007 | Conger et al. | |
| 2007/0175399 A1 | 8/2007 | Conger et al. | |
| 2007/0175404 A1 | 8/2007 | Conger et al. | |
| 2007/0181070 A1 | 8/2007 | Conger et al. | |
| 2007/0181074 A1 | 8/2007 | Conger et al. | |
| 2007/0181075 A1 | 8/2007 | Conger et al. | |
| 2007/0193527 A1 | 8/2007 | Verhage et al. | |
| 2007/0209653 A1 | 9/2007 | Beisheim et al. | |
| 2007/0256643 A1 | 11/2007 | Coiro et al. | |
| 2008/0066688 A1 | 3/2008 | Malnati et al. | |
| 2008/0078332 A1 | 4/2008 | Conger et al. | |
| 2008/0087231 A1 | 4/2008 | Gabriel et al. | |
| 2008/0134984 A1 | 6/2008 | Conger et al. | |
| 2008/0222565 A1 | 9/2008 | Taylor et al. | |
| 2008/0236506 A1 | 10/2008 | Conger et al. | |
| 2008/0236507 A1 | 10/2008 | Conger et al. | |
| 2008/0282990 A1 | 11/2008 | Conger et al. | |
| 2009/0002496 A1* | 1/2009 | Esmaeili | 348/207.1 |
| 2009/0293815 A1 | 12/2009 | Coiro et al. | |
| 2010/0006521 A1 | 1/2010 | Verhage et al. | |
| 2010/0242852 A1 | 9/2010 | Conger | |
| 2010/0248611 A1 | 9/2010 | Conger | |
| 2011/0005465 A1 | 1/2011 | Tamborini et al. | |
| 2011/0041773 A1 | 2/2011 | Brielmeier et al. | |
| 2011/0061600 A1 | 3/2011 | Conger et al. | |
| 2011/0297098 A1 | 12/2011 | Conger et al. | |
| 2011/0303158 A1 | 12/2011 | Conger et al. | |
| 2011/0308475 A1 | 12/2011 | Conger et al. | |
| 2012/0085291 A1 | 4/2012 | Conger et al. | |
| 2012/0318207 A1 | 12/2012 | Conger et al. | |
| 2013/0160716 A1 | 6/2013 | Conger et al. | |
| 2013/0220229 A1 | 8/2013 | Conger et al. | |
| 2013/0284109 A1 | 10/2013 | Conger et al. | |
| 2014/0069340 A1 | 3/2014 | Lipscomb | |
| 2014/0123906 A1 | 5/2014 | Conger et al. | |
| 2014/0345536 A1 | 11/2014 | Usui et al. | |
| 2015/0004679 A1 | 1/2015 | Conger et al. | |
| 2015/0359189 A1* | 12/2015 | Bernardini | A01K 1/031 119/419 |
| 2016/0037744 A1 | 2/2016 | Rudin | |

FOREIGN PATENT DOCUMENTS

| | | |
|---|---|---|
| EP | 0279076 | 12/1987 |
| FR | 2696423 A1 | 4/1994 |
| FR | 2824703 A1 | 11/2002 |
| JP | 56-3770 | 1/1981 |
| JP | S56-54772 | 12/1981 |
| JP | 57-083233 | 5/1982 |
| JP | 62-7852 | 1/1987 |
| JP | 64-85026 | 3/1989 |
| JP | 03-244330 | 10/1991 |
| JP | 4-9555 | 1/1992 |
| JP | 4-023929 | 1/1992 |
| JP | 4-267826 | 9/1992 |
| JP | 05005499 | 1/1993 |
| JP | H06-068430 | 9/1994 |
| JP | 3022196 | 12/1995 |
| JP | 9-168346 | 6/1997 |
| JP | H10-215720 | 8/1998 |
| JP | 10-286037 | 10/1998 |
| JP | H11-009126 | 1/1999 |
| JP | 2000-032862 | 2/2000 |
| JP | 3070623 | 8/2000 |
| JP | 2002-065109 | 3/2002 |
| JP | 2003-088263 | 3/2003 |
| JP | 2003-018932 | 7/2003 |
| JP | 2005-095004 | 4/2005 |
| JP | 2005-185189 | 7/2005 |
| JP | 2005-328725 | 12/2005 |

(56) References Cited

FOREIGN PATENT DOCUMENTS

| | | |
|---|---|---|
| JP | 2008-527975 | 7/2008 |
| JP | 2009-529862 | 8/2009 |
| JP | 2010-523158 | 7/2010 |
| WO | WO 92/18084 | 10/1992 |
| WO | WO 93/14474 | 7/1993 |
| WO | WO 01/91543 | 12/2001 |
| WO | WO 02/11523 | 2/2002 |
| WO | WO 03/051106 | 6/2003 |
| WO | WO 03/059048 | 7/2003 |
| WO | WO 2006/065773 | 6/2006 |
| WO | WO 2008/127998 | 10/2008 |
| WO | WO 2009/098617 | 8/2009 |
| WO | WO 2010/054257 | 5/2010 |
| WO | WO 2012/051124 | 4/2012 |
| WO | WO 2016/014319 | 1/2016 |

OTHER PUBLICATIONS

Office Action mailed on Sep. 19, 2013 in U.S. Appl. No. 12/614,291, filed Nov. 6, 2009 and published as US 2010-0242852 on Sep. 30, 2010.
Ancare Catalog, Systems and supplies for Animal Care, Sep. 2006, from World Wide Web URL "ancare.com".
Claim Translation for Japanese Patent Document JP04-9555. Translation certified: Feb. 5, 2009.
Claim Translation for Japanese Patent Document JP56-3770. Translation certified: Feb. 5, 2009.
Claim Translation for Japanese Patent Document JP62-7852. Translation certified: Feb. 5, 2009.
Statement under 37 C.F.R. section 1.98(a)(3) for Japanese Patent Document JP04-9555. Statement made: Feb. 6, 2009.
Statement under 37 C.F.R. section 1.98(a)(3) for Japanese Patent Document JP56-3770. Statement made: Feb. 6, 2009.
Statement under 37 C.F.R. section 1.98(a)(3) for Japanese Patent Document JP62-7852. Statement made: Feb. 6, 2009.
International Preliminary Report on Patentability for PCT/US2005/044977 mailed: Mar. 5, 2009.
International Search Report/Written Opinion for PCT/US2005/44977 mailed: Sep. 30, 2008.
International Search Report/Written Opinion for PCT/US2006/23038 mailed: May, 28, 2008.
International Preliminary Report on Patentability for PCT/US2007/018255 mailed: Feb. 26, 2009.
International Search Report/Written Opinion for PCT/US2007/018255 mailed: Jun. 16, 2008.
International Search Report/Written Opinion for PCT/US2008/059953 mailed: Jul. 16, 2008.
International Search Report and Written Opinion for PCT/US2008/063766 mailed: Sep. 25, 2008.
International Preliminary Report on Patentability mailed: May 10, 2011 in International Application No. for PCT/US2009/063638 filed on Nov. 6, 2009 and Published as: WO/2010/054257 on: May 14, 2010.
International Search Report/Written Opinion mailed: May 28, 2010 in International Application No. for PCT/US2009/063638 filed Nov. 6, 2009 and Published as: WO/2010/054257 on: May 14, 2010.
International Search Report/Written Opinion mailed: May 7, 2012 in International Application No. for PCT/US2011/055650 and Published as WO/2012/051124 on Jul. 12, 2012.
Extended European Search Report dated: Dec. 11, 2012 in European Application No. EP 06773076 filed on: Jun. 13, 2006.
Extended European Search Report dated: Jun. 27, 2012 in European Application No. EP 12160134 filed on: Dec. 13, 2005.
Marketing Materials From Trade Show Distributed Nov. 7, 2005.
Web Page describing Nalgene animal cage cover printed on Dec. 5, 2006 from VWR Catalogue on World Wide Web http://www.vwrsp.com.
Wikipedia/pulse-width-modulation (printed from internet http://en.wikipedia.org/wiki/Pulse-width_modulation on Dec. 5, 2009).
National Research Council, Guide for the Care and Use of Laboratory Animals, Washington, D.C.: National Academy Press, 1996.
Canadian Council on Animal Care, Guidelines on, Laboratory Animal Facilities—Characteristics, Design and Development, Ottawa, ON: Canadian Council on Animal Care, 2006.
Office Action mailed on: Dec. 29, 2009 in U.S. Appl. No. 12/101,046, filed Apr. 10, 2008 and published as US 2008-0282990 A1 on Nov. 20, 2008.
Office Action mailed on: Mar. 17, 2010 in U.S. Appl. No. 12/101,046, filed Apr. 10, 2008 and published as US 2008-0282990 A1 on Nov. 20, 2008.
Office Action mailed on: Oct. 25, 2010 in U.S. Appl. No. 12/101,046, filed Apr. 10, 2008 and published as US 2008-0282990 A1 on Nov. 20, 2008.
Office Action mailed on: May 23, 2011 in U.S. Appl. No. 12/101,046, filed Apr. 10, 2008 and published as US 2008-0282990 A1 on Nov. 20, 2008.
Office Action mailed on: Oct. 12, 2011 in U.S. Appl. No. 12/101,046, filed Apr. 10, 2008 and published as US 2008-0282990 A1 on Nov. 20, 2008.
Office Action mailed on: May 18, 2007 in U.S. Appl. No. 11/300,644, filed Dec. 13, 2005 and published as US 2006-0124072 A1 on Jun. 15, 2006 now issued U.S. Pat. No. 7,527,020 issued on May 5, 2009.
Office Action mailed on: Mar. 11, 2008 in U.S. Appl. No. 11/300,644, filed Dec. 13, 2005 and published as US 2006-0124072 A1 on Jun. 15, 2006 now issued U.S. Pat. No. 7,527,020 issued on May 5, 2009.
Office Action mailed on: Aug. 1, 2008 in U.S. Appl. No. 11/300,644, filed Dec. 13, 2005 and published as US 2006-0124072 A1 on Jun. 15, 2006 now issued U.S. Pat. No. 7,527,020 issued on May 5, 2009.
Office Action mailed on: Dec. 30, 2008 in U.S. Appl. No. 11/300,644, filed Dec. 13, 2005 and published as US 2006-0124072 A1 on Jun. 15, 2006 now issued U.S. Pat. No. 7,527,020 issued on May 5, 2009.
Office Action mailed on: Jan. 26, 2009 in U.S. Appl. No. 11/300,644, filed Dec. 13, 2005 and published as US 2006-0124072 A1 on Jun. 15, 2006 now issued U.S. Pat. No. 7,527,020 issued on May 5, 2009.
Office Action mailed on: Mar. 11, 2009 in U.S. Appl. No. 11/300,644, filed Dec. 13, 2005 and published as US 2006-0124072 A1 on Jun. 15, 2006 now issued U.S. Pat. No. 7,527,020 issued on May 5, 2009.
Office Action mailed on: Nov. 27, 2007 in U.S. Appl. No. 11/695,075, filed Apr. 2, 2007 and published as US 2007-0169717 A1 on Jul. 26, 2007, and issued as: U.S. Pat. No. 7,665,419 on Feb. 23, 2010.
Office Action mailed on: Sep. 11, 2008 in U.S. Appl. No. 11/695,075, filed Apr. 2, 2007 and published as US 2007-0169717 A1 on Jul. 26, 2007, and issued as: U.S. Pat. No. 7,665,419 on Feb. 23, 2010.
Office Action mailed on: May 26, 2009 in U.S. Appl. No. 11/695,075, filed Apr. 2, 2007 and published as US 2007-0169717 A1 on Jul. 26, 2007, and issued as: U.S. Pat. No. 7,665,419 on Feb. 23, 2010.
Office Action mailed on: Oct. 6, 2009 in U.S. Appl. No. 11/695,075, filed Apr. 2, 2007 and published as US 2007-0169717 A1 on Jul. 26, 2007, and issued as: U.S. Pat. No. 7,665,419 on Feb. 23, 2010.
Office Action mailed on: Dec. 26, 2007 in U.S. Appl. No. 11/695,085, filed Apr. 2, 2007 and published as US 2007-0169715 A1 on Jul. 26, 2007.
Office Action mailed on: Aug. 25, 2008 in U.S. Appl. No. 11/695,085, filed Apr. 2, 2007 and published as US 2007-0169715 A1 on Jul. 26, 2007.
Office Action mailed on: Apr. 22, 2009 in U.S. Appl. No. 11/695,085, filed Apr. 2, 2007 and published as US 2007-0169715 A1 on Jul. 26, 2007.
Office Action mailed on: Jan. 19, 2010 in U.S. Appl. No. 11/695,085, filed Apr. 2, 2007 and published as US 2007-0169715 A1 on Jul. 26, 2007.
Office Action mailed on: Jun. 17, 2011 in U.S. Appl. No. 11/695,085, filed Apr. 2, 2007 and published as: 2007/0169715 on Jul. 26, 2007.

(56) References Cited

OTHER PUBLICATIONS

Office Action mailed on: Mar. 28, 2012 in U.S. Appl. No. 11/695,085, filed Apr. 2, 2007 and published as: 2007/0169715 on Jul. 26, 2007.
Office Action mailed on: Dec. 3, 2007 in U.S. Appl. No. 11/695,089, filed Apr. 2, 2007 and published as US 2007-0169716 A1 on Jul. 26, 2007, and Issued as: U.S. Pat. No. 7,661,392 on Feb. 16, 2010.
Office Action mailed on: Sep. 3, 2008 in U.S. Appl. No. 11/695,089, filed Apr. 2, 2007 and published as US 2007-0169716 A1 on Jul. 26, 2007, and Issued as: U.S. Pat. No. 7,661,392 on Feb. 16, 2010.
Office Action mailed on: Mar. 30, 2009 in U.S. Appl. No. 11/695,089, filed Apr. 2, 2007 and published as US 2007-0169716 A1 on Jul. 26, 2007, and Issued as: U.S. Pat. No. 7,661,392 on Feb. 16, 2010.
Office Action mailed on: Oct. 6, 2009 in U.S. Appl. No. 11/695,089, filed Apr. 2, 2007 and published as US 2007-0169716 A1 on Jul. 26, 2007, and Issued as: U.S. Pat. No. 7,661,392 on Feb. 16, 2010.
Office Action mailed on: Jun. 2, 2009 in U.S. Appl. No. 11/695,090, filed Apr. 2, 2007 and published as US 2008-0236507 A1 on Oct. 2, 2008.
Office Action mailed on: Dec. 16, 2009 in U.S. Appl. No. 11/695,090, filed Apr. 2, 2007 and published as US 2008-0236507 A1 on Oct. 2, 2008.
Office Action mailed on: Jun. 17, 2011 in U.S. Appl. No. 11/695,090, filed Apr. 2, 2007 and published as US 2008-0236507 A1 on Oct. 2, 2008.
Office Action mailed on: Dec. 29, 2011 in U.S. Appl. No. 11/695,090, filed Apr. 2, 2007 and published as US 2008-0236507 A1 on Oct. 2, 2008.
Office Action mailed on: May 13, 2009 in U.S. Appl. No. 11/423,949, filed Jun. 13, 2006 and published as US 2006-02787171 A1 on Dec. 14, 2006.
Office Action mailed on: Mar. 2, 2010 in U.S. Appl. No. 11/423,949, filed Jun. 13, 2006 and published as US 2006-02787171 A1 on Dec. 14, 2006.
Office Action mailed on: Oct. 12, 2010 in U.S. Appl. No. 11/423,949, filed Jun. 13, 2006 and published as US 2006-02787171 A1 on Dec. 14, 2006.
Office Action mailed on: Feb. 3, 2011 in U.S. Appl. No. 11/423,949, filed Jun. 13, 2006 and published as US 2006-02787171 A1 on Dec. 14, 2006.
Office Action mailed on: Dec. 17, 2007 in U.S. Appl. No. 11/695,078, filed Apr. 2, 2007 and published as US 2007-0169714 A1 on Jul. 26, 2007 now abandoned.
Office Action mailed on Dec. 3, 2007 in U.S. Appl. No. 11/695,092, filed Apr. 2, 2007 and published as US 2007-0181070 A1 on Aug. 9, 2007 now abandoned.
Office Action mailed on Jun. 29, 2009 in U.S. Appl. No. 11/868,877, filed Oct. 8, 2007 and published as US 2008-0134984 A1 on Jun. 12, 2008 now abandoned.
Office Action mailed on: Feb. 2, 2011 in U.S. Appl. No. 12/432,650, filed Apr. 29, 2009 and published as US 2009-0272329 A1 on Nov. 5, 2009.
Office Action mailed on: Nov. 9, 2010 in U.S. Appl. No. 12/432,650, filed Apr. 29, 2009 and published as US 2009-0272329 A1 on Nov. 5, 2009.
Office Action mailed on: Mar. 3, 2010 in U.S. Appl. No. 12/432,650, filed Apr. 29, 2009 and published as US 2009-0272329 A1 on Nov. 5, 2009.
Office Action mailed on: Mar. 19, 2008 in U.S. Appl. No. 11/695,077, filed Apr. 2, 2007 and published as US 2007-0175399 A1 on Aug. 2, 2007, now abandoned.
Office Action mailed on Dec. 22, 2011 in U.S. Appl. No. 13/218,190, filed Aug. 25, 2011 and published as: 2011/0308475 on: Dec. 22, 2011.
Office Action mailed on Oct. 15, 2012 in U.S. Appl. No. 13/218,190, filed Aug. 25, 2011 and published as: 2011/0308475 on: Dec. 22, 2011.
Office Action mailed on Nov. 20, 2012 in U.S. Appl. No. 13/218,190, filed Aug. 25, 2011 and published as: 2011/0308475 on: Dec. 22, 2011.
Office Action mailed on Dec. 22, 2011 in U.S. Appl. No. 13/218,227, filed Aug. 25, 2011 and published as: 2011/0303158 on: Dec. 15, 2011.
Office Action mailed on Mar. 19, 2012 in U.S. Appl. No. 13/218,227, filed Aug. 25, 2011 and published as: 2011/0303158 on: Dec. 15, 2011.
Office Action mailed on Dec. 22, 2011 in U.S. Appl. No. 13/101,054, filed May 4, 2011 and published as: 2011/0297098 on: Dec. 8, 2011.
Office Action mailed on Nov. 7, 2012 in U.S. Appl. No. 13/101,054, filed May 4, 2011 and published as: 2011/0297098 on: Dec. 8, 2011.
Office Action mailed: May 24, 2013 in U.S. Appl. No. 13/594,703, filed Aug. 24, 2012 and published as: 2012/0318207 on: Dec. 20, 2012.
Office Action mailed: Mar. 26, 2010 in U.S. Appl. No. 11/695,081, filed Apr. 2, 2007 and published as: 2007/0181074 on Aug. 9, 2007.
Office Action mailed: Oct. 13, 2010 in U.S. Appl. No. 11/695,081, filed Apr. 2, 2007 and published as: 2007/0181074 on Aug. 9, 2007.
Office Action mailed: Feb. 15, 2011 in U.S. Appl. No. 11/695,081, filed Apr. 2, 2007 and published as: 2007/0181074 on Aug. 9, 2007.
Office Action mailed: Nov. 9, 2007 in U.S. Appl. No. 11/695,082, filed Apr. 2, 2007 and published as: US2007/01755404 on Aug. 2, 2007 and issued as: U.S. Pat. No. 7,874,268 on Jan. 25, 2011.
Office Action mailed: Jul. 18, 2008 in U.S. Appl. No. 11/695,082, filed Apr. 2, 2007 and published as: US2007/01755404 on Aug. 2, 2007 and issued as: U.S. Pat. No. 7,874,268 on Jan. 25, 2011.
Office Action mailed: Apr. 1, 2009 in U.S. Appl. No. 11/695,082, filed Apr. 2, 2007 and published as: US2007/01755404 on Aug. 2, 2007 and issued as: U.S. Pat. No. 7,874,268 on Jan. 25, 2011.
Office Action mailed: Dec. 15, 2009 in U.S. Appl. No. 11/695,082, filed Apr. 2, 2007 and published as: US2007/01755404 on Aug. 2, 2007 and issued as: U.S. Pat. No. 7,874,268 on Jan. 25, 2011.
Office Action mailed: Sep. 16, 2010 in U.S. Appl. No. 11/695,082, filed Apr. 2, 2007 and published as: US2007/01755404 on Aug. 2, 2007 and issued as: U.S. Pat. No. 7,874,268 on Jan. 25, 2011.
Office Action mailed: Jun. 22, 2009 in U.S. Appl. No. 11/695,084, filed Apr. 2, 2007 and published as: US2008/0236506 on Oct. 2, 2008 and issued as: U.S. Pat. No. 7,734,381 on Jun. 8, 2009.
Office Action mailed: Dec. 14, 2009 in U.S. Appl. No. 11/695,084, filed Apr. 2, 2007 and published as: US2008/0236506 on Oct. 2, 2008 and issued as: U.S. Pat. No. 7,734,381 on Jun. 8, 2009.
Office Action mailed: Feb. 22, 2010 in U.S. Appl. No. 11/695,084, filed Apr. 2, 2007 and published as: US2008/0236506 on Oct. 2, 2008 and issued as: U.S. Pat. No. 7,734,381 on Jun. 8, 2009.
Office Action mailed: Apr. 7, 2011 in U.S. Appl. No. 12/794,654, filed Jun. 4, 2010 and issued as: U.S. Pat. No. 7,970,495 on Jun 28, 2011 and issued as: U.S. Pat. No. 7,970,495 on Jun. 28, 2011.
Office Action mailed on: Apr. 2, 2010 in U.S. Appl. No. 11/695,079, filed Apr. 2, 2007 and published as US 2007-0169718 A1 on Jul. 26, 2007 and Issued as: U.S. Pat. No. 7,739,984 on Jun. 22, 2010.
Office Action mailed on: Oct. 13, 2009 in U.S. Appl. No. 11/695,079, filed Apr. 2, 2007 and published as US 2007-0169718 A1 on Jul. 26, 2007 and Issued as: U.S. Pat. No. 7,739,984 on Jun. 22, 2010.
Office Action mailed on: Jan. 16, 2013 in U.S. Appl. No. 12/614,291, filed Nov. 6, 2009 and published as US 2010-0242852 A1 on Sep. 30, 2010.
Office Action mailed on: Aug. 10, 2012 in U.S. Appl. No. 12/614,291, filed Nov. 6, 2009 and published as US 2010-0242852 A1 on Sep. 30, 2010.
Office Action mailed on: Dec. 9, 2011 in U.S. Appl. No. 12/614,291, filed Nov. 6, 2009 and published as US 2010-0242852 A1 on Sep. 30, 2010.
Office Action mailed on: Dec. 26, 2007 in U.S. Appl. No. 11/695,086, filed Apr. 2, 2007 and published as US 2007-0181075 A1 on Aug. 9, 2007.
Office Action mailed on: Sep. 1, 2011 in U.S. Appl. No. 11/695,087, filed Apr. 2, 2007 and published as US 2008-0078332 A1 on Apr. 3, 2008 and issued as U.S. Pat. No. 8,082,885 on Dec. 27, 2011.

(56) References Cited

OTHER PUBLICATIONS

Office Action mailed on: May 11, 2010 in U.S. Appl. No. 11/695,087, filed Apr. 2, 2007 and published as US 2008-0078332 A1 on Apr. 3, 2008 and issued as U.S. Pat. No. 8,082,885 on Dec. 27, 2011.
Office Action mailed on: Oct. 5, 2009 in U.S. Appl. No. 11/695,087, filed Apr. 2, 2007 and published as US 2008-0078332 A1 on Apr. 3, 2008 and issued as U.S. Pat. No. 8,082,885 on Dec. 27, 2011.
Office Action mailed: May 23, 2013 in U.S. Appl. No. 12/377,591, filed Feb. 13, 2009 and published as: 2011/0061600 on: Mar. 17, 2012.
Office Action mailed: May 23, 2013 in U.S. Appl. No. 12/377,591, filed Feb. 13, 2009 and published as: 2011/0061600 on: Mar. 17, 2011.
Office Action mailed on: Jun. 18, 2013 in U.S. Appl. No. 12/101,046, filed Apr. 10, 2008 and published as US 2008/0282990 on Nov. 20, 2008.
Office Action mailed: Jun. 26, 2013 in U.S. Appl. No. 13/771,015, filed Feb. 19, 2013 and published as US 2013/0220229 on Aug. 29, 2013.
Office Action mailed: Aug. 2, 2013 in U.S. Appl. No. 13/775,080, filed Feb. 22, 2013 and published as US 2013/0160716 on Jun. 27, 2013.
Office Action mailed on Oct. 18, 2013 in U.S. Appl. No. 13/270,165, filed Oct. 10, 2011 and published as US 2012-0085291 on Apr. 12, 2012.
Office Action mailed on Feb. 24, 2014 in U.S. Appl. No. 12/614,291, filed Nov. 6, 2009 and published as US 2010-0242852 on Sep. 30, 2010.
Office Action mailed on Mar. 6, 2014 in U.S. Appl. No. 12/101,046, filed Apr. 10, 2008 and published as US 2008/0282990 on Nov. 20, 2008.
Office Action mailed on May 6, 2014 in U.S. Appl. No. 13/270,165, filed Oct. 10, 2011 and published as US 2012-0085291 on Apr. 12, 2012.
Office Action dated Nov. 26, 2013 in U.S. Appl. No. 12/377,591, filed Nov. 23, 2010 and published as US 2011-0061600 on Mar. 17, 2011.
Office Action dated Dec. 5, 2013 in U.S. Appl. No. 13/771,015, filed Feb. 19, 2013 and published as US 2013-0220229 on Aug. 29, 2013.
Office Action dated Jan. 3, 2014 in U.S. Appl. No. 13/594,703, filed Aug. 24, 2012 and published as US 2012-0318207 on Dec. 20, 2012.
Office Action mailed May 16, 2014 in U.S. Appl. No. 13/775,080, filed Feb. 22, 2013 and published as US 2013/0160716 on Jun. 27, 2013.
Office Action dated Jun. 6, 2014 in U.S. Appl. No. 12/377,591, filed Nov. 23, 2010 and published as US 2011-0061600 on Mar. 17, 2011.
Office Action dated Jun. 18, 2014 in U.S. Appl. No. 13/771,015, filed Feb. 19, 2013 and published as US 2013-0220229 on Aug. 29, 2013.
Office Action dated Jun. 19, 2014 in U.S. Appl. No. 13/594,703, filed Aug. 24, 2012 and published as US 2012-0318207 on Dec. 20, 2012.
Extended European Search Report dated Jul. 23, 2014 in European Application No. EP 07811401.4-1655, filed on Aug. 17, 2007 and published as EP 2 059 121 on May 20, 2009.
Office Action mailed on Oct. 31, 2014 in U.S. Appl. No. 13/270,165, filed Oct. 10, 2011 and published as US 2012-0085291 on Apr. 12, 2012.
International Search Report and Written Opinion mailed on Nov. 11, 2014 in International Application No. PCT/US2014/044668, filed on Jun. 27, 2014 and published as WO 2015/002843 on Jan. 8, 2015.
Office Action mailed on Dec. 23, 2014 in U.S. Appl. No. 13/776,671, filed Feb. 25, 2013 and published as US 2014-0123906 on May 8, 2014.
Office Action dated Jan. 15, 2015 in U.S. Appl. No. 13/775,080, filed Feb. 22, 2013 and published as US 2013-0160716 on Jun. 27, 2013.
Office Action dated Feb. 20, 2015 in U.S. Appl. No. 13/771,015, filed Feb. 19, 2013 and published as US 2013-0220229 on Aug. 29, 2013.
Office Action dated Feb. 26, 2015 in U.S. Appl. No. 13/931,336, filed Jun. 28, 2013 and published as US 2013-0284109 on Oct. 31, 2013.
Office Action dated Mar. 20, 2015 in U.S. Appl. No. 12/377,591, filed Nov. 23, 2010 and published as US 2011-0061600 on Mar. 17, 2011.
Office Action dated Apr. 20, 2015 in U.S. Appl. No. 12/101,046, filed Apr. 10, 2008 and published as US 2008/0282990 on Nov. 20, 2008.
Office Action dated May 20, 2015 in U.S. Appl. No. 13/594,703, filed Aug. 24, 2012 and published as US 2012-0318207 on Dec. 20, 2012.
Office Action mailed on May 28, 2015 in U.S. Appl. No. 13/270,165, filed Oct. 10, 2011 and published as US 2012-0085291 on Apr. 12, 2012.
Office Action mailed Jul. 20, 2015 in U.S. Appl. No. 13/775,080, filed Feb. 22, 2013 and published as US 2013/0160716 on Jun. 27, 2013.
Office Action mailed on Aug. 10, 2015 in U.S. Appl. No. 13/776,671, filed Feb. 25, 2013 and published as US 2014-0123906 on May 8, 2014.
Office Action mailed Oct. 15, 2015 in U.S. Appl. No. 13/775,080, filed Feb. 22, 2013 and published as US 2013/0160716 on Jun. 27, 2013.
Office Action dated Oct. 27, 2015 in U.S. Appl. No. 13/931,336, filed Jun. 28, 2013 and published as US 2013-0284109 on Oct. 31, 2013.
Office Action dated Jul. 29, 2016 in U.S. Appl. No. 15/004,236, filed Jan. 22, 2016.
International Preliminary Report on Patentability mailed on Jan. 14, 2016 in International Application No. PCT/US2014/044668, filed on Jun. 27, 2014 and published as WO 2015/002843 on Jan. 8, 2015.
Office Action mailed on Jan. 25, 2016 in U.S. Appl. No. 13/270,165, filed Oct. 10, 2011 and published as US 2012-0085291 on Apr. 12, 2012.
Office Action dated Feb. 12, 2016 in U.S. Appl. No. 14/317,838, filed Jun. 27, 2014 and published as US 2015-0004679 on Jan. 1, 2015.
Office Action dated Mar. 16, 2016 in U.S. Appl. No. 13/931,336, filed Jun. 28, 2013 and published as US 2013-0284109 on Oct. 31, 2013.
Office Action dated Mar. 18, 2016 in U.S. Appl. No. 13/776,671, filed Feb. 25, 2013 and published as US 2014-0123906 on May 8, 2014.
International Search Report and Written Opinion mailed on Apr. 5, 2016 in International Application No. PCT/US2015/040647, filed on Jul. 15, 2015 and published as WO 2016/014319 on Jan. 28, 2016.
Office Action dated May 18, 2016 in U.S. Appl. No. 13/594,703, filed Aug. 24, 2012 and published as US 2012-0318207 on Dec. 20, 2012.

* cited by examiner

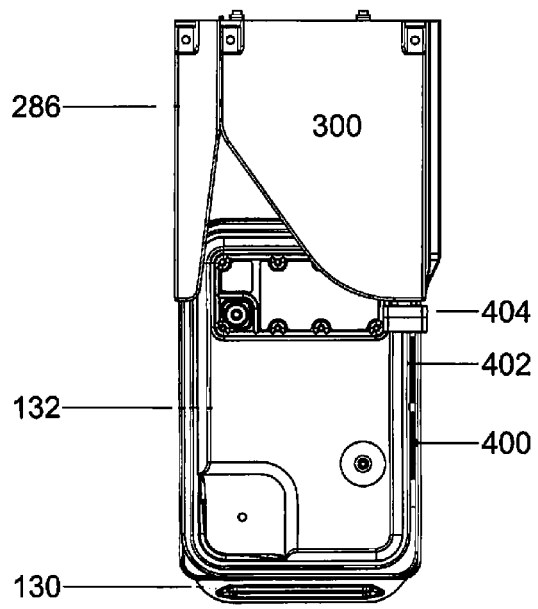
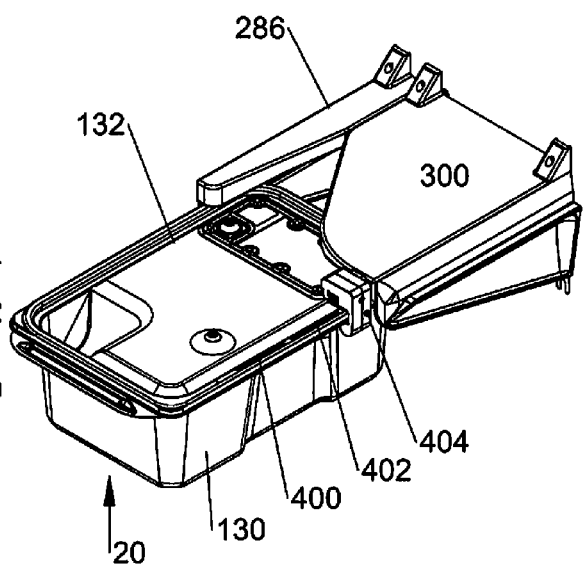
FIGURE 4A
FIGURE 4B
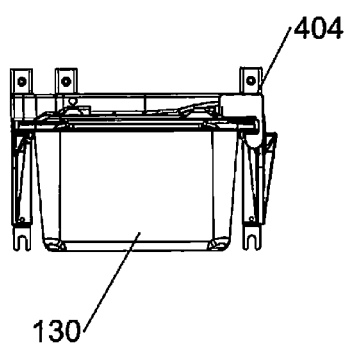
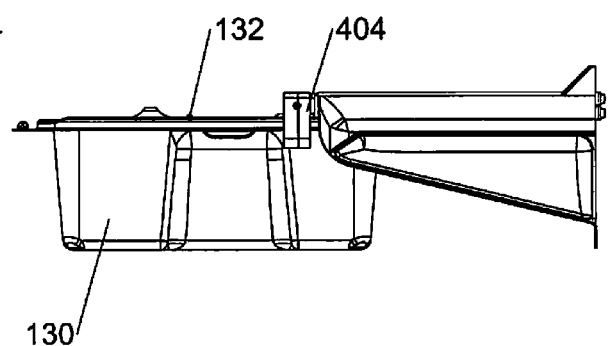
FIGURE 4C
FIGURE 4D

FIG. 16

RackNet    4:47 PM Sep. 30, 2010    Cage Components    ACH 55 DP 9

Cage Card Symbol ☺    Cage Location: M1, R4, C8    Identifier ID: XMB 1845

Lid
ID          775550777
First use   .2010-09-30 23:11:48

Bottom
ID          4097387301
First use   .2010-09-30 23:11:47

[DONE]

[AIRFLOW] [CAGES] [MESSAGES] [DATA] [CONFIG]

🔒 Log In

Innovive

Inventory Summary

Racks-1 Month Inventory

| Racks | Description | Number of Cages | Cage Lids/bottom | Status | Change Frequency | Alarms |
|---|---|---|---|---|---|---|
| ☐ rack1 | Rack #1 | 128 | 256/512 | alive | Average | Active |
| ☐ rack2 | Breeding Rack #5 | 96 | 96/192 | alive | Low | Active |
| ☐ rack3 | RS Prototype #1 | 87 | 174/348 | alive | High | Active |
| ☐ rack4 | future rack | n/a | n/a  n/a | down | n/a | Off |

Update target settings on selected racks

FIG. 17

Innovive

Rack Data Airflow

Rack Data for rack 'Rack #1' (rack1)

last 5 minutes | last hour | last 6 hours | last 12 hours | last day | last week | last month | all

| Type | Value | Time | Ref |
|---|---|---|---|
| ach | 33.99.40.09 | 2010-10-11 18:40:25 | 192287 |
| dp | 17.9 | 2010-10-11 18:40:25 | 192288 |
| ach | 31.44.39.82 | 2010-10-11 18:39:55 | 192285 |
| dp | 21.34 | 2010-10-11 18:39:55 | 192286 |
| dp | 23.7 | 2010-10-11 18:39:36 | 192284 |
| ach | 31.28.42.63 | 2010-10-11 18:39:36 | 192283 |
| dp | 17.28 | 2010-10-11 18:39:06 | 192282 |
| ach | 31.22.39.08 | 2010-10-11 18:39:06 | 192281 |
| ach | 30.99.39.83 | 2010-10-11 18:38:36 | 192279 |
| dp | 17.81 | 2010-10-11 18:38:36 | 192280 |
| ach | 31.37.39.47 | 2010-10-11 18:26:55 | 192277 |
| dp | 21.19 | 2010-10-11 18:26:55 | 192278 |
| ach | 33.66.38.89 | 2010-10-11 18:26:25 | 192275 |
| dp | 17.51 | 2010-10-11 18:26:25 | 192276 |
| dp | 20.39 | 2010-10-11 18:25:57 | 192274 |
| ach | 32.4.39.9 | 2010-10-11 18:25:56 | 192273 |
| dp | 23.35 | 2010-10-11 18:25:27 | 192272 |
| ach | 32.05.40.68 | 2010-10-11 18:25:26 | 192271 |
| dp | 22.51 | 2010-10-11 18:24:56 | 192270 |

*FIG. 18*

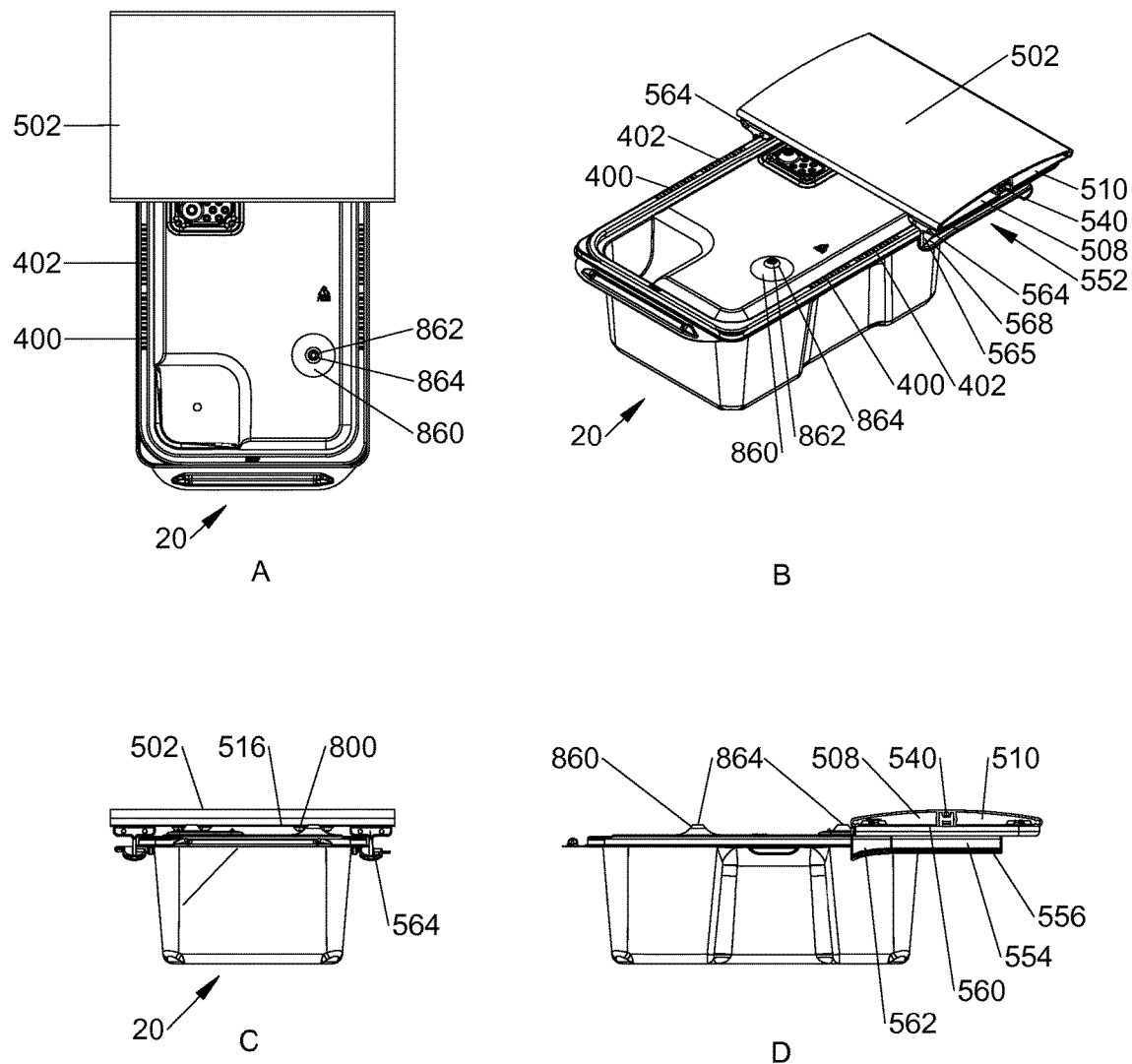
FIGS. 22A, B, C, D

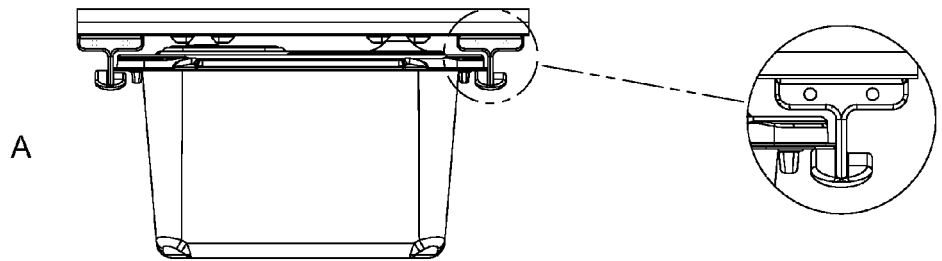
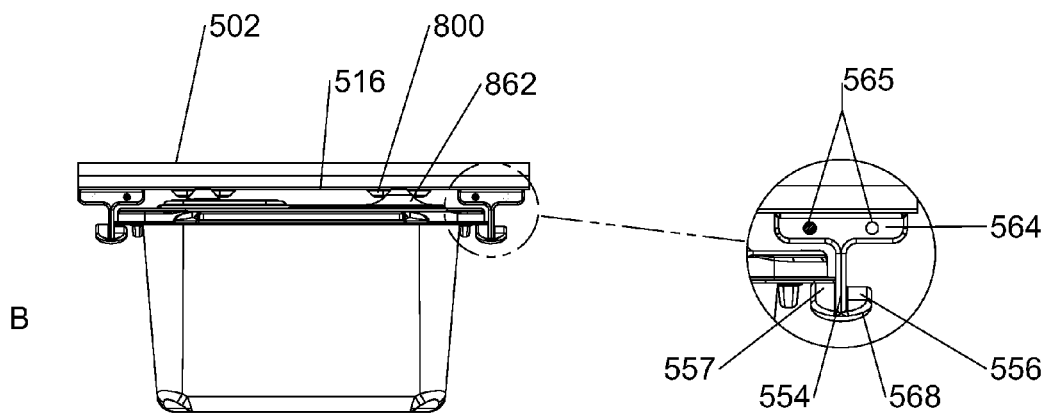
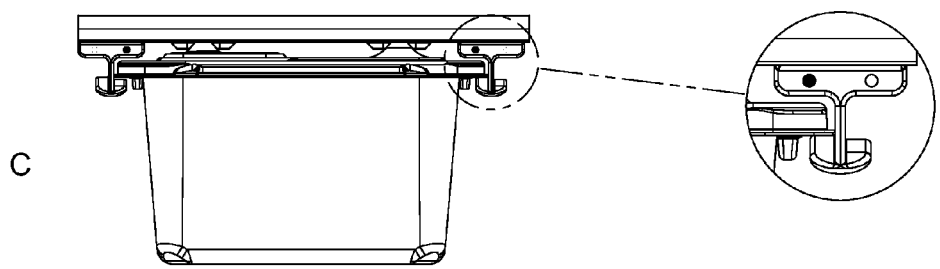
FIGS. 23 A,B,C

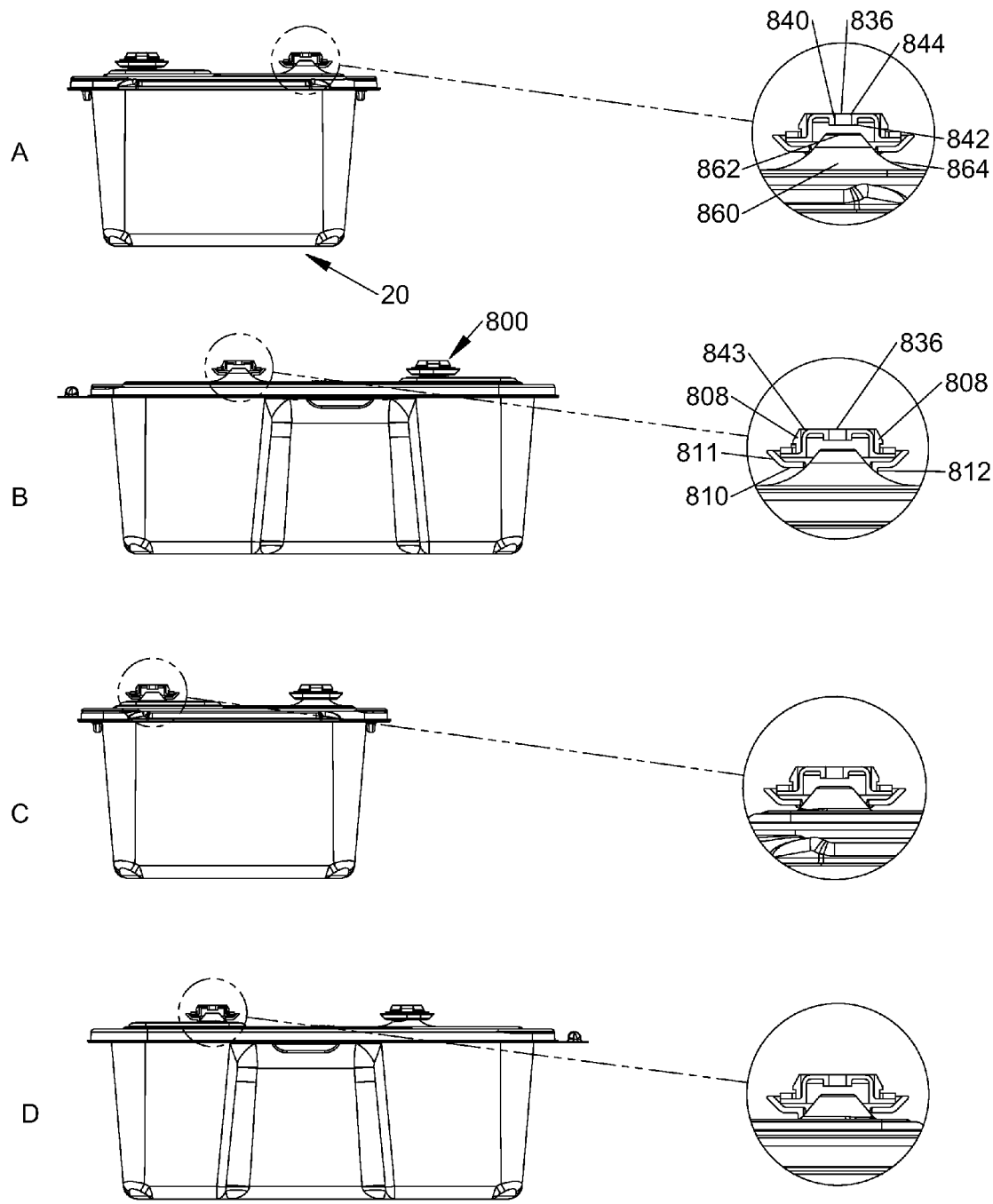
FIGS. 55 A,B,C,D

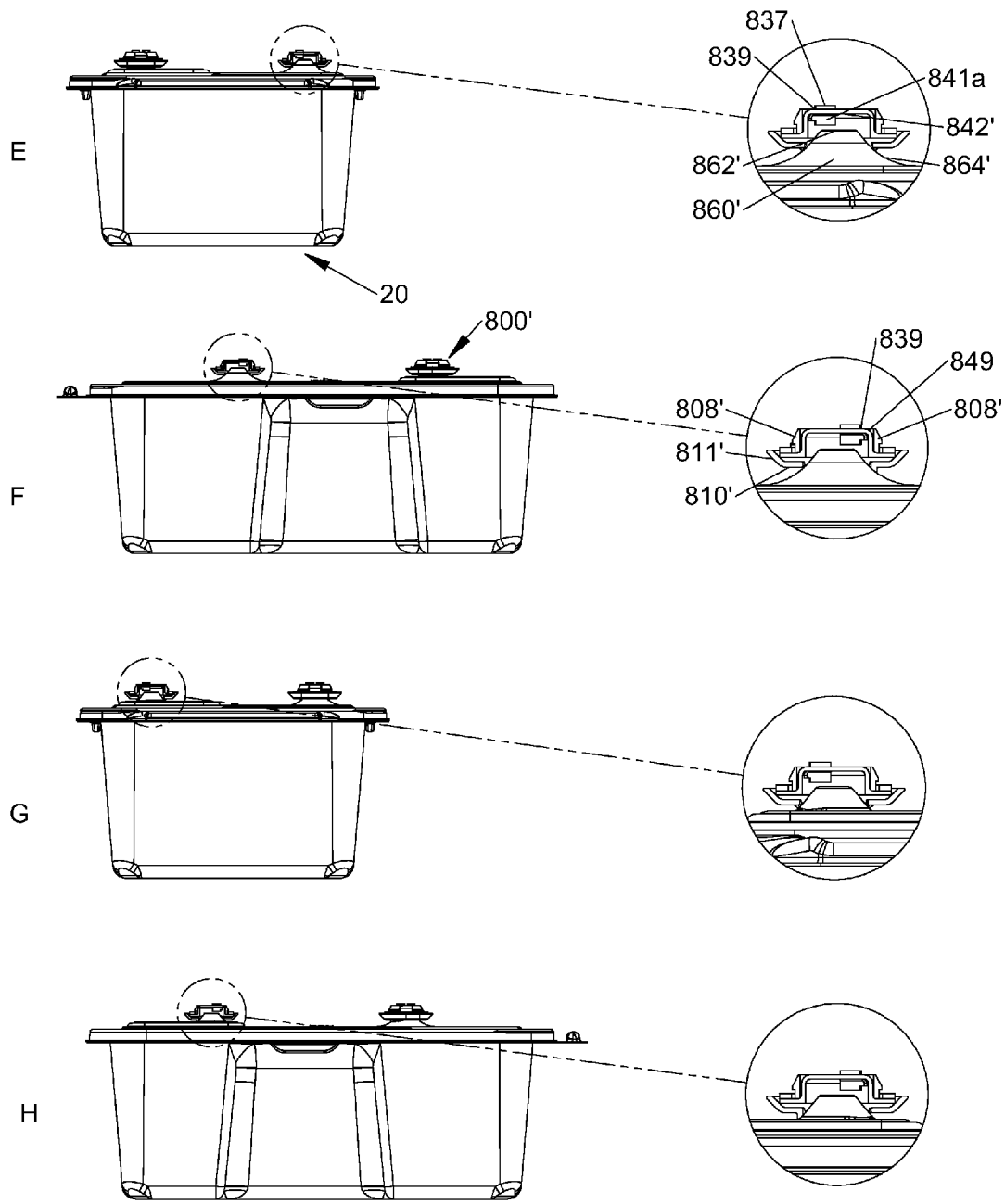
FIGS. 55 E,F,G,H

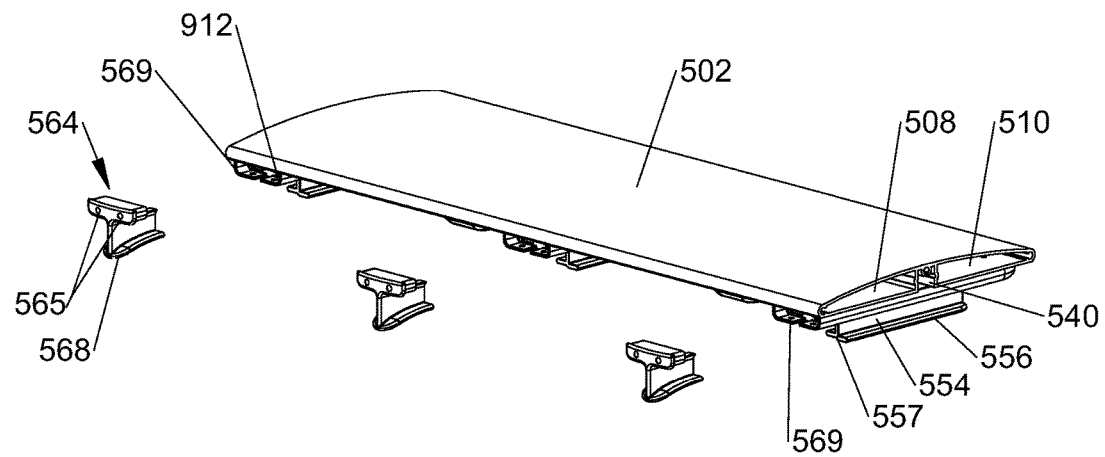
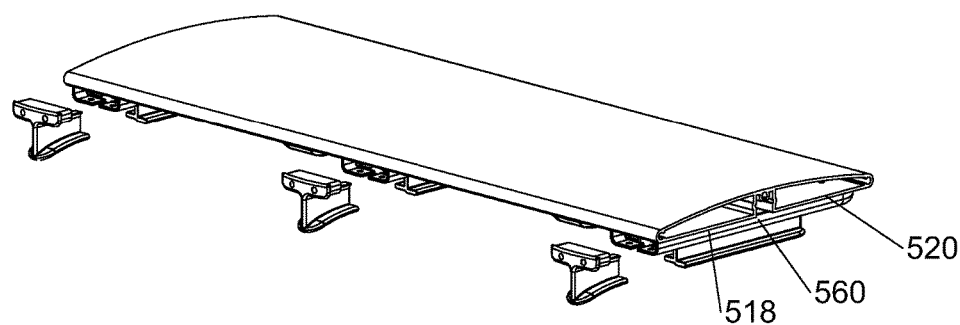
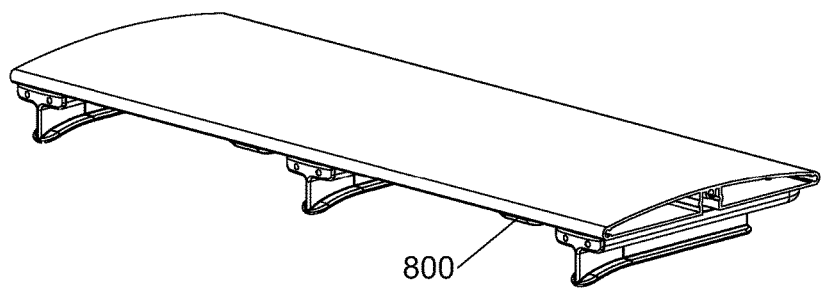
FIGS. 60 A,B,C

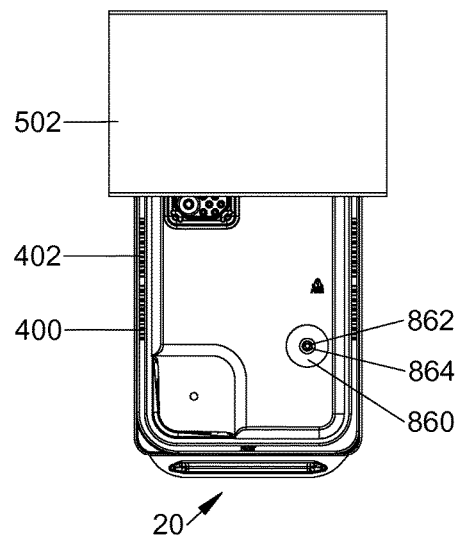
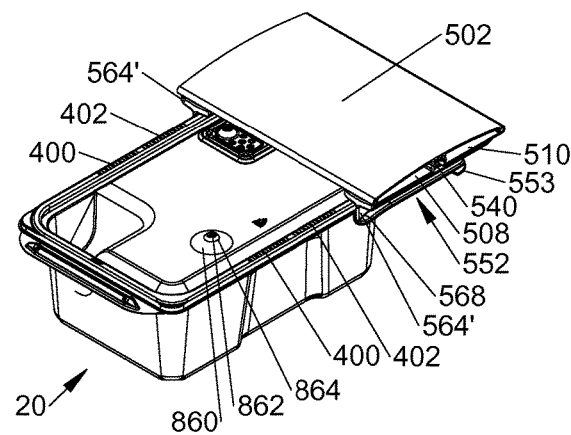
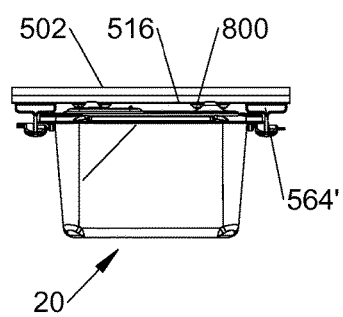
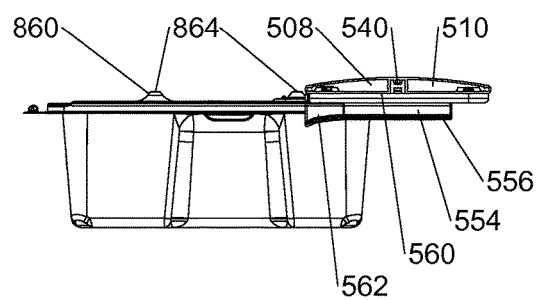
FIGS. 68 A, B, C, D

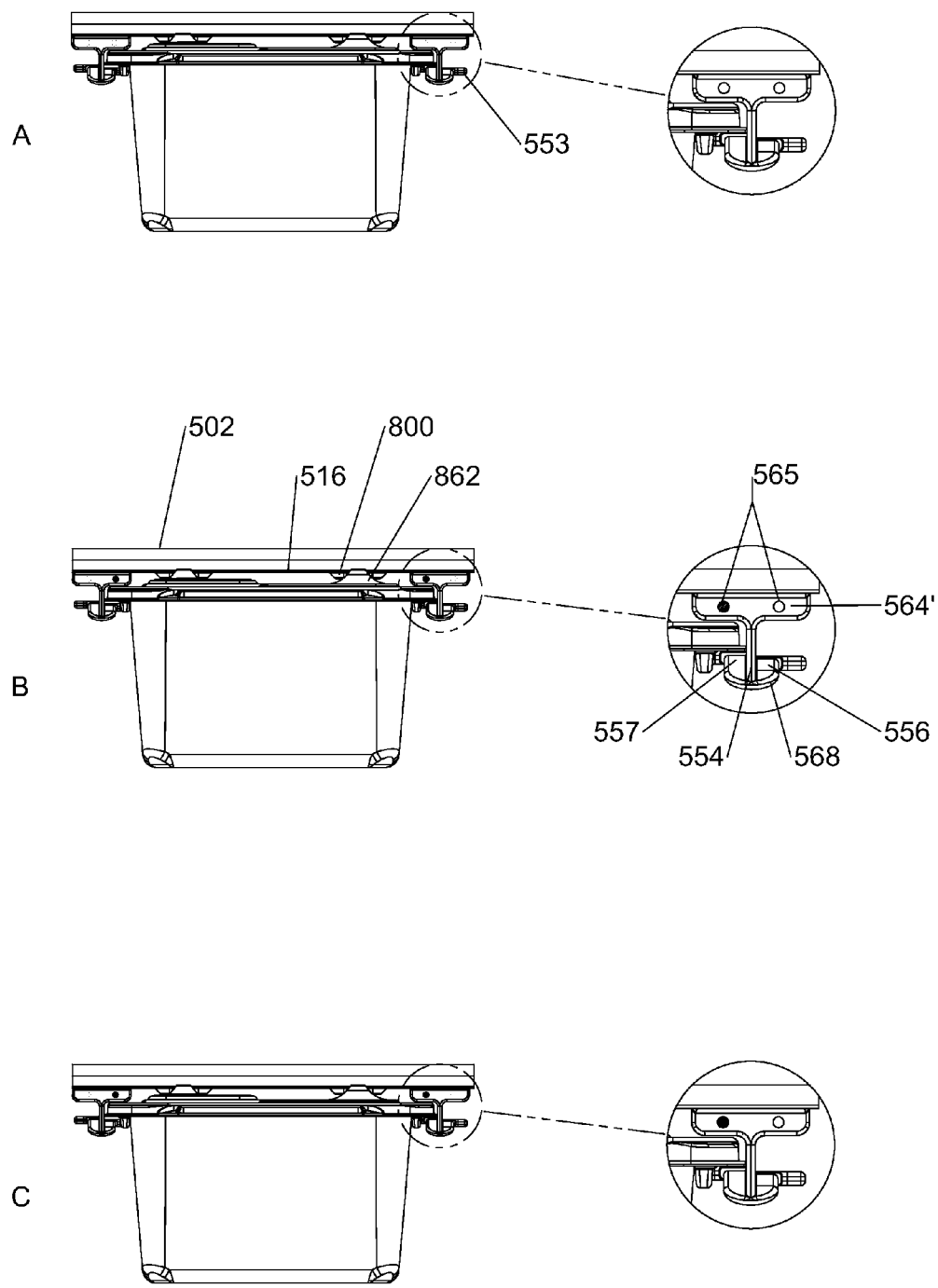
FIGS. 69 A,B,C

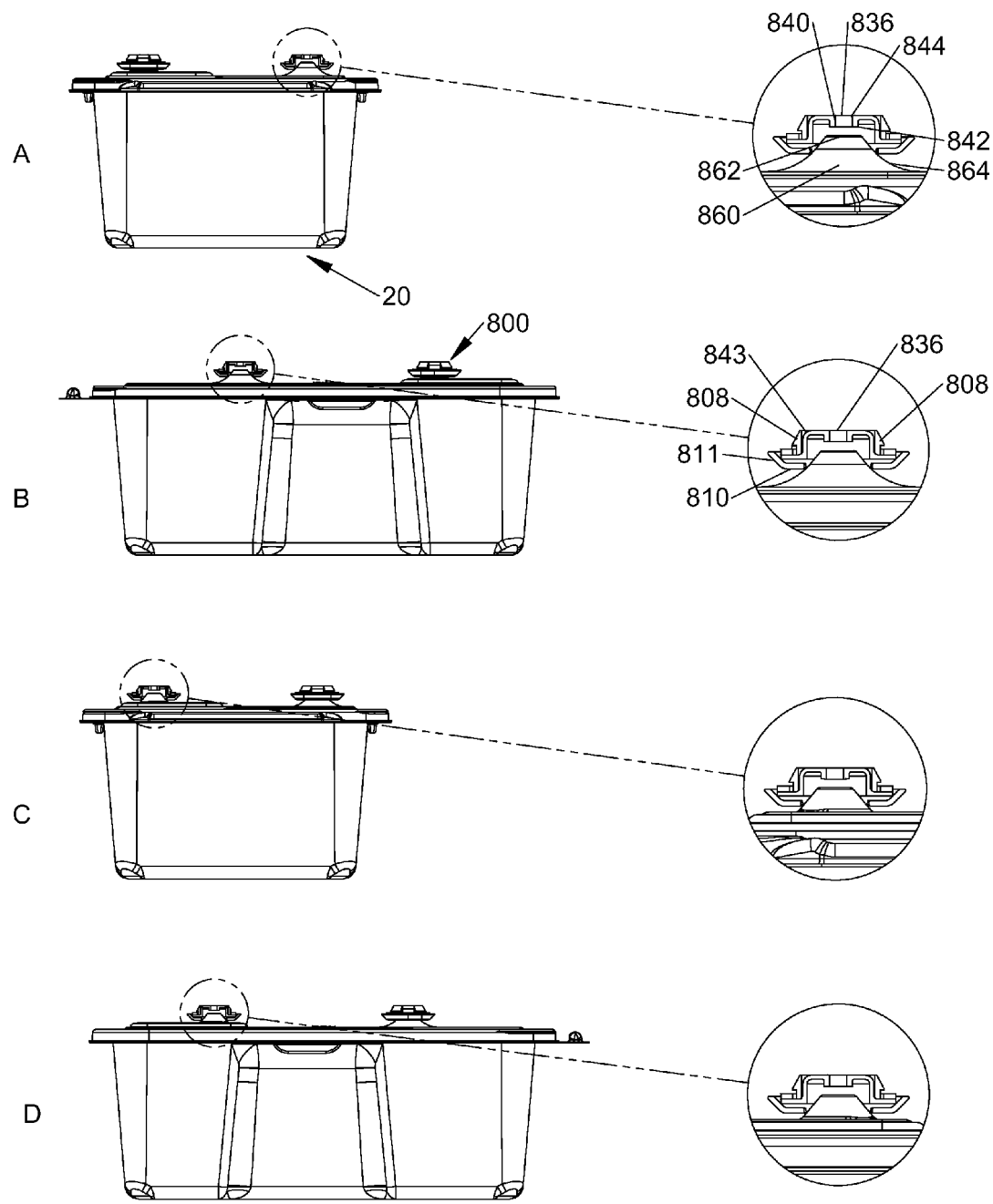
FIGS. 82 A,B,C,D

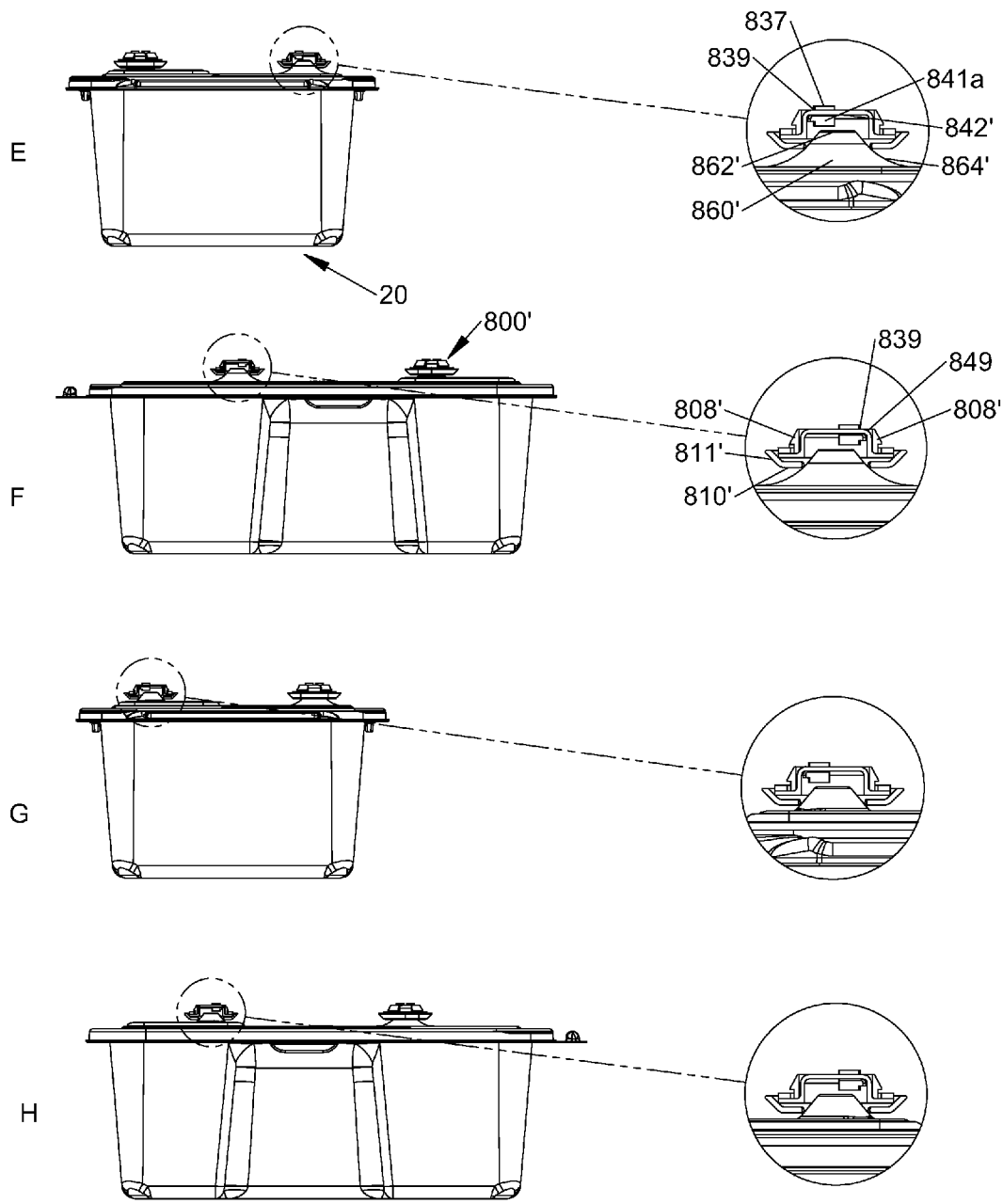
FIGS. 82 E,F,G,H

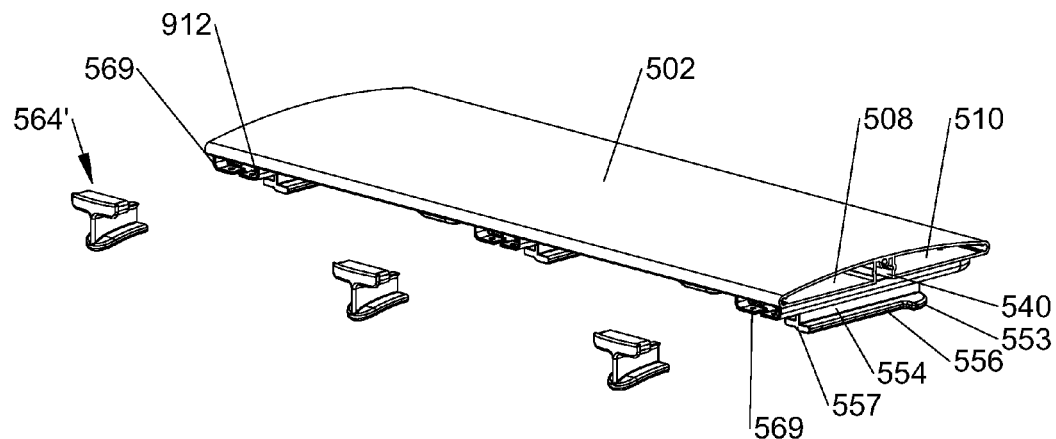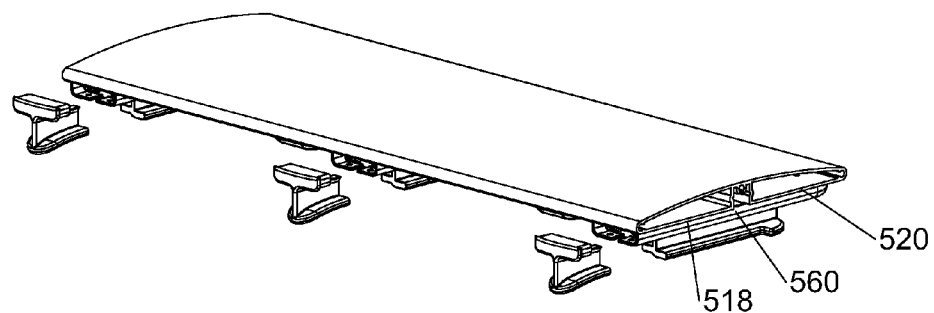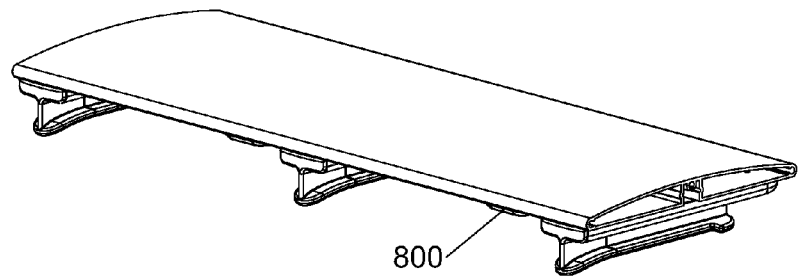
FIGS. 86 A,B,C

RODENT CONTAINMENT CAGE MONITORING APPARATUS AND METHODS

RELATED PATENT APPLICATION(S)

This application is a continuation of U.S. patent application Ser. No. 13/270,165, filed Oct. 10, 2011, entitled "Rodent Containment Cage Monitoring Apparatus and Methods", naming Dee L. Conger et al. as inventors, which claims the benefit of (i) U.S. Provisional Patent Application No. 61/541,859, filed Sep. 30, 2011, entitled "Rodent Containment Cage Monitoring Apparatus and Methods", naming Dee L. Conger et al. as inventors, (ii) U.S. Provisional Patent Application No. 61/495,855, filed Jun. 10, 2011, entitled "Rodent Containment Cage Monitoring Apparatus and Methods", naming Dee L. Conger et al. as inventors and (iii) U.S. Provisional Patent Application No. 61/391,972, filed Oct. 11, 2010, entitled "Rodent Containment Cage Monitoring Apparatus and Methods", naming Dee L. Conger et al. as inventors.

This application is also related to U.S. Provisional Patent Application No. 61/112,588, filed Nov. 7, 2008, entitled "Rack System and Monitoring for Animal Husbandry", naming Dee L. Conger et al. as inventors. This application is also related to Patent Application No. 60/911,271, filed Apr. 11, 2007, naming Dee L. Conger, Thomas M. Perazzo, Francesca McGuffie, and Matthew D. d'Artenay as inventors, entitled "Animal Husbandry Drawer Caging Systems and Components", and to U.S. Provisional Patent Application No. 60/979,721, filed Oct. 12, 2007, naming Dee L. Conger and Thomas M. Perazzo as inventors, entitled "Animal Husbandry Drawer Caging". This application is also related to U.S. Provisional Patent Application Nos. 60/635,756, 60/690,811 and 60/717,826 filed on 13 Dec. 2004, 14 Jun. 2005 and 16 Sep. 2005, respectively, entitled "Animal Containment Systems And Components," naming Thomas Perazzo and Dee Conger as inventors. This application is also related to U.S. Provisional Patent Application Nos. 60/734,229 and 60/734,189, each filed on 7 Nov. 2005, entitled "Containment Systems And Components For Animal Husbandry," naming Thomas Perazzo and Dee Conger as inventors. This application is also related to U.S. Provisional Patent Application No. 60/804,554 filed on 12 Jun. 2006, entitled "Containment Systems And Components For Animal Husbandry," naming Dee Conger et al. as inventors. This application is also related to U.S. Provisional Patent Application Nos. 60/822,755 and 60/822,914 filed on 17 Aug. 2006 and 18 Aug. 2006, entitled "Containment Systems And Components For Animal Husbandry," naming Dee Conger et al. as inventors. This application is also related to U.S. patent application Ser. No. 11/300,664 filed on 13 Dec. 2005, International Patent Application No. PCT/US2005/044977 filed on 13 Dec. 2005, U.S. patent application Ser. No. 11/423,949 filed on Jun. 13, 2006, and International Patent Application No. PCT/US2006/023038, each entitled "Containment Systems And Components For Animal Husbandry," each naming Dee Conger et al. as inventors, International Patent Application No. PCT/US2007/018255, filed Aug. 17, 2007, naming Dee L. Conger, Thomas M. Perazzo, Matthew D. d'Artenay and Francesca McGuffie as inventors, entitled "Containment Systems and Components for Animal Husbandry".

Each of the foregoing patent applications is incorporated herein by reference in its entirety, including all text, tables and drawings.

FIELD

The technology relates in part to the field of animal husbandry and to animal containment.

BACKGROUND

Animal containment systems are utilized in a variety of applications, such as for animal transportation, breeding and maintenance. Animals contained in the systems often are laboratory animals such as rodents, and such animals often are contained in a vivarium. Containment systems may include animal cages in which the animals are housed and a rack unit onto which cages are mounted. Animals contained in such systems emit several gaseous and particulate contaminates that are health risks to housed animals and human personnel maintaining the systems. Generally, permanent or multiple-use cages are designed for multiple uses, which requires they are washed and sterilized about every week for two years or more in an animal containment facility, for example, especially in a facility practicing Good Laboratory Procedures (GLPs). Multiple-use cages generally are heavy and have relatively thick walls and components often are constructed from resilient materials that can withstand multiple washes and sterilizations. Such cages may be disposed in a rack that holds multiple cages in order to house the animals more efficiently, however, it may be inconvenient to remove the cages from such rack in order to perform cleaning and other maintenance work. Due to these aspects of typical multiple-use animal containment systems, a significant portion of animal containment resources are required for washing and sterilizing multiple-use components. Multiple-use cage designs also can present disadvantages with respect to contamination, such as requiring contaminated air filter handling or exposure of cage components to the environment when a cage impacts a surface (e.g., a cage is dropped by a user or falls from an elevation), for example, which bear especially on handling of animals in higher biosafety level animal facilities. As such, what has been needed are animal containment cages and management systems that eliminate the need for regular washing of cages, provide a safe and healthy environment for contained animals and optionally provide an efficient means for housing and maintaining a large number of animals in a limited space.

SUMMARY

Provided in some embodiments are rodent containment cage systems, comprising a first cage component comprising a first detectable identifier and a second cage component comprising a second detectable identifier, the second cage component covering the first detectable identifier, and a detector, whereby the detector is configured to detect the first detectable identifier and the second detectable identifier. In some embodiments, the first cage component, second cage component, or first cage component and second cage component includes two or more identifiers. In certain embodiments, the identifier is selected from the group consisting of bar codes, serial numbers, radio frequency identifiers, discoloring polymers, reflective identifiers, non-reflective identifiers, magnetic identifiers, symbolic codes, chemical sensor identifiers, infrared wavelength identifiers, optical wavelength identifiers, or combinations thereof. In some embodiments, the identifier serves as a clocking identifier, a cage position identifier, a content identifier, or combination thereof. The detector may be in effective connection with a rack. The detector may attach to a shelf in the rack and the first and second cage components may engage with the shelf. The rack may comprise a shelf that includes a channel into which a portion of the cage can slide and the detector is located on the shelf in proximity to the channel and is configured to detect the first and second detectable identifiers when the cage is slid into the channel and the first and second detectable identifies pass the detector. A detector may attach to a side of the shelf in the rack and the first and second cage components each may include a flange whereby a surface of each flange of the first and second cage component may contact each other when the cage components are engaged and identifiers are located on the flange of each cage component, and the detector is in-line with the flanges and identifiers on the cage components for detection. The detector may employ materials selected from the group consisting of mechanical, magnetic, magnetic optical, optical, automatic, chemical sensing, fluorescence sensing components or combinations thereof. The detector may be located in a handheld device. The detector may be located on a cage component. The cage component may be selected from the group consisting of a cage lid component, cage base component, air supply or air exhaust component, water supply component, sensor component, filter component, baffle component or feeder component. One or more identifiers may be located on back of a cage component, on the side or sides of a cage component, on top of a cage component, on one or more flanges of a cage component, on a non-cage item, on a rack component, juxtaposed to another identifier, overlapping another identifier, or combinations thereof. The identifier may be placed on one or more cage components by a process selected from the group consisting of heat, ink jet, embossing, laser impression, sticker, adhesive, discoloring polymers, electromagnetic wavelength absorbing polymer additives, magnets, or fasteners. The system may comprise a display; the display may be located on a rack of the system; and the display may be located in a location remote from the rack. The system may further comprise one or more indicators on a rack of the containment cage system. The term "shelf" as used herein refers to one or more rack components that are utilized to support a cage or cage component (e.g., a cage mount).

Also provided is a rodent containment cage system comprising one or more cage components comprising a first detectable identifier and a second detectable identifier, and a detector, where the detector is configured to detect the first detectable identifier or the second detectable identifier. Sometimes the cage component is a lid. Sometimes the cage component is a cage base. Sometimes the cage components are a cage lid and a cage base. Sometimes the detector is attached to a cage mount assembly. Sometimes the detector is part of the front module of a cage mount assembly.

Also provided is a rodent containment cage system, comprising one or more cage components comprising a first detectable identifier and a second detectable identifier, and a first detector and a second detector, where the first detector is configured to detect the first detectable identifier and the second detector is configured to detect the second detectable identifier. Sometimes the cage component is a lid. Sometimes were the cage component is a cage base. Sometimes the cage components are a cage lid and a cage base. Sometimes the first and second detectable identifiers are on opposite sides along the length of a cage. Sometimes the first and second detectors are on adjacent cage mount assembles attached to a cage rack. Sometimes the first detector is configured to detect the first detectable identifier and the second detector is configured to detect the second detectable identifier when the cage is slid into the cage mount assemblies.

Also provided is a rodent containment cage system, comprising a cage component comprising a detectable identifier and a first detector configured to detect the identifier. Sometimes the cage component is cage lid. Sometimes the cage component is cage base. Sometimes the detector is attached to a cage mount assembly. Sometimes the detector is part of the front module of a cage mount assembly. Sometimes the detector is configured to detect the detectable identifier when a cage comprising the cage component with the identifier is slid into the cage mount assemblies.

Provided also in some embodiments is a rodent containment cage, comprising a base that includes a first detectable identifier, and a lid comprising a second detectable identifier, affixed to the base, and covering the first detectable identifier, whereby the second detectable identifier is located in proximity to the first detectable identifier. In some embodiments, a detector is configured to detect the first detectable identifier and the second detectable identifier. In certain embodiments, the base or lid includes two or more identifiers. In some embodiments, the identifier is selected from the group consisting of bar codes, serial numbers, radio frequency identifiers, discoloring polymers, reflective identifiers, non-reflective identifiers, magnetic identifiers, symbolic codes, chemical sensor identifiers, or combinations thereof. In certain embodiments, the identifier serves as a clocking identifier, a cage position identifier, a content identifier, or combination thereof. The detector may be in effective connection with the cage, and the detector may be located on a cage component. The base, lid or both may be substantially transparent. One or more identifiers may be located on the back of the base or lid, on the side or sides of the base or lid, on top of the base or lid, on one or more flanges of the base or lid, juxtaposed to another identifier, overlapping another identifier, or combinations thereof. The identifier may be placed on one or more cage components by a process selected from the group consisting of heat, ink jet, embossing, laser impression, sticker, adhesive, discoloring polymers, magnets, or fasteners.

Also provided is a rodent containment cage, comprising one or more components with a first detectable identifier and second detectable identifier. Sometimes the cage component is a lid. Sometimes were the cage component is a cage base. Sometimes the cage components are a cage lid and a cage base. Sometimes the first and second identifiers are on opposite sides of the length of a cage. Sometimes the first identifier and the second identifier are the same. Sometimes the first identifier and the second identifier are different. Sometimes the first and second detectable identifiers comprise bar codes.

In some embodiments, one or more identifiers are configured so they do not overlap with one another. In certain embodiments, one or more identifiers are configured so two or more identifiers overlap. In some embodiments having overlapping identifiers, the identifiers can be offset from each other thereby generating regions of non-overlapping identifiers and regions of overlapping identifiers. In some embodiments, overlapping identifiers are detected by the same detector, and in certain embodiments, overlapping identifiers are detected by different detectors. In certain embodiments, each identifier in an overlapping identifier configuration is detected by a different detector. In some embodiments, each cage component has 2 or more, 3 or more, 4 or more, or more than 5 independently detectable identifiers, and in certain embodiments, a subset or all of the independently detectable identifiers can be detected in various combinations. In some embodiments having two or more identifiers (e.g., overlapping or non-overlapping), portions or all of the identifiers may be redundant. The detector may be connected to a shelf in a rack in some embodiments.

Also provided is a rodent containment cage, comprising a component with a detectable identifier.

Also provided in some embodiments is a method for detecting identifiers on a rodent containment cage, comprising engaging a cage with a shelf of a rack, the cage comprising a base that includes a first detectable identifier and lid that includes a second detectable identifier, and the shelf comprising a detector; and sliding the cage into the shelf, whereby the first detectable identifier and the second detectable identifier are detected by the detector as they pass the detector when the cage is slid into the shelf. In some embodiments, the lid covers the first detectable identifier and first detectable identifier is detected through the lid. In certain embodiments, the detector is an optical reader, the first detectable identifier and the second detectable identifier are configured for optical detection, and the lid is substantially transparent. In some embodiments, the first detectable identifier and the second detectable identifier are arranged in-line. In certain embodiments, the lid or the base includes two or more detectable identifiers. The detectable identifier may be selected from the group consisting of bar codes, serial numbers, radio frequency identifiers, discoloring polymers, reflective identifiers, non-reflective identifiers, magnetic identifiers, symbolic codes, chemical sensor identifiers, and combinations thereof. The detectable identifier may serve as a clocking identifier, a cage position identifier, a content identifier, or combination thereof. The shelf may further comprise a channel and the cage can slide into the shelf by engaging the channel.

Also provided is a method for detecting identifiers on a rodent containment cage, comprising engaging a cage with rail guides on adjacent first and second cage mount assemblies of a rack, the cage comprising a first detectable identifier and a second detectable identifier, and the first and second cage mount assemblies each comprising a detector, and sliding the cage into the cage mount assemblies thereby contacting the cage lid with the rail guides of the first and second cage mount assemblies, whereby the first detectable identifier is detected by the detector on the first cage mount assembly and the second detectable identifier is detected by the detector on the second cage mount assembly as each identifier passes each detector when the cage is slid into the first and second cage mount assemblies. Sometimes the detectable identifiers comprise bar codes.

Also provided is a method for detecting an identifier on a rodent containment cage, comprising engaging a cage with a rail guide on a cage mount assembly of a rack, the cage comprising a detectable identifier and the cage mount assembly comprising a detector and sliding the cage into the cage mount assembly thereby contacting the cage lid with the rail guide of the cage mount assembly, whereby the detectable identifier is detected by the detector on the cage mount assembly as the identifier passes the detector when the cage is slid into the cage mount assembly.

In some embodiments, one or more identifiers are transparent or opaque to one or more detection means (e.g., electromagnetic radiation). Generally, electromagnetic radiation emitted or absorbed by an object is characteristic of the object's electromagnetic spectrum, which electromagnetic spectrum often can be detected. Electromagnetic radiation often includes features such as electromagnetic frequencies and/or electromagnetic wavelengths and an electromagnetic spectrum sometimes comprises substantially all readily detectable electromagnetic radiation. Transparency and/or opaqueness to one or more electromagnetic features can be predetermined by the use of various detectable materials and detectors. Detectable materials sometimes are part of, included in or layered on materials utilized to generate cage components described herein. In some embodiments, a cage component may be transparent to some wavelengths, but not all electromagnetic wavelengths (e.g., opaque to some wavelengths). In some embodiments, one or more cage components may be transparent to one or more types of electromagnetic radiation chosen from radio waves, micro wavelengths, infrared wavelengths, visible wavelengths, ultraviolet wavelengths, soft x-rays, the like or combinations of the foregoing. In some embodiments, one or more cage components may be opaque to one or more types of electromagnetic radiation chosen from radio waves, micro wavelengths, infrared wavelengths, visible wavelengths, ultraviolet wavelengths, soft x-rays, the like or combinations of the foregoing. The term "opaque" with regard to electromagnetic radiation refers to a cage component and/or identifier allowing transmission of 5% or less of an electromagnetic feature.

Provided also in certain embodiments is a rodent containment cage system, comprising a rack that includes a cage, the cage including a base that comprises a first detectable identifier, a lid that comprises a second detectable identifier, and a third detectable identifier in association with the lid and/or the base that includes cage content information; a shelf connected to the rack and in association with the cage, the shelf including a detector configured to detect the first detectable identifier, the second detectable identifier and the third detectable identifier, and a processor in effective communication with the detector that associates the cage content information with the first detectable identifier and the second detectable identifier. In some embodiments, a controller is in effective communication with the processor and is configured to receive association information from the processor. In certain embodiments, an indicator is in effective communication with the controller, and the indicator is configured to identify one or more cage components in association with the cage content information or subset thereof. In some embodiments, the indicator identifies one or more cage components by a visual, auditory, tactile indicator or combinations thereof. The indicator may be a visual light display, and sometimes the indicator is a LED display. The indicator may be integrated into the detector, and in some embodiments the indicator is integrated into the rack. The cage and/or the lid may be in association with a card that comprises cage content information. The lid may cover the first detectable identifier and first detectable identifier is detected through the lid in some embodiments. The first detectable identifier and the second detectable identifiers may be arranged in-line or may be arranged to overlap one another. The second detectable identifier and the third detectable identifiers may be arranged in-line or may be arranged to overlap one another. In some embodiments the first detectable identifier and the third detectable identifiers are arranged in-line or are arranged to overlap one another. The system may further comprise a card that comprises cage content information. The controller may be located in a location on the rack and/or remote from the rack.

Also provided in some embodiments is a method for associating cage content information with one or more cage components in a rodent containment system, comprising detecting a first detectable identifier in association with a cage base, a second detectable identifier in association with a cage lid, and a third detectable identifier in association with the lid and/or the base that includes the cage content information, by a detector in association with a shelf that is connected to a rack, and transmitting the first detectable identifier, the second detectable identifier and the third detectable identifier to a processor configured to associate the cage content information of the third detectable identifier with the first detectable identifier and/or the second detectable identifier. In some embodiments, the method further comprises associating via the processor the cage content information of the third detectable identifier with the first detectable identifier and/or the second detectable identifier, thereby producing an association. In certain embodiments, the method further comprises transmitting the association from the processor to a controller. In some embodiments, the method further comprises transmitting the association from the controller to an indicator and identifying one or more cage components in association with the cage content information or subset thereof.

Provided also in certain embodiments is a method for associating parts of a rodent containment cage system, comprising receiving cage component data obtained from a detectable identifier, receiving cage content data; and associating the cage component data with the corresponding cage content data, thereby generating an association. In some embodiments, the cage component data is from an identifier detected by a detector. In certain embodiments, the cage content data is from a detectable identifier and/or manual input. In some embodiments, the method further comprises receiving cage condition data and associating the cage condition data with the corresponding cage content data and/or cage component data, thereby generating an association. The cage condition data may be from a detectable identifier and/or manual input. In some embodiments, the method further comprise receiving cage user data and associating the cage user data with the corresponding cage content data, corresponding cage component data and/or corresponding cage condition data, thereby generating an association. The cage user data may be from a detectable identifier and/or manual input. In certain embodiments, the method further comprises reporting the association. The association may include an association between the cage component data and the corresponding cage content data. The association may include an association between the cage condition data and the corresponding cage content data and/or the corresponding cage component data. The association may include an association between the cage user data, and the corresponding cage content data, the corresponding cage condition data and/or the corresponding cage component data. The reporting may be user-defined in some embodiments, and the reporting is pre-programmed in some embodiments. The reporting may be selected from the group consisting of cage indicators, graphics, inventory reports, security reports and productivity reports. The cage condition data may be selected from the group consisting of a food change, a water change, a medicine administered, a bedding material change, a filter change, a syringe administered, a glove used, and combinations thereof. The cage condition data may be given a time stamp and/or date stamp when the cage condition data is received. The cage user data may be selected from the group consisting of a personnel accessing the cage, a time of cage access, a date of cage access, a purpose of cage access, and combinations thereof. The cage component may be selected from the group consisting of a cage lid component, a cage base component, an air supply component, an air exhaust component, a water supply component, a sensor component, a filter component, a baffle component, a feeder and combinations thereof. The cage content data may be selected from the group consisting of number of animals, and type of animal in a cage, animal identifier, an owner of the cage, an age of an animal, a sex of an animal, a pedigree of an animal, an experimental procedure on an animal, an observations by a cage user, and combinations thereof. The detector may be connected to a shelf in a rack of the system.

Also provided in some embodiments is a computer program product, comprising a computer usable medium having a computer readable program code embodied therein, the computer readable program code adapted to be executed to implement a method for associating parts of a rodent containment cage system, the method comprising receiving cage component data obtained from a detectable identifier; receiving cage content data; and associating the cage component data with the corresponding cage content data, thereby generating an association. The cage component data may be from an identifier detected by a detector. The cage content data may be from a detectable identifier and/or manual input. The program product may further comprise receiving cage condition data and associating the cage condition data with the corresponding cage content data and/or cage component data, thereby generating an association. The cage condition data may be from a detectable identifier and/or manual input. The program product may further comprise receiving cage user data and associating the cage user data with the corresponding cage content data, corresponding cage component data and/or corresponding cage condition data, thereby generating an association. The cage user data may be from a detectable identifier and/or manual input. The program product may further comprise reporting the association. The association may include an association between the cage component data and the corresponding cage content data. The association may include an association between the cage condition data and the corresponding cage content data and/or the corresponding cage component data. The association may include an association between the cage user data, and the corresponding cage content data, the corresponding cage condition data and/or the corresponding cage component data. The reporting may be user-defined. The reporting may be pre-programmed. The reporting may be selected from the group consisting of cage indicators, graphics, inventory reports, security reports and productivity reports. The cage condition data may be selected from the group consisting of a food change, a water change, a medicine administered, a bedding material change, a filter change, a syringe administered, a glove used, and combinations thereof. The cage condition data may be given a time stamp and/or date stamp when the cage condition data is received. The cage user data may be selected from the group consisting of a personnel accessing the cage, a time of cage access, a date of cage access, a purpose of cage access, and combinations thereof. The cage component may be selected from the group consisting of a cage lid component, a cage base component, an air supply component, an air exhaust component, a water supply component, a sensor component, a filter component, a baffle component, a feeder component and combinations thereof. The cage content data may be selected from the group consisting of number of animals in a cage, type of animals in a cage, animal identifier, an owner of the cage, an age of an animal, a sex of an animal, a pedigree of an animal, an experimental procedure on an animal, an observations by a cage user, and combinations thereof. The detector may be connected to a shelf in a rack of the system. The computer program product may be stored on a removable storage device selected from the group consisting of a floppy disk, a hard disk, a magnetic tape, a CD-ROM disc, a DVD disc, a magneto-optical disc, or a USB drive. Also provided in certain embodiments is a computer program product, comprising a computer usable medium having a computer readable program code embodied therein, the computer readable program code including distinct software modules adapted to be executed to implement a method for associating parts of a rodent containment cage, the method comprising receiving, by a receiving module, cage component data obtained from a detectable identifier, receiving, by the receiving module, cage content data, and associating the cage component data with the corresponding cage content data, thereby generating an association, by an associating module. The cage component data may be from an identifier detected by a detector. The cage content data is from a detectable identifier and/or manual input. The program product further comprises receiving cage condition data and associating the cage condition data with the corresponding cage content data and/or cage component data, thereby generating an association. The cage condition data may be from a detectable identifier and/or manual input. The program product may further comprise receiving cage user data and associating the cage user data with the corresponding cage content data, corresponding cage component data and/or corresponding cage condition data, thereby generating an association. The cage user data may be from a detectable identifier and/or manual input. The program product may further comprise reporting the association of the one or more cage component data with the corresponding cage content data by a reporting module. The association may include an association between the cage component data and the corresponding cage content data. The association may include an association between the cage condition data and the corresponding cage content data and/or the corresponding cage component data. The association may include an association between the cage user data, and the corresponding cage content data, the corresponding cage condition data and/or the corresponding cage component data. The reporting may be user-defined. The reporting may be pre-programmed. The reporting by the reporting module may be selected from the group consisting of cage indicators, graphics, inventory reports, security reports and productivity reports. The cage condition data may be selected from the group consisting of a food change, a water change, a medicine administered, a bedding material change, a filter change, a syringe administered, or a glove used. The cage condition data may be given a time/date stamp when the cage condition data is performed. The cage user data may be selected from the group consisting of a personnel accessing the cage, a time of cage access, a date of cage access, or a purpose of cage access. The cage component may be selected from the group consisting of a cage lid component, a cage base component, an air supply component, an air exhaust component, a water supply component, a sensor component, a filter component, a baffle component or a feeder. The cage content data may be selected from the group consisting of a number and type of animals in a cage, an owner of the cage, an age of an animal, a sex of an animal, a pedigree of an animal, an experimental procedure on an animal or on an observation by a cage user. The detector may be connected to a shelf in a rack of the system. The computer program product may be stored on a removable storage device selected from the group consisting of a floppy disk, a hard disk, a magnetic tape, a CD-ROM disc, a DVD disc, a magneto-optical disc, or a USB drive.

Provided also in certain embodiments is a system that associates cage content data with corresponding cage component data in a rodent containment system comprising a programmable processor, the system comprising a processor that implements a method of a computer program product described herein. The cage component data may be from an identifier detected by a detector. The cage content data may be from a detectable identifier and/or manual input. The system further comprises in some embodiments receiving cage condition data and associating the cage condition data with the corresponding cage content data and/or cage component data, thereby generating an association. The cage condition data may be from a detectable identifier and/or manual input. The system may further comprise receiving cage user data and associating the cage user data with the corresponding cage content data, corresponding cage component data and/or corresponding cage condition data, thereby generating an association. The cage user data may be from a detectable identifier and/or manual input. The system may further comprise reporting the association. The association may include an association between the cage component data and the corresponding cage content data. The association may include an association between the cage condition data and the corresponding cage content data and/or the corresponding cage component data. The association may include an association between the cage user data, and the corresponding cage content data, the corresponding cage condition data and/or the corresponding cage component data. The reporting may be user-defined, and in some embodiments, the reporting may be pre-programmed. The reporting may be selected from the group consisting of cage indicators, graphics, inventory reports, security reports and productivity reports. The cage condition data may be selected from the group consisting of a food change, a water change, a medicine administered, a bedding material change, a filter change, a syringe administered, a glove used, and combinations thereof. The cage condition data may be given a time stamp and/or date stamp when the cage condition data is received. The cage user data may be selected from the group consisting of a personnel accessing the cage, a time of cage access, a date of cage access, a purpose of cage access, and combinations thereof. The cage component may be selected from the group consisting of a cage lid component, a cage base component, an air supply component, an air exhaust component, a water supply component, a sensor component, a filter component, a baffle component, a feeder and combinations thereof. The cage content data may be selected from the group consisting of number of animals in a cage, type of animals in a cage, animal identifier, an owner of the cage, an age of an animal, a sex of an animal, a pedigree of an animal, an experimental procedure on an animal, an observations by a cage user, and combinations thereof. The system may further comprise a detector in association with a rack that detects an identifier associated with the cage component data, the cage content data, the cage condition data and/or the cage user data. The system may further comprise a controller, the controller may be located on a rack of the system, and the controller may be located in a location remote from the rack. The system may further comprise one or more indicators on the rack.

Provided here is a rodent containment cage rack, comprising a plurality of cage mount support members each disposed between and connected to a first side member and a second side member, each support member comprising a wall that contains, or walls that contain, a first support member plenum and a second support member plenum substantially extending the length of the support member, each support member comprising a first set of cage connection apertures and a second set of cage connection apertures in the wall or walls of a lower surface of a support member, each aperture of the first set of cage connection apertures is in connection with the first support member plenum, and each aperture of the second set of cage connection apertures is in connection with the second support member plenum; each support member comprising a first set of support member end apertures in connection with the first support member plenum and a second set of support member end apertures in connection with the second support member plenum, each of which end apertures is at the end of each support member that connects to a side member; each side member comprising a wall that contains, or walls that contain, a first side member plenum and a second side member plenum substantially extending the length of the side member, and each side member comprising a first set of side member apertures and a second set of side member apertures in the wall or walls of the side member, one or more apertures of the first set of side member apertures are in connection with the first side member plenum and are in effective connection with one or more apertures of the first set of support member end apertures, and one or more apertures of the second set of side member apertures are in connection with the second side member plenum and are in effective connection with one or more apertures of the second set of support member end apertures. The first support member plenum may be in effective connection with each first side member plenum and each second support member plenum may be effective connection with each second side member plenum. The support member apertures may be regularly spaced across the transverse axis of the support member. The rodent containment cage rack may comprise a nozzle at each aperture in the support member.

The rodent containment cage rack may further comprise a plurality of cage mounts on a bottom surface of each support member. The rodent containment cage rack may comprise a first air connection plate comprising an aperture in effective connection with an aperture on the upper end of a first side member plenum of a side member and comprising a second air connection plate comprising an aperture in effective connection with an aperture on the upper end of a second side member plenum on the opposite side member.

Provided herein is a rodent containment cage rack, comprising a plurality of cage mount support members, which contain a communication medium, each disposed between and connected to a first side member and a second side member and a first side member and a second side member which contain a communication medium. Sometimes the communication media in the support members are in effective communication with the communication media in the side members. Provided herein is a rodent containment cage rack comprising a plurality of cage mount support members each disposed between and connected to a first side member and a second side member each support member comprising a channel adapted to contain one or more communication media; each support member comprising an end aperture at each end which the support member connects to the side member and each side member comprising a channel adapted to contain one or more communication media. Sometimes the channels contain one or more communication media. Sometimes the side members and support members are directly and/or indirectly (e.g., effectively) connected via a gasket intermediary.

Provided herein is a rodent containment cage rack comprising a plurality of cage mount support members each disposed between and connected to a first side member and a second side member, each support member comprising a wall that contains, or walls that contain, a first support member plenum and a second support member plenum substantially extending the length of the support member, each support member comprising a first set of cage connection apertures and a second set of cage connection apertures in the wall or walls of a lower surface of a support member, each aperture of the first set of cage connection apertures is in connection with the first support member plenum, and each aperture of the second set of cage connection apertures is in connection with the second support member plenum, each support member comprising a first set of support member end apertures in connection with the first support member plenum and a second set of support member end apertures in connection with the second support member plenum, each of which end apertures is at the end of each support member that connects to a side member, each side member comprising a wall that contains, or walls that contain, a first side member plenum and a second side member plenum substantially extending the length of the side member, each side member comprising a first set of side member apertures and a second set of side member apertures in the wall or walls of the side member, one or more apertures of the first set of side member apertures are in connection with the first side member plenum and are in effective connection with one or more apertures of the first set of support member end apertures, and one or more apertures of the second set of side member apertures are in connection with the second side member plenum and are in effective connection with one or more apertures of the second set of support member end apertures; and each support member and each side member comprising a channel configured to receive one or more communication media. Sometimes the channel comprises one or more communication media.

Also provided is rodent containment cage rack, comprising a plurality of cage mount support members each disposed between and connected to a first side member and a second side member each support member comprising a wall that contains, or walls that contain, a first support member plenum and a second support member plenum substantially extending the length of the support member, each support member comprising a first set of cage connection apertures and a second set of cage connection apertures in the wall or walls of a lower surface of a support member, each aperture of the first set of cage connection apertures is in connection with the first support member plenum, and each aperture of the second set of cage connection apertures is in connection with the second support member plenum, each support member comprising a first set of support member end apertures in connection with the first support member plenum and a second set of support member end apertures in connection with the second support member plenum, each of which end apertures is at the end of each support member that connects to a side member, each side member comprising a wall that contains, or walls that contain, a first side member plenum and a second side member plenum substantially extending the length of the side member, each side member comprising a first set of side member apertures and a second set of side member apertures in the wall or walls of the side member, one or more apertures of the first set of side member apertures are in connection with the first side member plenum and are in effective connection with one or more apertures of the first set of support member end apertures, and one or more apertures of the second set of side member apertures are in connection with the second side member plenum and are in effective connection with one or more apertures of the second set of support member end apertures; and each support member and each side member comprises one or more communication media. Sometimes the one or more communication media are contained in a channel in each support member and each side member. Sometimes the channel in each support member is disposed between the first support member plenum and the second support member plenum. Sometimes the channel in each side member is disposed between the first side member plenum and the second side member plenum. Sometimes the communication media in the side members are in effective connection with the communication media in the support members.

Sometimes the rack comprises a plurality of cage mounts on a bottom surface of each support member. Sometimes each cage mount has a channel adapted to contain communication media.

Sometimes the one or more communication media in the support member are in communication with the communication media in the cage mounts.

Also provided is a rodent containment cage rack, comprising a plurality of cage mount support members each disposed between and connected to a first side member and a second side member, each support member comprising a wall that contains, or walls that contain, a first support member plenum and a second support member plenum substantially extending the length of the support member, each support member comprising a first set of cage connection apertures and a second set of cage connection apertures in the wall or walls of a lower surface of a support member, each aperture of the first set of cage connection apertures is in connection with the first support member plenum, and each aperture of the second set of cage connection apertures is in connection with the second support member plenum, each support member comprising a first set of support member end apertures in connection with the first support member plenum and a second set of support member end apertures in connection with the second support member plenum, each of which end apertures is at the end of each support member that connects to a side member, each side member comprising a wall that contains, or walls that contain, a first side member plenum and a second side member plenum substantially extending the length of the side member, each side member comprising a first set of side member apertures and a second set of side member apertures in the wall or walls of the side member, one or more apertures of the first set of side member apertures are in connection with the first side member plenum and are in effective connection with one or more apertures of the first set of support member end apertures, and one or more apertures of the second set of side member apertures are in connection with the second side member plenum and are in effective connection with one or more apertures of the second set of support member end apertures, and the rack is configured to, when positive air pressure is supplied to the first side member plenum of a side member, direct air from the first side member plenum of a side member to the first set of side member apertures of a side member to a set of support member end apertures to the first support member plenums and through the first set of cage connection apertures.

Also provided is a rodent containment cage rack, comprising a plurality of cage mount support members each disposed between and connected to a first side member and a second side member, each support member comprising a wall that contains, or walls that contain, a first support member plenum and a second support member plenum substantially extending the length of the support member, each support member comprising a first set of cage connection apertures and a second set of cage connection apertures in the wall or walls of a lower surface of a support member, each aperture of the first set of cage connection apertures is in connection with the first support member plenum, and each aperture of the second set of cage connection apertures is in connection with the second support member plenum, each support member comprising a first set of support member end apertures in connection with the first support member plenum and a second set of support member end apertures in connection with the second support member plenum, each of which end apertures is at the end of each support member that connects to a side member, each side member comprising a wall that contains, or walls that contain, a first side member plenum and a second side member plenum substantially extending the length of the side member, each side member comprising a first set of side member apertures and a second set of side member apertures in the wall or walls of the side member, one or more apertures of the first set of side member apertures are in connection with the first side member plenum and are in effective connection with one or more apertures of the first set of support member end apertures, and one or more apertures of the second set of side member apertures are in connection with the second side member plenum and are in effective connection with one or more apertures of the second set of support member end apertures and the rack is configured to, when negative air pressure is supplied to the second side member plenum of a side member, direct air through the second set of cage connection apertures to the second support member plenums to a second set of support member end apertures to the second set of side member apertures of a side member and to the second side member plenum of a side member.

Also provided is a rodent containment cage rack, comprising a plurality of cage mount support members each disposed between and connected to a first side member and a second side member, each support member comprising a wall that contains, or walls that contain, a first support member plenum and a second support member plenum substantially extending the length of the support member, each support member comprising a first set of cage connection apertures and a second set of cage connection apertures in the wall or walls of a lower surface of a support member, each aperture of the first set of cage connection apertures is in connection with the first support member plenum, and each aperture of the second set of cage connection apertures is in connection with the second support member plenum, each support member comprising a first set of support member end apertures in connection with the first support member plenum and a second set of support member end apertures in connection with the second support member plenum, each of which end apertures is at the end of each support member that connects to a side member, each side member comprising a wall that contains, or walls that contain, a first side member plenum and a second side member plenum substantially extending the length of the side member, each side member comprising a first set of side member apertures and a second set of side member apertures in the wall or walls of the side member, one or more apertures of the first set of side member apertures are in connection with the first side member plenum and are in effective connection with one or more apertures of the first set of support member end apertures, and one or more apertures of the second set of side member apertures are in connection with the second side member plenum and are in effective connection with one or more apertures of the second set of support member end apertures, the rack is configured to, when positive air pressure is supplied to the first side member plenum of a side member, direct air from the first side member plenum of a side member to the first set of side member apertures of a side member to a first set of support member end apertures to the first support member plenums and through the first set of cage connection apertures and the rack is configured to, when negative air pressure is supplied to the second side member plenum of a side member, direct air through the second set of cage connection apertures to the second support member plenums to a second set of support member end apertures to the second set of side member apertures of a side member and to the second side member plenum of a side member. Sometimes the side members and support members are directly and/or indirectly (e.g., effectively) connected via a gasket intermediary. Sometimes a blower is in effective connection with the rack that provides the positive air pressure. Sometimes a blower is in effective connection with the rack that provides the negative air pressure. Sometimes the blower is in effective connection to an aperture at the top of the side member, the second side member, or the first side member and the second side member. Sometimes the pressure across a first support member plenum varies less than 5%. Sometimes the rack comprises cage protrusion connection assemblies each comprising a nozzle in effective connection with the cage connection apertures and the pressure is measured at the assemblies. Sometimes the rack has one or more cages. Sometimes air enters each cage effectively through an aperture of the first set of cage connection apertures and exits the cage effectively through an aperture of the second set of cage connection apertures. Sometimes the one or more cages are engaged with cage protrusion connection assemblies in effective connection with the first set of cage connection apertures and the second set of cage connection apertures. Sometimes the air flow in the first support member plenum and the second support member plenum is transverse to the air flow across the bottom of the one or more cages.

Also provided is a modular blower system comprising independent modules, which modules comprise an air intake or air exhaust unit and a fan unit and a filter unit and where the modules are stacked in series. Sometimes the modules are vertically stacked. Sometimes the modules are horizontally stacked. Sometimes there is an air intake unit. Sometimes the air intake unit comprises a pre-filter and a baffle. Sometimes the edges of the stacked units are contiguous. Sometimes the sidewalls of the units are contiguous. Sometimes the blower comprises an air exhaust unit. Sometimes the air exhaust unit comprises an air outlet structure attached to a sidewall. Sometimes the outlet structure is perpendicular to a sidewall of the air exhaust unit.

Sometimes the air intake unit is connected to the fan unit, and the fan unit is connected to the filter unit. Sometimes the filter unit comprises a HEPA filter. Sometimes the air exhaust unit is connected to the fan unit, and the fan unit is connected to the filter unit. Sometimes the modular the filter unit comprises a HEPA filter. Sometimes the filter unit comprises a pre-filter upstream of the HEPA filter. Sometimes the modular blower further comprises a base. Sometimes the modular blower is attached to a rodent containment cage rack.

Also provided is a modular blower system comprising independent modules, which modules comprise a fan unit; and a filter unit and where modules are stacked in series. Sometimes the modules are vertically stacked. Sometime the modules are horizontally stacked. Sometimes the modular blower system comprising independent modules is functionally connected to the rack system utilizing a vibration dampening component (e.g., gasket).

Also provided is a blower control board attached to a modular blower system attached to a rodent containment rack, which blower control board comprises one or more connectors or receivers for electrical power and/or one or more communication media, a connector for functional association with a rack mounted circuit board and an identifier for the cages and blowers attached to the rack. Sometimes the identifier is for the cage configuration of the cages in the rack, sometimes the identifier is for monitoring differential pressure developed by the modular blower system, and sometimes the identifier is for identifying an inoperative component in a modular blower system attached to the rack. Sometimes a receiver is for one or more communication media, a connector is for a control unit and a receiver is for electrical power.

Also provided is a rack mounted circuit board hub attached to a rodent containment rack comprising a connector or receiver for electrical power and one or more communication media and an identifier for the cages attached to the rack. Sometimes the identifier is for the cage configuration of the cages in the rack, a receiver is for one or more communication media, a connector is for a control unit and a receiver is for electrical power.

Also provided is a rack controller attached to a rodent containment rack comprising one or more connectors or receivers for electrical power and/or one or more communication media, including wireless communication media (e.g., Wi-fi interface), identifiers for (i) cages attached to the rack, (ii) blowers attached to the rack and (iii) air pressure in the rack. Sometimes the pressure in the rack is determined by calculations involving data from (i) and (ii). Sometimes an identifier is for the cage configuration of the cages in the rack, sometimes an identifier is for monitoring differential pressure developed by the modular blower system, and sometimes the identifier is for identifying an inoperative component in a modular blower system attached to the rack. Sometimes a receiver is for one or more communication media, a connector is for a control unit (e.g., circuit board and/or controller board) and a receiver is for electrical power.

Also provided is a rodent containment cage rack where each of the first set of cage connection apertures and each of the second set of cage connection apertures is in effective connection with a cage protrusion connector assembly. Sometimes the cage protrusion connector assembly comprises a protrusion connector comprising a body, and an orifice in the body. Sometimes the cage protrusion connector assembly comprises one or more fasteners on a first side of the body. Sometimes the cage protrusion connector assembly comprises a projected surface disposed around a portion of the orifice on a second side of the body. Sometimes the one or more fasteners are two or more fasteners disposed around the orifice. Sometimes the projected surface is configured to contact a portion of a cage protrusion. Sometimes the projected surface is configured to position the cage in the rail guide. Sometimes the rack comprises a pin extending from the first side of the body.

Sometimes the cage protrusion connector assembly comprises a protrusion connector gasket in sealing connection with the body of the protrusion connector. Sometimes the protrusion connector gasket comprises a protrusion connector gasket orifice concentric with the orifice in the protrusion connector, an annular flange around the protrusion connector gasket orifice on a first surface of the protrusion connector gasket, one or more grooves on a second surface of the protrusion connector gasket, and one or more channels configured to receive the one or more fasteners of the protrusion connector. Sometimes the protrusion connector gasket comprises a bore configured to receive a pin. Sometimes the annular flange comprises a surface configured to sealingly engage with a surface of a cage protrusion. Sometimes the cage protrusion extends from a cage lid.

Sometimes the cage protrusion connector assembly comprises a nozzle in sealing connection with the protrusion connector gasket. The nozzle generally comprises one or more orifices (e.g., sometimes two or more orifices). Sometimes the nozzle comprises a nozzle orifice concentric with the orifice in the protrusion connector gasket and in certain embodiments includes one or more tabs configured to rest in the one or more grooves of the protrusion connector gasket. Sometimes the nozzle comprises an annular flange disposed around the nozzle orifice on a first side of the nozzle opposite to the first side of the protrusion connector body. Sometimes the nozzle comprises two or more nozzle orifices, and in certain embodiments the nozzle comprises a cylindrical projection that substantially defines a portion or all of an orifice perimeter. In some embodiments, the nozzle comprises a rib projecting from a nozzle surface or cylindrical projection in proximity to an orifice. In certain embodiments, the rib has a semi-circular profile, sometimes an edge of the rib is coextensive with a portion of an orifice perimeter and sometimes the rib circumscribes a portion of an orifice perimeter. Sometimes the nozzle comprises a bushing disposed in a nozzle orifice.

Sometimes the cage protrusion connector assembly comprises a nozzle gasket in sealing connection with the nozzle. Sometimes the nozzle gasket comprises a bore configured to receive a pin. Sometimes the cage protrusion connector assembly is connected to a surface of the wall of the support member in effective connection with each of the cage connection apertures. Sometimes the one or more fasteners on the first side of the cage protrusion connector body are fastened to fasteners on the wall or in the wall of the support member.

Certain embodiments are described further in the following description, examples, claims and drawings.

BRIEF DESCRIPTION OF THE DRAWINGS

The drawings illustrate embodiments of the technology and are not limiting. For clarity and ease of illustration, the drawings are not made to scale and, in some instances, various aspects may be shown exaggerated or enlarged to facilitate an understanding of particular embodiments.

FIGS. 4A-4D are top, isometric, front and side perspective views, respectively, of a cage being inserted into a rack having a reader.

FIG. 16 is a diagrammatic screen shot of an embodiment of a controller displaying associated cage components.

FIG. 17 is a diagrammatic screen shot of an embodiment of a controller displaying an inventory summary.

FIG. 18 is a diagrammatic screen shot of an embodiment of a controller displaying airflow data in a list form.

FIGS. 22A-D illustrate top, isometric, front and side perspective views, respectively, of a cage being inserted into a rack embodiment having a reader.

FIGS. 23-A-C illustrate front perspective views, with detailed inserts of readers, of a cage inserted into a rack embodiment with different LED illumination representing different states.

FIG. 31 also illustrates the first and second set of cage connection apertures and the support member communication medium channel.

FIG. 37 shows wiring that goes from the power supply to the exhaust blower and from the exhaust blowers to the supply blowers.

FIG. 38 illustrates support member and side member plenums that distribute air thought out the rack embodiment.

FIGS. 45A and 45B, and FIGS. 46A and 46B show a blower control board mounted in the blower base unit. The difference between FIGS. 45A and 45B, and FIGS. 46A and 46B are in the orientation of the air outlet channel and placement of the blower control board, as shown in the figures.

FIG. 52A illustrates a single orifice cage protrusion connection assembly embodiment. FIG. 52B illustrates a dual orifice cage protrusion connection assembly embodiment.

FIG. 53A illustrates an exploded view of a single orifice cage protrusion connection assembly embodiment. FIG. 53B illustrates an exploded view of a dual orifice cage protrusion connection assembly embodiment.

FIG. 54A illustrates a single orifice cage protrusion connection assembly embodiment in effective connection with a cage protrusion. FIG. 52B illustrates a dual orifice cage protrusion connection assembly embodiment in effective connection with a cage protrusion.

FIGS. 55A-D illustrate front, back and both side views, respectively, with detail enlargements, of a cage embodiment having cage protrusions in effective connection with a single orifice cage protrusion connection assembly embodiment. FIGS. 55E-H illustrate front, back and both side views, respectively, with detail enlargements, of a cage embodiment having cage protrusions in effective connection with a dual orifice cage protrusion connection assembly embodiment. The cage protrusion connection assemblies are presented as cross sections.

FIG. 60A-C illustrates an isometric view of a schematic representation of two adjacent positions for attachment of a cage to a support member embodiment. Also illustrated in the schematic representation are cage mount guide assemblies and a cage mount front module reader having LED's for status reporting. The cage mount front module reader is shown being inserted into the cage mount front module receptacle.

FIG. 61A illustrates a single orifice cage protrusion connection assembly embodiment. FIG. 61B illustrates a dual orifice cage protrusion connection assembly embodiment.

FIG. 64A illustrates a centrally located single orifice nozzle. FIG. 64B illustrates a dual orifice nozzle with the orifices located equidistant from a central point. As described herein, nozzle orifices can be placed in any convenient and suitable location for air distribution throughout a cage rack embodiment described herein.

FIGS. 68A-D illustrate top, isometric, front and side perspective views, respectively, of a cage having two cage identifiers being inserted into a rack embodiment having a reader having a substantially sealed translucent cover.

FIGS. 69-A-C illustrate front perspective views of a cage inserted into a rack embodiment, with detailed inserts of readers, each reader having a substantially sealed translucent cover, with different LED illumination representing different states.

FIGS. 75A and 75B, and FIGS. 76A and 76B show a blower control board mounted in the blower base unit. Differences between embodiments illustrated in FIGS. 75A and 75B, and FIGS. 76A and 76B include the orientation of the air outlet channel and placement of the blower control board. Differences between embodiments illustrated in FIGS. 75A, 75B, 76A and 76B and FIGS. 45A, 45B, 46A and 46B include the configuration of the blower base. The blower base illustrated in FIGS. 75A, 75B, 76A and 76B lack the connection boss or detent, present in FIGS. 45A, 45B, 46A and 46B as reference character 622/722.

FIGS. 78A, 78B, 79A and 79B do not have blower support protrusion 590 illustrated in FIGS. 48A, 48B, 49A and 49B, and have alternate air connector plate mating pins 588'.

FIGS. 80A and 80B also do not have blower support protrusion 590, illustrated in FIGS. 50A and 50B.

FIG. 81 also does not have blower support protrusion 590, illustrated in FIG. 51.

FIGS. 82A-D illustrate front, back and both side views, respectively, with detail enlargements, of a cage embodiment having cage protrusions in effective connection with a single orifice cage protrusion connection assembly embodiment. FIGS. 82E-H illustrate front, back and both side views, respectively, with detail enlargements, of a cage embodiment having cage protrusions in effective connection with a dual orifice cage protrusion connection assembly embodiment. The cage protrusion connection assemblies are presented as cross sections. Differences between embodiments illustrated in FIGS. 82A-H and 55A-H include the configuration of the cage protrusion assemblies. The cage protrusion connection assemblies shown in FIGS. 82A-H do not have projected surface 812, the latter of which is used as a cone guide stop surface, as illustrated in FIGS. 55A-H. The function of projected surface 812 is replaced by cage mount guide rail stop 553, located on alternate cage mount assembly 530'.

FIG. 86A-C illustrates an isometric view of a schematic representation of two adjacent positions for attachment of a cage to a support member embodiment. Also illustrated in the schematic representation are cage mount guide assemblies and a cage mount front module reader having LED's for status reporting. The cage mount front module reader is shown being inserted into the cage mount front module receptacle. Differences between embodiments illustrated in FIG. 86A-C and FIG. 60A-C include the configuration of the cage mount assemblies and cage mount front modules (reference character 562 in FIGS. 61A-B). The alternate cage mount assembly illustrated in FIG. 86A-C includes cage mount guide rail stop 553. The cage mount assembly illustrated in FIG. 60A-C does not include cage mount guide rail stop 553. In some embodiments, cage mount front module is cage mount front module reader 564' in some embodiments, and in certain embodiments, cage mount front module is cage mount front module plug 566. The cage mount front module illustrated in FIG. 60A-C is cage mount front module reader 564.

FIG. 87A illustrates a single orifice cage protrusion connection assembly embodiment. FIG. 87B illustrates a dual orifice cage protrusion connection assembly embodiment. Differences between embodiments illustrated in FIGS. 87A-B and 61A-B include the configuration of the cage mount assemblies and the cage protrusion assemblies. Alternate cage mount assembly 530' illustrated in FIGS. 87A-B includes cage mount guide rail stop 553. Cage mount assembly 530 illustrated in FIGS. 61A-B does not include cage mount guide rail stop 553. Additionally, cage protrusion connection assembly 800' shown in FIGS. 87A-B do not have projected surface 812 illustrated in FIGS. 61A-B, which sometimes is used as a cone guide stop surface.

DETAILED DESCRIPTION

Identifiers

Figure 1:
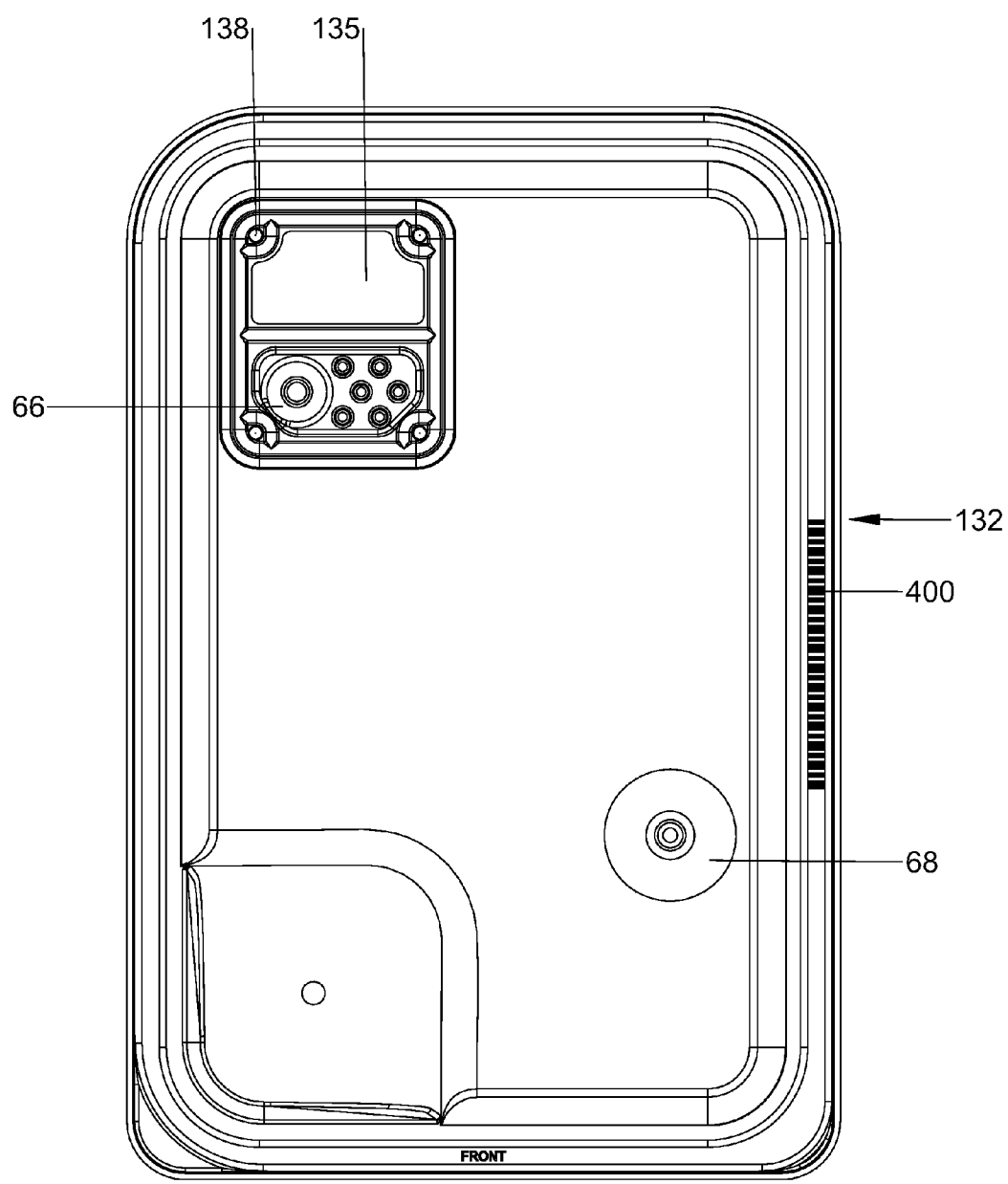
FIG. 1 is a top perspective view of a cage lid.

Provided in some embodiments are identifiers, methods of manufacturing identifiers, and use of identifiers to uniquely label or identify one or more items (such as animal cage cards, animal cages or racks or large or small objects), to identify animals, cage components or data for sorting, tracking, identification, verification, authentication, management, inventory, maintenance, or for other purposes. This type of identification technology is useful in helping machines and/or people identify cage components, animals and/or associated data and capture the information. Such identification may include manual interaction by a human operator (e.g., scan an identifier by a handheld device or manually input code or information pertaining to an identifier into a computer reader and/or controller), and often includes automatic data capture where data is automatically recorded by machine and/or device.

Such identifiers may include one or more bar codes, serial numbers, alphanumeric identifiers, text, graphics, watermarks, holographs, electronic microchips/transponders, radio-frequency identification (RFID), reflective identifiers, non-reflective identifiers, magnetic identifiers, symbolic codes, chemical identifiers, magnetic tags/strips/ink character recognition, smart cards, optical character recognition, optical mark recognition, and fluorescence (or other optical techniques), or combinations thereof, for example. An identifier may be a physical code, physical image or physical substance, and can be a representation of data or information or representation of a physical structure. An identifier may be obtained from, determined by or calculated from information obtained from other identifiers. For example a cage lid identifier may be used in reference to the actual bar code placed on a cage lid, or in some embodiments, an identifier can be used in reference to non-tangible information, such as usage history of the cage lid or association of the cage lid to corresponding objects and/or number of animals. In some embodiments having more than one identifier, the identifiers sometimes contain the same information, and sometimes the identifiers have different information. In certain embodiments, identifiers on different cage components include different information and in some embodiments identifiers on different cage components include substantially identical information.

Bar codes may be a series of lines of varying width, printed, as on a container or product, that may be read by a scanner and/or decoded by a computer into usable information. A serial number may be a number, usually one of a series, assigned for identification. A serial number may be a unique number assigned for identification which varies from its successor or predecessor by a fixed discrete integer value. An alphanumeric identifier may be a combination of alphabetic and numeric (also called alphanumeric), and can be used to describe the collection of Latin letters and Arabic digits used by much of western society. A set of 36 (single case) or 62 (case-sensitive) alphanumeric characters may be utilized. An alphanumeric character set often consists of the numbers 0 to 9 and letters A to Z. Text may be the actual wording of anything written or printed or a unit of connected speech or writing, especially composed of more than one sentence, which forms a cohesive whole. Graphics may be a product of the graphic arts, as a drawing, symbol or print, for example. Graphics may generally involve drawing, painting, and printmaking, for example.

Radio-frequency identity (or identification), RFID, is a technology that uses tiny computer chips to track items at a distance. Radio-frequency identification (RFID) is the use of an object (typically a RFID tag) applied to or incorporated into a product, animal, or person for the purpose of identification and tracking using radio waves. Some tags can be read from several meters away and beyond the line of sight of the reader. Radio-frequency identification involves interrogators (or readers), and tags (or labels). RFID tags may contain two parts. One part may be an integrated circuit for storing and processing information, modulating and demodulating a radio-frequency (RF) signal, and other specialized functions. The second may be an antenna for receiving and transmitting the signal. Generally, there are three types of RFID tags: active RFID tags, which contain a battery and can transmit signals autonomously, passive RFID tags, which have no battery and require an external source to provoke signal transmission, and battery-assisted passive (BAP) RFID tags, which require an external source to be activated and has greater signal range.

Reflective identifiers may be any type of identifier capable of casting back particles (such as, for example, light, heat, sound, electromagnetic radiation, etc). Such identifiers may reflect light, images, or sound waves, for example. Non-reflective identifiers may be any type of identifier not capable of casting back particles.

In some embodiments, one or more identifiers are transparent or opaque to one or more detection means (e.g., electromagnetic radiation). Generally, electromagnetic radiation emitted or absorbed by an object is characteristic of the object's electromagnetic spectrum, which electromagnetic spectrum often can be detected. Electromagnetic radiation often includes features such as electromagnetic frequencies and/or electromagnetic wavelengths and an electromagnetic spectrum sometimes comprises substantially all readily detectable electromagnetic radiation. Transparency and/or opaqueness to one or more electromagnetic features can be predetermined by the use of various detectable materials and detectors. Detectable materials sometimes are part of, included in or layered on materials utilized to generate cage components described herein. In some embodiments, a cage component may be transparent to some wavelengths, but not all electromagnetic wavelengths (e.g., opaque to some wavelengths). In some embodiments, one or more cage components may be transparent to one or more types of electromagnetic radiation chosen from radio waves, micro wavelengths, infrared wavelengths, visible wavelengths, ultraviolet wavelengths, soft x-rays, the like or combinations of the foregoing. In some embodiments, one or more cage components may be opaque to one or more types of electromagnetic radiation chosen from radio waves, micro wavelengths, infrared wavelengths, visible wavelengths, ultraviolet wavelengths, soft x-rays, the like or combinations of the foregoing. The term "opaque" with regard to electromagnetic radiation refers to a cage component and/or identifier allowing transmission of 5% or less of an electromagnetic feature.

Magnetic identifiers, magnetic tags/strips, magnetic ink characters, and/or smart cards may be any type of identifier having properties of a magnet. An example of a system employing magnetic materials is in WO 93/14474, which describes a system that generates an electromagnetic field, to which individual transponder units receive, store, and transmit the identification data, which is then received by a receiver and is incorporated by reference herein in its entirety. Another example of a system employing magnetic materials is in U.S. Pat. No. 4,075,618, which describes an antipilferage magnetic tag detected in an interrogation zone producing an alternating magnetic field by high-order harmonics produced by the presence of the tag and is incorporated by reference herein in its entirety. The tag has an asymmetrically shaped piece of low-coercive force ferromagnetic material, including a centre section and flux concentrator sections at opposite ends of this section. Another example of a system employing magnetic materials is in U.S. Pat. No. 6,144,300, which discloses a magnetic analogue of an optical bar code reader system and is incorporated by reference herein in its entirety. Soft magnetic elements are arranged in a linear array and read by mechanically scanning a coil along the array, the coil generating a magnetic null enabling the elements of the array to respond to the applied field. The spatial arrangement of the elements in the linear array defines a code similar to a bar code.

Symbolic codes or identifiers may be any type of symbol that conveys identify or recognition of any type. A symbol may be something used for or regarded as representing something else; a material object representing something, often something immaterial; emblem, token, or sign. A symbol may be a letter, figure, or other character or mark or a combination of letters or the like used to designate something: the algebraic symbol x or the chemical symbol Au for gold, for example. A symbol also may be a word, phrase, image, or the like having a complex of associated meanings and perceived as having inherent value separable from that which is symbolized, as being part of that which is symbolized, and as performing its normal function of standing for or representing that which is symbolized: usually conceived as deriving its meaning chiefly from the structure in which it appears, and generally distinguished from a sign. A symbol may be commonly known such as a smiley face, or be obscure, non-recognizable, and novel, for example.

Chemical identifiers of any type may be used to signal the presence of a chemical. A chemical identifier may be used in lieu of or in conjunction with any type of sensor. Additionally the chemical identifier may be triggered by an autocatalytic chemical reaction, for example by the presence of moisture, by the presence of heat and/or pressure, or by the presence of water and/or another chemical such as ammonium, for example. Chemical identifiers also may be called discoloring polymers, where there is a chemical change within polymers used for identification.

An optical identifier of any type may be used. An optical identifier may include an optical substrate or be encoded with optical identification elements, optical character recognition, optical mark recognition, capable of having many optically readable codes. The optical substrate or element may be made of a glass material, such as silica or other glasses, or may be made of plastic or polymer, or any other material capable of having a diffraction grating disposed therein.

Fluorescence identifiers of any type may be used. Fluorescence identifiers may include the emission of radiation or of visible light or luminescence, during exposure to external radiation such as light or x-rays, or other sources of optical emissions, such as an optical reader, for example.

Holographic identifiers also may be used, or any type of two, three, or four dimensional image reproduced from a pattern of interference or produced by a split coherent beam of radiation, as from a laser. A holograph may be an image produced by a hologram, which is a negative produced by exposing a high-resolution photographic plate, without camera or lens, near a subject illuminated by monochromatic, coherent radiation, as from a laser when it is placed in a beam of coherent light a true three-dimensional image of the subject is formed.

For a cage rack system, identifiers can be cage content identifiers, cage component identifiers, cage condition identifiers and cage user identifiers, for example. Identifiers also may be associated with data that pertain to cage content data, cage component data, cage condition data and cage user data identify the same tangible object and/or digital information. For example, a cage lid identifier may refer to the identifier code on the lid, the lid itself, the history of the lid, location of the lid and the like.

Identifiers can be detected by a detector at any suitable speed of cage insertion. In some embodiments an identifier can be detected at a relatively slow insertion speed, and in certain embodiments, an identifier can be detected at a relatively fast insertion speed. In some embodiments changes in the rate of cage insertion velocity (e.g., increasing speed of cage insertion, decreasing speed of cage insertion, increasing then decreasing speed of cage insertion, decreasing then increasing speed of cage insertion, the like or combinations of the forgoing) do not effect a detectors ability to accurately detect an identifier.

Location of Identifiers

One or more identifiers may be located in any location, such as on an animal cage card, on the back of a cage component, on the side or sides of a cage component, on the top of a cage component, on a cage component flange, on a rack module or rack module component, in a rack side member or support member, on one or more other cage or rack items/components, on non-cage items (e.g. a personnel identification badge, medication, drug dosing card, investigator card, veterinarian records, etc), or combinations thereof, for example. Identifiers on one or more cage components (e.g. a lid, a base, an air supply component, an air exhaust component, a water supply component, a sensor component, a filter component, a baffle component, a feeder and the like), may be located near another identifier, adjacent to another identifier, overlapping another identifier, on top of another identifier, or in any location where data from the identifier may be captured or accessed. The identifiers also may be in-line with one another or in-line with another component. The term "in-line" as used herein pertains to a linked sequence of placement, such as, sequentially within a line or one identifier behind another identifier thereby forming a straight line.

The location of identifiers may be visible or invisible to a cage user. The location of identifiers may be determined by an identifier reader, such as by an optical reader, for example. Inventory of identifiers within a specified location may be determined by an identifier reader, for example by using a RFID reader.

Figure 2:
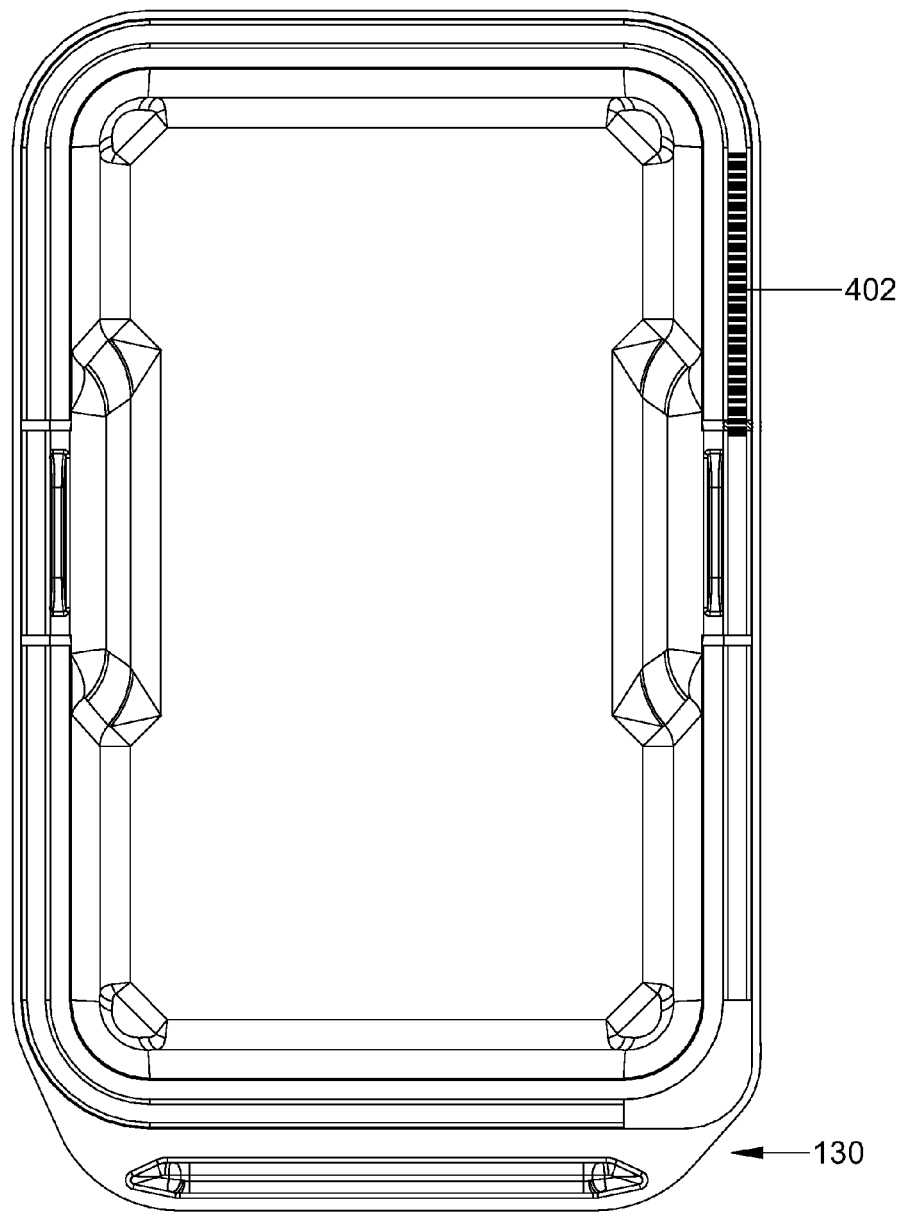
FIG. 2 is a top perspective view of a cage bottom.
Figure 65:
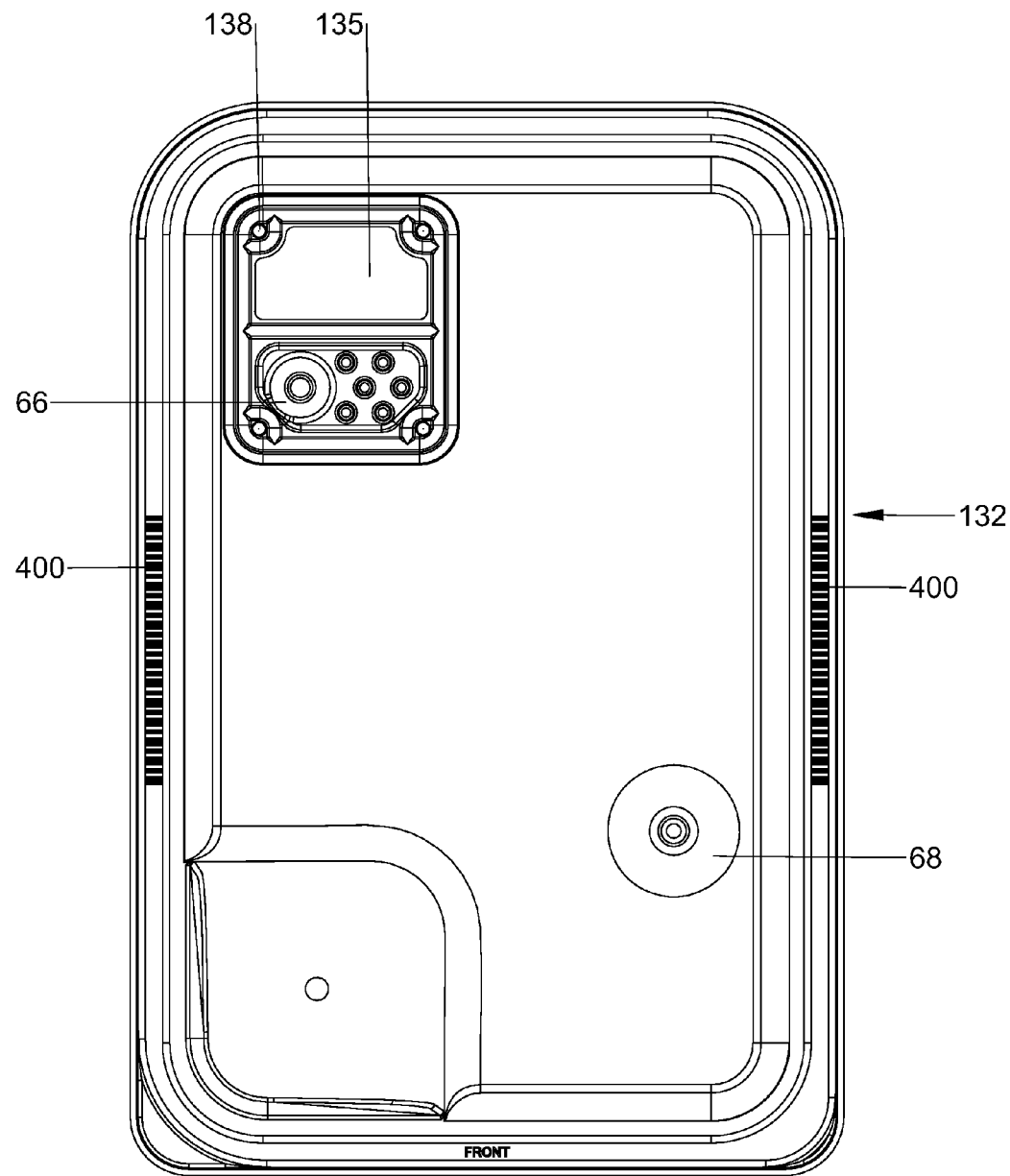
FIG. 65 is a top perspective view of a cage lid, having two cage identifiers.
Figure 66:
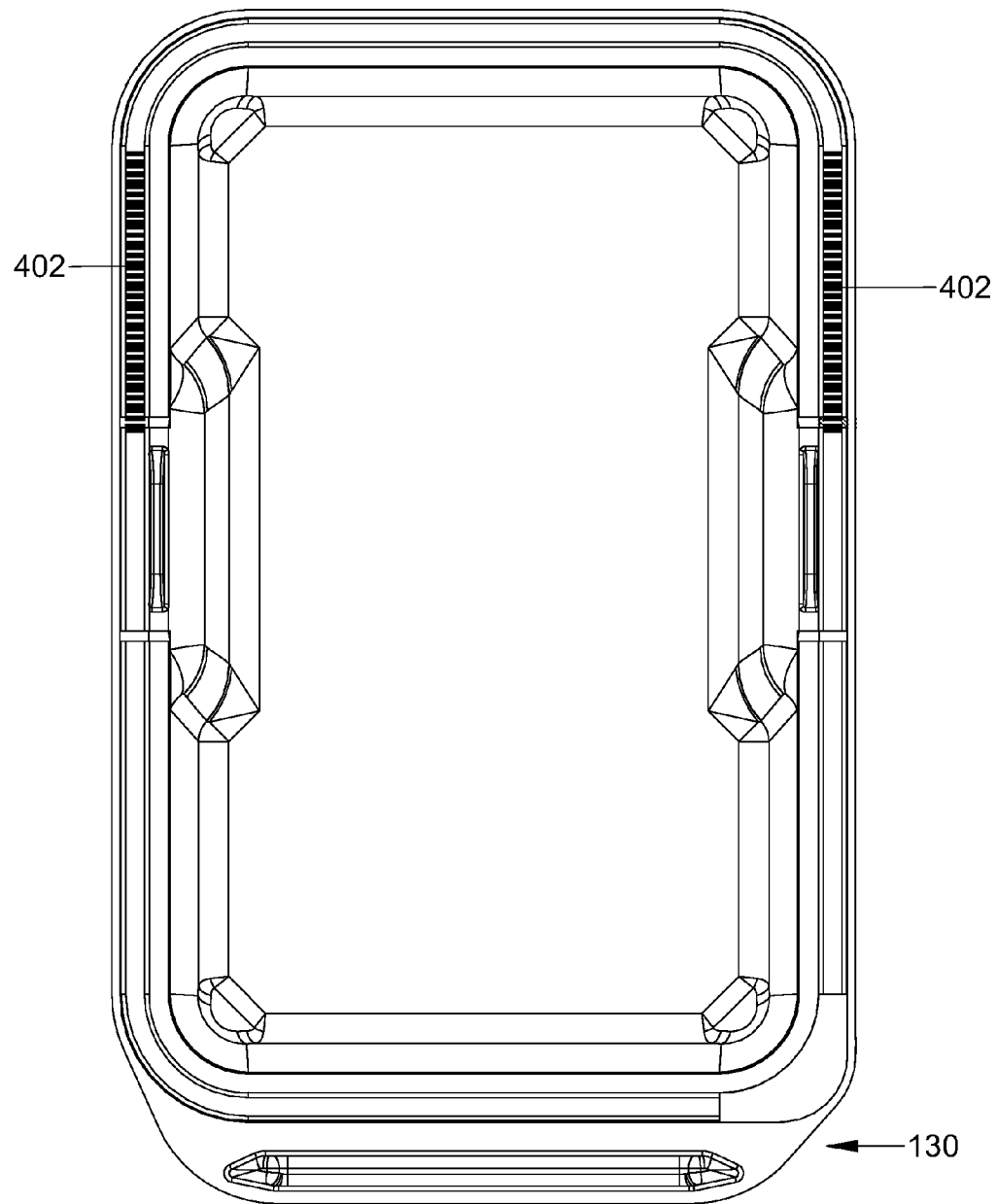
FIG. 66 is a top perspective view of a cage bottom, having two cage identifiers.

Non-limiting examples of identifier locations are shown in FIGS. 1-3, 7, 22, 54, and 65-68. FIGS. 1 and 65 show a top perspective view of cage lid 132 having a filter element 135, two nozzles 66 and 68, press-in post couplers 138 and lid identifier 400. FIG. 65 shows a lid embodiment having two identifiers 400. The lid identifier 400 may be on a flange of the lid 132. Identifier 400 may be on the bottom surface of the flange or on the top surface of the flange of the cover and/or base. FIGS. 2 and 66 show a top perspective view of the cage bottom 130 having bottom or base identifier 402.

Figure 3:
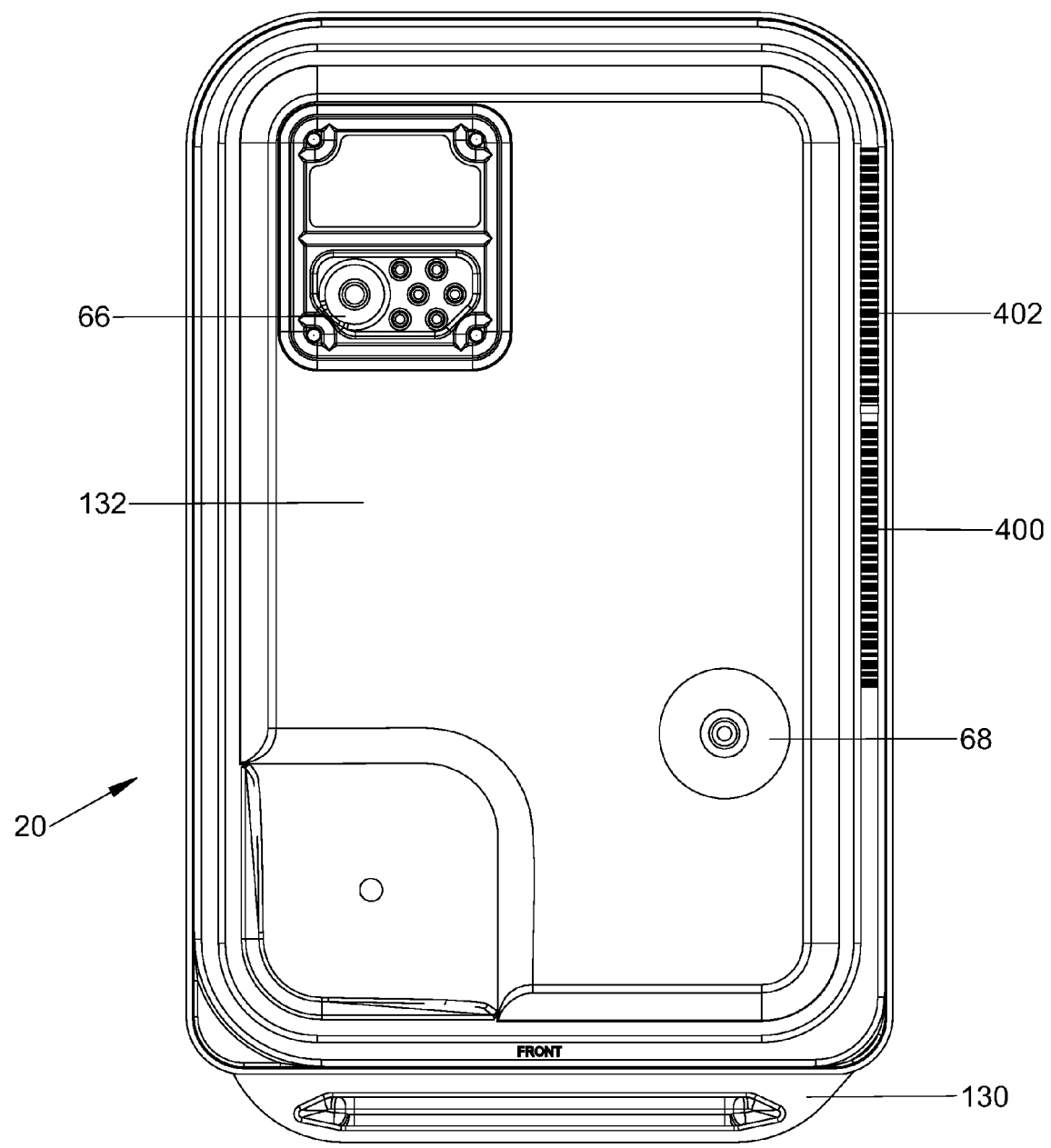
FIG. 3 is a top perspective view of a cage lid on top of a cage bottom.
Figure 7:
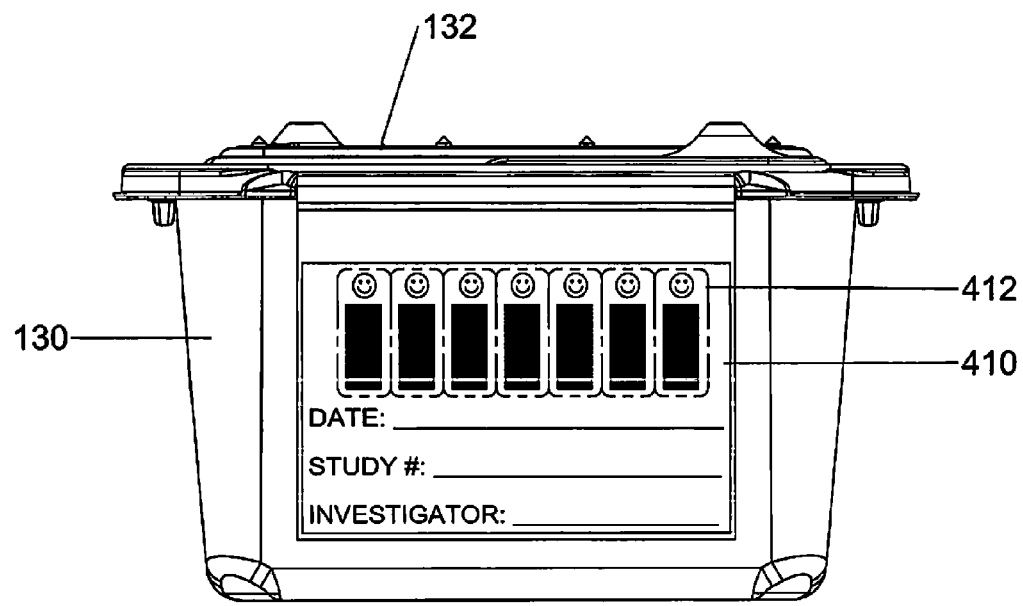
FIG. 7 is a front perspective view of a cage with a cage card.
Figure 54A:
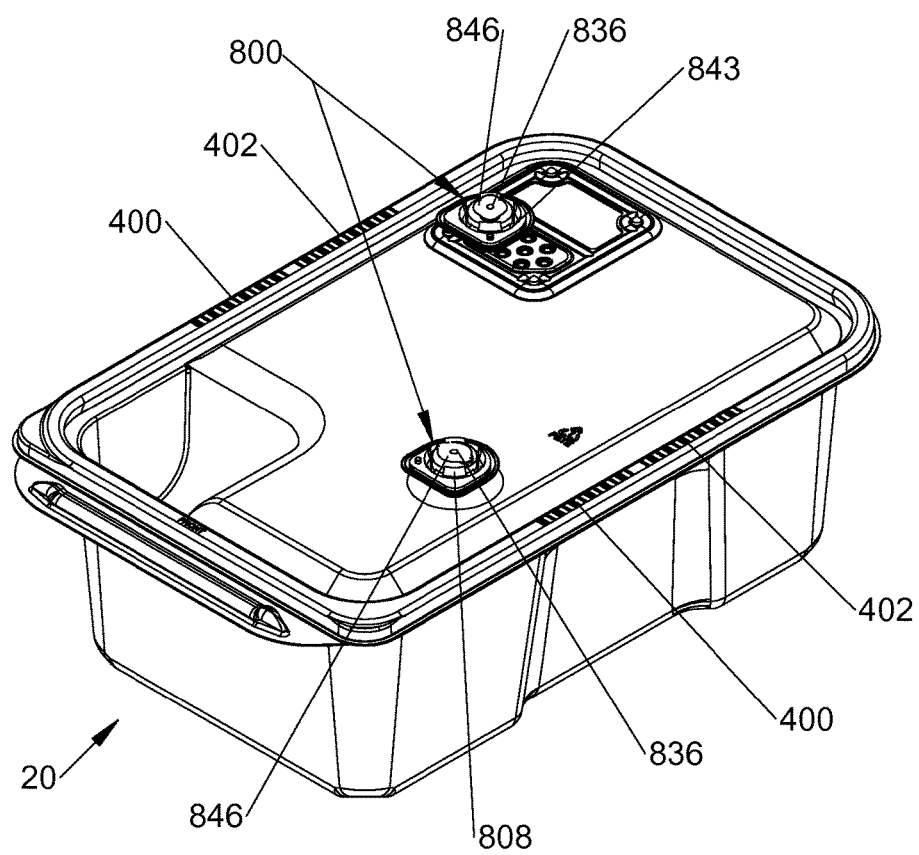
FIGS. 54A and 54B illustrate schematic representations of isometric views of a cage embodiment in effective connection with cage protrusion connection assembly embodiments.
Figure 54B:
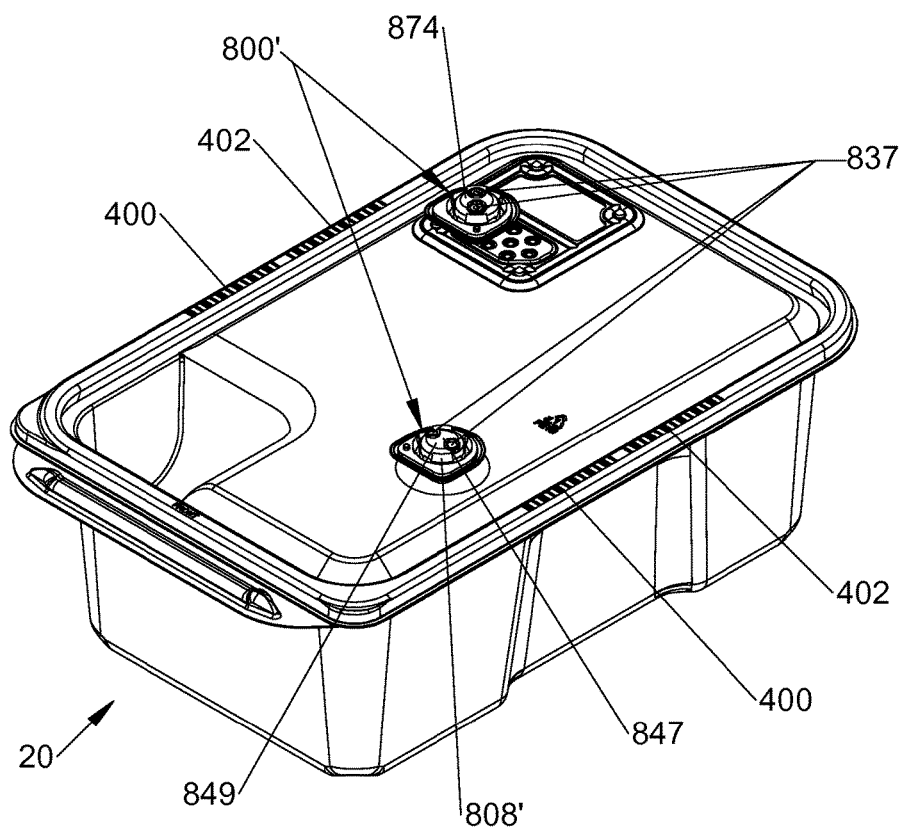
Figure 67:
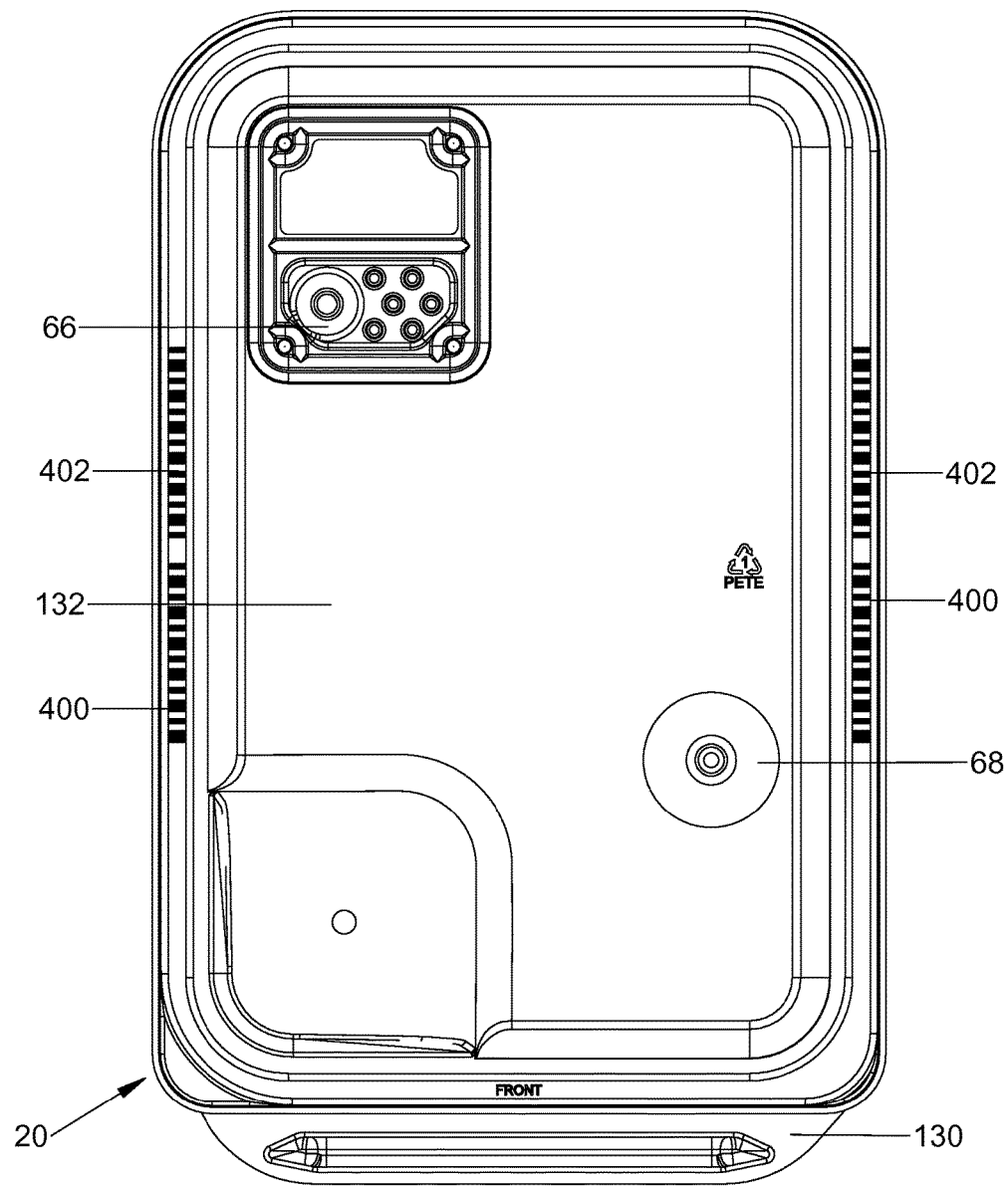
FIG. 67 is a top perspective view of a cage lid on top of a cage bottom, having two cage identifiers.
Figure 70:
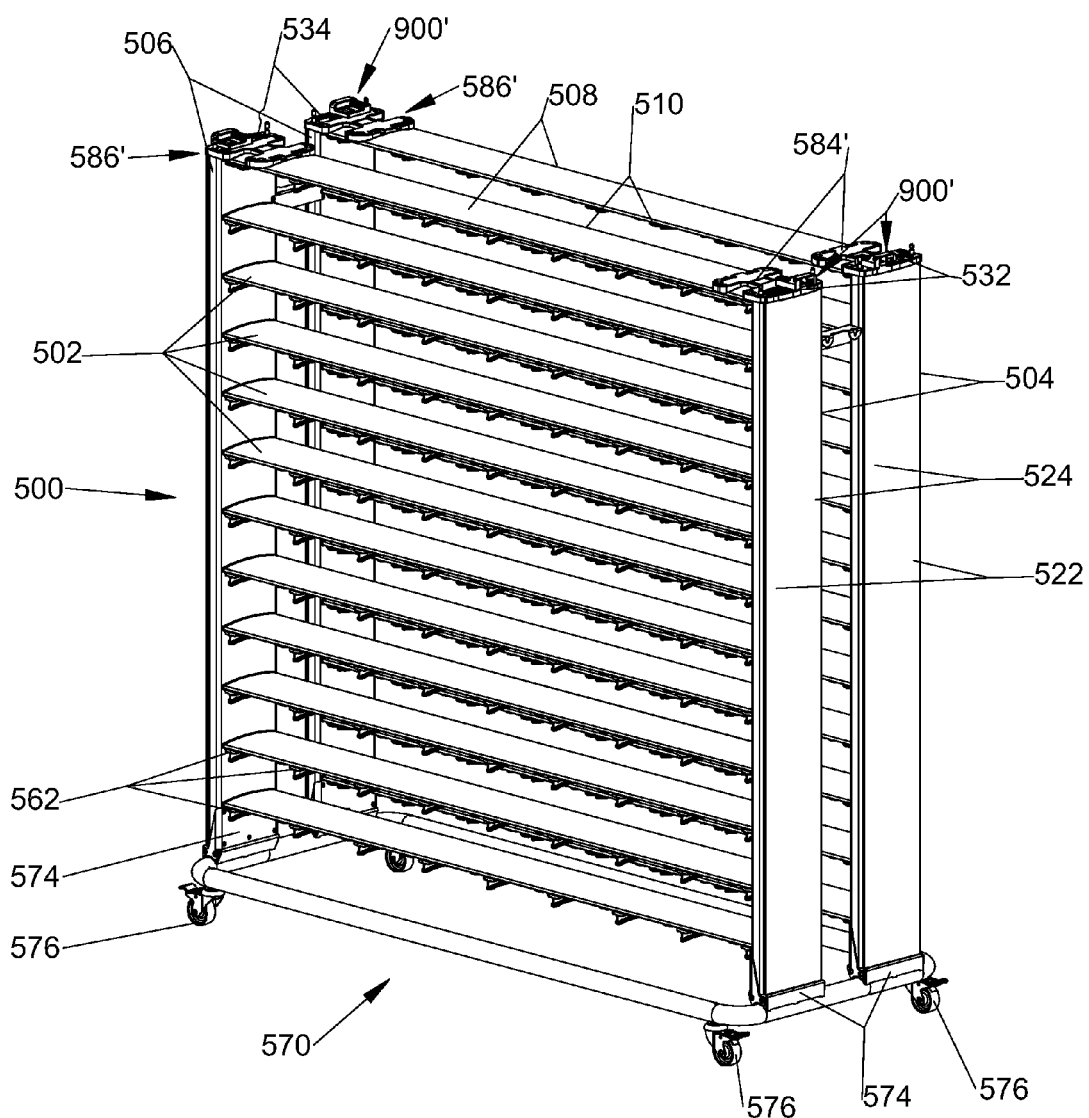
FIG. 70 illustrates a perspective view of a double unit rack embodiment, without modular blower system attachments and without inserted cages. The rack embodiment shown in FIG. 70 illustrates an alternate blower mounting plate.
Figure 71:
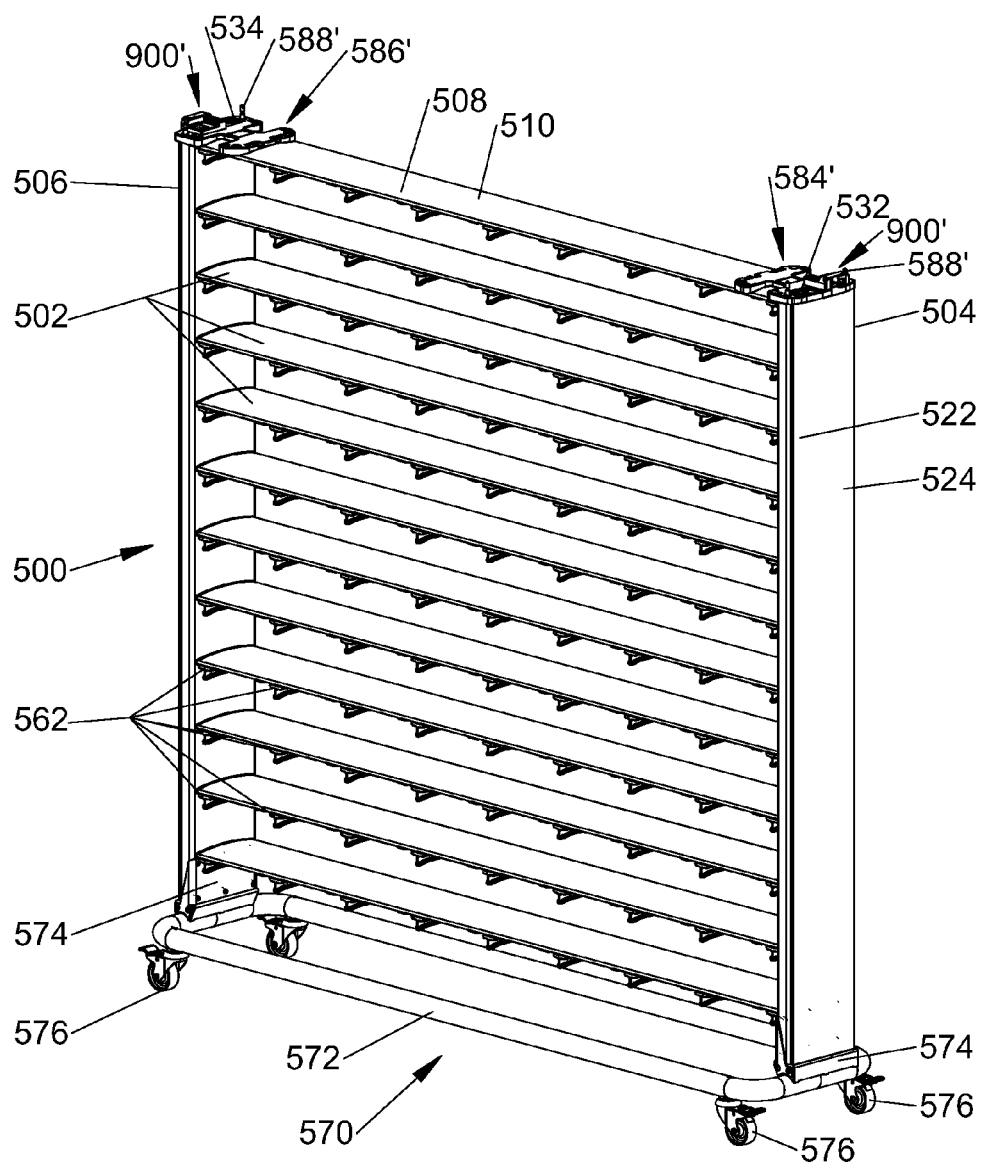
FIG. 71 illustrates a perspective view of a single unit rack embodiment, without modular blower system attachments and without inserted cages. The rack embodiment shown in FIG. 71 illustrates an alternate blower mounting plate.
Figure 72:
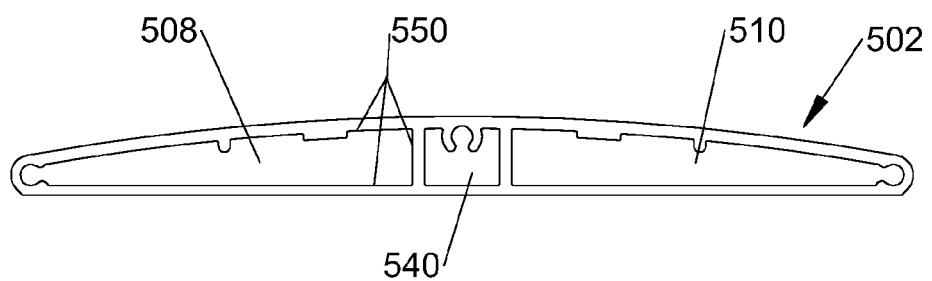
FIG. 72 illustrates a profile or side view of a support member embodiment.
Figure 73:
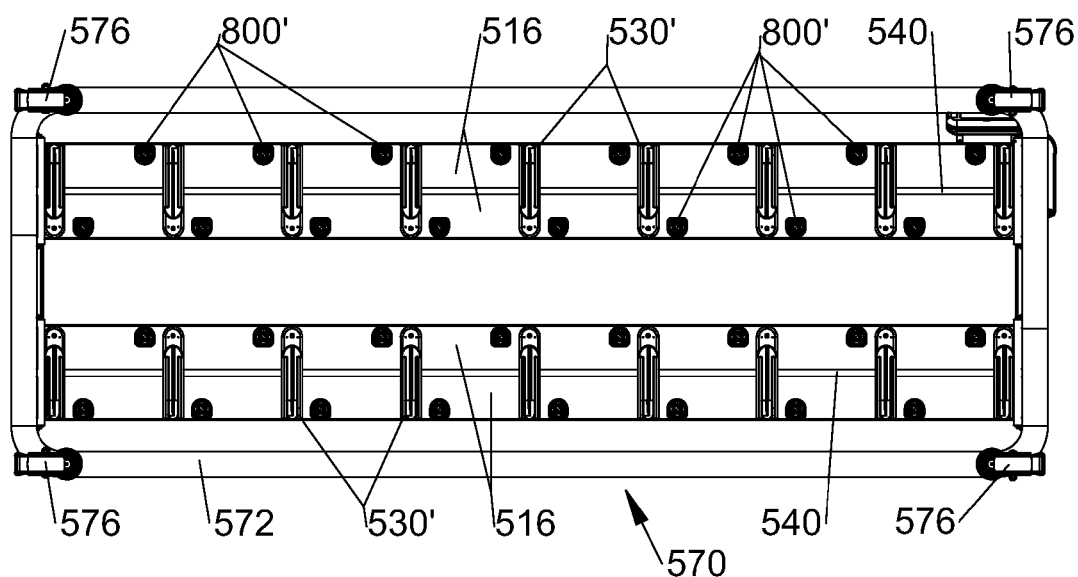
FIG. 73 is a bottom view of a rack embodiment illustrating various components of the trolley system and the bottom surface of support members having guide rail assemblies and cage protrusion connection assemblies. Also illustrated in FIG. 35 are support member communication medium channels. Differences between embodiments illustrated in FIG. 73 and FIG. 35 include the configuration of the guide rail assemblies and cage protrusion connection assemblies.
Figure 74:
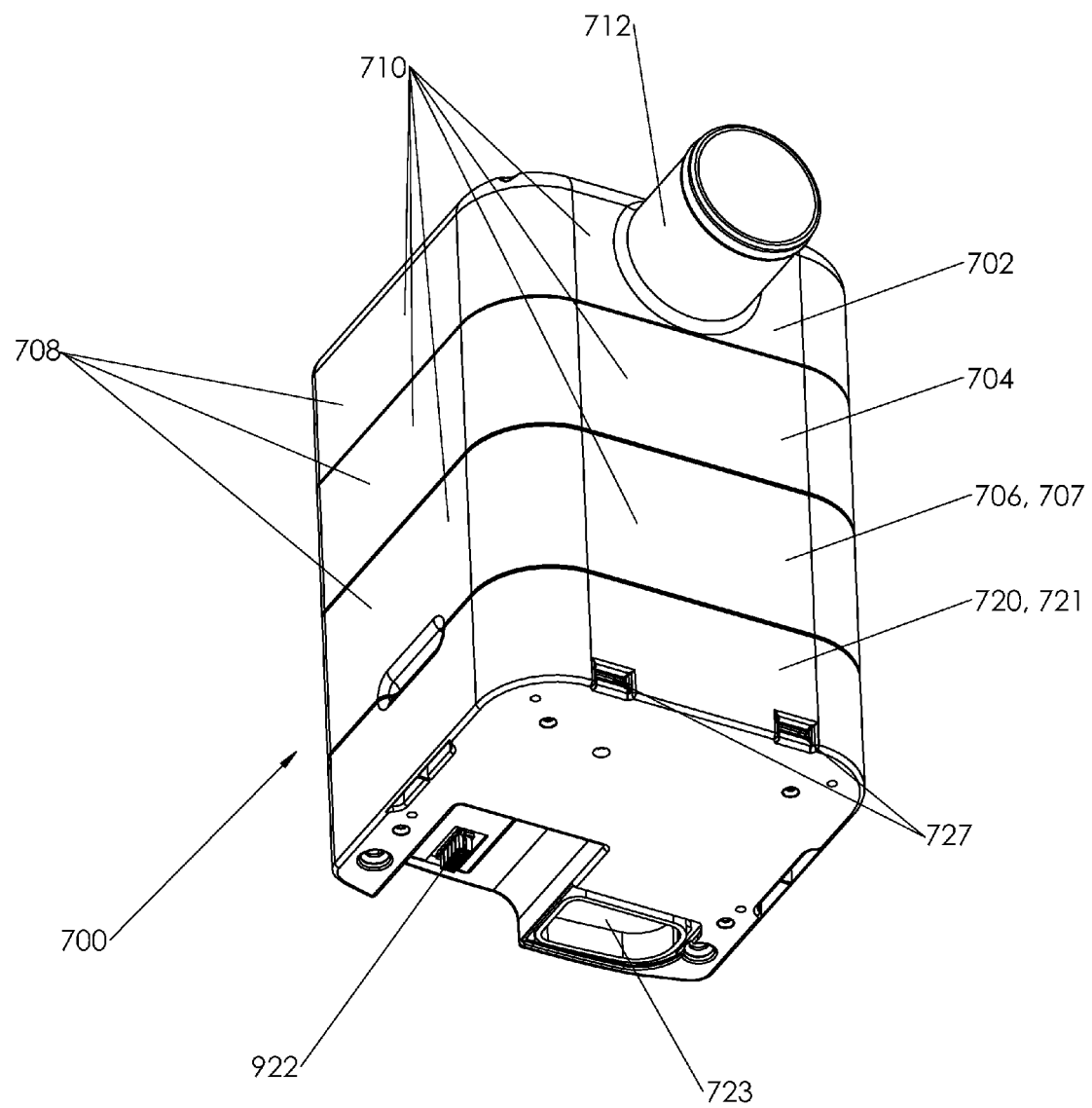
FIG. 74 is an isometric view of an exhaust blower embodiment. Differences between embodiments illustrated in FIG. 74 and FIG. 39 include the configuration of the blower base. The blower illustrated in FIG. 74 lacks the connection boss or detent, present in FIG. 39 as reference character 722.
Figure 75:
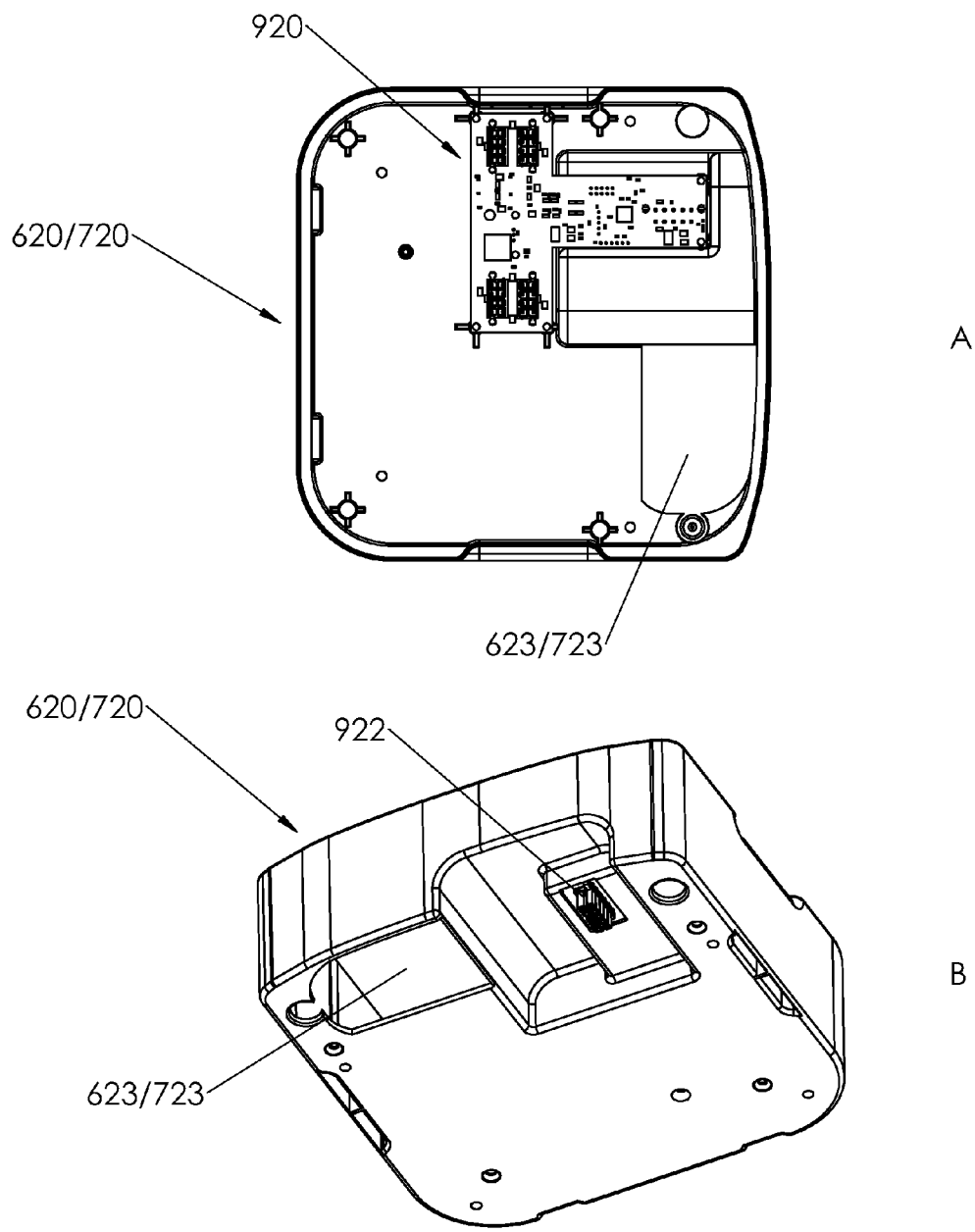
FIGS. 75A and 75B, and FIGS. 76A and 76B illustrate top and isometric views of a blower base unit embodiment that can be used in modular supply or modular exhaust blower embodiments described herein. Both
Figure 76:
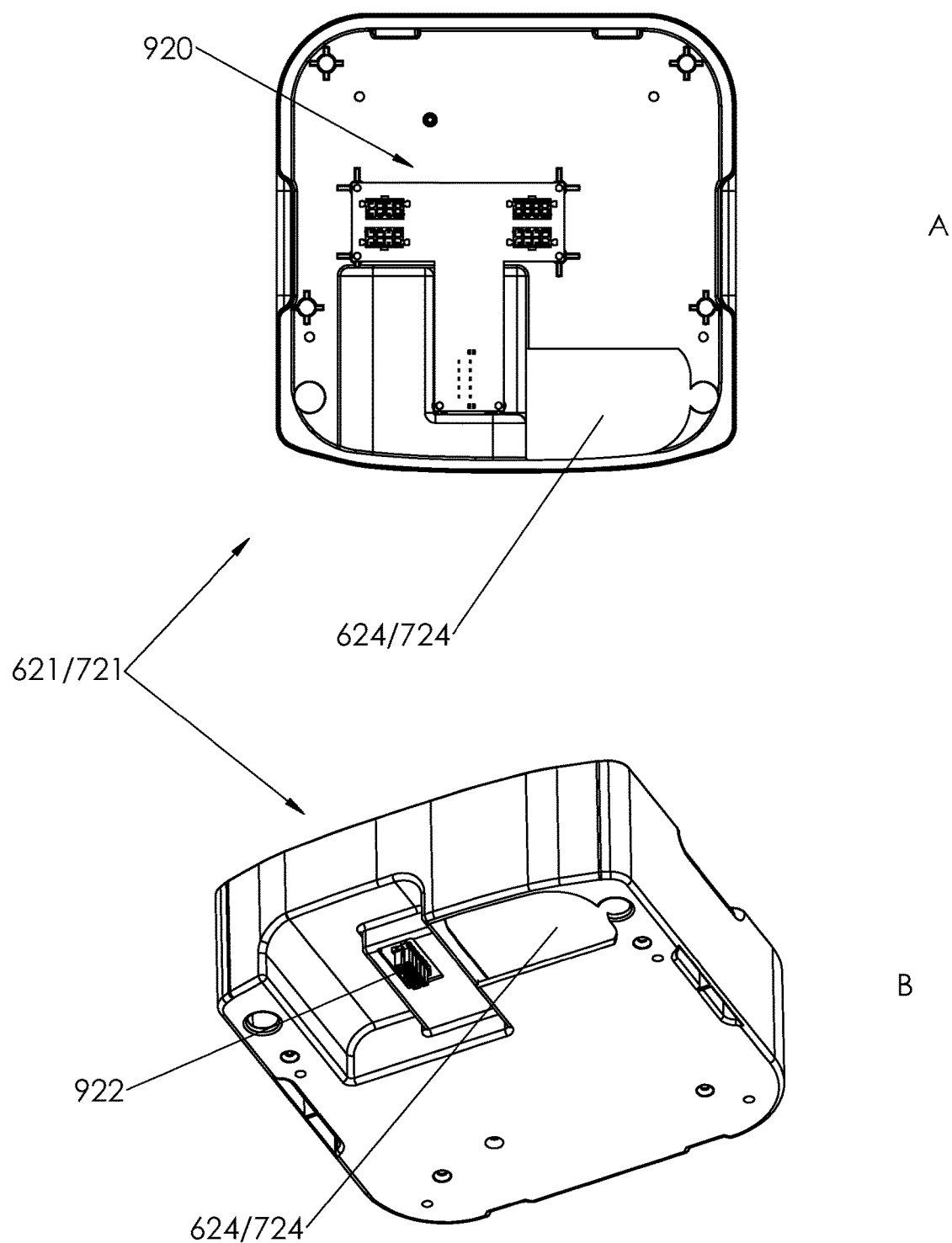

FIG. 66 shows a cage bottom embodiment having two identifiers. The bottom identifier 402 may be on the top or bottom of a flange of the base 130. The identifier 402 may be on the bottom surface of the flange or on the top surface of the flange. FIGS. 3 and 67 show a top perspective view of cage lid 132 on top of cage bottom 130 where the bottom identifier 402 can be seen through the transparent cage lid 132. As shown in FIGS. 3 and 67, the identifiers 400 and 402 are in-line with the flanges and in-line with each other. FIG. 67 shows an embodiment of a cage lid on top of a cage bottom where both the cage lid and cage bottom have two identifiers. Placement of in-line identifiers may aid in the quick scanning or identification of the identifiers by a reader, for example. One or more other identifiers may be placed in-line with the lid identifier 400 and bottom identifier 402 such that the third or more identifiers will be scanned or read by a reader. FIG. 7 shows a front perspective view of a cage 20 with a cage card 410 and seven separate cage card identifiers 412. FIGS. 22 A-B and FIGS. 68A-B show top and isometric views of cage 20 with cage identifiers 400 on either side of cage 20. FIGS. 54A and 54b show isometric views of cage 20 with cage identifiers 400 on either side of cage 20. In one embodiment, a cage card identifier or cage content identifier 412 may contain two identifiers, one being a symbol (smile face) and the second being bar code/serial code which may be detected by a reader. Each different cage card identifier 412 for separate cages may have different symbolic and bar code/serial code identifiers from each other such that all of the cage card identifiers are unique. For example, one cage card identifier may have a smiley face symbol, another cage card identifier may have a star symbol, another cage card identifier may have a cloud symbol and the like. Cage card identifiers may have one or more identical identifiers, such that one or both of the two identifiers on the cage card identifier is the same as another cage card identifier. One of the perforated/adhesive cage card identifiers 412 may be placed in-line with bottom identifier 402 and lid identifier 400 such that all three identifiers will be read by a reader. Other perforated/adhesive cage card identifiers 412 may be placed on objects that have an association or correspond to the identifier or occupants of the animal cage which the cage card identifier 412 is attached or belongs to.

In some embodiments, one or more identifiers can be located on a cage lid, cage base or both cage lid and cage base. In certain embodiments, two or more identifiers can be located on a cage lid, cage base or both cage lid and cage base. In some embodiments, a first and second identifier are on opposite sides along the length of a cage. The identifiers can be the same or different. Identifiers that are the same encode redundant information. A reader can be located above a cage, as shown in FIGS. 23A-C and FIGS. 69A-C, identifiers on the cage lid or cage base or both are placed such that the readers can detect them as the cage is contacted and moved along the cage mount guide rails of the cage mount assemblies. In a certain embodiment, Identifiers may be on the opposite long sides of a cage lid that is attached to a cage base as shown in FIGS. 22A-D, 54, 58, and 65-68A-B. In some embodiments, the identifier is a barcode. Identifiers on opposite sides of a cage lid are simultaneously read by devices, such as cage readers, located on the front of adjacent cage mount assemblies as a cage is slid into the cage mount assemblies and the identifier passes the device.

In some embodiments, one or more identifiers are configured so they do not overlap with one another. In certain embodiments, one or more identifiers are configured so two or more identifiers overlap. In some embodiments having overlapping identifiers, the identifiers can be offset from each other thereby generating regions of non-overlapping identifiers and regions of overlapping identifiers. In some embodiments, overlapping identifiers are detected by the same detector, and in certain embodiments, overlapping identifiers are detected by different detectors. In certain embodiments, each identifier in an overlapping identifier configuration is detected by a different detector. In some embodiments, each cage component has 2 or more, 3 or more, 4 or more, or more than 5 independently detectable identifiers, and in certain embodiments, a subset or all of the independently detectable identifiers can be detected in various combinations. In some embodiments having two or more identifiers (e.g., overlapping or non-overlapping), portions or all of the identifiers may be redundant.

Manufacturing of Identifiers

Techniques for applying one or more identifiers may include, but are not limited to, printing (e.g. impact, ink jet, laser, thermal transfer printing, flexographic, rotogravure, offset or rotary screen and the like), imprinting, embossing, molding, laminating, heating, spraying, rolling, silk-screening, painting, fastening, adhering with adhesives, or any other technique suitable for applying the identifier as described herein. Ink or markings used may be colored or colorless in the visible spectrum. Identifiers may be made with conductive inks that can store and transmit data, and/or made to be fluorescent under certain electromagnetic radiation. Any variety of electronic inks with conductive, insulating, or semiconductor qualities may be used and can be printed in one or successive layers on any material such as plastic substrates or polymer films. The electronic inks also may be opaque, or transparent and thus undetectable to the human eye. Identifiers may be made of organic and/or biodegradable material. Identifiers may be chipless or made on polymer-based tags. Identifiers may be manufactured to allow for a large number of distinct codes, to be made flexible or bendable, and/or to withstand harsh environments.

An identifier may vary in size, shape, color, texture, and the like. Identifiers may be relatively small microelements, microparticles or encoded particles for smaller applications (about 1-1000 microns), or relatively larger macroelements for larger applications (e.g., 10-1000 cm or larger). An identifier also may be embedded within, or part of, a larger substrate, element or object. An identifier also may be in the form of a thread, fiber or filaments that can be weaved into a material. Also, an identifier may be embedded in a film or coating, which may be an adhesive film, coating or tape, having one or a plurality of particles or filaments therein. For example a roll of encoded adhesive tape may be attached to an item for labeling. Identifiers that are embedded inside (e.g., on or near the surface) of a substrate and/or surface, may be permanent, non-removable identifiers that can operate in relatively harsh environments (e.g., subjected to harsh chemicals, temperature, pressure, electromagnetic, etc.).

Identifiers may or may not be affected by spot imperfections, scratches, cracks or breaks in the substrate and/or surface carrying the identifiers. Identifiers may be produced such that they are spatially invariant, where splitting or slicing an identifier axially produces more elements with the same code such that the code is not lost, but instead replicated in each piece.

Identifiers also may be coated by paint, a protective coating or the like. Identifiers may be layered onto each other or overlapping each other such that the combination of two or more identifiers overlapping each other represents a unique code. Identifiers may be identified, recognized, and/or transmit data through other objects (e.g., an identifier may be detected and transmit information through a lid component (e.g., through a flange of a lid)). Sometimes identifiers transmit different information based on the method of detection used. In some embodiments one or more types of information may be layered in one or more identifiers, and in certain embodiments, the different types of information may be detected by one or more detectors. In some embodiments, the layered information may be present in non-overlapping identifier regions. In certain embodiments, the layered information may be present in overlapping identifier regions. In some embodiments, the layered information may be present in non-overlapping identifier regions and in overlapping identifier regions. For example, identifiers that are transparent to some electromagnetic wavelengths and opaque to other electromagnetic wavelengths sometimes allow detection of different information based on the type of detector used for detection. The term "different information" as used with regards to layered information present in identifiers refers to one or more types of information that can be encoded in an identifier, which information sometimes can be detected under certain detection conditions, but not other detection conditions (e.g., detected with certain electromagnetic wavelengths, but not other electromagnetic wavelengths).

Identifiers and/or detection of identifiers also may be modified by one or more additives added to materials from which cage components are manufactured. In some embodiments, one or more additives added to polymers used to manufacture cage components described herein can alter transparency or opaqueness of a cage component to various types of electromagnetic radiation used to detect one or more identifiers.

Detectors and Readers

An identifier may be read visually by a user or may be read by a machine (e.g., automated detection). Machines that detect, scan and/or identify identifiers are referred to herein as "readers" or "detectors." Some identifiers are detected, scanned and/or identified without use of a reader, and some identifiers are detected, scanned and/or identified with the use of a reader. A reader may be a mechanical machine, and in some embodiments, a reader includes one or more magnetic optical components. A reader may be mounted to a cage system component (e.g., a rack in an automated reading configuration) and/or may be a handheld device in some embodiments. The output, input or a signal to or from a reader can be directed and received by a controller, computer, main server, local server, database, another reader or by a device that has a visual display such as an indicator, in certain embodiments. In some embodiments, a reader is write enabled. That is, in some embodiments a reader can alter the information content encoded on a cage component by altering (e.g., adding to, removing from or changing) a cage component identifier.

Any convenient configuration of one or more indicators can be utilized. An indicator may be relatively simple, such as a device having a red and green light, which can indicate two states, such as, yes or no, open or closed, and the like, for example. An indicator may respond to identification of an identifier or location of an identifier by a signal other than a visual signal, such as an auditory, tactile, or olfactory signal, for example. An indicator can be a graphic display of one or more rack systems, and show cage positions associated with one or more criteria (e.g., user-defined criteria or pre-programmed criteria) in certain embodiments. A reader may be integrated with an indicator, such that a reader can respond to identification of an identifier or location of identifier by producing a visual, auditory, tactile, or olfactory signal. Thus a reader may be synonymous to an indicator.

A reader may comprise a detector, which detects an identifier and delivers electrical signals to a controller, the latter of which processes electrical signals transmitted by the detector i to produce a visual display or data of, for example, information about/recorded by the identifier and/or location of the identifier. A reader may be in wireless communication or directly connected to a controller and/or computer processor. A reader may be a mobile device with a scanner operably coupled to the mobile device. The scanner may include a light source, a lens, a photo conductor which translates optical impulses into electrical impulses, an output port, and the like, in some embodiments. Readers also may include decoder circuitry which analyze an identifier's image in certain embodiments.

Any variety of readers may be utilized to detect identifiers, such as a device that can detect an identifier described herein. Non-limiting examples of readers include pen type readers, laser scanners, CCD readers, camera based readers and the like. In some embodiments, an identifier is moved past a relatively stationary reader and the reader detects the identifier before, during or after the identifier is in detectable proximity with the reader. In certain embodiments, the reader is moved past a relatively stationary identifier and the reader detects the identifier before, during or after the reader is in detectable proximity with the identifier. An identifier and reader may be moved past the other (e.g., moved over the other, moved near the other) in a suitable or convenient manner, such as by a user or by an automated translation device (e.g., a robot may move a cage component or components past a reader or move a movable reader past a cage component). A reader may detect a signal emitted from an identifier in some embodiments, and sometimes a reader can detect a signal first generated by the reader and then transmitted back to the reader from the identifier (e.g., reflected by the identifier). A signal transmitted to a reader from an identifier may be processed or decoded by the reader in some embodiments, and the processed signal may be forwarded to another part of a system (e.g., processor and/or controller). In some embodiments, a signal is two or more signals (e.g., 2 or more signals, 3 or more signals, 4 or more signals, or more than 5 signals). In certain embodiments, each signal is the same signal, and in some embodiments, each signal is a different signal. In embodiments having two or more different signals, each signal may be detected by the same detector or one or more signals may be detected by a different detector. A signal transmitted to a reader from an identifier may be forwarded directly, without processing or decoding, to another part of a system (e.g., processor and/or controller) in certain embodiments. In the latter embodiments, another part of a system may process and/or decode an identifier signal detected by the reader. Certain specific types of readers that can be utilized are described hereafter.

Pen type readers can include a light source and a photodiode placed next to each other in the tip of a pen, wand or projected device, in some embodiments. To read an identifier, the tip of the pen or device often moves across the bars of an identifier in a steady motion. The photodiode measures the intensity of the light reflected back from the light source and generates a waveform that is used to measure the widths of the bars and spaces in the identifier. Dark bars in the identifier absorb light and white spaces reflect light so that the voltage waveform generated by the photo diode is a representation of the bar and space pattern in the identifier. This waveform is decoded by the scanner in a manner similar to the way Morse code dots and dashes are decoded.

Laser scanners are similar to pen type readers except that they may use a laser beam as the light source and may employ a reciprocating mirror or a rotating prism to scan the laser beam back and forth across the identifier. Similar to a pen type reader, a photodiode is used to measure the intensity of the light reflected back from the identifier. In pen readers and laser scanners, the light emitted by the reader often is tuned to a specific frequency and the photodiode is designed to detect modulated light of the same frequency.

CCD readers (also referred to as LED scanner) use an array of (e.g., hundreds of) tiny light sensors lined up in a row in the head of the reader. Each sensor can function as a single photodiode that measures the intensity of light immediately in front of it. Each individual light sensor in the CCD reader often is small and because there are a plurality of sensors lined up in a row, a voltage pattern identical to the pattern in a bar code is generated in the reader by sequentially measuring the voltages across each sensor in the row. A difference between a CCD reader and a pen or laser scanner sometimes is the CCD reader is measuring emitted ambient light from the identifier whereas a pen or a laser scanner is measuring reflected light of a specific frequency originating from the scanner itself.

A camera-based reader or 2D imaging scanner also may be used. Such a device often makes use of a small video camera that can capture an image of an identifier. The reader then may make use of a digital image processing technique to decode the identifier. Video cameras use the same CCD technology as in a CCD identifier reader except that instead of having a single row of sensors, a video camera has hundreds of rows of sensors arranged in a two dimensional array so that they can generate an image.

A reader may be located in any suitable or convenient location on a device, such as on a rack, on a shelf, on a cage mount assembly, on an animal cage, on a controller, on a computer, or on a hand-held device, for example. Different types of readers may be used in combination. Or only one specific type of reader may be used. In some embodiments, readers may be configured with a water tight seal, to allow washing of a rack without the need for reader removal. In some embodiments, a translucent faceplate or cover is used to seal the LED's sometimes used as the indicators in a reader. In certain embodiments, the translucent faceplate or cover is made of a plastic, and in some embodiments, the plastic is a Lexan™. In certain embodiments, the reader is configured to fit into a cage mount front module receptacle with a watertight seal.

Non-limiting embodiments of reader configurations are shown in FIGS. 4-6, 22-23, 60, 62, 68A-69C, 83-86C, and 88. Non-limiting examples of cage mount assembly receptacle plugs are shown in FIGS. 56-59, and 63. FIGS. 4A-D show a top, isometric, front and side perspective views, respectively, of a cage 20 being inserted into a rack shelf 300 having reader 404. This shelf 300 has a side frame piece 286 and is at the left most location on a rack. The cage 20 has a lid 132 having identifier 400 and bottom or base 130 having identifier 402. FIGS. 4A and 4B show the reader 404 in-line with identifiers 400 and 402. FIG. 4D shows the cage 20 is engaged with, but not yet inserted into, shelf 300 of a rack. When the cage 20 is inserted into shelf 300, identifiers 400 and 402 pass in-line under reader 404 such that the reader can detect each identifier. FIGS. 68A-D show a top, isometric, front and side perspective views, respectively, of a cage 20 being inserted into a rack support member 502 having reader 564'. Rack support member 502 has cage mount guide rail 552 located on each side of a cage station and in some embodiments reader 564, 564' are located at the front of each guide rail. Cage 20, as illustrated in FIGS. 68A-D, shows identifier 400 and identifier 402. FIGS. 68A-B show reader 564' in-line with identifiers 400 and 402. FIG. 68D shows cage 20 is engaged with, but not yet inserted into, rack support member 502. When the cage 20 is inserted into rack support member 502, identifiers 400 and 402 pass in-line under reader 564' such that the reader can detect each identifier.

Figure 5A:
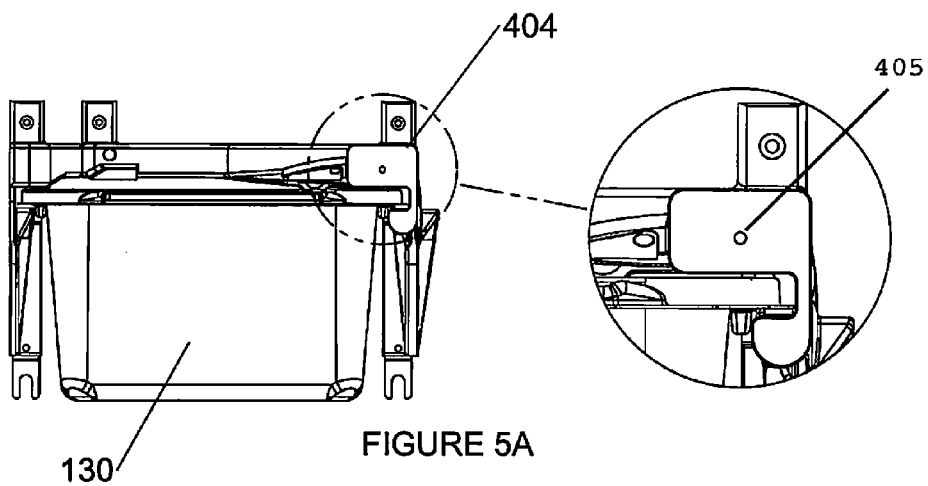
FIGS. 5A-5C are front perspective views, with detailed inserts of readers, of a cage inserted into a cage rack with different LED illumination representing different states.
Figure 5B:
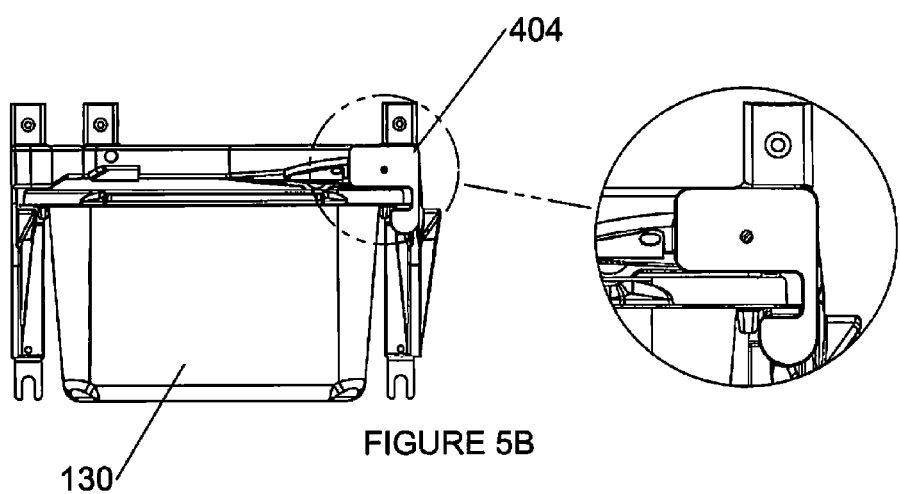
Figure 5C:
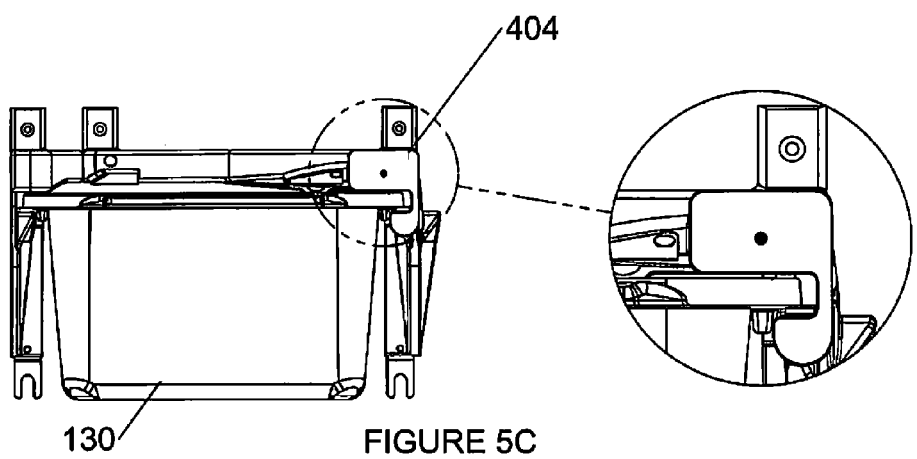

FIGS. 5A-C show front views of a system that includes a reader 404, a cage 20, having front 130, inserted into a cage rack with different LED illumination representing different states. The LED 405 is an example of an indicator within a reader. The LED illumination has three states, as seen in the circular expansions in FIGS. 5A-C. The states are clear (FIG. 5A), shaded (FIG. 5B), and dark (FIG. 5C).

FIGS. 69A-C show front views of a system that includes a reader 564', a cage 20 inserted into a cage rack with different LED illumination representing different states. The LED 565 is an example of an indicator within a reader. The LED illumination has three states, as seen in the circular expansions in FIGS. 69A-C. The states are clear (FIG. 69A), shaded (FIG. 69B), and dark (FIG. 69C). The states illustrated in FIGS. 69-A-C are non-limiting examples. In some embodiments, the states (e.g., cage status) can be indicated by different colored LED's, and in certain embodiments additional states not described herein also can be indicated by LED indicators within a reader.

Figure 6A:
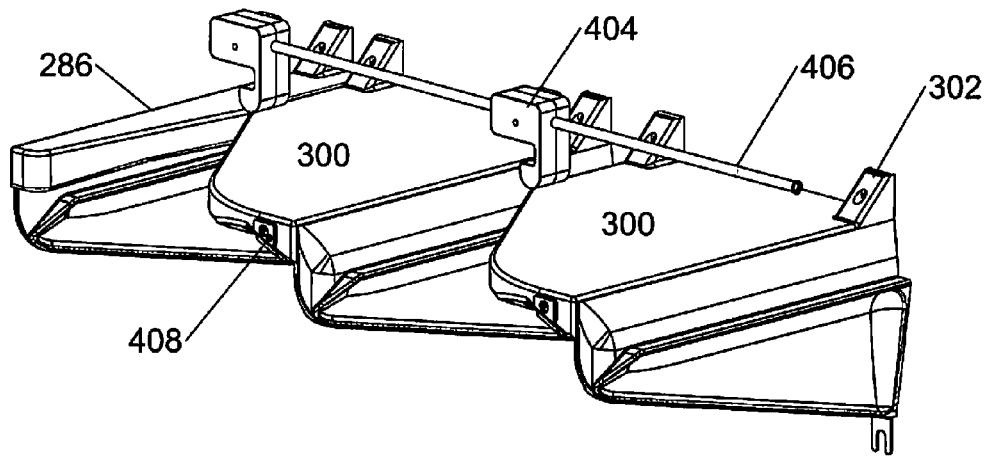
FIGS. 6A-6C are isometric perspective views of two adjacent readers mounted onto the shelves of the rack assembly.
Figure 6B:
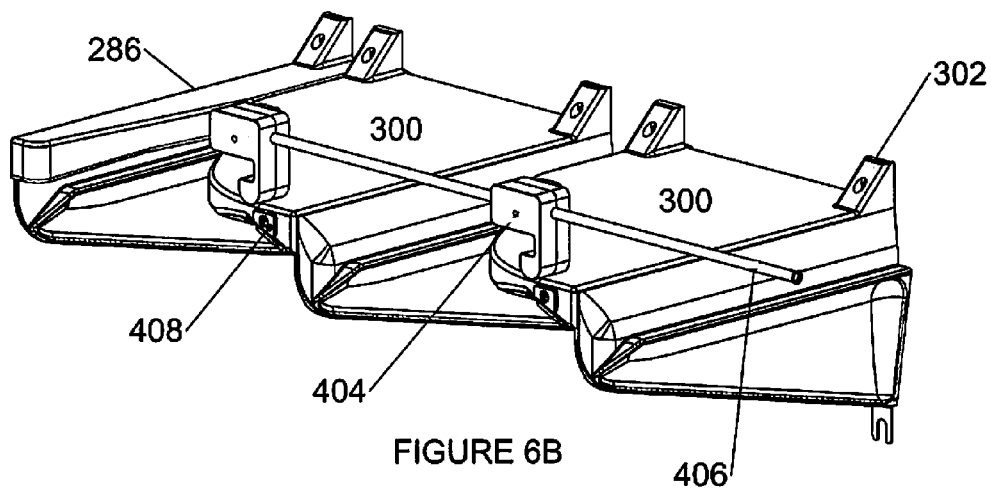
Figure 6C:
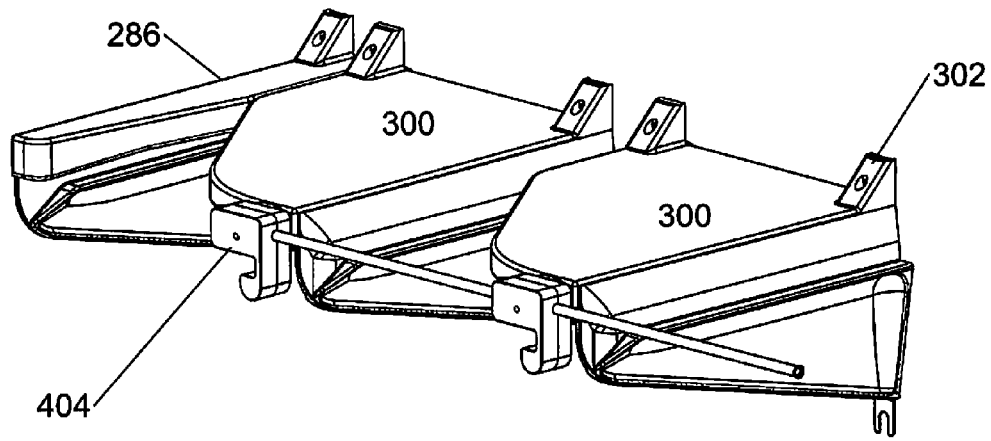

FIGS. 6A-C show isometric perspective views of two adjacent readers 404 being mounted onto the shelves 300 of the rack assembly. Also shown is a bar shield or bar wiring harness shield 406 that holds readers 404 and can protect a ribbon cable running from the readers (not shown). The cable from readers on the same horizontal shelf row may travel through the bar shield to the side of the rack assembly. At the side of the rack assembly, cables from multiple horizontal rows may meet up with each other and can travel vertically to the top of the rack assembly where they can be wired to a power source and/or into a controller. In some embodiments, readers 404 are in wireless communication with a controller and/or local server. Also shown are reader shelf mounts 408 at the front of each shelf 300. Reader shelf mounts 408 is where readers 404 can attach onto each shelf 300. In some embodiments, there is a reader shelf mount 408 and reader 404 for each shelf 300 within a rack assembly.

In some embodiments, one or more cage components have a first detectable identifier and a second identifier. In certain embodiments, the cage lid can have a first and second detectable identifier or the cage base can have a first and second detectable identifier or a cage lid can have a first detectable identifier and a cage base can have a second detectable identifier. A detector or reader can be configured to detect the first or second detectable identifier. The detector can be attached to or is part of a cage mount assembly. In certain embodiments, the detector is part of the front module of a cage mount assembly. In another embodiment, there can be a first and a second detector and the first detector is configured to detect the first detectable identifier and the second detector is configured to detect the second detectable identifier. The cage can have the first and second detectable identifier on opposite sides along the length of a cage. The first and second detectors can be on adjacent cage mount assembles attached to a cage rack. In certain embodiments, the detectors can be part of the front modules of cage mount assemblies. The first detector can be configured to detect the first detectable identifier and the second detector can be configured to detect the second detectable identifier when a cage is slid into the cage mount assemblies and the first detectable identifier passes the first detector and the second detectable identifier passes the second detector.

In some embodiments, a cage system includes a cage component having a detectable identifier and a first detector configured to detect the identifier. The detectable identifier can be part of the cage lid or the cage base. The detector can be attached to a cage mount assembly. In certain embodiments, the detector is part of the front module of a cage mount assembly. The detector can be configured to detect the detectable identifier when a cage with the cage with the detectable identifier is slid into the cage mount assembly and the detectable identifier passes the detector.

FIGS. 22-23, 60, 62, 68A-D, 69A-C, 83-86C and 88 illustrate alternate reader configurations suitable for use with cage rack 500 described herein. FIG. 22A-D and FIG. 68A-D show top, isometric, front and side perspective views, respectively of cage 20 being inserted into cage rack 500 cage mount assembly 530, which includes reader 564, 564'. Reader 564, 564' includes LED's 565, which indicate cage insertion status upon reading cage identifier 400 located on lid 132 of cage 20. Reader 564' includes a substantially sealed translucent cover over LED's 565. With the exception of the end cage mount assemblies located at each end of support member 502, reader 564, 564' effectively contacts two separate cages and indicates the status of each cage by LED's 565. Each cage 20 is read by two independent readers 564, 564', in some embodiments. Each reader in operational contact with lid 132 of cage 20 reads one of two independent identifiers 400, 402 located on lid 132. Using two readers to report insertion status for each cage aids in proper alignment and placement of cage 20.

Figure 62:
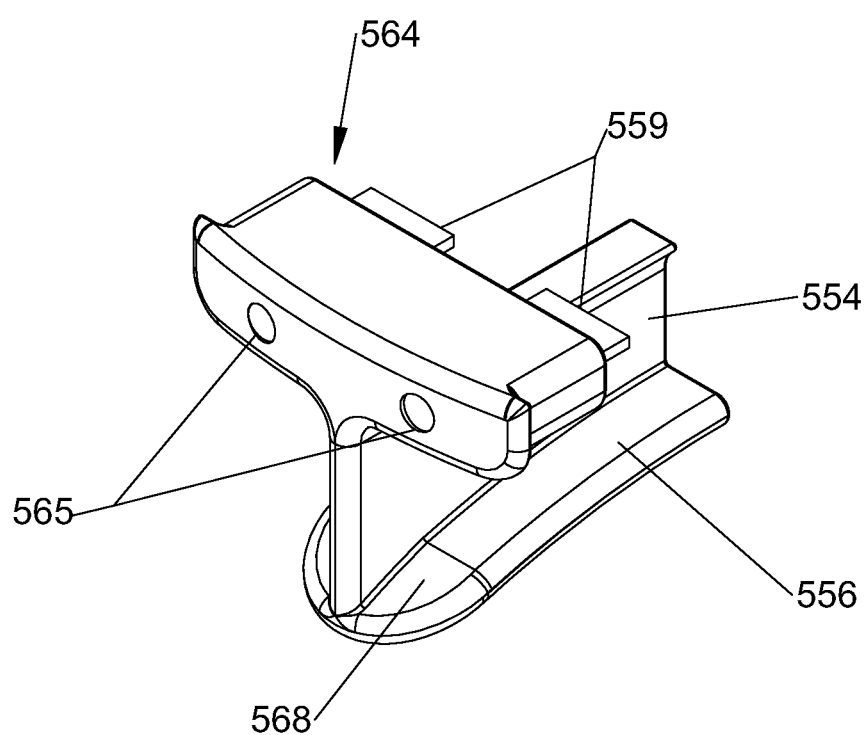
FIG. 62 illustrates an isometric view of a cage mount front module reader.
Figure 88:
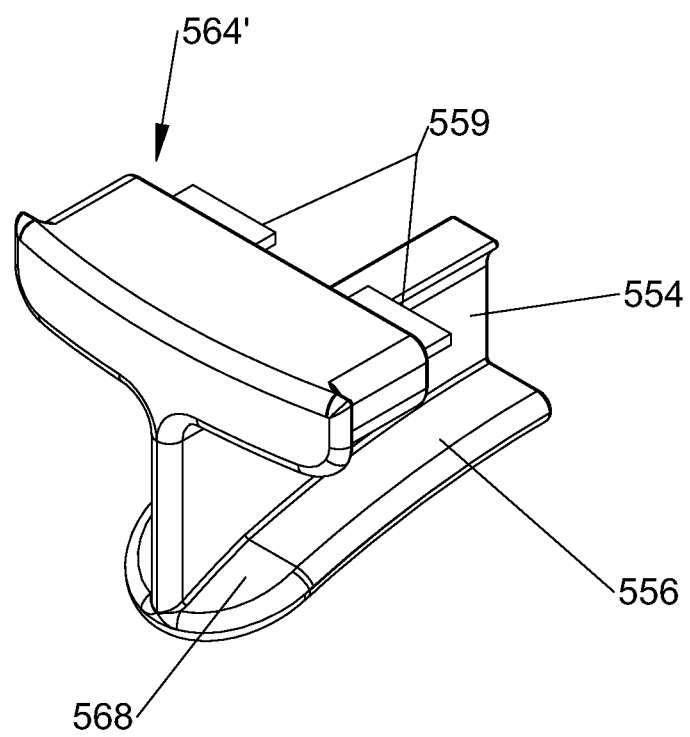
FIG. 88 illustrates an isometric view of a cage mount front module reader. Differences between embodiments illustrated in FIG. 88 and FIG. 62 include the configuration of the cage front module reader. Cage mount front module reader 564' illustrated in FIG. 84 has a sealed (e.g., water tight) translucent cover. In some embodiments the translucent cover is made from lexan.

FIGS. 23A-C and 69A-C illustrate non-limiting examples of different status reports possible via LED's 565 of reader 564, 564'. FIGS. 23A-C and 69A-C illustrate a front view of cage 20 engaged with cage mount assembly 530, 530' including cage reader 564, 564', respectively. The LED status shown in FIGS. 23A-C and 69A-C correspond to the LED status shown in FIGS. 5A-C. FIGS. 60 and 86 are partial cut away isometric views illustrating support member 502 with cage reader assembly 530, 530'. Also illustrated in FIGS. 60 and 86 is reader 564, 564' being inserted into the front of cage mount assembly 530 reader receptacle 569. Also illustrated in FIG. 86 is cage mount guide rail stop 553. FIG. 62 is an isometric view of reader 564, illustrating LED's 565, communication plugs 559, cage mount guide rail stem 554, cage mount guide rail cross projection 556 and cage mount front module beveled lip 568. FIG. 88 is an isometric view of reader 564', illustrating the sealed translucent cover, which hides LED's 565 from view unless the LED's are active, communication plugs 559, cage mount guide rail stem 554, cage mount guide rail cross projection 556 and cage mount front module beveled lip 568. Communication plugs 559 are inserted into eSATA receptacle 912 of communication medium 536, 538 in some embodiments.

Use and Function of Identifiers

It is often desirable to uniquely label or identify items, such as cage components, cage contents (e.g., animals), cage conditions, and cage user information for sorting, tracking, identification, verification, authentication, inventory, billing, management, anti-theft/anti-counterfeit, security/anti-terrorism, forensics, and/or for other purposes. One issue regarding maintenance of a rack system and the animals contained within the cages supported by the rack system concerns efficient and accurate gathering, processing and displaying information regarding the interior conditions of each cage to lab personnel. In many circumstances regarding the care and maintenance of systems or studies involving multiple containment cages that house laboratory animals, the cages are cleaned, changed or otherwise maintained on a regular schedule that may be dictated by good laboratory practices and may also include the input of a veterinary professional. Because of the complicated nature of the interaction of an animal with its surroundings, maintenance schedules may often be calculated or determined based on a worst case scenario for a group of cages. More specifically, the maintenance schedule for all cages may be determined by the cage having the highest bio-burden as it is too time consuming to monitor each cage individually. For such an arrangement, cages not immediately requiring maintenance will receive it anyway, resulting in a non-efficient use of laboratory resources and unnecessary maintenance of some cages having a lower bio-burden or the like. In addition, even if cage monitoring data is available remotely to laboratory personnel, if laboratory personnel are tasked with monitoring a large number of cages, it may still be burdensome to process all the cage data.

Identifiers may serve any suitable or convenient purpose. For example, identifiers may be clocking identifiers, cage position identifiers or location identifiers, content identifiers, user identifiers, cage component identifiers, cage condition identifiers or combinations thereof. A clocking identifier may measure and record time and/or speed by which the identifier was read. A clocking identifier may also function as a meter, a speedometer or taximeter, for measuring and recording speed, distance covered, or other quantitative functioning of how the identifier was read or data acquired.

Information from one identifier may be associated with information from another identifier in some embodiments. Information from an identifier can be associated with information not generated from an identifier, such as, for example, information inputted or read by a user or machine (e.g., cage card information, cage content information, cage user information, information entered by a user into the rack controller).

In certain embodiments, a cage position identifier or location identifier may act in collaboration with one or more other indicators, readers, identifiers, systems, sensors or components to disclose its location. A cage position identifier or location identifier may store location information regarding its position in relation to other identifiers and or other cage components or other relative location (e.g., a GPS location), in some embodiments. In certain embodiments, a cage position identifier or location identifier may transmit a wireless GPS signal to a reader, controller or computer having a digital screen to display the location when the identifier is moved, soiled, or activated by a variety of actions.

In some embodiments, a cage content identifier may contain information regarding the occupants of the animal cage such as the number and type of animals in a cage, the owner of a cage, the age of an animal, the sex of an animal, the pedigree of an animal, the experimental procedure planned for an animal, the observations/notes by a cage user, or the like. A cage user identifier may contain information regarding users of the rack system or of one or more cages such as the personnel accessing a cage, the time of cage access, the date of cage access, the purpose of cage access or the like.

In certain embodiments, a cage component identifier may label or identify an object the identifier is located on, for example a cage lid component, a cage base component, an air supply component, an air exhaust component, a water supply component, a sensor component, a filter component, a baffle component, a bedding component or a feeder or the like.

In some embodiments, a cage condition identifier may contain information regarding any conditional changes made to the inside or outside of the cage itself or any materials used in maintenance of the cages, such as a food change, a water change, a medicine administered to the occupants of the cage, a bedding material change, a filter change, a syringe administered to one or more animals, a glove used by personnel cleaning the cages, cleaning supplies used to clean the cages or the like. A cage condition identifier may also contain a time/date stamp of when the non-cage material was used for the cage or when the cage was maintained. In some embodiments, a cage condition identifier comprises a bedding component, and in certain embodiments a bedding component identifier comprises a sensor chosen from a chemical sensor, RFID sensor, thermal sensor, moisture sensor, the like and combinations of the foregoing.

FIG. 7 shows a front perspective view of a cage 20 with a cage card 410 and several cage card identifier or cage content identifiers 412 in a row. FIG. 7 shows the cage card 410 mounted onto the front of the cage bottom 130 with information displayed, such date, study # and investigator. There are seven cage card identifiers 412 horizontally lined up next to each other that have perforated sides such that a user may tear or detach each identifier separately from the cage card. The cage card identifiers 412 also may have an adhesive backing such that they will stick to other surfaces. Each identifier has a symbol and a bar code or serial code. The symbol on the identifier 412 is a smiley face. In maintaining a disposable animal cage, the cage bottom 130 and/or cage lid 132 may be replaced. Upon replacing the cage bottom 130, the cage card 410 can be taken off the old cage bottom and attached to the new cage bottom. In some embodiments, cage components, such as a cage lid or cage bottom, that are associated with a specific cage or a cage card 410, can be placed with the same identifier such as 412 for tracking. If a reader is located above a cage, as shown in FIGS. 4A-D, identifiers of cage components and cage content identifiers 412 may all be placed in-line such that the reader can detect them as the cage is inserted into the shelf rack assembly. Personnel switching an old cage bottom for a new cage bottom may perforate one cage card identifier 412 from the cage card 410 and place it on the flange of either the cage lid 132 or cage bottom 130, in-line with the identifiers 400 and 402 such that the reader 400 can now identify the three identifiers together and thus associated them together. After changing the cage bottom 130, the new cage bottom has a new cage bottom identifier 402 and is associated with the correct/corresponding cage content identifier 412 and cage lid identifier 400. The old cage bottom and the new cage bottom may have the same identifier code. The old cage bottom and the new cage bottom may have different identifier codes. The location of the identifiers at the same coordinates may associate them together. The detection of the identifiers at the same time/date may associate them together. Detecting the identifiers by the same reader may associate them together and the like.

By detecting and processing information from identifiers, systems and methods described herein can allow lab personnel to reliably and conveniently monitor the interior conditions of each individual cage supported by a rack system with cage status information being conveniently and efficiently displayed. Also, systems and methods provided herein can allow for tracking cage component inventory and placing orders for cage components from a manufacturer or distributor. Systems and methods provided herein can allow for tracking of cage conditions and identification of cages that share certain conditions (e.g., amount of food and/or water placed into a cage and when each amount was placed in the cage; type and amount of drug administered to specific animals in a cage and time and date of such administration). Systems and methods herein also can allow for tracking of certain activities associated with vivarium personnel, thereby providing for efficiency and security determinations (e.g., which personnel handled a particular cage, when certain personnel handled a cage, how often certain personnel handled a cage). Some of these functions are described further in the section herein entitled "Processors, Controllers and Servers."

Figure 9:
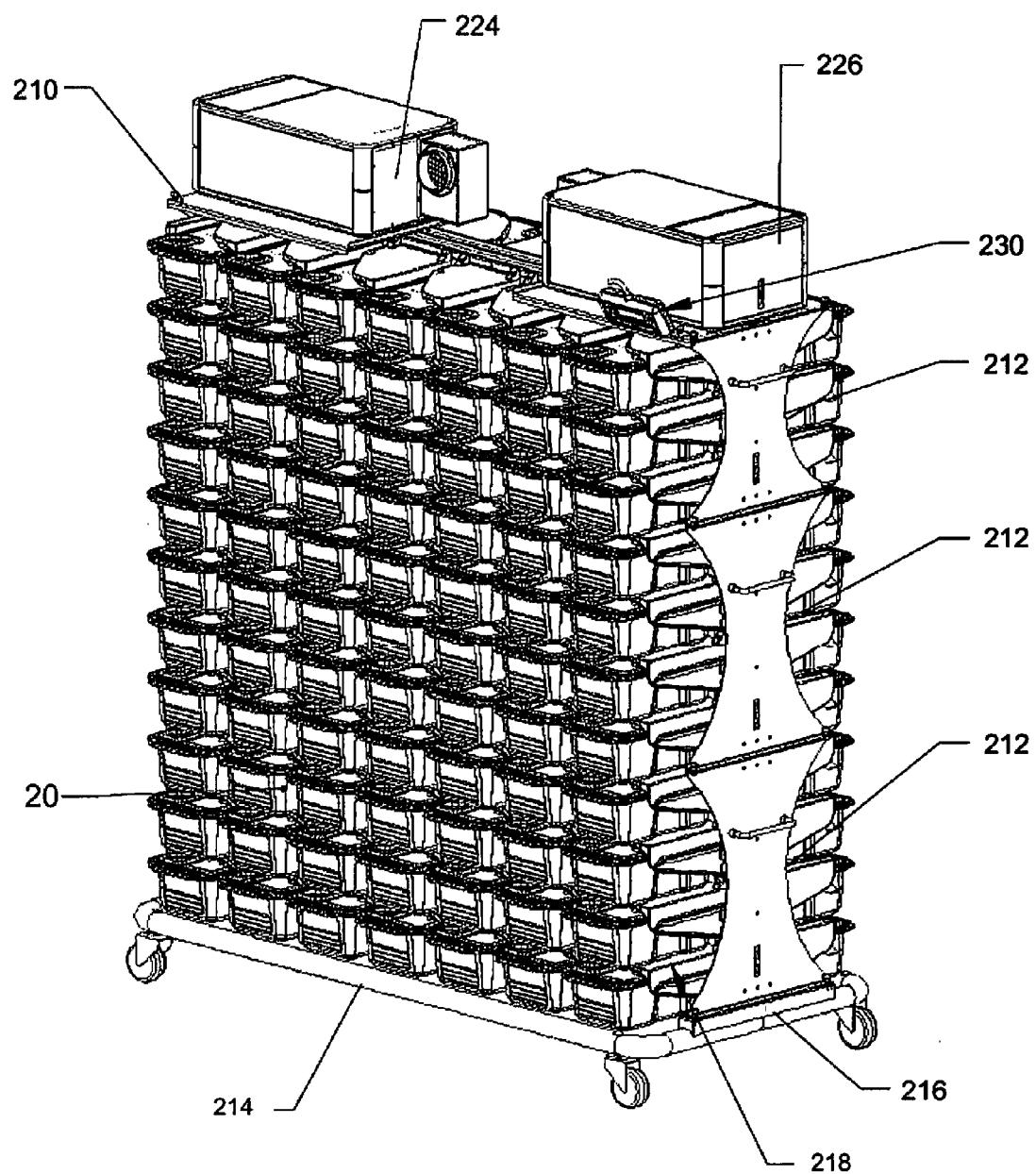
FIG. 9 is a perspective view of an embodiment of a rack system.

In certain embodiments shown in FIG. 9, a rack system 210 includes a controller 230 that may be coupled to a blower assembly 224 and 226 and one or more sensors (not shown). The sensors include any of a variety of configurations or types that may be used to monitor conditions within each individual cage 20 supported by rack system 210. The data obtained by the controller 230 from the sensors, identifiers, or other sources may be processed by a computing system disposed within the controller, main server, local server or any other suitable location in the system that may include a processor and data storage device and then displayed on a graphic user interface in a convenient visual display format.

Figure 26:
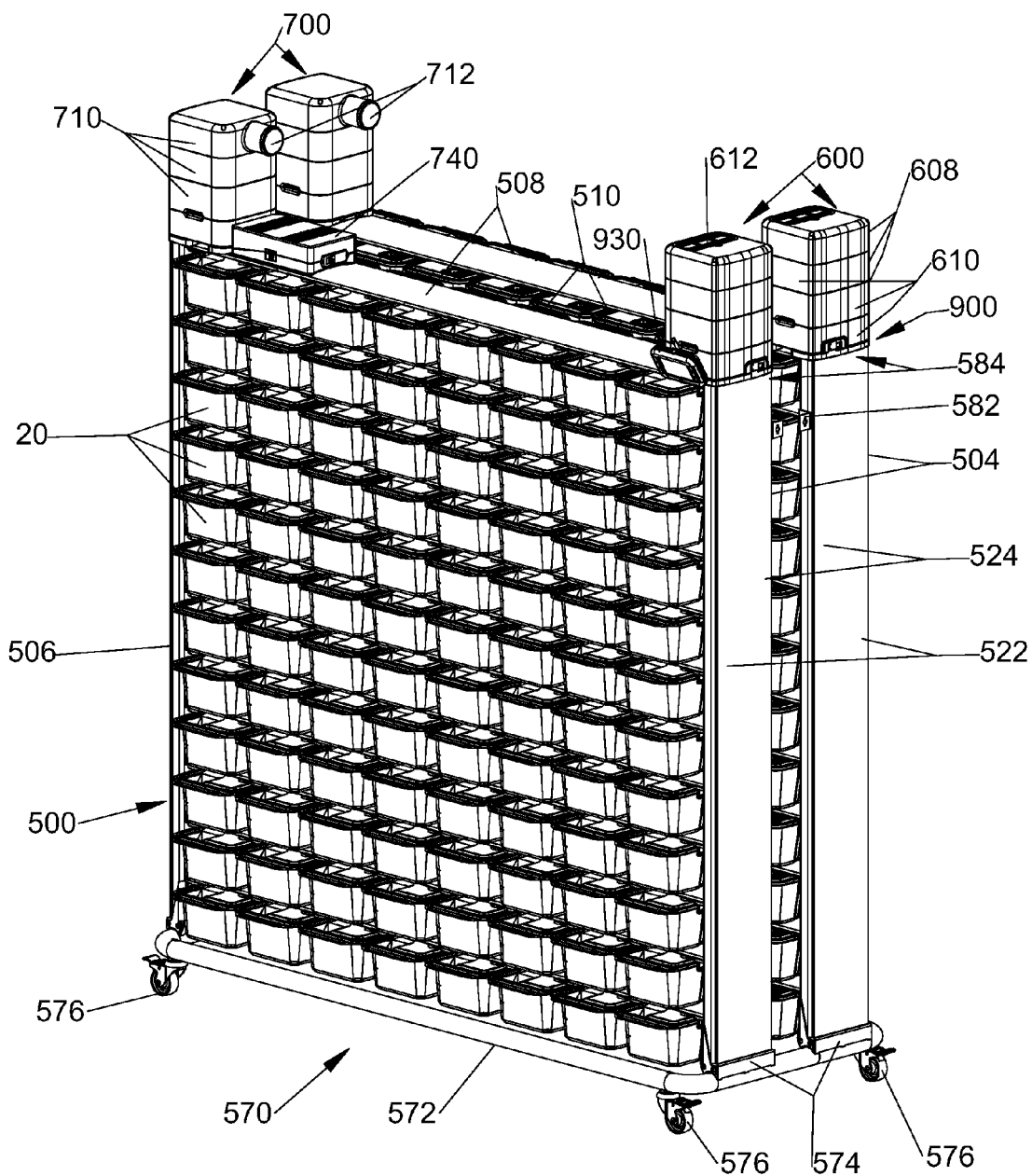
FIG. 26 illustrates a perspective view of a double unit rack embodiment, with modular blower system attachments and inserted cages.

In certain embodiments shown in FIG. 26, cage rack system 500 includes controller 580 that may be coupled to blower assembly 600, 700 and one or more sensors (not shown). The controller can be mounted on the top of a side member 504, 506 or on the side of a side member. In one embodiment, the controller can be mounted on a controller side mount 582. The sensors include any of a variety of configurations or types that may be used to monitor conditions within each individual cage 20 supported by cage rack 500. The data obtained by controller 580 from the sensors, identifiers, or other sources may be processed by a computing system disposed within the controller, main server, local server or any other suitable location in the system that may include a processor and data storage device and then displayed on a graphic user interface in a convenient visual display format. In some embodiments, a controller can communicate with blower assembly 600, 700 and one or more sense wirelessly.

Cages

Some animal containment cage embodiments may include a containment cage base member, a cover or lid member, and an optional insertion member or device. An animal cage base sometimes is provided separately from a lid, the lid often may be attached to the cage base and the lid may be readily detachable from the base. An animal, such as a rodent, and/or optional insertion member may be placed in a cage base before a lid is attached. A variety of animals may be contained within cage embodiments described herein. Rodents often are contained within such units, including but not limited to mice, rats, hamsters, gerbils, guinea pigs, chinchillas and rabbits. The animal can be transgenic, inbred, immunodeficient, lack one or more functional genes (e.g., knock-out animal), and/or can include one or more xenografts. Examples of immunodeficient mice include nude mice and severe combined immune deficiency (SCID) mice. Cells from cultured cell lines, cultured primary cells or directly from another animal or tissue (e.g., biopsy) may be utilized for xenografts (e.g., cancer cells from a human). The animals contained in cages and systems described herein can be utilized in a variety of manners, including but not limited to studying cancer and other diseases, assessing parameters of potential drugs (e.g., toxicity, efficacy, maximum tolerated doses, effective doses and other pharmacokinetic parameters), producing and isolating antibodies and producing and isolating cells useful for preparing hybridomas, for example.

Cage base embodiments may be of any geometry suitable for housing animals, such as cylindrical, substantially cylindrical, conical, rectangular, square, cubic, rhomboid and the like, for example. Cage base embodiments may include a bottom member that supports a plurality of sides or sidewall members (e.g., four sidewall members). One sidewall member may be referred to as a "front sidewall member" and the opposite sidewall member may be referred to as a "rear sidewall member." Opposing sidewall members sometimes are parallel, substantially parallel, not parallel, rhomboid, substantially rhomboid or a combination thereof. In some embodiments, opposing sidewalls are not parallel, and are not vertical or perpendicular with respect to the bottom. In such embodiments, a sidewall, and sometimes all sidewalls, are at a non-90 degree angle with respect to the bottom, such as an angle between about 91 degrees and about 105 degrees, an angle of about 92 degrees to about 98 degrees or an angle of about 95 degrees, for example. Such angled sidewall configurations (with respect to the bottom) can promote cage base nesting (described in greater detail hereafter).

In certain embodiments, a guide member and/or support member is a flange, projection, rib or groove located on the exterior surface of a bottom member of a base and/or one or both cage sidewall members (e.g., sidewall member adjacent to the front sidewall and rear sidewall), and often may be parallel with the top edges of the sidewall members. Such guide members and support members sometimes extend from the front edge of a sidewall member, sometimes extend to the rear edge of a sidewall member, sometimes extend from a point in a sidewall member a distance from the front edge, and sometimes extend to a point in a sidewall member a distance from the rear edge. Such members sometimes are oriented in the middle half of the vertical length of a sidewall member, and sometimes are oriented in the middle of the vertical length. In some embodiments, guides are low profile, and sometimes are grooves or depressions, that do not substantially interfere with nesting of cage bases.

Some cage base embodiments may be manufactured from any material suitable for housing an animal, such as a small rodent, for a time period of about one week or greater. The material may be rigid, and often is a semi-rigid or flexible material. The cage base sometimes is constructed entirely, or in part, from a translucent or transparent material. The material sometimes includes additives that alter the transparency or opaqueness of the cage base to various types of electromagnetic radiation. Examples of materials that may be utilized for manufacture of any of the a cage base or lid embodiments discussed herein include, but are not limited to, polypropylene (PE), high-density polyethylene, low-density polyethylene, polyethylene teraphthalate (PET), polyvinyl chloride (PVC), polyethylenefluoroethylene (PEFE), polystyrene (PS), high-density polystryrene, acrylnitrile butadiene styrene copolymers and the like. In certain embodiments, a cage is constructed from PET or PS (e.g., high density PS). For any of the embodiments discussed herein, it may be desirable to use a photodegradable or biodegradable material in order to reduce the impact of the use of disposable type cage assemblies on landfills and other waste management depots. One such material may include a biodegradable PET, such as a biodegradable PET by BioLand from Advanced Extrusions in Minnesota. Such a biodegradable PET material may include the polyethylene terephthalate and an organic additive which creates an extension of the polymer chain that is highly attractive to microbes. Some such additives may be used that do not degrade the strength, stiffness, impact resistance, abrasion resistance, gas barrier properties or migration propensity of the material. Some biodegradable PET materials may have a specific gravity of about 1.3 grams per cm2 and a tensile strength of about 7,000 psi to about 8,500 psi.

A cover or lid may be provided separately from a cage base, often reversibly mates with a cage base, sometimes in sealing attachment, and may be of any suitable geometry allowing for attachment to base embodiments, including sliding attachment. Some lid embodiments may include one or more members that directly mate with and seal with one or more members of a base; sometimes has no side wall members; and sometimes is planar or substantially planar. Some lid embodiments may be constructed from any material that allows for animal containment for about one week or greater. Materials for constructing a lid sometimes are selected to allow for sealing or partial sealing attachment to a cage base. Examples of materials from which lid embodiments may be constructed include those described above for cage base embodiments. Additives that alter the transparency or opaqueness of cage base embodiments also can be used in lid embodiments. Non-limiting examples of additives that alter the transparency or opaqueness of a cage component include chemical additives, metallic additives, particulate additives, films, inks, dyes, and other additives that alter the absorption or transmission of electromagnetic radiation passing through a cage component. Sometimes the lid and base are constructed from the same material and sometimes are of a similar or the same thickness as a thickness of a corresponding base.

Some lid embodiments may be flexible or semi-rigid and include a substantially planar region and a flange region. The substantially planar region may include one or more components described herein. A flange region of lid embodiments sometimes is embossed, may be raised and may includes a region that extends downwards as a lip (referred to herein as a "lip"). A flange and optional lip region may extend continuously around the perimeter of lid embodiments. The profile of the flange and optional lip often correspond to a flange and optional lip on a cage base, and may allow the lid to seal or partially seal with some base embodiments. The flange and optional lip may include any suitable shape to fit with corresponding base embodiments, and sometimes are S-shaped, V-shaped, J-shaped and U-shaped, upwards or inverted, for example.

In some embodiments the lid includes one or more connectors adapted to receive an air supply or air exhaust component or water supply component (e.g., a nozzle or nozzle receptacle). A connector can be of any geometry to receive a corresponding connector from an air supply, air exhaust or water supply component. The cage lid connector often mates with the air supply, air exhaust or water supply connector by a sealing attachment, and often by a reversible connection, and the connectors are of any suitable type. For example, the connection may be defined by cylindrical, square, rectangular or conical side geometry, and flat, rounded, tip or point geometry for the top or bottom, for example. The connecting member in the lid may be a protrusion or a void (e.g., concave or convex, respectively) that receives a corresponding mating void or protrusion, respectively.

One or more cages may be stored on or in a rack module, and any convenient configuration for storing a cage can be utilized. A cage sometimes is placed on a surface of a rack module and stored for a period of time. A cage often resides on a shelf or rail connected to a rack. A rack module sometimes includes one or more mount members useful for storing one or more cages in or on the rack module. A corresponding mount member sometimes is located on one or more outer surfaces of a cage and is adapted to connect with a mount member located on a rack module. In certain embodiments, a mount member is a groove or flange on one or more surfaces of a rack module and is adapted to receive, sometimes slideably receive, a corresponding flange or groove on or in a cage. There may be sufficient distance between the top of a mounted cage and the lower surface of a rack module located above the cage to permit airflow out of the cage in such embodiments.

As discussed above, for any of the cage system embodiments discussed herein or components thereof, including the base 130 and lid 132, it may be desirable to use a photodegradable or biodegradable material in order to reduce the impact of the use of disposable type cage assemblies on landfills and other waste management depots. One such material may include a biodegradable PET, such as a biodegradable PET manufactured by BioLand company. Such a biodegradable PET material may include the polyethylene terephthalate and an organic additive which creates an extension of the polymer chain that is highly attractive to microbes. Some such additives may be used that do not degrade the strength, stiffness, impact resistance, abrasion resistance, gas barrier properties or migration propensity of the material. Some biodegradable PET materials may have a specific gravity of about 1.3 grams per cm2 and a tensile strength of about 7,000 psi to about 8,500 psi.

Figure 8:
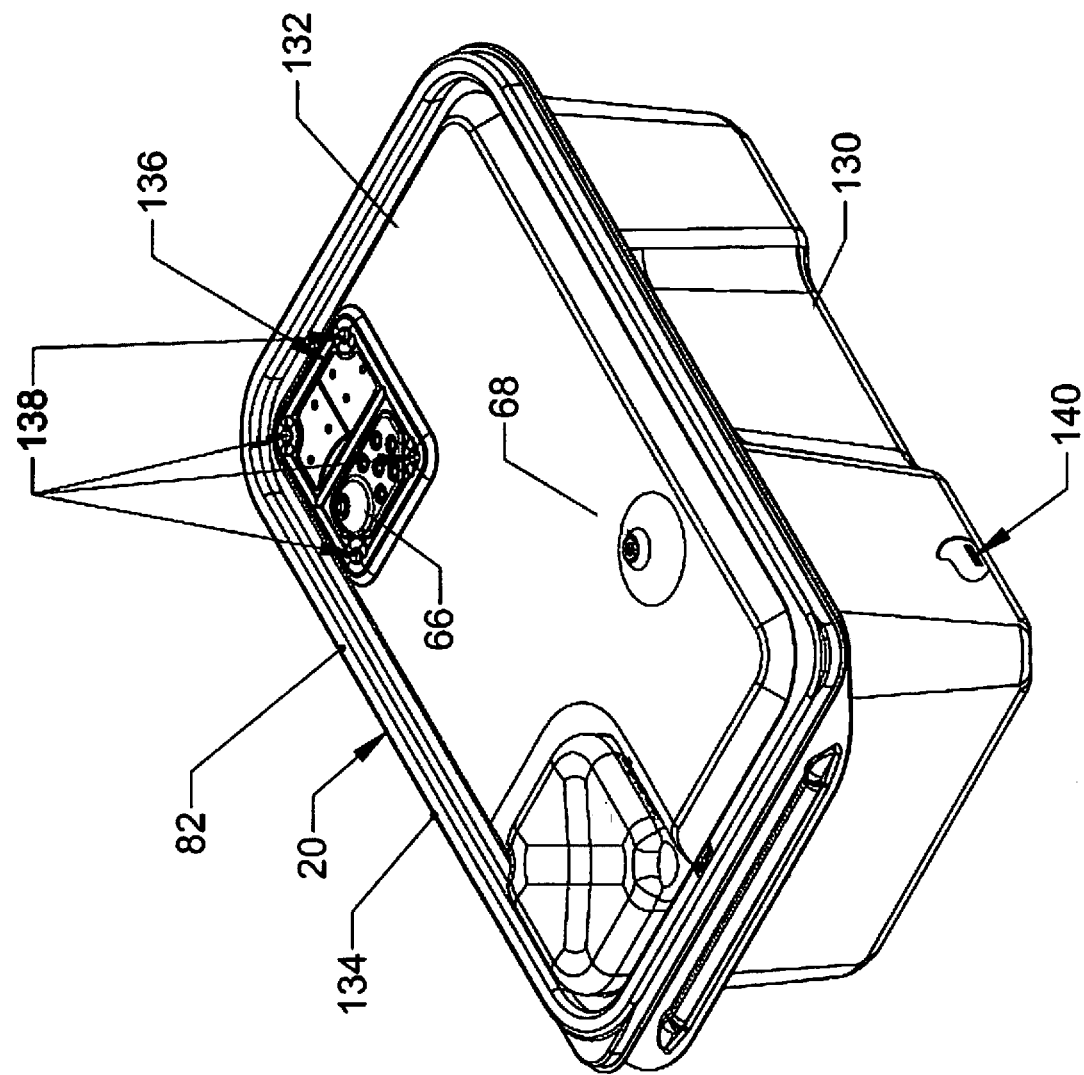
FIG. 8 is a perspective view of an embodiment of a cage assembly suitable for use with a modular rack system.

FIG. 8 shows a perspective view of an embodiment of a cage 20 assembly suitable for use with the modular rack system. The cage has a lid 132, bottom 130, two nozzle receptacles 66 and 68, four post couplers 138, a vent structure 136, a channel 134 on the perimeter of the lid 132 which is configured to mate by snap fit to the rim of the base 130 also extends continuously around the perimeter of the lid, a flange portion 82 of the cage assemblies 20 which may be configured to have a substantially loose fit in a transverse or horizontal direction so as to allow some movement and adjustment of the conical receptacles 66 and 68 of the cage assembly 20 with respect to the fixed nozzles of the shelf assembly, and a remote sensor 140.

Figure 21:
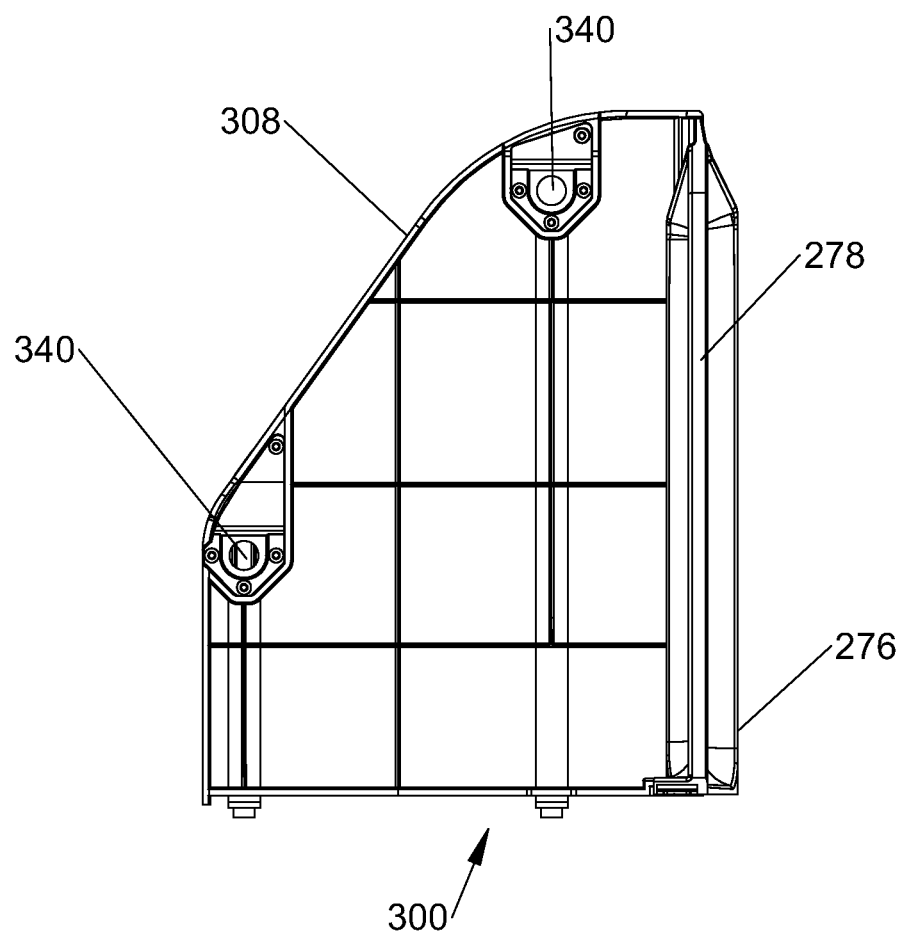
FIG. 21 is a bottom view of the shelf assembly of FIGS. 6A-6C.

As depicted in FIG. 4A-4D, a cage 20 may be inserted into a shelf 300 of a rack system such that the shelf includes a channel into which a portion of the cage can slide. A channel may be a rail, a groove or furrow, a flute, a route or passageway through which anything passes. FIG. 21 shows a bottom view of the shelf 300 assembly of FIG. 6. Sensors 340 FIG. 21 shows the rim or lip portion 308 which extends around the perimeter of the shelf 300. The reader shelf mount 408 is fastened onto the rim 308. Also shown are the sensors 340, frame member 278 of the shelf 300 with a rail 276.

As depicted in FIG. 68A-4D, a cage 20 may be inserted into a rack support member 502 of a rack system such that the shelf includes a channel into which a portion of the cage can slide. A channel may be a rail, a groove or furrow, a flute, a route or passageway through which an object may pass. Illustrated in FIG. 68A-D is a cage mount assembly, which includes cage mount guide rail 552, cage mount guide rail stem 554, cage mount guide rail stop 553, cage mount front module beveled lip 568 and cage mount guide rail cross projection 556, 557 (557 not shown in FIG. 68A-D). FIGS. 61A-B and 87A-B show a bottom view of the rack support member 502 of FIGS. 60A-C and 86A-C. Readers 564, 564' are mounted to the front end of cage mount assembly 530, 530' via front module receptacle 569.

Racks

Rack units or systems may be referred to herein as "cage mounting platforms", "cage mounting systems" or "rodent containment cage racks". A rack unit generally includes one or more cage mount support members attached to two side members where the side members often are parallel or substantially parallel and cage mount support members often are parallel or substantially parallel. Rack unit embodiments may be constructed from any suitable material. Non-limiting examples of materials used to construct a rack unit include metal alloys (e.g., sheet metal), polymers, the like and combinations of the foregoing. A rack unit often comprises airflow components, often located internally, such as plenums, apertures and connectors which are described hereafter. A rack unit sometimes includes additional components, non-limiting examples of which include one or more blower units, a power supply, a controller unit, communication medium, cage readers and other desired devices.

In some embodiments, a rack unit is mounted onto a trolley assembly. Sometimes a trolley assembly is configured as a base for one or more rack units and for transportation of a rack unit or plurality of rack units. The trolley assembly includes a trolley frame tube and trolley plate mounts onto which the rack unit is mounted in certain embodiments. In some embodiments, a trolley assembly has two trolley plate mounts attached at each end for mounting of a side member. In some embodiments, the trolley assembly includes coasters or wheels. In certain embodiments a trolley assembly has more than one set of trolley plate mounts attached to each end to accommodate more than one rack unit. In certain embodiments, two rack units are attached to a trolley mount, sometimes back to back and sometimes side to side. A trolley assembly can be constructed from any suitable material, non-limiting examples of which include a metal (e.g., sheet metal), a polymer the like or a combination of the foregoing.

In some embodiments, a rack unit is configured for use with smaller rodents (e.g., mice), and in certain embodiments a rack unit is configured for use with larger rodents (e.g., rats). Rack units can be configured with any number of cage stations suitable for use with the desired type and/or size of rodent. In some embodiments a single rack unit is configured with up to 96 cage stations when configured for use with smaller rodents, and in certain embodiments, the cage stations are configured in an array of 8 columns×12 rows. In some embodiments two rack units configured for use with smaller rodents can be connected to generate a double rack unit with up to 192 cages. In some embodiments a single rack unit is configured with up to 40 cage stations when configured for use with larger rodents, and in certain embodiments, the cage stations are configured in an array of 5 columns×8 rows. In some embodiments two rack units configured for use with larger rodents can be connected to generate a double rack unit with up to 80 cages.

Cage Mount Support Members

Cage mount support members generally are disposed between and connected to the side members. In some embodiments, a cage mount support member includes plenums for the movement of air through the rack system and includes docking positions for engagement of cages. In some embodiments the cage mount support members are disposed between two side members, are substantially perpendicular to the side members and cage mount support members and are substantially parallel to each other. A rack unit generally has one or more cage support members, sometimes 1 to 20 support members (e.g., 2, 3, 4, 5, 6, 7, 8, 9, 10, 11, 12, 13, 14, 15, 16, 17, 18 or 19 support members). In some embodiments a rack unit has twelve cage support members. In certain embodiments, a rack unit has 8 cage support members.

Generally, the length of the cage mount support member is dependent on a desired or pre-determined width of the rack unit or the number of cages that can be attached to a cage mount support member. Generally, the number of cages that can be attached to a cage mount support member is 1 to 20 cages (e.g., 2, 3, 4, 5, 6, 7, 8, 9, 10, 12, 13, 14, 15, 16, 17, 18 or 19 cages). In some embodiments, the number of cages that can be attached to a cage mount support member is eight. In certain embodiments, the number of cages that can be attached to a cage mount support member is five.

A cage mount support member generally includes an upper surface and a lower surface and one or more channels or plenums. A cage mount support member can have any suitable profile, and non-limiting examples include rectangular, cylindrical and elliptical. The upper and lower surface of a cage mount support member generally is planar or curved and sometimes the surfaces are joined together (e.g., directly or indirectly) and/or are contiguous. In some embodiments, the cage mount support member is elliptical or semi-elliptical with the upper surface convex relative to the lower surface and with rounded junctions between the upper and lower surfaces. In some embodiments, a cage mount support member and plenums within are of a unitary construction.

The channels or plenums of a cage mount support member generally are independent, with substantially no air communication between the plenums. The plenums extend substantially the length of the cage support member in certain embodiments. In some embodiments, one or more walls (e.g., continuous or sections attached to each other) of the cage mount support member contain a first support member plenum and a second support member plenum that extend substantially the length of the cage mount support member. The plenums generally are tubular and can have any suitable profile, non-limiting examples of which include rectangular, cylindrical and elliptical. Plenums within a cage mount support member, or among different cage mount support members in a rack, can have the same or different profiles. In some embodiments, the profiles of the two plenums in a cage mount support member are generally elliptical. A plenum can include any suitable number of walls and sometimes shares one or more walls of a cage mount support member, and/or one or more walls with another plenum in the same cage mount support member (e.g., share a dividing wall). In some embodiments, a cage mount support member includes two plenums that are separated from one another and do not share a dividing wall.

A cage mount support member in some embodiments can be directly abutted against the side member or connected via a connector (e.g., a sleeve). In some embodiments, there is a gasket between a cage mount support member and a side member to provide a substantially air tight seal at the junction of the cage mount support member and the side member. The gasket can be manufactured from any suitable material, and in certain embodiments, the gasket can be manufactured from silicone rubber (other non-limiting examples of gasket materials are described herein). A cage mount support member may be fastened or mounted to a side member by any suitable connection or connector, and non-limiting examples include a threaded connector (e.g., screw), pin, weld or welds, adhesive or by friction. In certain embodiments, one or more screws or bolts (e.g., 2, 3, 4 or 5 or more screws or bolts) are inserted through a side member into bosses or depressions in a cage mount support member.

A cage support member generally has one or more sets of cage connection apertures in the wall or walls of a lower surface. Each cage connection aperture generally is in connection with a single plenum. In some embodiments, a cage support member includes a first set of cage connection apertures in connection with a first support member plenum and a second set of cage connection apertures in connection with a second support member plenum. The cage connection apertures can be in any suitable configuration. In some embodiments the cage connection apertures are regularly spaced across a longer length (i.e., transverse axis) of a cage mount support member. Sometimes, the first set of cage support apertures are disposed along an axis that is parallel to a second axis on which the second set of cage support apertures are aligned. In some embodiments, a first set of cage support apertures are disposed on an axis that is parallel to a second axis on which the second set of cage connection apertures are aligned and each of the apertures in the first set of apertures is offset from apertures in the second set of apertures. Generally, the configuration of cage connection apertures matches the configuration of the protrusions in the cage covers, which are also offset, such that when a cage is inserted into a rack the cage protrusion connection assemblies in contact with the first and second set of cage connection apertures are positioned over and can contact the protrusions in the cage cover. A cage mount support member sometimes includes about 2 to about 50 cage connection apertures (e.g., 4, 6, 8, 10, 12, 14, 16, 18, 20, 22, 24, 26, 28, 30, 32, 34, 36, 38, 40, 42, 44, 46, 48). In some embodiments, a set of cage connection apertures includes about 4 to about 14 apertures (e.g., about eight apertures). Generally, a cage connection aperture is of any suitable shape and size sufficient to provide a chosen rate of air flow into and out of a cage, and often is circular or oval in cross section.

A cage mount support member generally includes an end aperture for each plenum, which is at the end of the cage mount support member where it connects to a side member. In some embodiments, the cage support member has a first set of support member end apertures in connection with a first plenum and a second set of support member end apertures in connection with a second plenum. The support member end aperture can have any suitable profile. In some embodiments, the support member end aperture has the same profile as the plenum to which it is connected (e.g., elliptical). Sometimes, the aperture is smaller than the cross section of a plenum (e.g., the end of the plenum includes a wall and the end aperture is in the wall) and sometimes is substantially coextensive with the cross section of the plenum (e.g., there is no wall covering the end).

In some embodiments, cage mount support member end apertures are in effective contact with, or are in air communication with, the side member end apertures such that each first support member plenum is in effective connection with each first side member plenum and each second support member plenum is in effective connection with each second side member plenum.

Sometimes, a cage mount support member includes a channel, and sometimes one or more channels are positioned between plenums. A channel can have any suitable profile. In some embodiments, a channel is substantially rectangular in profile and is between walls of the two plenums and can contain a communication medium. In some embodiments, a cover snaps over the channel.

Side Members

Side members generally are connected to one or more cage mount support members. In some embodiments, side members include plenums for the movement of air through and in and out of the rack system, and side members generally provide support for the cage mount support members. In some embodiments, there are two side members substantially perpendicular to and connected to two or more cage mount support members. In certain embodiments, side members and support members are directly and/or indirectly (e.g., effectively) connected via a gasket intermediary.

A side member may have any suitable profile, non-limiting examples of which include rectangular, cylindrical and elliptical. In some embodiments, a side of a side member is substantially rectangular. In certain embodiments, a side member includes a flat inner surface that contacts one or more cage support members and a rounded outer surface (e.g., the outer surface is convex with respect to the inner surface).

The height of a side member often is determined by the number of cage mount support members that can be connected (e.g., rows). Generally there are about 2 to about 20 rows (e.g., 2, 3, 4, 5, 6, 7, 8, 9, 10, 11, 12, 13, 14, 15, 16, 17, 18 or 19 rows). In some embodiments, there are about twelve rows in a rack unit. In certain embodiments, there are about eight rows in a rack unit.

A side member generally includes one or more channels or plenums. The channels or plenums of the side member generally are independent, with substantially no air communication between the plenums. The plenums often extend substantially the entire length of a side member. In some embodiments, one or more walls (e.g., continuous or sections attached to each other) of the side member contain a first side member plenum and a second side member plenum that extend the length of the side member. The plenums generally are tubular and can have any suitable profile, non-limiting examples of which include rectangular, cylindrical are elliptical. Plenums in one side member, or among side members in a rack, can have the same or different profiles. In some embodiments, the cross section of the two plenums in a side member are substantially rectangular. Generally, the first side member plenum and the second side member plenum in a side member have end apertures. A side member end aperture can have any suitable profile. In some embodiments, the side member end aperture has the same profile as the plenum to which it is connected and is substantially rectangular. Sometimes, the aperture is smaller than the cross section of a plenum (e.g., the end of the plenum is substantially includes a wall and the end aperture is in the wall) and sometimes the aperture is substantially coextensive with the cross section of the plenum (e.g., there is no wall covering the end).

A side member generally has one or more sets of side member apertures in the wall or walls of an inner surface. A side member aperture often is in connection with a single side member plenum. In some embodiments, each side member includes a first set of side member apertures and a second set of side member apertures. One or more apertures of the first set of side member apertures often are in connection with a first side member plenum, and are in effective connection with (e.g., in air communication with) one or more apertures of a first set of support member end apertures. One or more apertures of a second set of side member apertures often are in connection with a second side member plenum and are in effective connection with (e.g., air communication with) one or more apertures of a second set of support member end apertures. Generally a set of side member apertures includes about 1 to 20 apertures (e.g., 2, 3, 4, 5, 6, 7, 8, 9, 10, 11, 12, 13, 14, 15, 16, 17, 18 or 19 apertures). In some embodiments, a set of side member apertures is twelve apertures. In certain embodiments, a set of side member apertures is 8 apertures. In some embodiments, the first and second set of side member apertures are adjacent to each other and regularly spaced along the length of a side member.

The side member apertures can have any suitable profile. In some embodiments, the side member apertures have the same profile as a support member end aperture to which it is connected. In some embodiments, the side member apertures have an elliptical profile.

A side member sometimes includes one or more a channels, and in some embodiments one or more channels are positioned between plenums. A channel can have any profile. In some embodiments, a channel has a substantially rectangular profile, is between walls of two plenums and is suitably configured to contain a communication medium. In the some embodiments a side member includes a communication aperture that is in effective connection with a channel. Generally, a communication aperture is positioned between first and second side member apertures. The communication apertures can have any suitable profile. In some embodiments, the communication apertures have a substantially rectangular profile. The communication aperture often is in effective connection with a channel between the plenums in a cage mount support member.

In some embodiments, each side member includes an air connector plate at the top of the side member. In certain embodiments, an air connector plate has an aperture the can effectively connect with one of the end apertures at the upper side of a side member. In some embodiments, an air connector plate attached to a side member has an aperture in effective connection with the aperture on the upper end of a first plenum of the side member (supply plenum) and an air connector plate attached to the opposite side member has an aperture in effective connection with the aperture on the upper end of a second plenum of the side member (exhaust plenum). An air connector plate generally effectively blocks air flow through the plenum in a side member for which it has no connecting aperture, i.e., a supply air connector plate substantially blocks the second side member plenum in the side to which it is attached and a exhaust air connector plate side member plate substantially blocks the first side member plenum in for the side it is attached. Generally, a supply air connector plate and exhaust air connector plate have apertures that are in opposite orientation. In some embodiments an air connector plate functions as a mount for a modular blower unit. In some embodiments a supply air connector plate, and sometimes an exhaust air connector plate, includes a circuit board hub as described below. In certain embodiments, an air connector plate is effectively (e.g., physically and/or functionally) connected to the top of a side member through a gasket intermediary. In some embodiments, a gasket intermediary (e.g., between support members and side members, between air plate connectors and side members, the like) comprises a silicone foam rubber, and in certain embodiments, the silicone foam rubber has a 30 shore A rating. In some embodiments, the silicon foam rubber material used for gaskets is in the range of about 0.100 inches to about 0.150 inches, +/− about 0.020 inches. In certain embodiments, the silicone foam rubber gasket material is about 0.125 inches+/−0.020 inches.

In some embodiments, a side member has an optional cover on the exterior surface of the side member opposite the surface of the side member that contacts the cage support members. Generally, the cover extends essentially the entire length of a side member. The cover can be manufactured from any material suitable for constructing a rack unit. Non-limiting examples of materials used to construct a rack unit include metal alloys (e.g., sheet metal) polymers, the like and combinations of the foregoing. The cover functions to cover any communication media contained in a channel in the side member and often serves as a cosmetic feature.

In some embodiments, each side member is in contact with a gasket (e.g., gasket intermediary). A gasket often matches the geometry of the first and second plenums and often is positioned at the bottom of the side member between the side member and trolley frame tube with which it contacts. The gasket generally serves to seal the rack system when air is supplied and exhausted from the rack system. The gasket can be made of any material suitable for sealing and a non-limiting example is silicone rubber (and other non-limiting examples of gasket materials are described herein).

Cage Mount Assembly

One or more cages may be stored on or in a rack unit and any convenient configuration for storing a cage can be utilized. A cage sometimes is placed on a surface of a rack and stored for a period of time. A rack unit sometimes includes one or more cage mount assemblies useful for storing one or more cages in or on the rack unit.

Cage mount assemblies are typically positioned on the lower surface of a cage mount support member. Cage mount assemblies can be configured in any suitable manner relative to the cage mount support member. Generally cage mount assemblies may be constructed of any material suitable for engaging cages and a non-limiting example is a plastic. Non-limiting examples of rigid plastic include nylon 30% glass and non-limiting examples of non-rigid plastic include silicon rubber and silicon rubber foam. In some embodiments, cage mount assemblies are configured for attaching an upper surface of the cage mount assembly to the lower surface of a cage mount support member. In some embodiments, a cage mount assembly is configured so that the longer length of the cage mount assembly is perpendicular to the longer length of a cage mount support member to which it is attached. In certain embodiments, cage mount assemblies are regularly spaced across the transverse axis of a cage mount support member. A cage mount assembly may be fastened or mounted to a cage mount support member by any suitable connection or connector, and non-limiting examples include a threaded connector (e.g., screw), pin, an adhesive or by friction. In certain embodiments, two thread forming screws are inserted through each cage mount assembly into a cage mount support member.

A cage mount support member generally can be attached to one or more cage mount assemblies, sometimes about two to about 20 cage mount assemblies (e.g., about 2, 3, 4, 5, 6, 7, 8, 9, 10, 11, 12, 13, 14, 15, 16, 17, 18 or 19 cage mount assemblies. In some embodiments, a cage mount support member has nine cage mount assemblies attached.

A corresponding mount member sometimes is located on one or more outer surfaces of a cage and is adapted to connect with a cage mount assembly located on a rack unit. In certain embodiments, a cage mount assembly comprises a guide rail adapted to receive, sometimes slideably receive, a corresponding flange or groove on or in a cage. In some embodiments, a cage mount assembly includes a guide rail positioned on a lower surface of the cage mount assembly.

A guide rail often includes a stem and a first cross projection on one side of the guide rail stem and a second cross projection on the other side of the guide rail stem. The cross projections sometimes are skewed relative to each other in cross section (i.e., they are offset from one another in cross section) and sometimes the cross projections are contiguous (i.e., not offset). The cross projections often extend the length of a guide rail and often are substantially perpendicular to the guide rail stem. In certain embodiments, a cage bottom lip on a side of a cage (e.g., a flange) engages the first cross projection of the guide rail of a first cage mount assembly and the cage bottom lip on the other side of the cage (e.g., flange) engages a cross projection of the guide rail of a second cage mount assembly that is adjacent to the first cage mount assembly, in which embodiments two successive guide rails engage a single cage. In certain embodiments, a cage hangs from guide rails and is suspended below the cage mount support member. In certain embodiments, a cage is properly positioned on guide rails when a cage bottom flange is substantially in contact with and rests upon the cross projections of the guide rails of adjacent cage mount assemblies.

Cage mount assemblies often include one or more channels that accommodate a communication medium. A channel often substantially extends the length of the cage mount assembly, and in some embodiments, a channel has an end aperture at the end of the cage mount assembly. In certain embodiments, a channel contains a communication medium. In some embodiments, a channel contains SATA cable and includes a receptacle to secure the SATA cable.

A cage mount assembly sometimes includes a removable front module that attaches to the front end of a cage mount assembly. Generally, the lower portion of the front module contacts the guide rail of the cage mount assembly and the upper portion contacts the aperture of a channel of the cage mount assembly. In some embodiments, the front module includes a beveled and/or curved lip that aids in engagement of a cage with the guide rail of the cage mount assembly (e.g., the lip can function as a lead-in surface for facilitating slideable engagement of a cage with a guide rail). The front module can be a plug or can include a device and electronic components required for the device. In certain embodiments, the electronic components in the front module connect with a communication medium in the cage mount assembly. In some embodiments a front module includes a cage reader.

Figure 31:
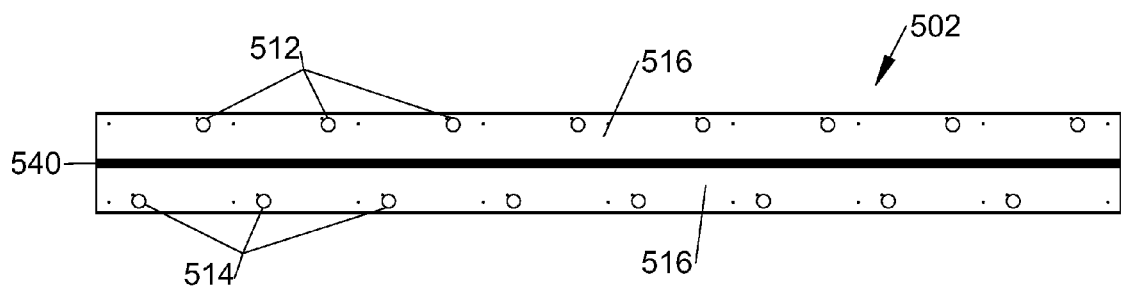
FIG. 31 illustrates a bottom view of a support member embodiment.
Figure 32:
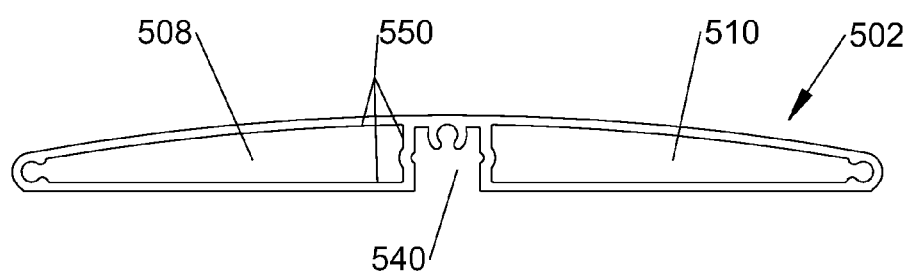
FIG. 32 illustrates a profile or side view of a support member embodiment.
Figure 33:
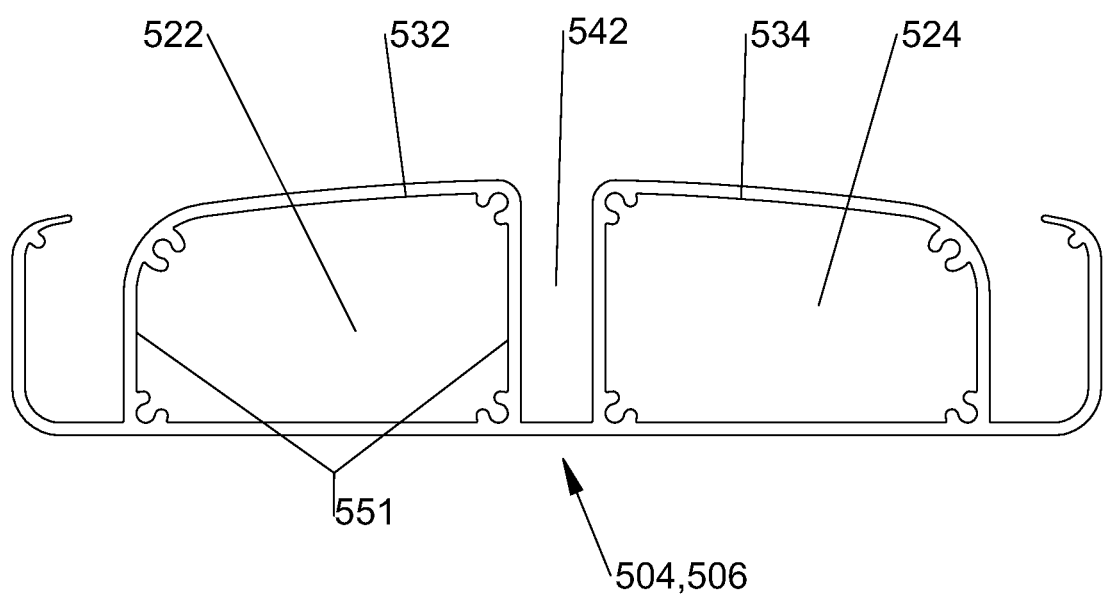
FIG. 33 illustrates a top view of a side member embodiment.

Some embodiments are shown in FIGS. 22-30, 50A-50B, 57-58, 60-61, 68-71, 80A-80B, 83-84, and 86-87. Rodent containment cage rack 500 includes a plurality of cage mount support members 502 each disposed between and connected to a first side member 504 and a second side member 506, in some embodiments. Support member 502 includes a wall or walls 550 that contain a first support member plenum 508 and a second support member plenum 510 substantially extending the length of the support member 502, in certain embodiments. Support member 502 also includes a first set of cage connection apertures 512 and a second set of cage connection apertures 514 in the wall or walls of a lower surface 516 of a support member 502, in some embodiments. Each aperture of the first set of cage connection apertures 512 is in connection with the first support member plenum 508, and each aperture of the second set of cage connection apertures 514 is in connection with the second support member plenum 510, in certain embodiments. Support member cage connection apertures 512, 514 (see FIG. 31) are regularly spaced across the transverse axis of support member 502, in certain embodiments, and in some embodiments, each aperture 512, 514 includes a nozzle 834 in a cage protrusion connection assembly 800, 800' (see FIGS. 22-23, 30, 35, 52-54, 59-61, 68-69, 73, and 85-87).

Support member 502 also includes a first set of support member end apertures 518 in connection with the first support member plenum 508 and a second set of support member end apertures 520 in connection with the second support member plenum 510, where each of the end apertures 518, 520 is at the end of each support member 502 that connects to a side member 504, 506, in some embodiments.

Each side member 504, 506 includes a wall or walls 551 that contain, a first side member plenum 522 and a second side member plenum 524 substantially extending the length of the side member 504, 506, in some embodiments. Each side member 504, 506 includes a first set of side member apertures 526 and a second set of side member apertures 528 in the wall or walls of the side member 504, 506, in certain embodiments. One or more apertures of the first set of side member apertures 526 are in connection with the first side member plenum 522 and are in effective connection with one or more apertures of the first set of support member end apertures 518, and one or more apertures of the second set of side member apertures 528 are in connection with the second side member plenum 524 and are in effective connection with one or more apertures of the second set of support member end apertures 520, in some embodiments.

Each first support member plenum 508 is in effective connection with each first side member plenum 522 and each second support member plenum 510 is in effective connection with each second side member plenum 524, in certain embodiments.

Communication Medium

A cage rack unit can include one or more communication media for sending information form locations in the rack to information devices. An information device can be any device that obtains, processes, controls, transmits or displays information or any combination thereof. Non-limiting examples of information devices include detectors, controllers, chips and printed circuits. A communication media can be any medium used to connect information devices. Non-limiting examples of communication medium include wires, cables, fiber optic fibers and wireless communications media (e.g., wi-fi, Bluetooth, any suitable 802.11 communication standard, the like and combinations thereof).

Figure 34:
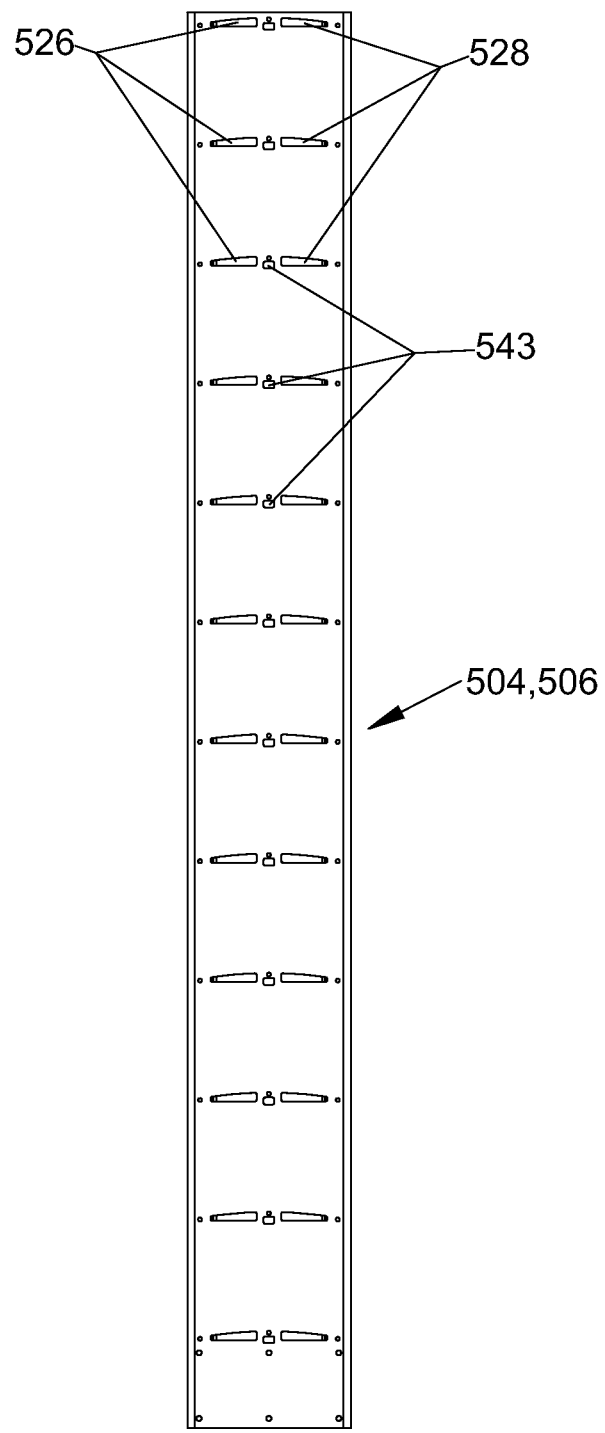
FIG. 34 illustrates side member apertures and side member communication apertures that are in effective connection with support member plenums and support member communication medium channels.
Figure 35:
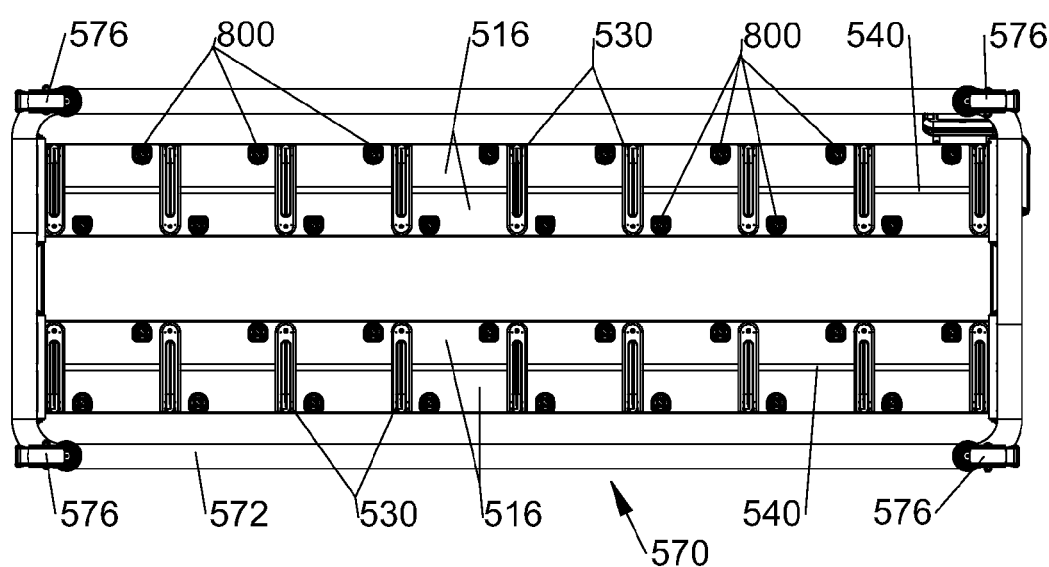
FIG. 35 is a bottom view of a rack embodiment illustrating various components of the trolley system and the bottom surface of support members having guide rail assemblies and cage protrusion connection assemblies. Also illustrated in FIG. 35 are support member communication medium channels.
Figure 36:
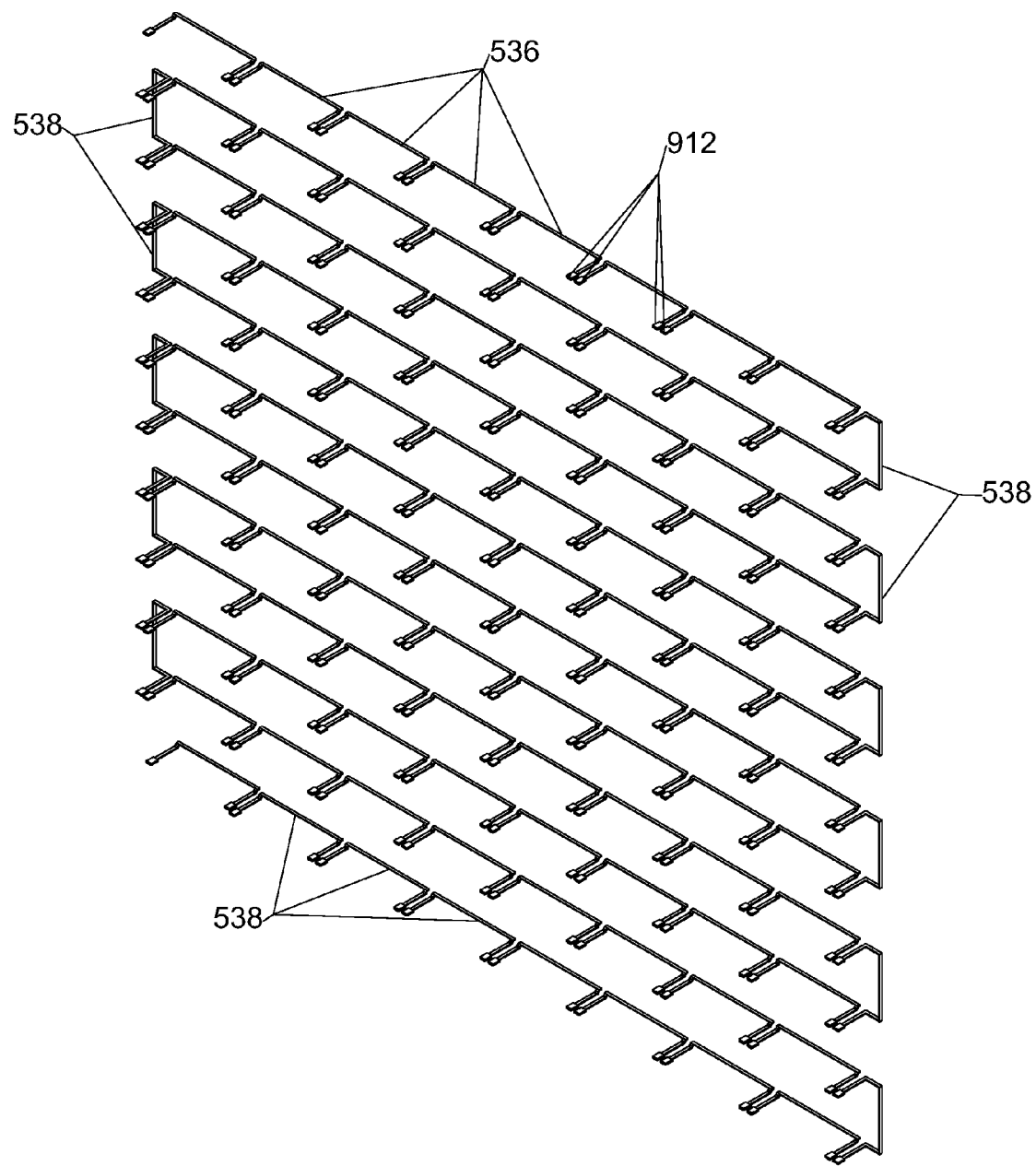
FIG. 36 is a schematic representation of a wiring diagram embodiment for communication media contained in some cage rack embodiments described herein.

Referring to FIGS. 22-30, 35-36, 50A-50B, 57-58, 68A-D, 72-73, 80A-80B, 83-84, and 86-87 each support member 502 includes a channel 540 adapted to contain communication medium 536, in certain embodiments. Support member 502 channel 540 is disposed between the first support member plenum 508 and the second support member plenum 510, in certain embodiments. Each side member includes a channel 542 adapted to contain communication medium 538, in some embodiments. Side member 504, 506 channels 542 are disposed between the first side member plenum 522 and the second side member plenum 524, in some embodiments. Support members 502 and side members 504, 506 each include one or more communication media 536, 538, in certain embodiments. Channels 540, 542 contain communication media 536, 538, respectively, in certain embodiments. Each side member 504, 506 also includes a plurality of side member communication apertures 543 (see FIG. 34), in some embodiments. Support member communication media 536 are in effective communication with side member communication media 538, in some embodiments. Passage of communication medium 538 from side member 504, 506 into support member communication channel 540 through side member communication apertures 543 allows for effective connection and/or communication between support member communication medium 536 and side member communication medium 538.

In some embodiments, communication media 536, 538 include 16 inch long (16") external serial advanced technology attachment (e.g., eSATA) cables, with female receptacles at both ends. Communication media 536, 538 also are used to power cage reader electronics in certain embodiments. The circuit board eSATA cable receptacle 912 is powered by the circuit board hub 900 located at the top of side members 504, 506. The initial communication medium 538 is connected to eSATA cable receptacle 912 in circuit board hub 900 and is disposed in channel 542 of side member 504, 506. The second eSATA receptacle 912 of the initial communication medium 538 is secured to the first cage mount assembly 530 in the upper most support member 502 directly below rack circuit board hub 900. Power is distributed across the row via the effective connection of communication media 536, 538 that are disposed in channel 540 in support member 502 and secured at cage mount assembly 530. One receptacle from two independent communication media 536, 538 are secured in each cage mount assembly 530. Power is distributed throughout cage rack 500 with one receptacle of communication medium 538 secured at the end of one support member 502, disposed in channel 540, 542 in the adjacent side member 504, 506, and the second receptacle of the same communication media 536, 538 is secured to cage mount assembly 530 in support member 502 directly below. Communication media 536, 538 are distributed throughout cage rack 500 support members 502 and side members 504, 506 in the same fashion until the final receptacle 912 is secured to the final cage guide assembly at the bottom support member 502. As noted herein, communication between cage readers 564 and circuit board hubs 900, rack mounted controller and circuit board hubs 900, and circuit board hubs and modular blower system also can be accomplished utilizing wired or wireless communication media or systems, in some embodiments. In cage rack 500 embodiments utilizing wireless communication media, wired communication media 536, 538 is optionally removed or not installed during cage rack manufacture.

With reference to FIGS. 22-30, 35, 50A-50B, 57-58, 60-61, 68-69, 73, 83-87 rodent containment cage rack 500 also includes a plurality of cage mount assemblies 530, 530' on the bottom surface 516 of each support member 502, in certain embodiments. With reference to FIGS. 22-23, 35-36, 56-61, 68-69, 73, and 83-87 rodent containment cage rack 500 further includes a plurality of cage mount assemblies 530, 530' on a bottom or lower surface 516 of each support member 502. Cage mount assemblies 530, 530' further include cage mount guide rail 552, cage mount guide rail stem 554, cage mount guide rail cross projections 556, 557, cage mount channel 558 for communication medium, cage mount assembly upper surface 560, cage mount assembly front module 562 (e.g., cage mount front module cage reader 564, cage mount front module plug 566), cage mount front module beveled lip 568, and/or cage mount front module receptacle 569, in some embodiments. Additionally, cage mount assembly 530' includes cage mount guide rail stop 553. Each cage mount assembly 530, 530' has a channel 558 adapted to contain communication media 536, 538. Communication media 536, 538 in support member 502 are in communication with communication media 536, 538 in cage mount assemblies 530, 530'.

Figure 24:
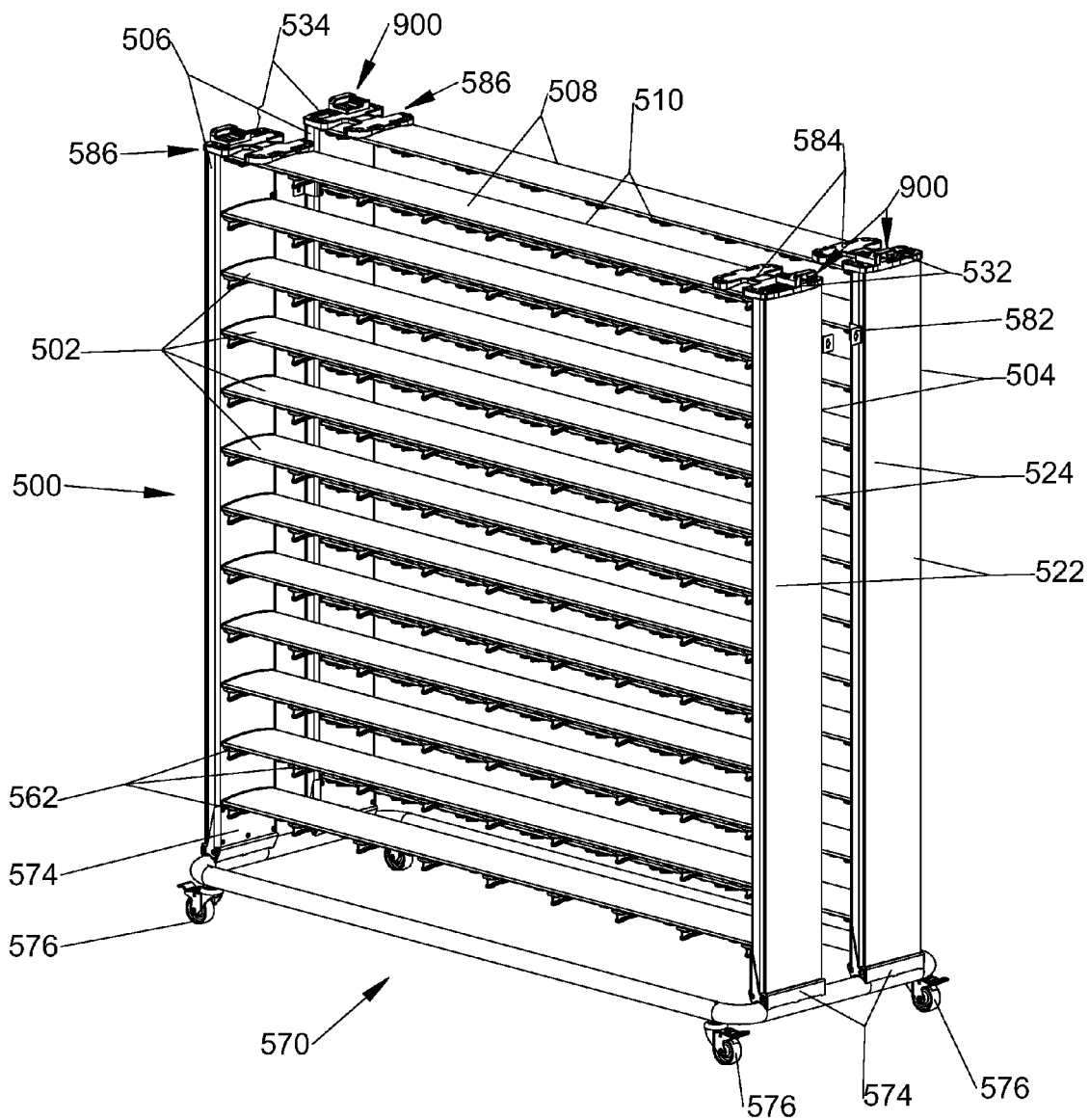
FIG. 24 illustrates a perspective view of a double unit rack embodiment, without modular blower system attachments and without inserted cages.
Figure 25:
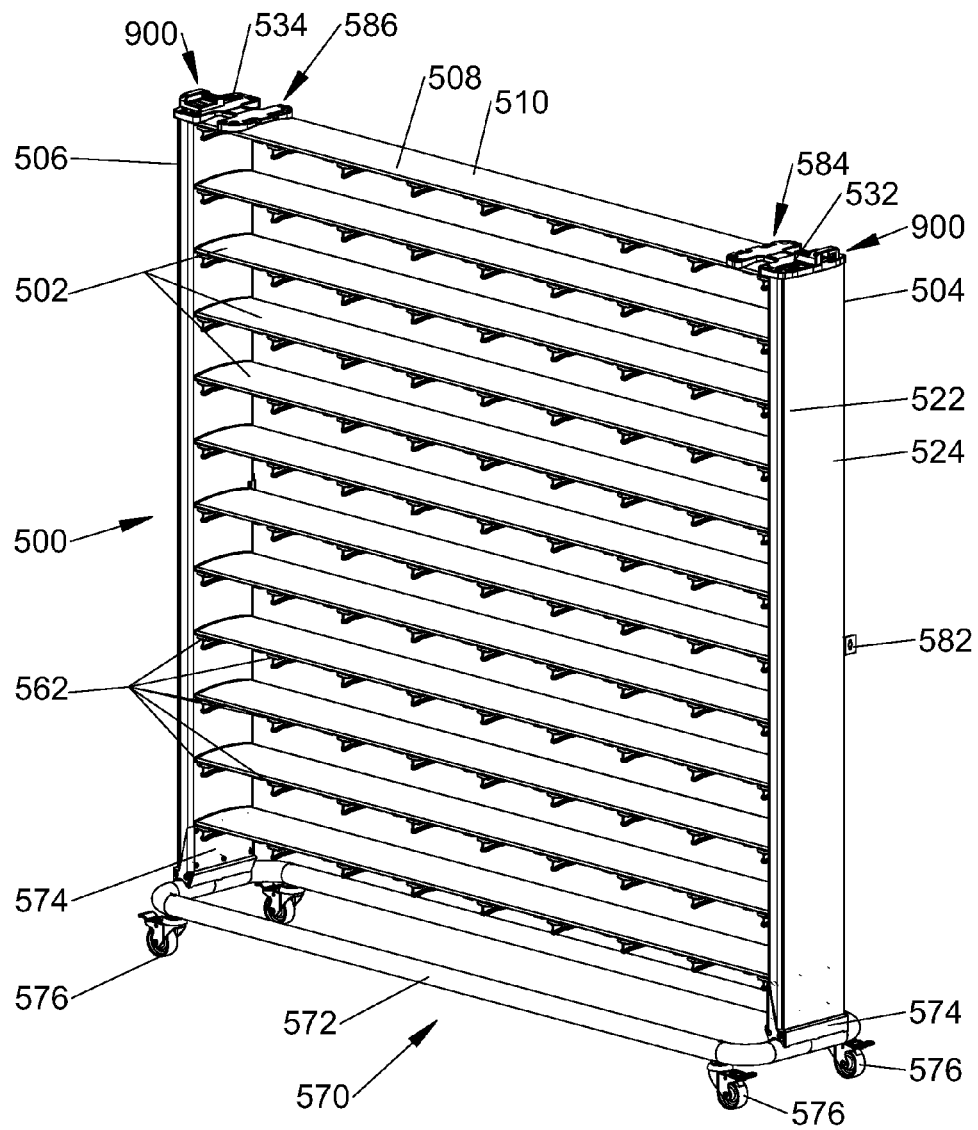
FIG. 25 illustrates a perspective view of a single unit rack embodiment, without modular blower system attachments and without inserted cages
Figure 27:
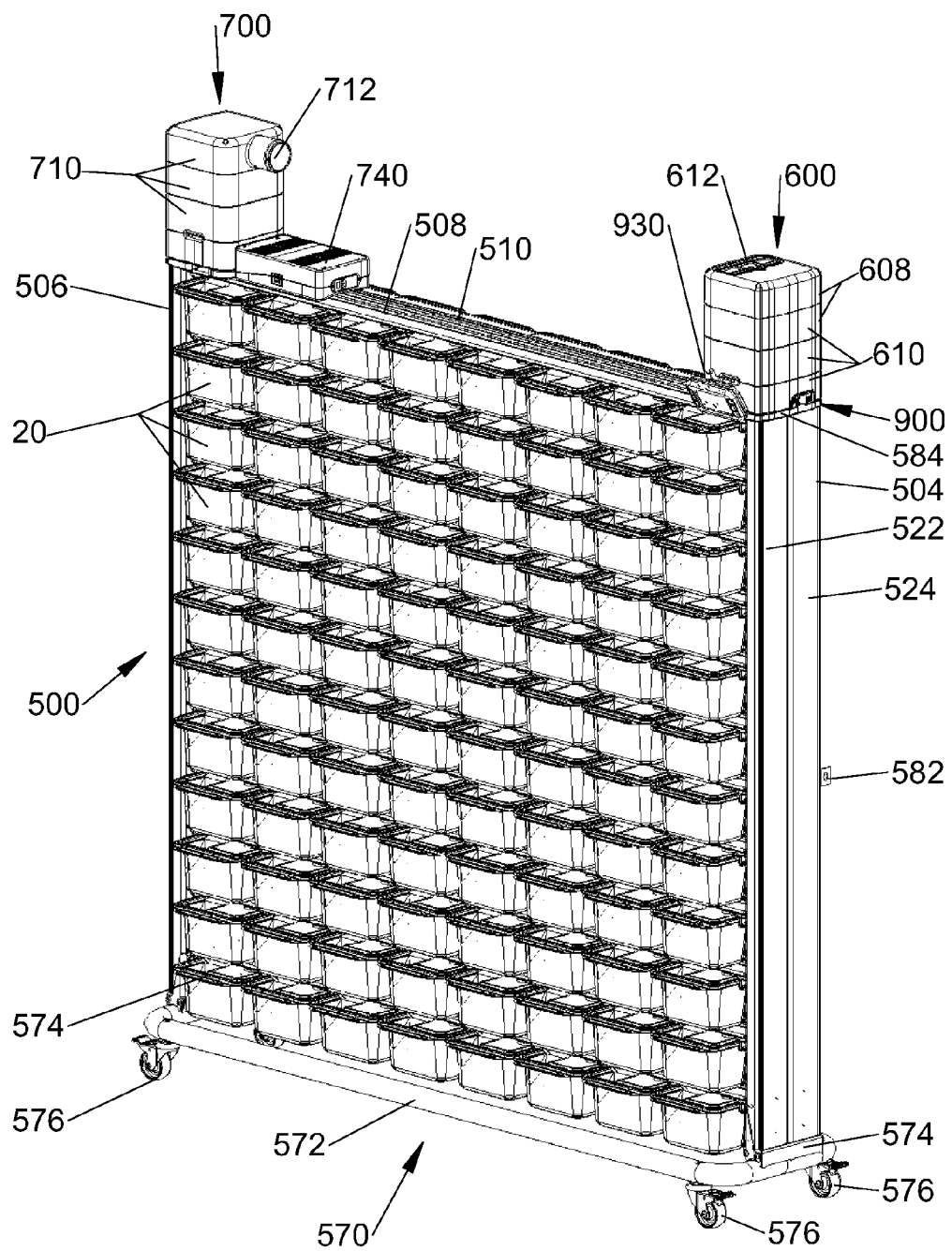
FIG. 27 illustrates a perspective view of a single unit rack embodiment, with modular blower system attachments and inserted cages.
Figure 28:
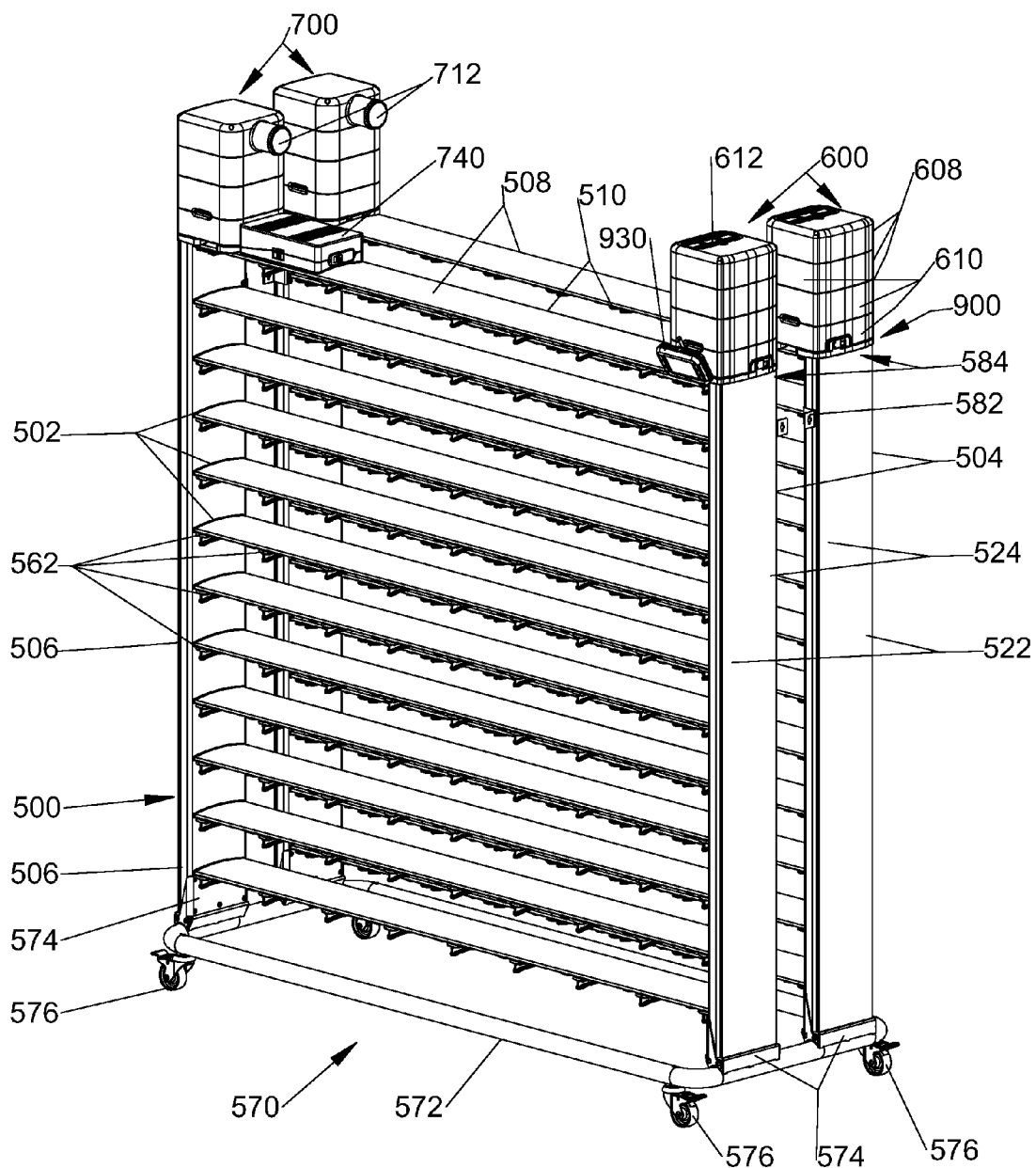
FIG. 28 illustrates a perspective view of a double unit rack embodiment, with modular blower system attachments, and without inserted cages.
Figure 29:
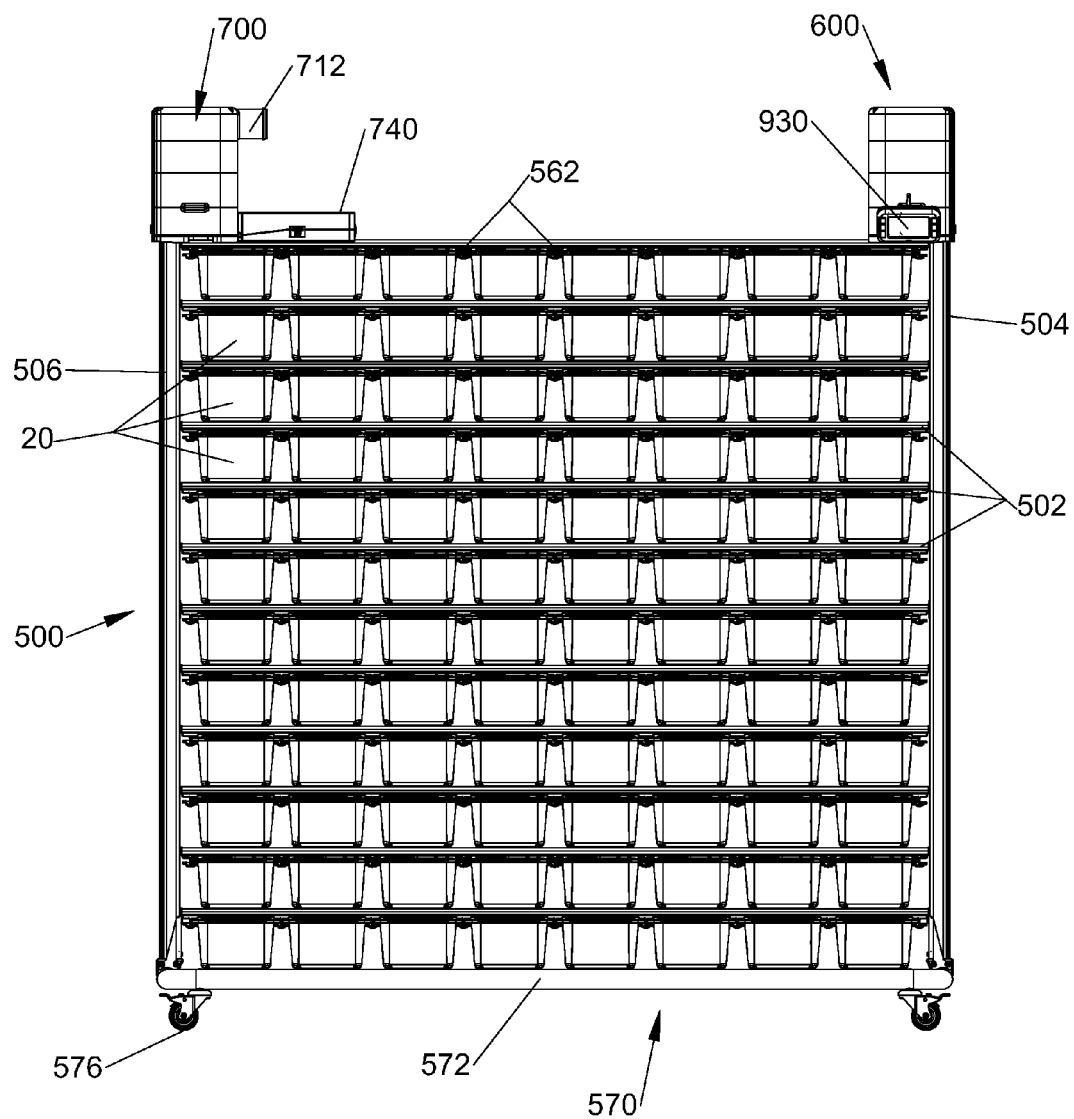
FIG. 29 illustrates a front view of a rack embodiment, with modular blower attachments and inserted cages.
Figure 30:
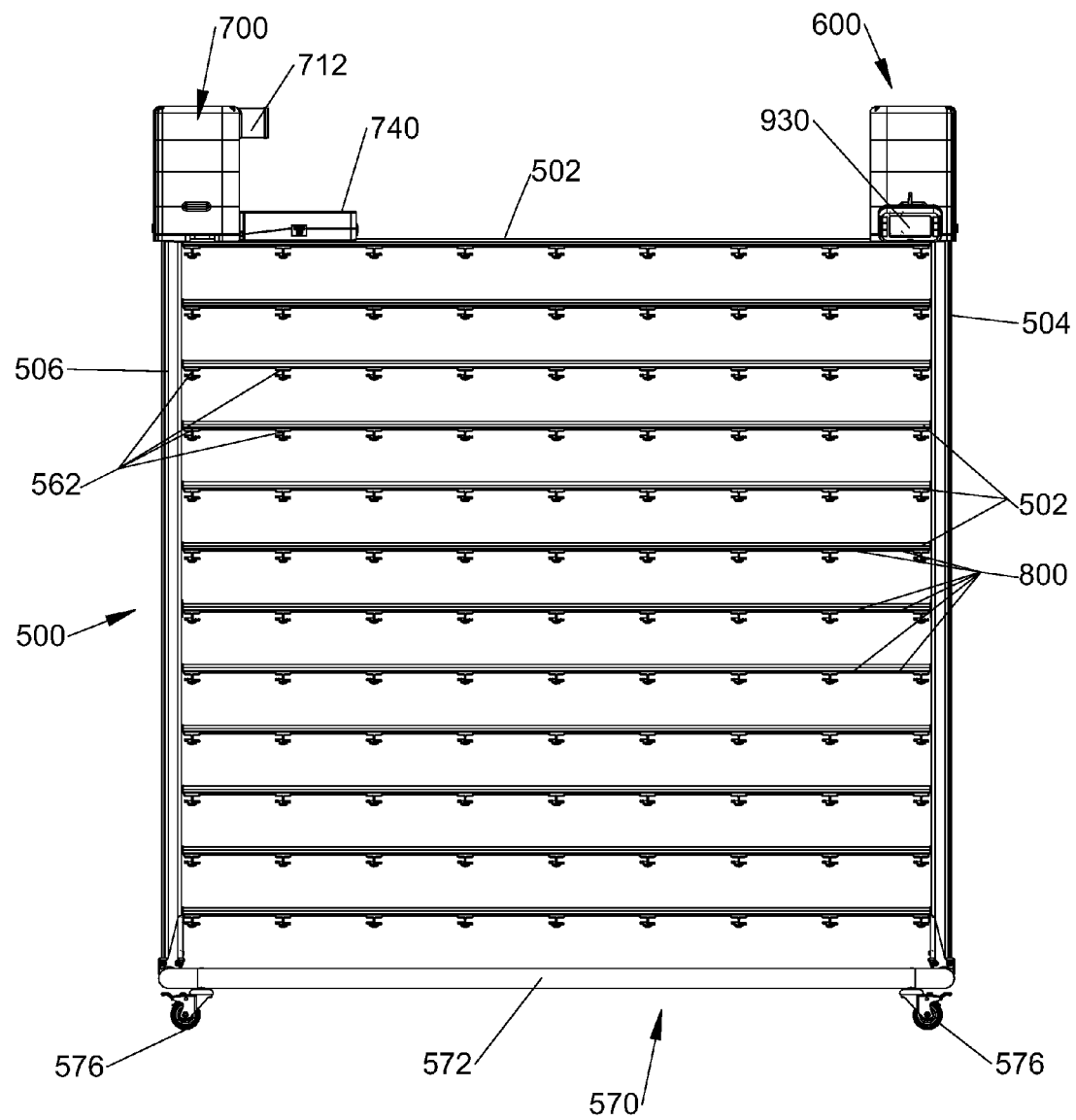
FIG. 30 illustrates a front view of a rack embodiment, with modular blower attachments and without inserted cages.

Referring to FIGS. 24-30, 35, and 70-71 rodent containment cage rack 500 also includes trolley assembly 570, which trolley assembly further includes trolley frame tube 572, trolley plate mounts 574 and casters (e.g., wheel or wheels in connection with a rotating spindle) 576. Cage rack 500 also includes controller side mount 582 and in some embodiments also includes top mounted controller 580. In some embodiments, a cage rack can be a single unit as shown in FIGS. 25 and 27 or two rack units as shown in FIGS. 24, 26 and 28.

As depicted in FIGS. 22A-D and 68-A-D, cage 20 may be inserted into cage mount assembly 530, 530' of cage rack 500 such that the cage guide assembly includes a cage mount guide (e.g., rail stem 554 and cross projections 556, 557), which a portion of the cage contacts as it is inserted into a rack. In cage mount assembly 530', a portion of the cage contacts cage mount guide stop 553, when the cage is fully inserted into the cage is fully inserted into a rack. FIGS. 61A-B and 87A-B illustrate a bottom view of support member 502 including cage mount guide assemblies 530, 530' in effective contact with support member 502 lower surface 516, support member communication medium channel 540, cage mount rail guide cross projections 556, 557, cage mount front module 562 (e.g., cage mount front module reader 564, cage mount front module plug 566) and cage protrusion connection assembly 800, 800'. Reader 564, 564' or module plug 566 are inserted in front module receptacle 569 to functionally connect to communication medium 536, 538 (e.g., reader 564) or to close the front of the open cage guide mount assembly 530, 530'.

Figure 56:
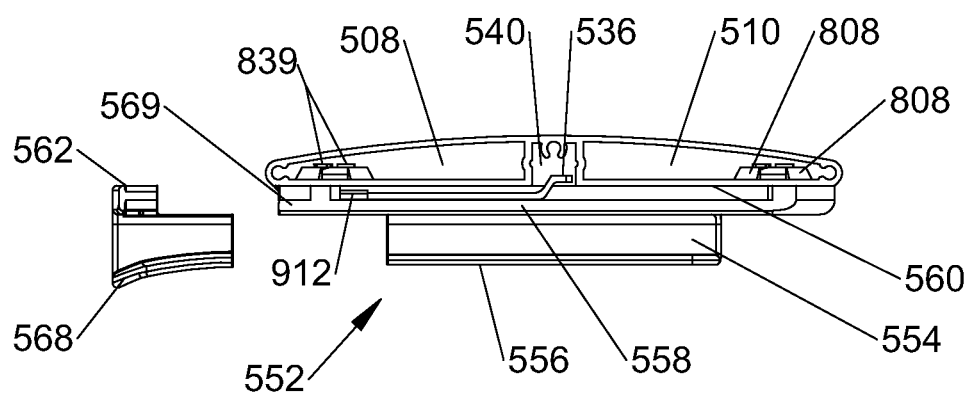
FIG. 56 illustrates a profile or side partial cutaway view of a support member in effective connection with a cage mount assembly, including a cage mount front module.
Figure 57:
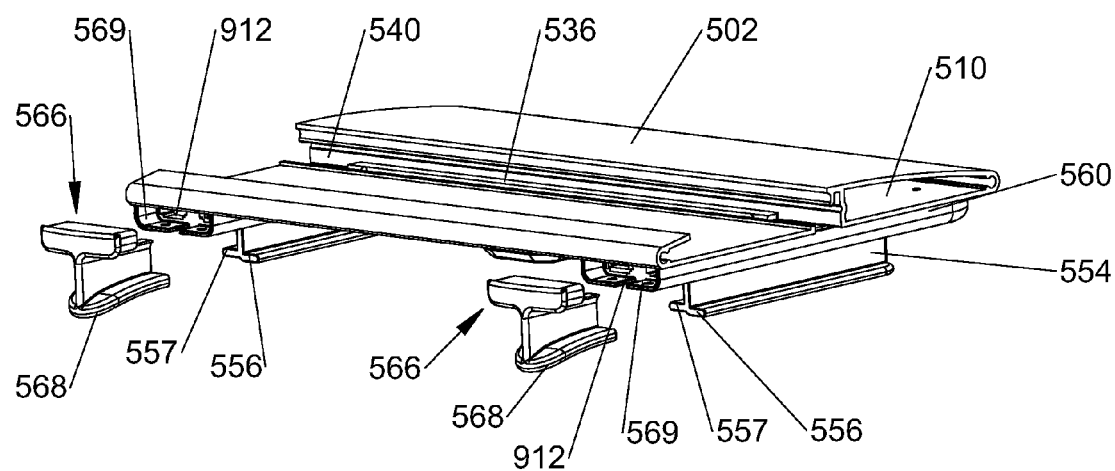
FIG. 57 illustrates a partial cutaway isometric view of a support member embodiment in effective connection with a cage mount assembly embodiment, including a cage mount front module plug embodiment. A portion of the top of a plenum has been removed to visualize the communication medium channel contained in the support member embodiment.
Figure 58:
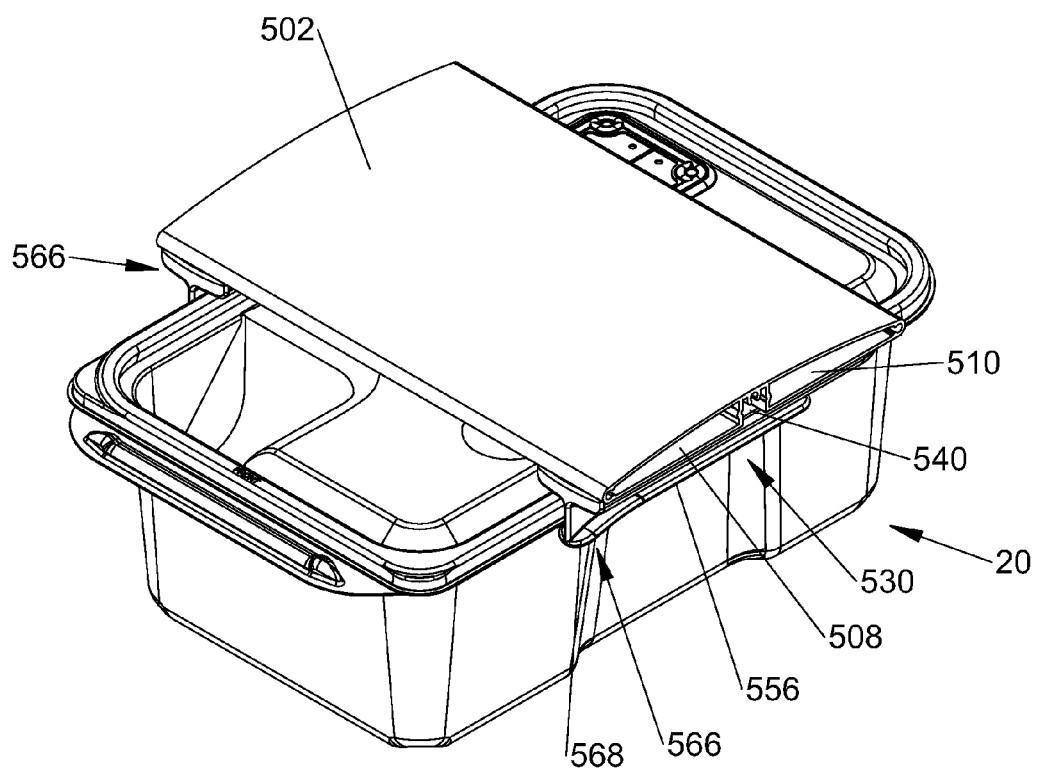
FIG. 58 illustrates a partial cutaway isometric view of a cage embodiment in effective connection with a support member embodiment, held between two cage mount assembly embodiments.
Figure 59:
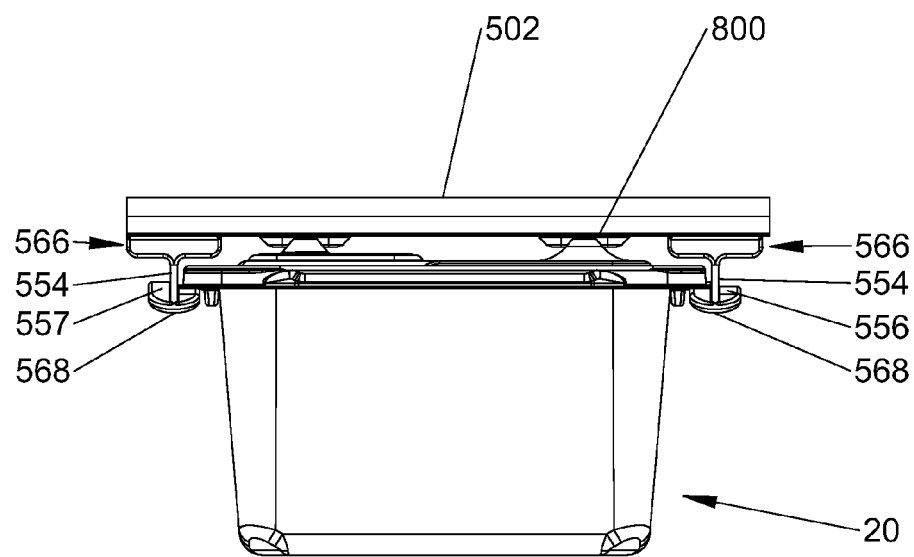
FIG. 59 illustrates a front view of a cage embodiment in effective connection with a support member embodiment, held between two cage mount assembly embodiments. The view illustrated in FIG. 59 shows only a single cage mounted into a single cage slot of a rack embodiment described herein.
Figure 61A:
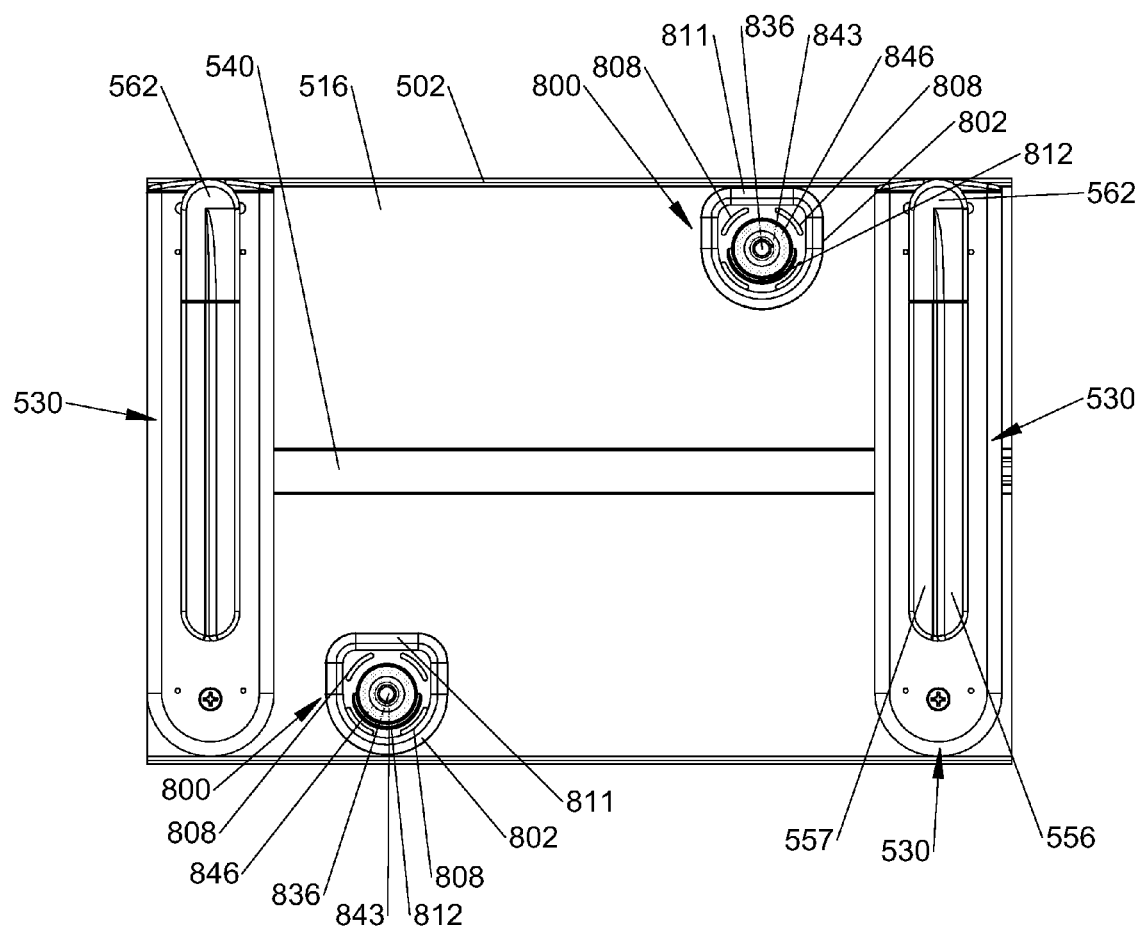
FIGS. 61A and 61B are bottom views representing a single cage position in a support member embodiment including cage mount assemblies and cage protrusion connection assemblies.
Figure 61B:
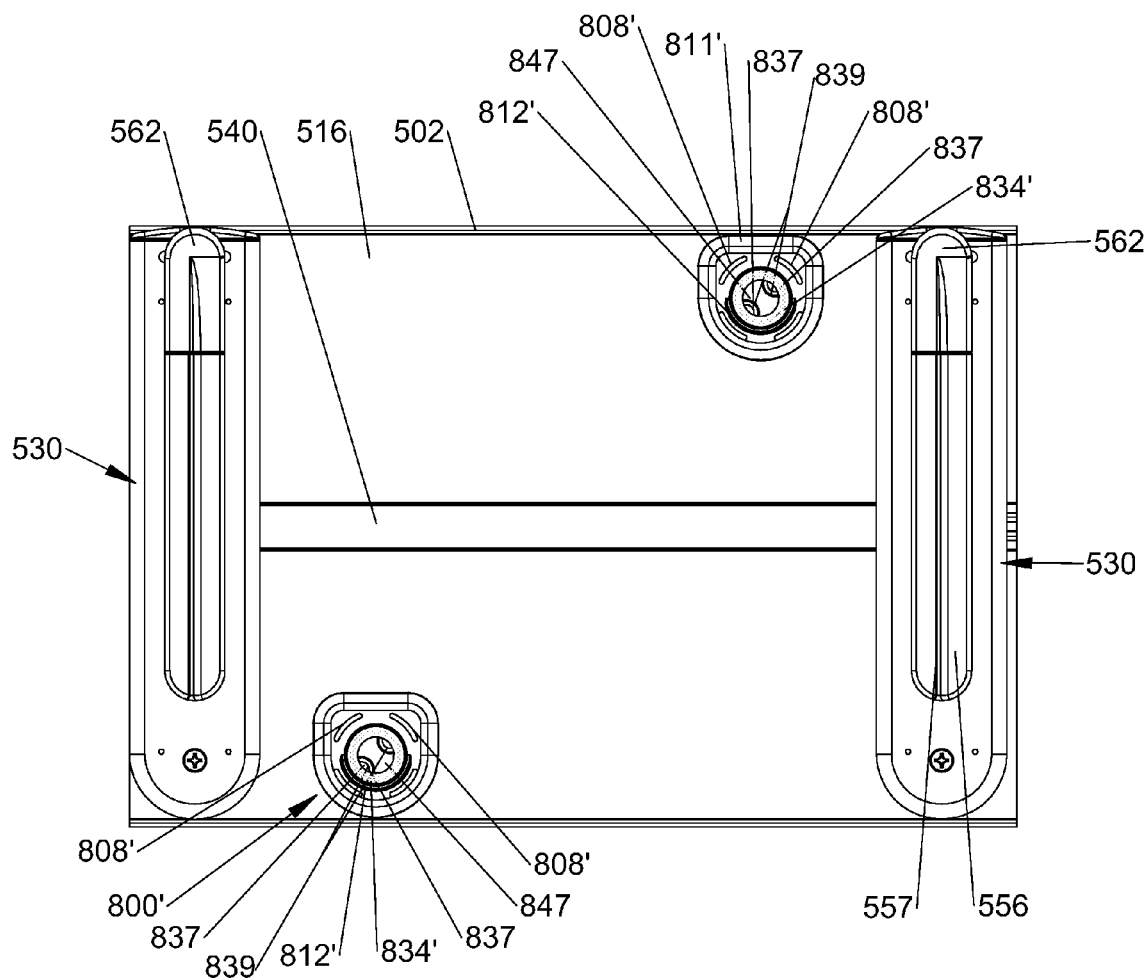
Figure 63:
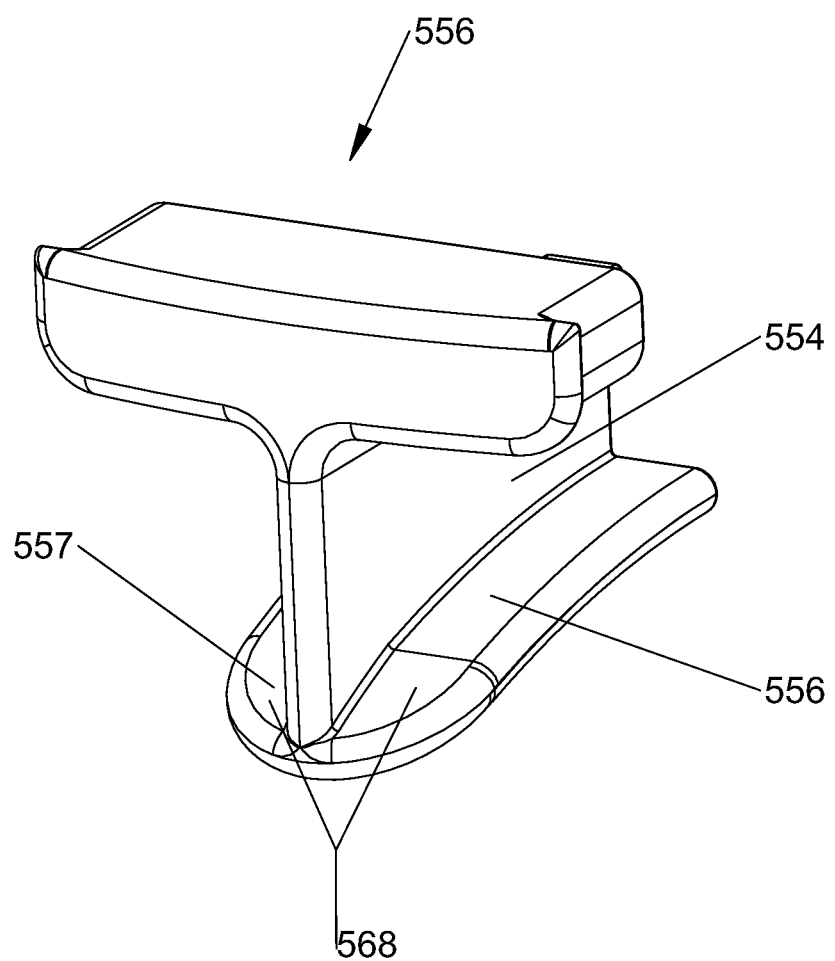
FIG. 63 illustrates an isometric view of a cage mount front module plug.

In some cage rack embodiments without communication medium 536, 538, cage reader plug 566 may be used to cover front module receptacle 569. Cage reader plug 566 is illustrated in FIGS. 56-59, and 63. FIGS. 56 and 57 illustrate cage reader plug 566 being inserted into front module receptacle 569. FIG. 56 is a partial cutaway profile view, illustrating cage mount assembly 530 in effective connection with the lower surface of support member 502. FIG. 57 is an isometric cutaway view of support member 502, with an additional cut away view of plenum 508. FIGS. 58 and 59 are a perspective partial cutaway view and a profile partial cut away view of cage 20 engaged with cage mount assembly 520, and also illustrates cage reader plug engaged with front module receptacle 569. FIG. 63 is an isometric view of reader plug 566. Cage reader plug 566 includes cage mount guide rail stem 554, cage mount guide rail cross projection 556, 557 and cage mount front module beveled lip 568.

FIGS. 60A-C and 86A-C show a partial cutaway isometric perspective view of a support member 520 including three adjacent readers 564, 564', which can report the status of two independent cages 20 engaged in cage mount assemblies via guide rail stem 554 and guide rail cross projections 556, 557. Shown in the embodiment illustrated in FIG. 86A-C is cage mount guide rail stop 553, which serves to delimit how far cage 20 can be inserted into rack 500. Also shown is communication medium channel 540 that contains communication medium 536, 538 in support member 502. Cage mount assembly upper surface contains a channel 558 (not shown) for passage of communication media 538, 538 to the front module receptacle 559. Passage of the communication media 536, 538 through support members 502 and side members 504, 506 is described herein. FIGS. 60A-C and 86A-C illustrate cage reader 564, 564' being inserted into front module receptacle 559.

Cage mount front module cage reader 564, 564' includes two communication plugs 559 (see FIGS. 62 and 88), which when in effective connection with communication media 536, 538, via insertion into front module receptacle 569, forms a continuous communication media throughout cage rack 500. Cage mount front module cage reader 564, 564' also includes reader light emitting diodes (e.g., LED's) 565 for indicating cage insertion status. LED's 565 are covered by a substantially sealed translucent cover in reader embodiment 564'.

Modular Blower Systems

Modular blower systems are generally either air supply or air exhaust systems. In some embodiments, a modular blower system includes two or more independent assemblies that are stacked or connected in series such that air can be moved sequentially from one module to another. In some embodiments, a modular blower system includes three or more independent assemblies (i.e., independent modules) that are stacked or connected in series such that air can be moved sequentially from one module to another. The modules and assemblies may be stacked vertically or horizontally. Sidewalls of two or more or all modules often are contiguous when the modules of the blower are stacked. Edges of two or more or all modules often are contiguous when the modules of the blower are stacked.

In some embodiments, a blower system can include one or more modules that each include one or more units of the same type, such as one or more air intake unit, one or more exhaust units, one or more fan units and/or one or more filter units, for example. A module can have any suitable number of units, and in some embodiments a module can comprise about 1 to about 20 units in a suitable combination (e.g., 2, 3, 4, 5, 6, 7, 8, 9, 10, 11, 12, 13, 14, 15, 16, 17, 18 or 19 units). Where a module includes two or more units of a particular unit type (e.g., fan unit), the units of the particular type can be directly connected to one another and/or there can be one or more other types of units disposed between the units of a particular type. In some embodiments, the multiple units of a particular type can be disposed in parallel or series in a module. In certain embodiments, a module can include two or more fan units attached to two or more filter units. In certain embodiments, a module can include two or more fan units in series or parallel (e.g. 2, 3, 4, 5, 6, 7, 8, 9, 10) and/or two or more filter units in series or parallel (e.g. 2, 3, 4, 5, 6, 7, 8, 9, 10). In certain embodiments, multiple modules within a blower can include more than one type of unit. For example, each of two modules can include a fan unit and a filter unit and the modules can be assembled in the blower such that the units are in the following order: fan unit—filter unit—fan unit—filter unit.

In some embodiments, a modular blower system includes modules that include an air intake or exhaust unit, a fan unit, a filter unit. In some embodiments the modular blower includes modules that include a fan unit and a filter unit. An air intake unit generally includes one or more pre-filters. A pre-filter can be made of any material that generally can capture larger particles in the air, a non-limiting example is open cell foam. In certain embodiments, a pre-filter is in the top portion of the air intake unit. In some embodiments, an air intake unit can include any suitable material configured to function as a baffle to reduce sound emitted by the fan unit. A non-limiting example of baffle material is ABS plastic.

An air exhaust unit directs air out of a modular blower system. In some embodiments, the air exhaust unit includes an outlet structure in air flow connection with the air exhaust unit through which air can exits the air exhaust unit. The outlet structure can be any suitable form for directing exhaust air out of the air exhaust unit. The air outlet structure is generally tubular and can have any suitable profile, non-limiting examples of which include rectangular, cylindrical and elliptical. In a certain embodiment the outlet structure is connected to the sidewall of the air exhaust unit. In certain embodiments, the outlet structure is perpendicular to the sidewall of the unit. In some embodiments, the outlet structure is attached to a vacuum system so that exhaust air does not enter the immediate surroundings. In certain embodiments, the vacuum system is an HVAC system. In some embodiments, an air exhaust unit can include any suitable material configured to function as a baffle to reduce sound emitted by the fan unit.

A fan unit generally includes one or more fans. In certain embodiments, one or more of the fan are counter-rotating. In some embodiments, each fan delivers air at high pressure throughout the supply plenums in the rack system. In certain embodiments, each fan is oriented to blow air into the system (supply) or each fan is oriented in the opposite orientation to draw air out of the system (exhaust). In some embodiments, there is a gasket between the bottom of the fan unit and the unit to which the fan unit is connected, typically the filter unit.

A filter unit generally can include any type of air filter, non-limiting examples include HEPA filter and charcoal filters. In certain embodiments, the filter is a HEPA filter. In certain embodiments, the filter includes a HEPA filter and a pre-filter that typically upstream of the HEPA (exhaust air first contacts the pre-filter and then the HEPA filter). In some embodiments, the filter unit includes an air channel to direct air flow into a first plenum or second plenum in a side member. In certain embodiments, the filter unit includes a pressure sensor port on the bottom of the unit for functional association with a blower pressure control board (pcb).

In some embodiments, the filter unit is attached to a blower base. The blower base generally provides support for the blower modules and houses the blower pressure control board to which the fan or fans are in effective communication. Generally, the pressure control board includes a pressure sensor. The pressure sensor typically measures the differential pressure between the system downstream of the HEPA filter and the ambient pressure. Ambient pressure is typically measured from a port in the blower base. In some embodiments, the blower base is in effective and/or physical connection to a blower control circuit board (e.g., blower controller board or blower controller).

In some embodiments a modular blower system is a supply system that includes an intake unit, a fan unit and a filter unit. In certain embodiments, ambient air first enters the intake unit and passes through a pre-filter, passes to the fan unit, then through the filter unit and exits the modular blower system. In certain embodiments, air enters the top of the intake unit in a vertically oriented assembly. In some embodiments, the modular blower system is in connection with a rack system and air that exits the modular blower system enters a first side member plenum or supply plenum. In certain embodiments a modular blower system is attached to a rack system on top of a side member. In some embodiments, attachment of a modular blower system to a rack system is by a blower base attached to a supply air connector plate attached to the rack unit.

In some embodiments a modular blower system is an exhaust system and includes an exhaust unit, a fan unit and a filter unit. In certain embodiments air first enters a filter unit, passes through a fan unit, then through an air exhaust unit to exit the modular blower system. In certain embodiments, the filter unit includes a HEPA filter and a pre-filter. In some embodiments, a modular blower system is in connection with a rack system and air enters the modular blower system from a second side member plenum (exhaust plenum) into a filter unit. In certain embodiments, the modular blower system is attached to a rack system on top of a side member. In some embodiments, attachment of a modular blower system to a rack system is by a blower base attached to an exhaust air connector plate attached to the rack unit.

In some embodiments, a supply modular blower system and an exhaust modular blower system are attached to a rack system, the supply modular blower system is attached on the top of a side member and the exhaust modular blower system is attached on top of the opposite side member.

In some embodiments, a modular blower system can have any number of additional modules added, including additional fan units and filter units. Generally, these modular can be added in any order to an exiting set of modules.

Supply blower systems can be constructed in left and right orientations which are essentially mirror images of each other. The air intake unit and fan unit are the same. The filter unit, base and air connector plate have left and right orientations. Exhaust blower systems can be constructed in left and right orientations which are essentially mirror images of each other. The air exhaust unit and fan unit are the same. The filter unit, base and air connector plate have left and right orientations. In general for a single rack unit that have blower systems attached, a right orientation supply blower system is placed on one side member and a right orientation exhaust blower in placed on the opposite side member. Typically, for two rack units attached to a trolley assembly that have blower systems attached, a right orientation supply blower system is placed on one side member of a first rack unit and a left orientation supply blower is placed on the adjacent side member of the second rack unit. The opposite side members of the two racks have a right orientation exhaust blower placed on the first rack unit and a left orientation exhaust blower placed on the second rack unit.

In some embodiments modular blowers are connected to a power supply. In certain embodiments, power is distributed from a power supply to a first modular blower unit and from the first modular blower unit to a second modular blower unit. The first modular blower unit can be an exhaust unit or a supply unit. In some embodiments, with two rack systems, power is distributed from a power supply to a first modular blower unit on each rack system and then from the first modular blower units on each rack system to a second modular blower on the same rack system. The first modular blower units can be exhaust units or supply units. In certain embodiments, the first modular blower units are exhaust blower units and the second modular blower units are supply blower units.

Each blower unit is of a suitable shape to permit stacking, airflow and filter functions. Non-limiting examples of blower unit bodies include tubular, structures comprising parallel sides, one or more bevels, tapers and/or flairs. Non-limiting examples of a cross section for blower unit bodies include circular; oval; rectangular; square; rhomboid; variants of rectangular, square and rhomboid geometries having bevels, curved edges, curved corners, and bevels; the like; and combinations of the foregoing. Each blower unit is constructed from one or more suitable materials, non-limiting examples of which include polymers (e.g., polypropylene (PP), polyethylene (PE), high-density polyethylene, low-density polyethylene, polyethylene teraphthalate (PET), polyvinyl chloride (PVC), polyethylenefluoroethylene (PEFE), polystyrene (PS), high-density polystryrene, acrylInitrile butadiene styrene (ABS) copolymers and the like and applicable recyclable versions thereof), metals (e.g., steel, aluminum, other metals or alloys), the like and combinations thereof. Each unit sometimes is connected to an adjacent unit without fasteners (e.g., by a substantially loose fit or friction fit), by a harness, or by one or more fasteners, in certain embodiments. Non-limiting examples of fasteners include reversible, non-reversible, threaded, non-threaded, deflectable, non-deflecting, interference fit, male and female fasteners, the like and combinations of the foregoing. Fasteners may be located in or on any suitable surface of a blower unit and may be on or in an interior or exterior surface. A blower assembly may include one or more connectors between one or more sets of adjacent units. A connector in some embodiments can be flexible, semi-flexible, substantially flexible, deformable, semi-deformable, substantially deformable, rigid, substantially rigid or semi-rigid. A connector may function as a seal between adjacent units in certain embodiments. A connector sometimes is a sleeve that covers one or more edges of a unit. In certain embodiments, a connector is a gasket.

In some embodiments, blower units can be detached from a rack unit and re-attached. For example if a rack unit is to be washed or autoclaved, blower units may be detached prior to washing or autoclaving and then reattached.

Some embodiments are shown in FIGS. 26-30, 37-46, and 74. Modular blower system 600, 700 includes independent modules, which modules include air intake unit 602 or air exhaust unit 702, fan unit 604, 704, and filter unit 606, 607, 706, 707, in some embodiments. Supply filter units 606, 607 differ in the orientation of air channels 623, 624. Exhaust filter units 706, 707 differ in the orientation of air channels 723, 724.

In some embodiments, the modules are stacked in series. In certain embodiments, the modules are vertically stacked (see FIGS. 26-30, 37-39 and 74), and in some embodiments, the modules are horizontally stacked (not shown). Edges 608 of modular supply blower 600 often are contiguous when the units are stacked, in some embodiments, and in certain embodiments supply blower sidewalls 610 often are contiguous when the modular units are stacked. Edges 708 of modular exhaust blower 700 often are contiguous when the units are stacked, in some embodiments, and in certain embodiments exhaust blower sidewalls 710 often are contiguous when the modular units are stacked.

Modular supply blower 600 includes air intake unit 602, in some embodiments, and in certain embodiments, air intake unit 602 includes pre-filter 612 and baffle 603. Air intake unit 602 is connected to fan unit 604 and fan unit 604 is connected filter unit 606, 607, in some embodiments. Filter unit 606, 607 includes high efficiency particulate air (e.g., HEPA) filter 614, in certain embodiments.

Modular exhaust blower 700 includes air exhaust unit 702, in certain embodiments, and in some embodiments air exhaust unit 702 includes air outlet connector (e.g., air outlet structure) 712 attached to a sidewall 710 of blower 700. In certain embodiments, air outlet connector 712 is perpendicular to sidewall 710 of air exhaust unit 702. Air exhaust unit 702 is connected to fan unit 704, and fan unit 704 is connected to filter unit 706, 707, in certain embodiments. Filter unit 706, 707 includes HEPA filter 714 and pressure sensor port 616, 716 in some embodiments. In certain embodiments, filter unit 706, 707 includes a pre-filter 726 (not shown) upstream of HEPA filter 714.

Modular blower systems 600, 700 include base 620, 621 (supply) and, 720, 721 (exhaust). Bases 620, 621, 720, 721 are configured to slidingly engage filter units 606, 607, 706, 707, respectively and differ from each other in placement of air channel opening and placement electronics for monitoring pressure, in certain embodiments. In some embodiments, bases 620, 621, 720, 721 also include stacking support protrusion 622, 722, which is configured to slidingly engage air connector plate blower support boss 590 to attach and secure blower 600, 700 to cage rack 500 via air connector plates 584, 586. In certain embodiments bases 720, 721 also include stabilizing connectors 727. Stabilizing connectors 727 are configured to functionally associate with one or more connectors on rack 500 thereby securing and stabilizing blower 700. In certain embodiments, stabilizing connectors 727 include two indents in to which brackets on the blower stand clip. In some embodiments, stabilizing connectors 727 helps reduce or eliminate vibration, and in certain embodiments, stabilizing connectors 727 help reduce or eliminate vibration in conjunction with a gasket intermediary. Without being limited by theory, stabilizing connectors 727 may help reduce or eliminate vibration by minimizing lateral movement during blower operation.

Modular blower units 602, 702, 604, 704, 606, 607, 706, 707 on blower 600, 700 are joined using 4 long screws. Screw heads are retained in air intake unit 602 and/or air exhaust unit 702. Screws pass through fan unit 604,704 and are secured into brass threaded inserts in filter unit 606, 607, 706, 707 and base 620, 621, 720, 721. Gaskets are utilized between each modular blower unit, which gaskets are compressed when the screws are tightened to generate an airtight seal between the assembled units. Blower base 620, 621, 720, 721 is secured onto the bottom of HEPA filter unit 614, 714 with 4 screws. Modular blower system 600, 700 is properly aligned, for mating with cage electronics, on top of cage rack 500 using 2 metal air connector plate mounting pins 588, located on the front of air connector plate 584, 586 and a large plastic boss or protrusion 590 located on the back of air connector plate 584, 586. Pins 588 and boss 590 are included as part of air connector plate 584, 586 and air connector plates 584, 586 are mounted to the rack. In some embodiments, modular blower system 700 is properly aligned for mating with cage electronics, on top of cage rack 500, using two metal air connector plate mounting pins 588' (see FIG. 74) located on the front of air connector plate 584, 586. Mounting pins can be metal or any other suitable material, in some embodiments. Embodiments comprising metal air connector plate mounting pins 588' sometimes do not include a plastic boss or protrusion 590 located on the back of air connector plate 584, 586. In some embodiments, pins 588' are included as part of air connector plates 584, 586 and air connector plates 584, 586 are mounted to the rack.

Alignment of blower 600, 700 utilizing pins 588' and/or pins 588 and boss or protrusion 590 enables proper attachment of blower 600, 700 to cage rack 500 air connector plate 584, 586 prior to engagement of the blind mate connector on the blower (not shown) comes into contact with blind mate connector 908 on the rack mounted circuit board hub 900. Proper alignment of blower 600, 700 and air connector plate 584, 586 ensures that the connectors are not damaged when engaged.

Pins 588, 588' also act as a locking feature for blower 600, 700. When blower 600, 700 is lowered over pins 588, 588', the pins deflect a set of spring plungers (e.g., spring loaded connectors) 618, 718 that lock the blower into place when spring loaded connectors 618, 718 return to their non-deflected position and engage a notch in pins 588. Spring plungers 618, 718 are housed in HEPA filter unit 614, 714. Pins 588' are configured to allow proper orientation by virtue of being non-identical, thus mating can only occur if the pins are aligned with the correct mounting holes of the modular blower system base.

Figure 37:
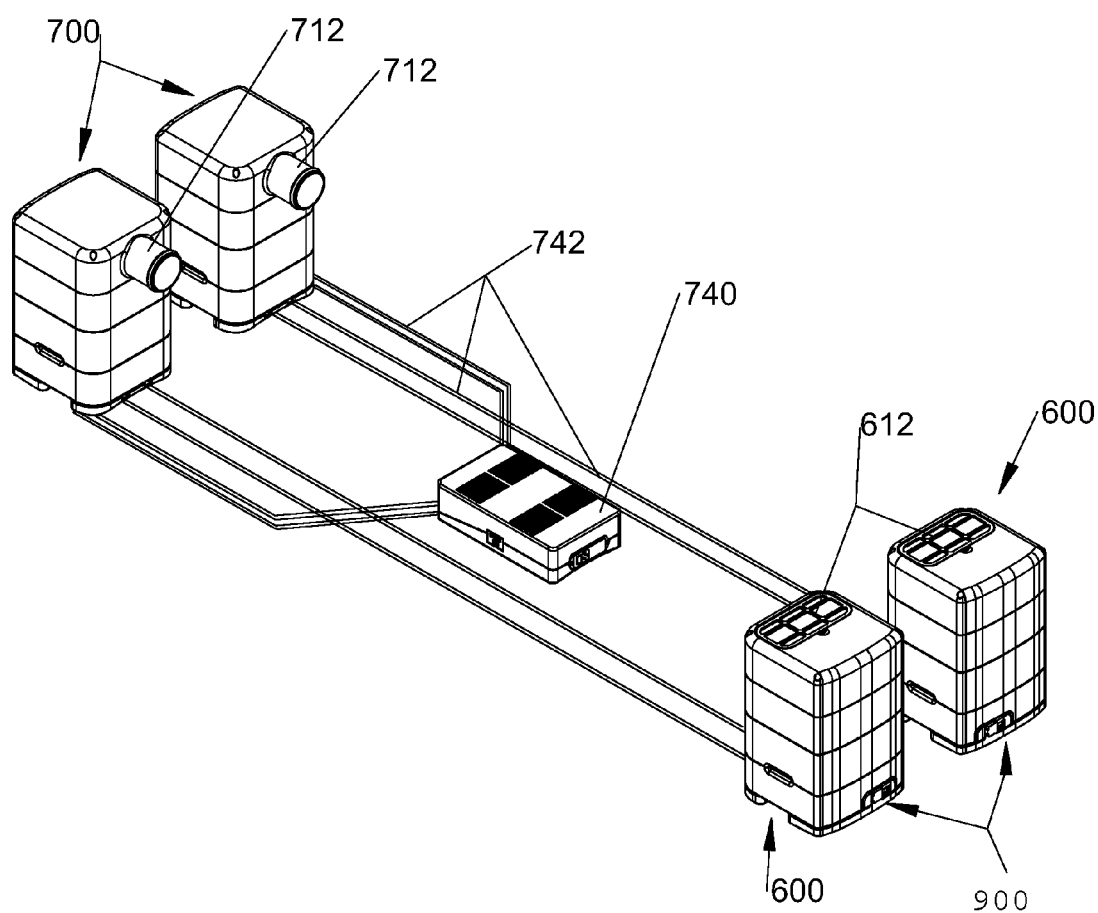
FIG. 37 is a schematic representation of a power system and wiring embodiment for a double unit cage rack embodiment described herein.
Figure 38:
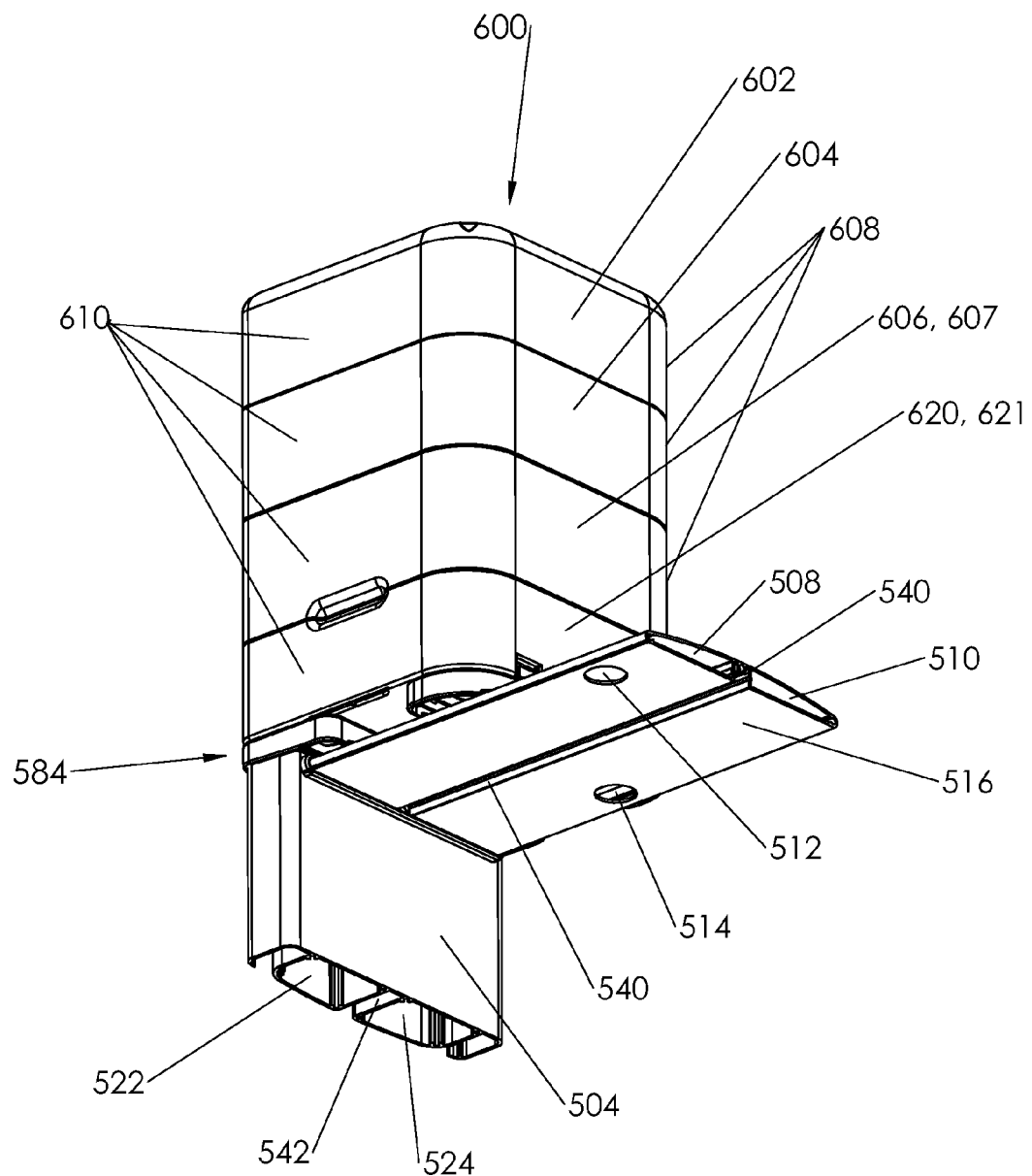
FIG. 38 is a partial cutaway isometric view of a supply blower embodiment in effective connection with a support and a side member. The supply blower is effectively connected to the support and side members via a rack mounted air connector plate.
Figure 39:
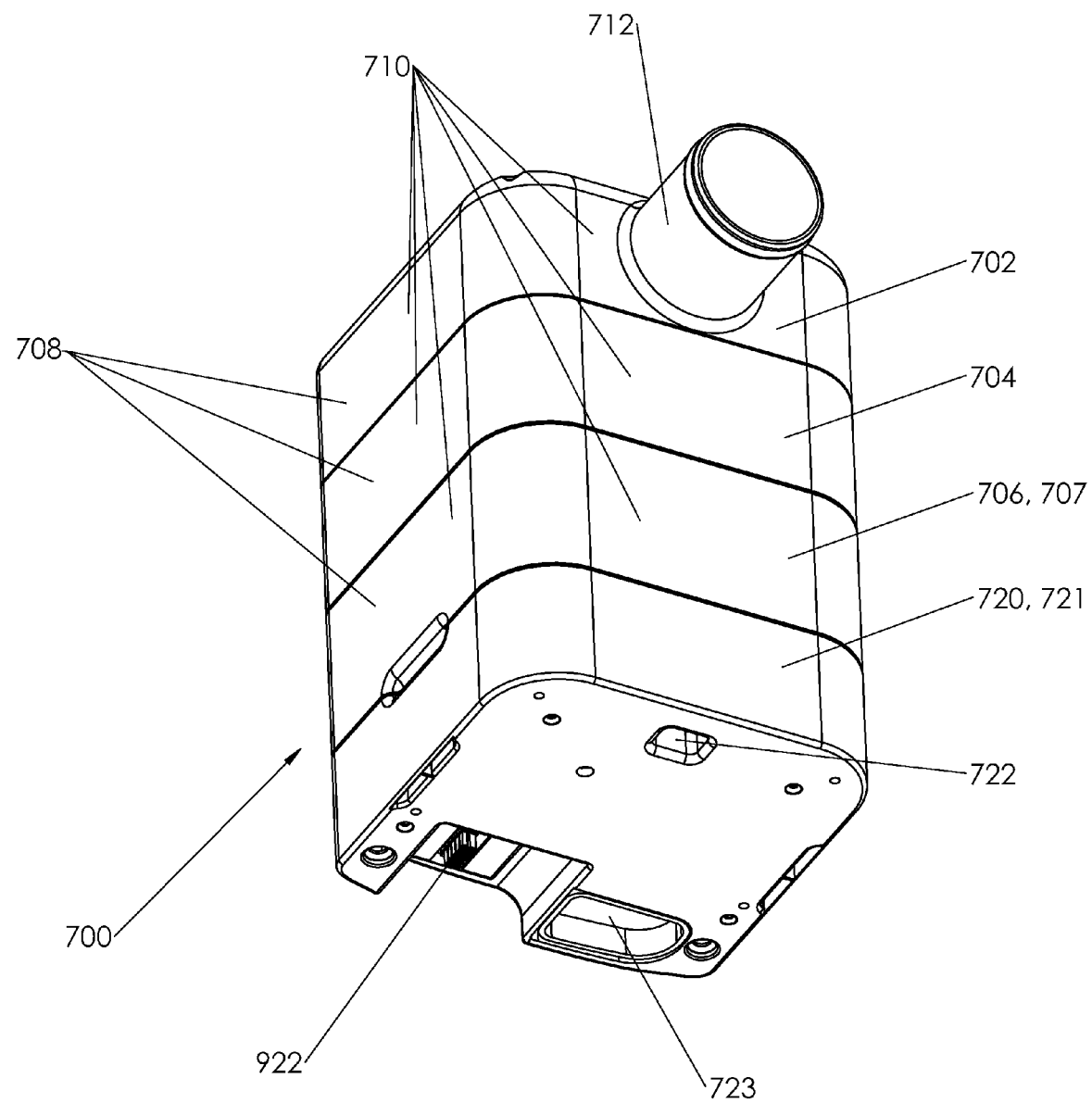
FIG. 39 is an isometric view of an exhaust blower embodiment.
Figure 40:
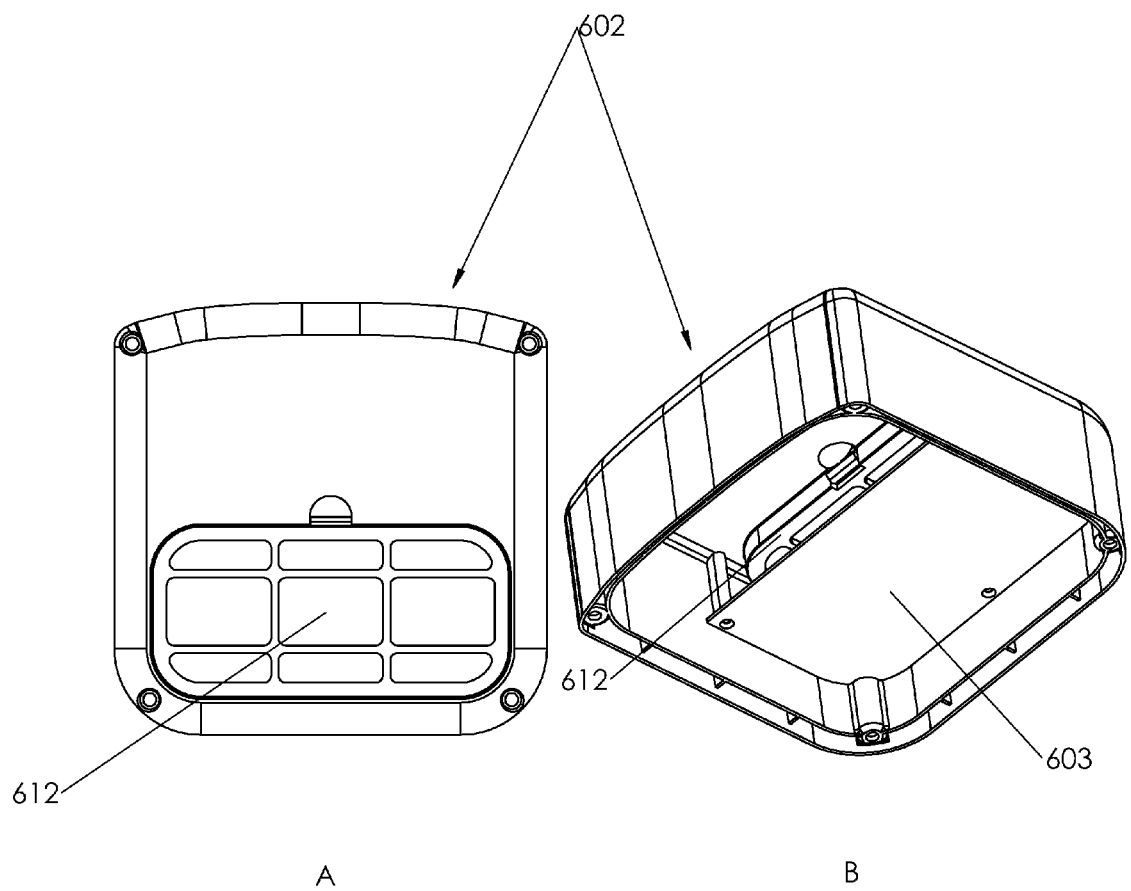
FIG. 40 illustrates top and isometric views of a supply blower air intake unit embodiment.
Figure 41:
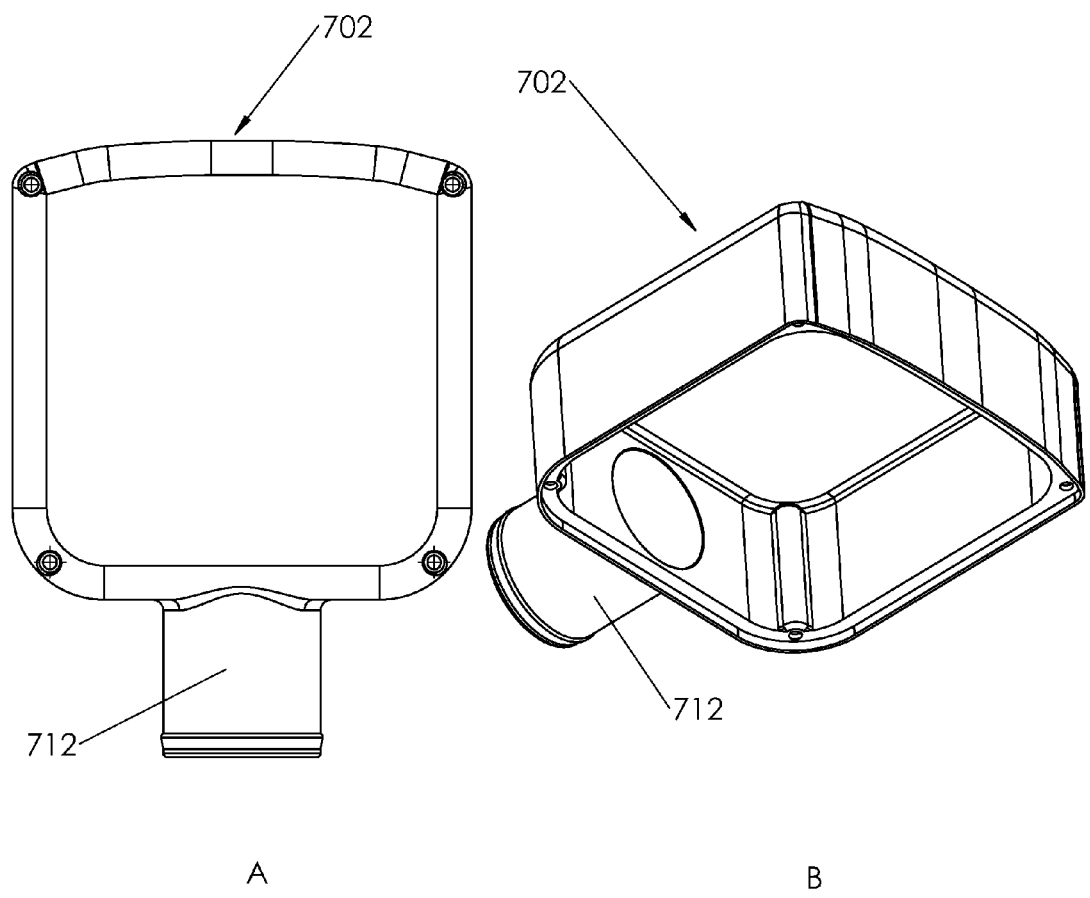
FIGS. 41A and 41B illustrate top and isometric views of an exhaust blower air exhaust unit embodiment.
Figure 42:
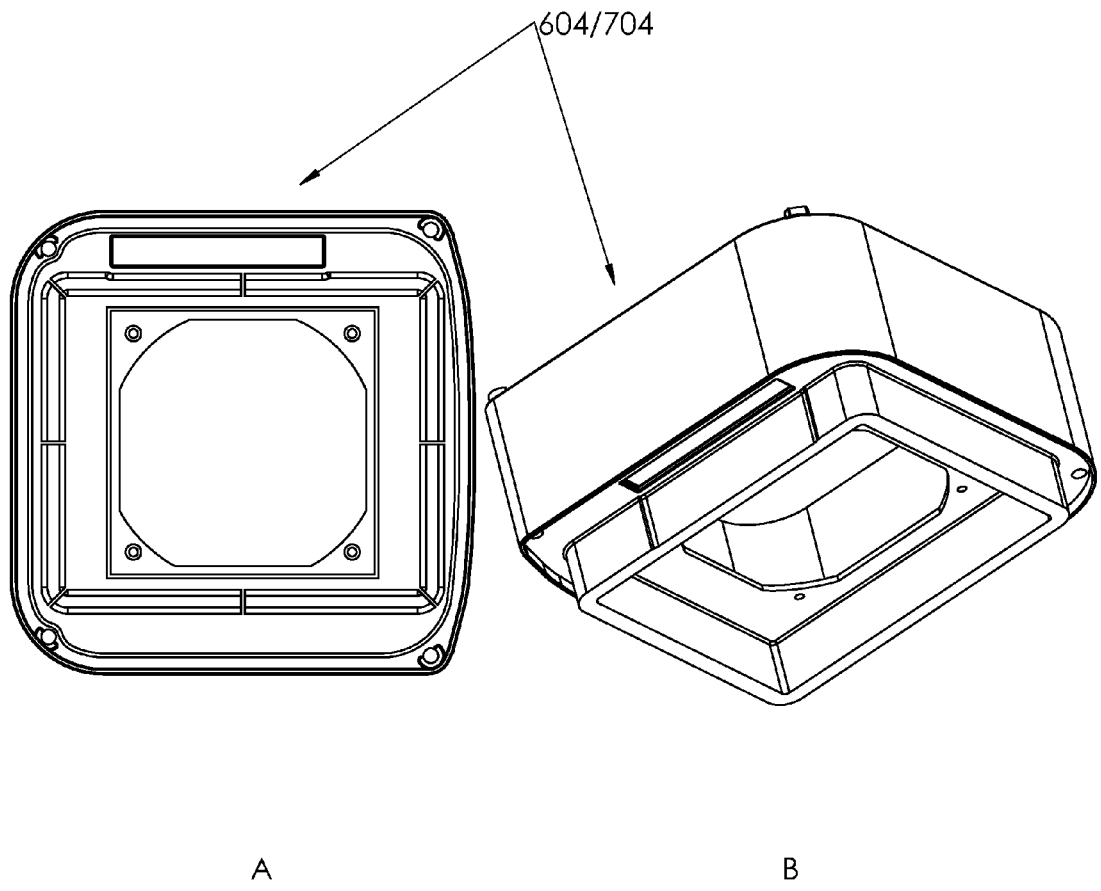
FIGS. 42A and 42B illustrate top and isometric views of a fan unit, that can be used in modular supply or modular exhaust blower embodiments described herein.
Figure 43:
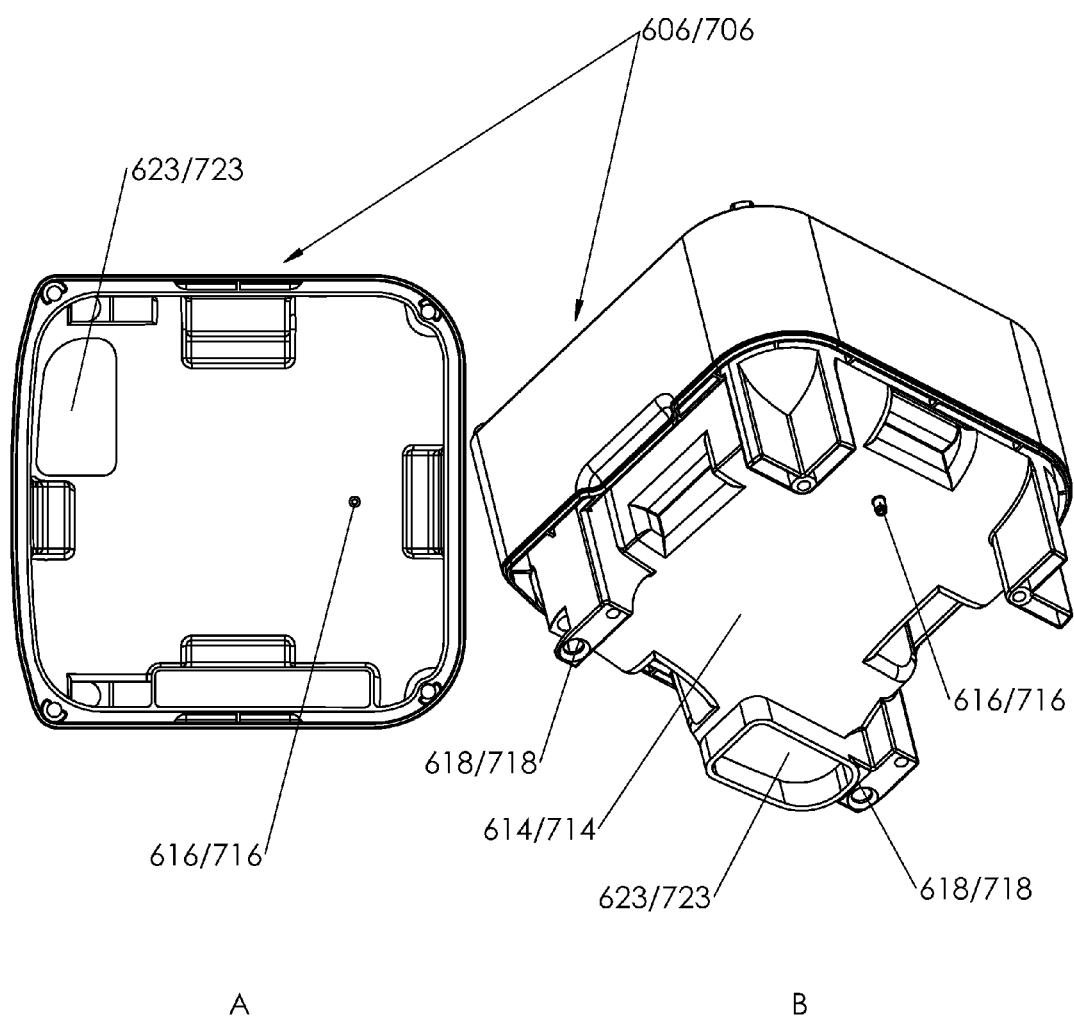
FIGS. 43A and 43B, and FIGS. 44A and 44B illustrate top and isometric views of a filter unit that can be used in modular supply or modular exhaust blower embodiments described herein. The difference between FIGS. 43A and 43B, and FIGS. 44A and 44B are in the orientation of the air outlet channel as shown in the figures.
Figure 44:
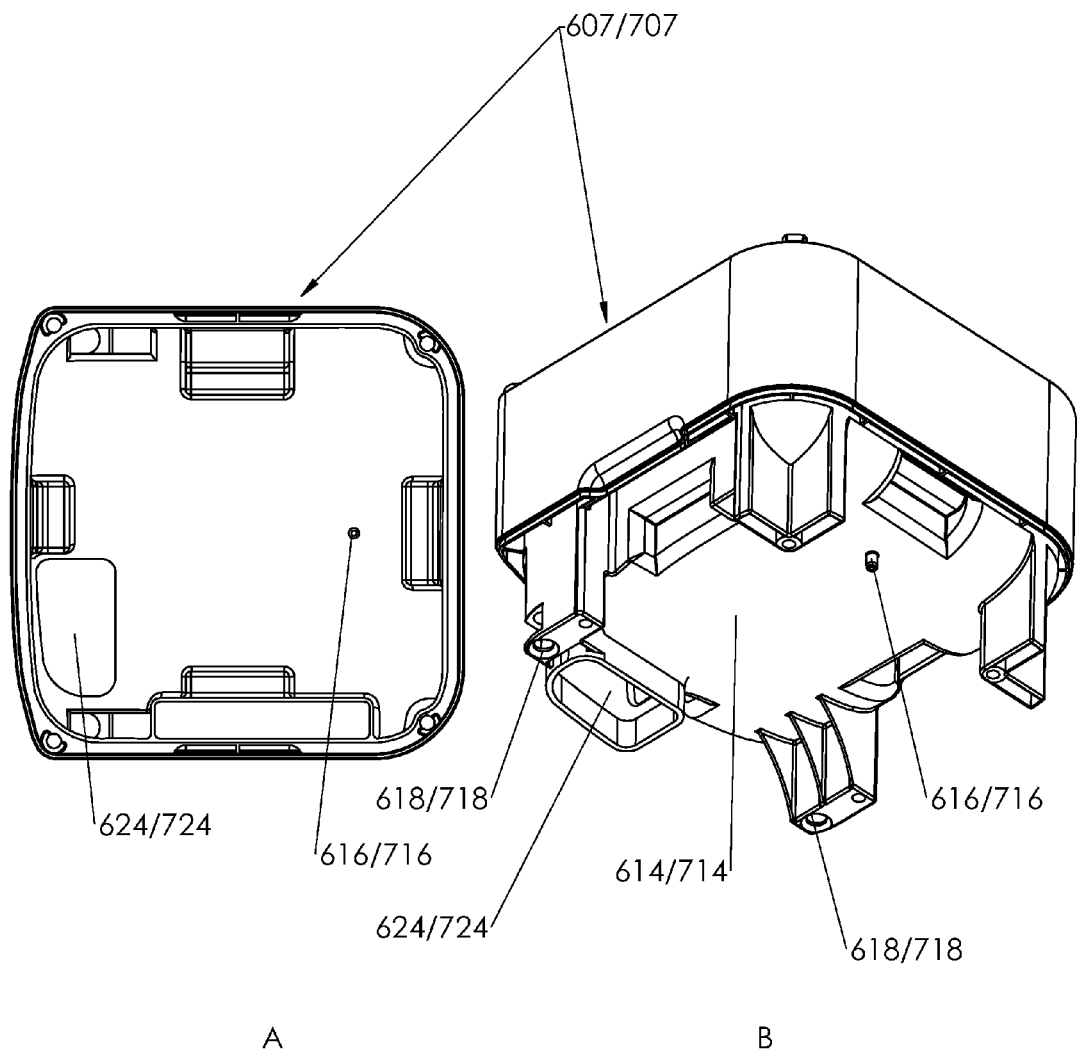
Figure 45:
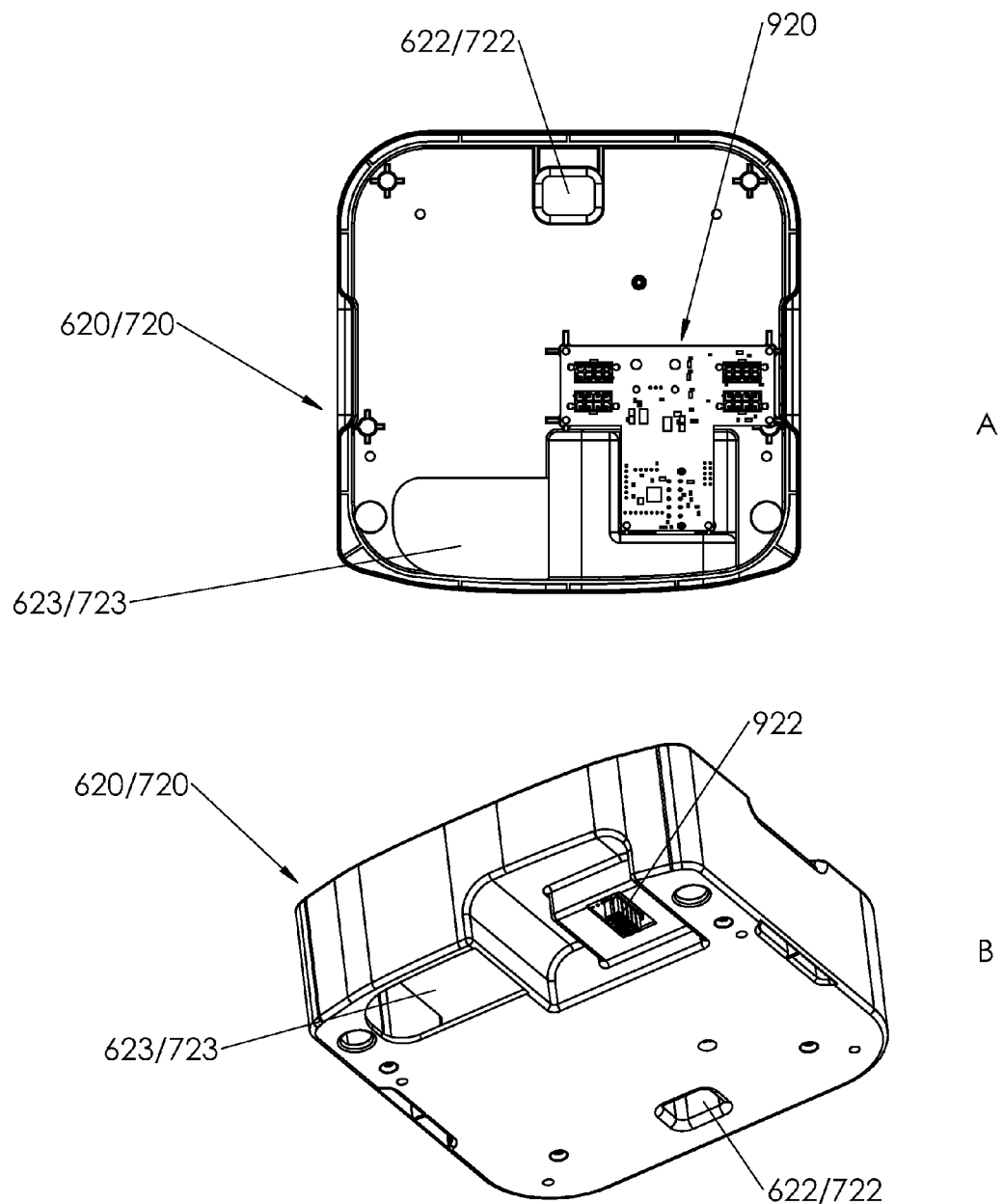
FIGS. 45A and 45B, and FIGS. 46A and 46B illustrate top and isometric views of a blower base unit embodiment that can be used in modular supply or modular exhaust blower embodiments described herein. Both
Figure 46:
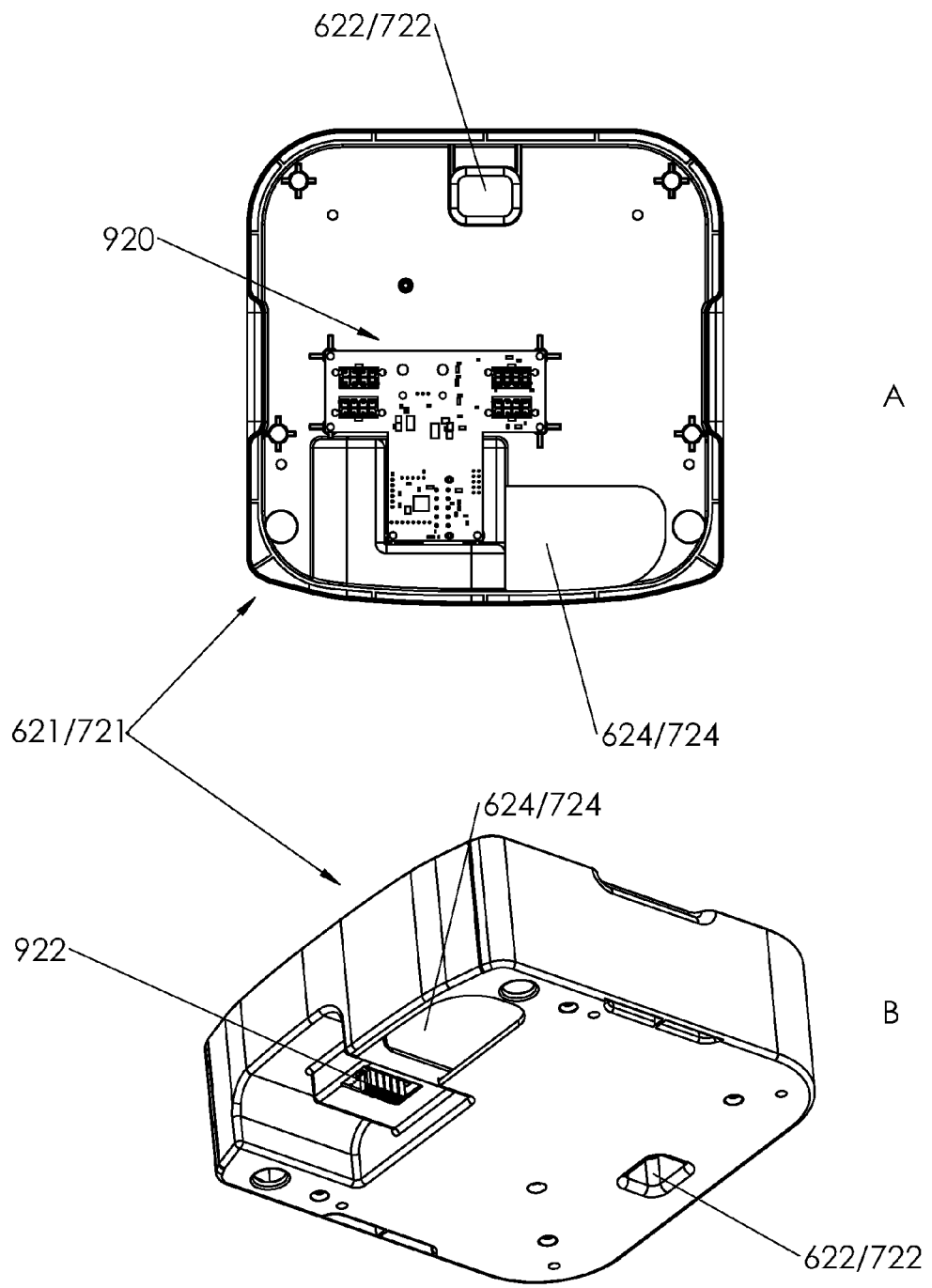
Figure 47:
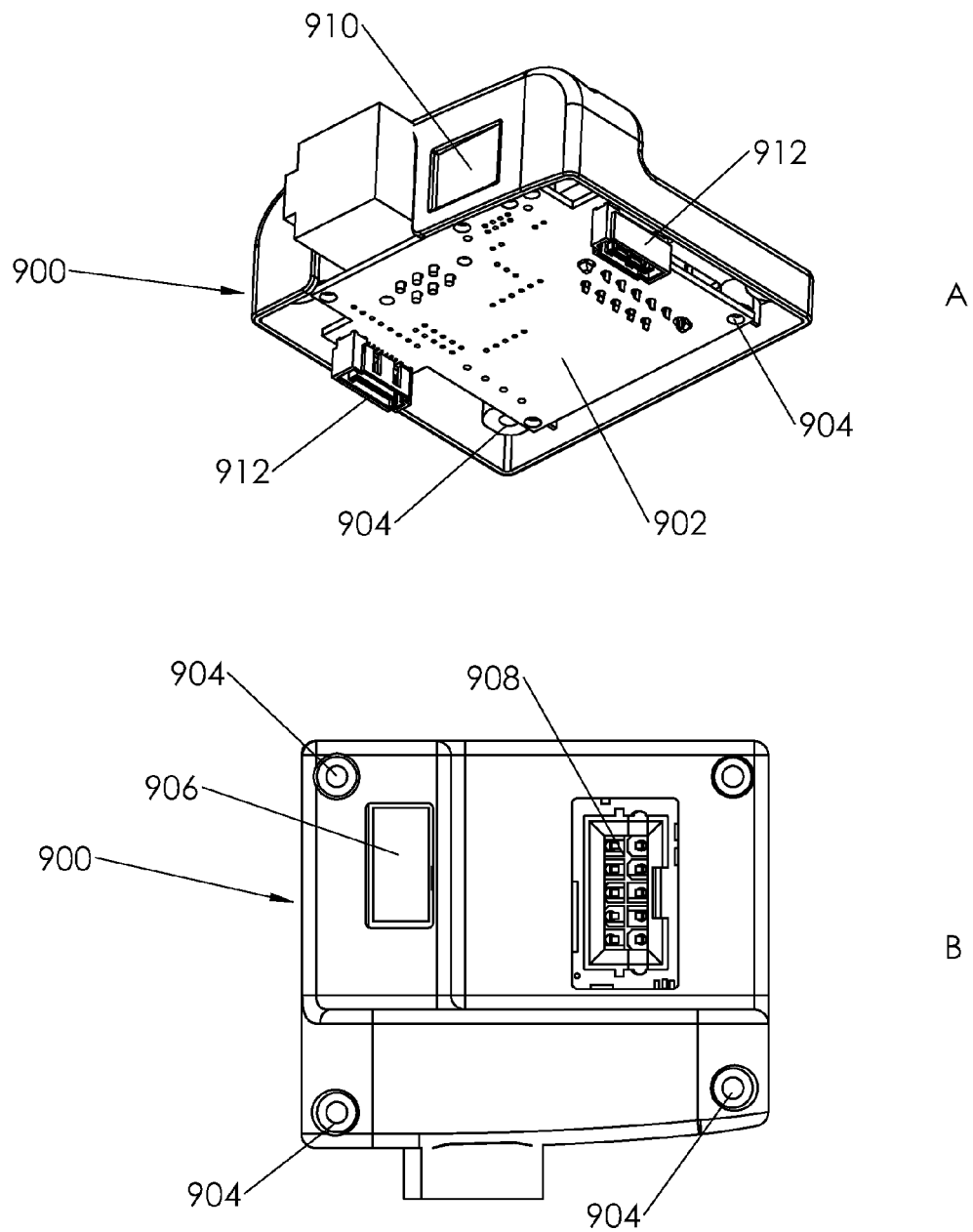
FIGS. 47A and 47B illustrate top and isometric views of a rack mounted circuit board hub embodiment.
Figure 48:
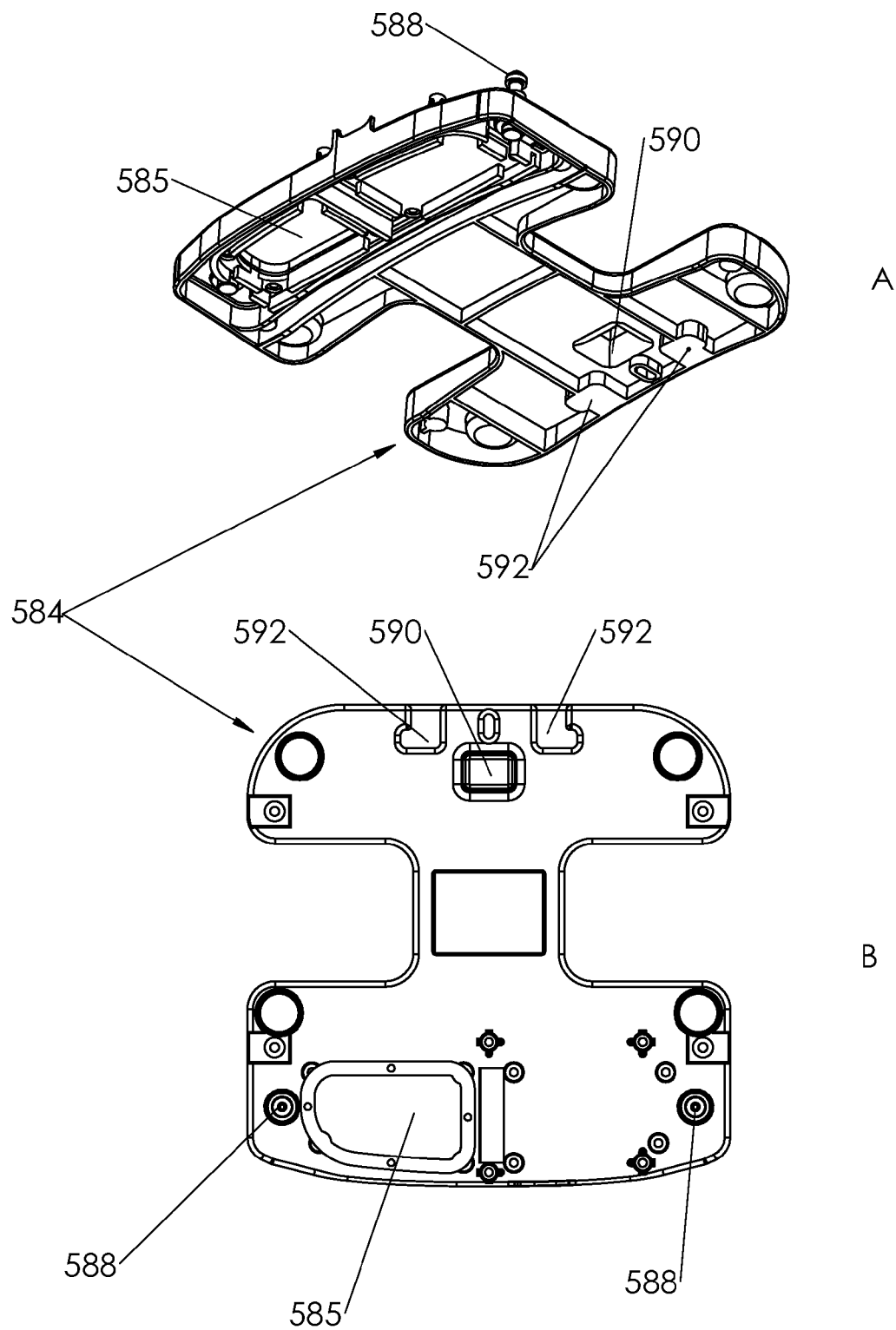
FIGS. 48A and 48B, and FIGS. 49A and 49B illustrate top and isometric views of an air connector plate embodiment that can be used to connect a modular supply or modular exhaust blower embodiment to cage rack embodiments described herein. The difference between FIGS. 48A and 48B, and FIGS. 49A and 49B are in the orientation of the air outlet channel as shown in the figures.
Figure 49:
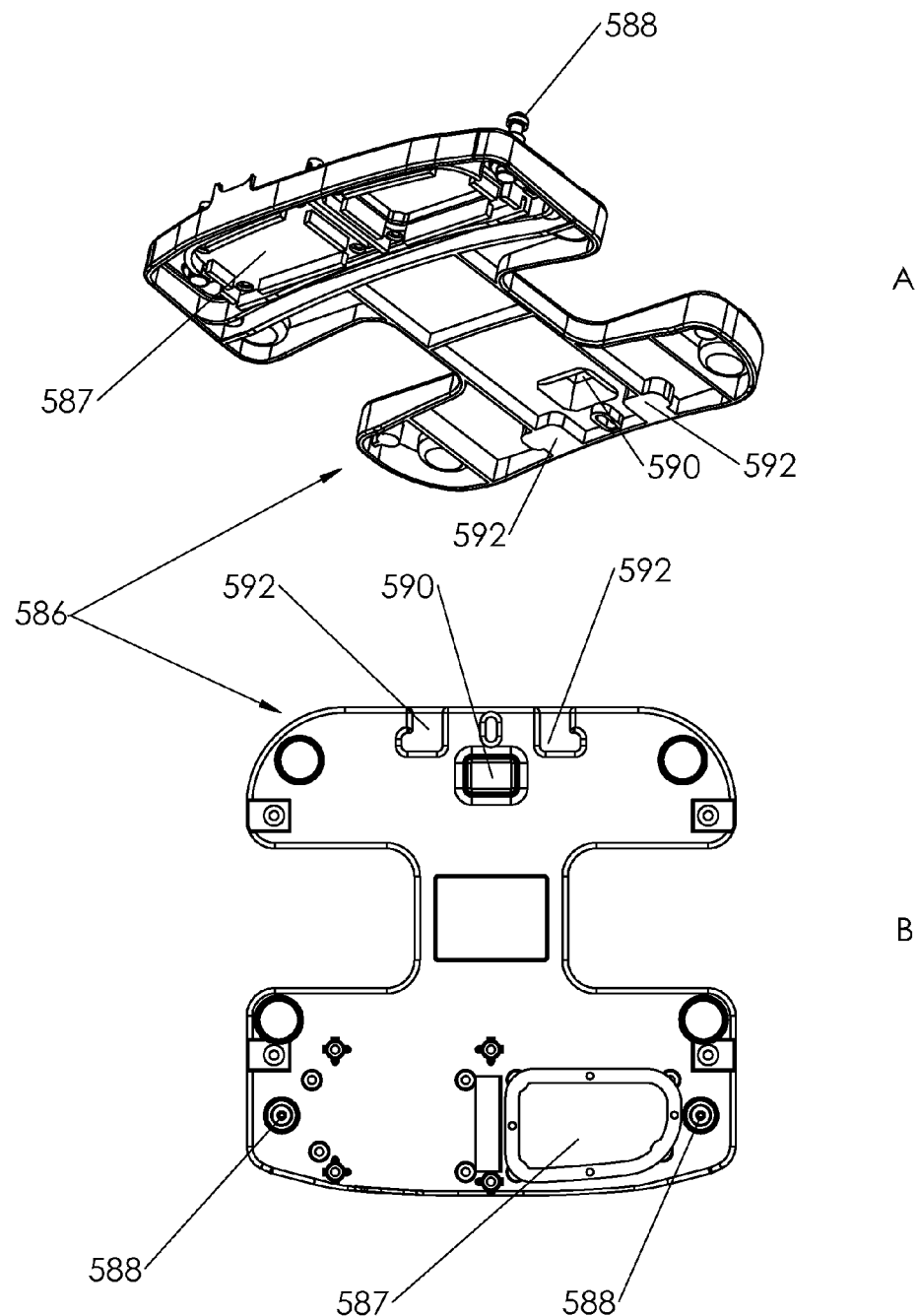
Figure 50:
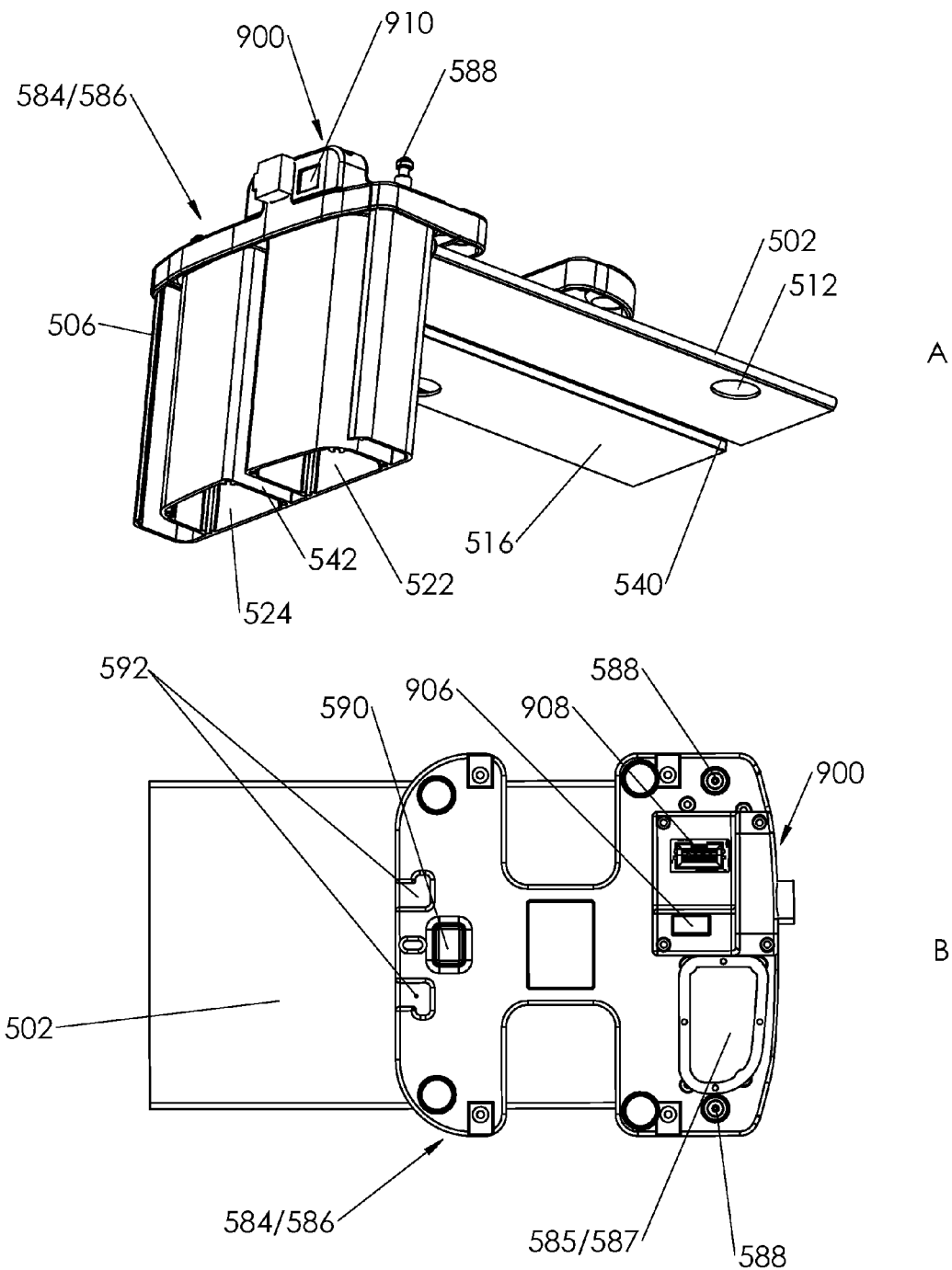
FIGS. 50A and 50B illustrate top and bottom isometric views of an air connector plate embodiment in effective connection with a support member and a side member. Also illustrated in FIG. 50B is a circuit board embodiment described herein.
Figure 51:
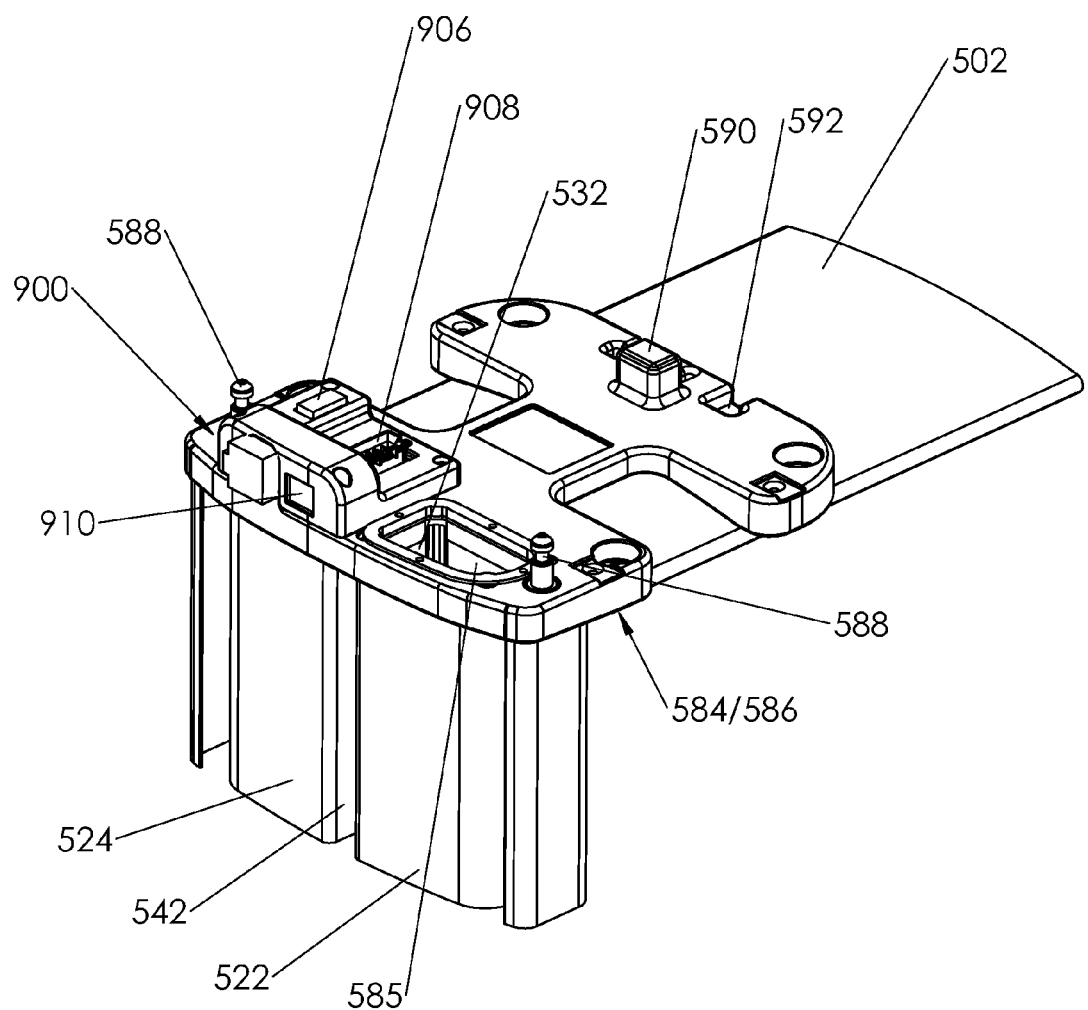
FIG. 51 illustrates a top isometric view of an air connector plate embodiment in effective connection with a support member and a side member. Also illustrated in FIG. 51 is a circuit board embodiment described herein.
Figure 52A:
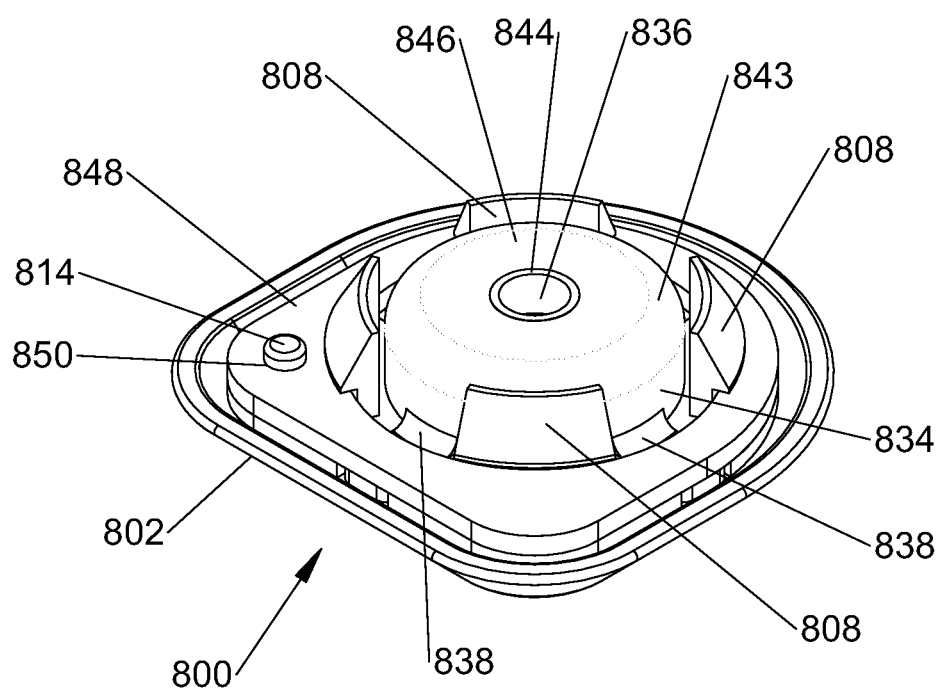
FIGS. 52A and 52B illustrate isometric views of cage protrusion connection assembly embodiments.
Figure 52B:
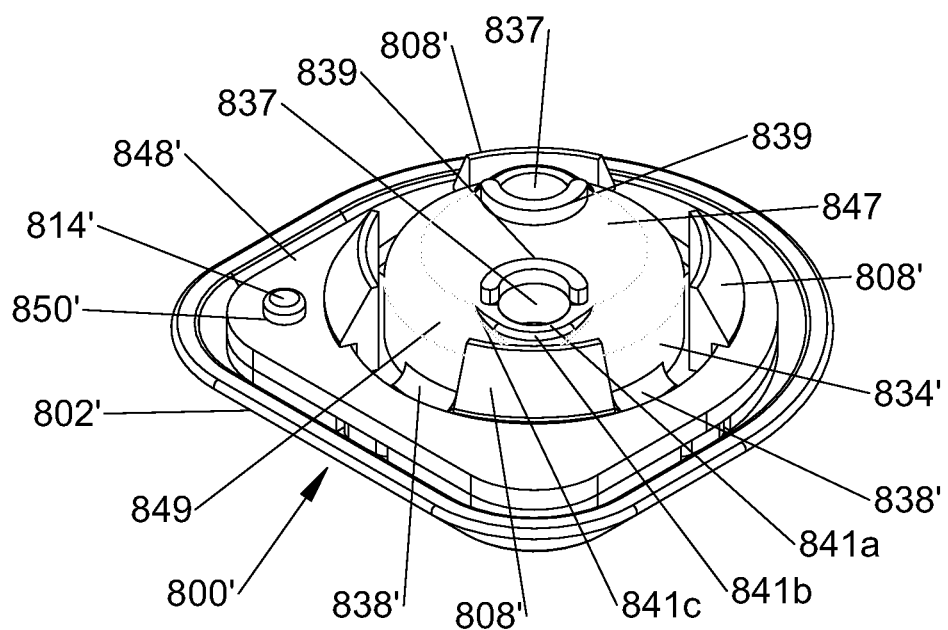
Figure 53A:
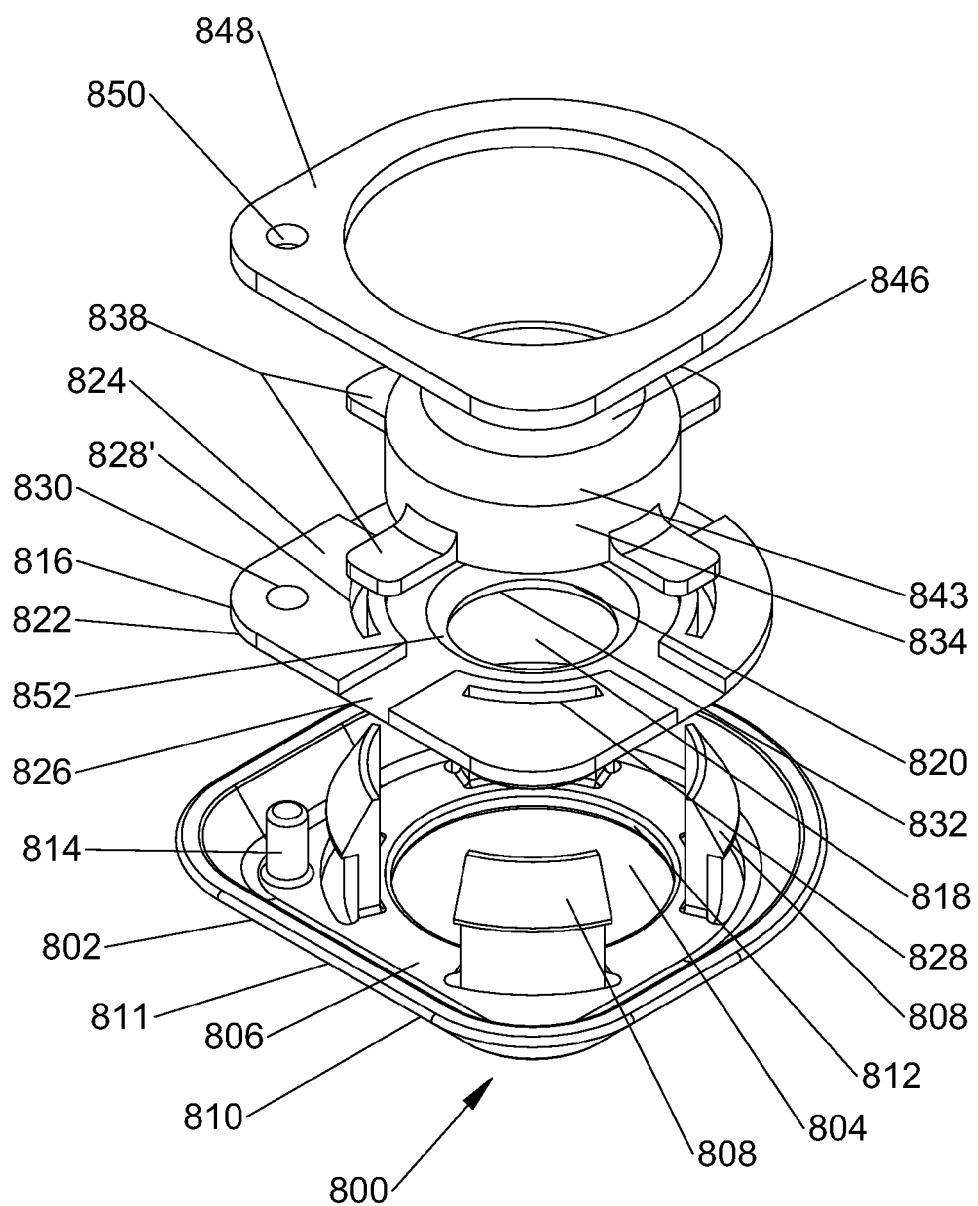
FIGS. 53A and 53B illustrate exploded isometric views of cage protrusion connection assembly embodiments.
Figure 53B:
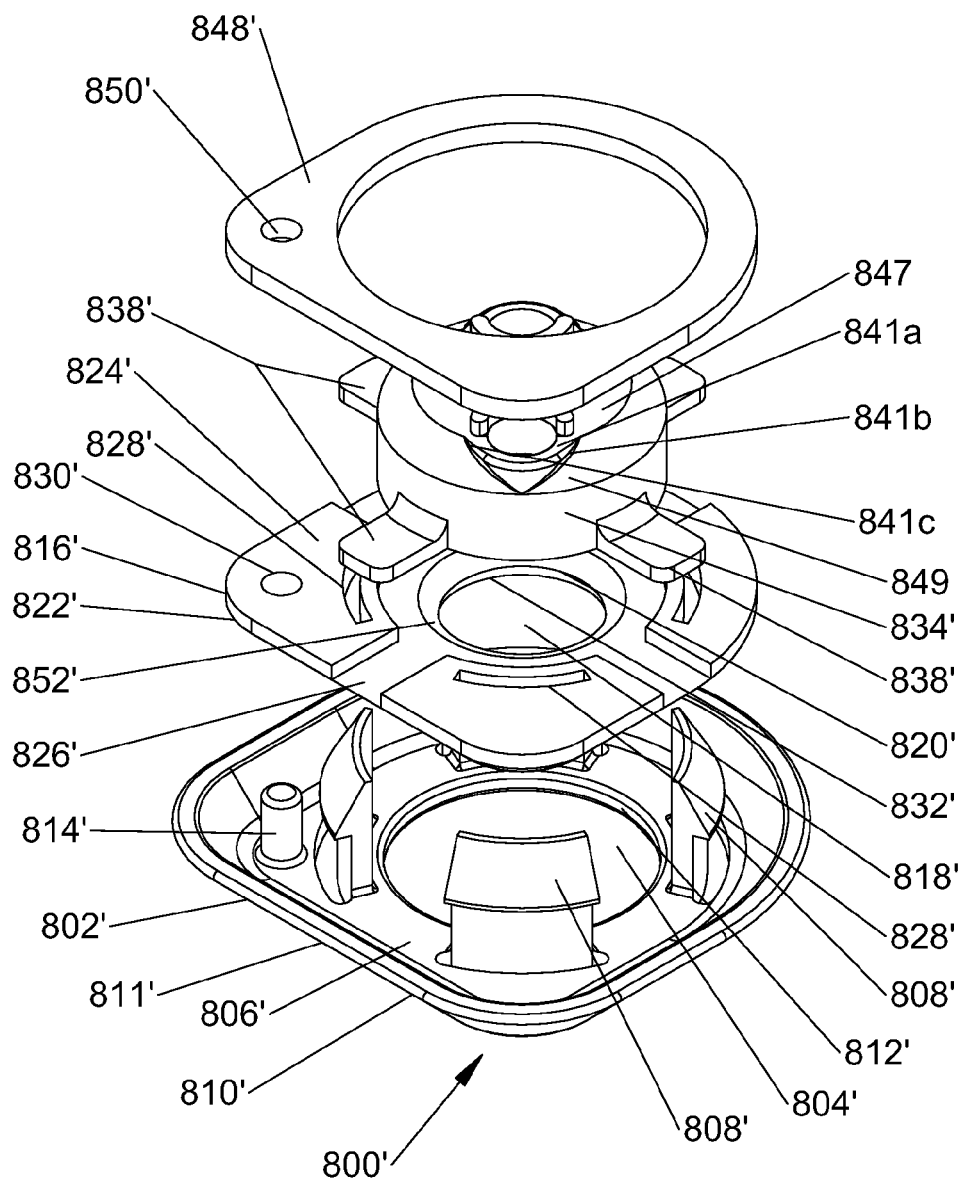

With reference to FIGS. 26-30, and 37, modular blower systems 600, 700 are powered by power supply 740. A schematic wiring diagram is shown in FIG. 37. Power supply cables 742 are routed from power supply 740 to the circuit board hub 900 in effective connection with exhaust blower 700, and from circuit board hub 900 in effective connection with exhaust blower 700 to the circuit board hub 900 in effective connection with supply blower 600, in some embodiments. FIG. 37 schematically illustrates the wiring for a double rack. The wiring for a single rack eliminate cables 742 to the second set of blowers. Each power supply cable includes four 16 gauge (e.g., 16 GA) wires for power and two 22 GA wires for communication. Power supply cables 742 power two blowers at one end of rack 500. These cables are routed from the power supply box to Deutsch receptacle 906 on rack 500 circuit board hub 900. Power is distributed from blowers 700 to blowers 600 at the other end of cage rack 500 through a set of two 14 GA wires that are disposed in channel 540 of the topmost support member 502. In some embodiments, cables 742 are configured for high temperature resistance and/or operation (e.g., can be autoclaved, can be used at elevated temperatures and the like), and in certain embodiments cables 742 are not configured for high temperature resistance and/or operation. In some embodiments where cables are configured to be autoclaved, electronics, wiring or electronics and wiring are sealed or enclosed to minimize or eliminate exposure to moisture. In certain embodiments, communication channels in side and/or support members are configured to minimize or eliminate exposure of communication media to moisture. In some embodiments, the 22 GA communication wires are carried using the same channels are the 14 GA wires.

Air Flow

Generally, air flows throughout the rack system from a supply blower through the first plenums in the side members and the first plenums in the cage support members, through the orifices of the cage protrusion connector assemblies connected to the first set of cage connection apertures and into the orifices of a first set of cage protrusions in the cage lids and into cages. Generally, air is drawn out of the cages through a second set of cage protrusions in the cage lids, through the orifices of cage protrusion connector assemblies connected to a second set of cage connection apertures, through the second plenums of the cage support members to a second plenum of a side member connected to an exhaust blower and out of the rack. The air generally flows in a circuit from the supply portion of a rack through the cages to the exhaust portion of the rack.

In some embodiments, the rack is configured to, when positive air pressure is supplied to the first plenum of a side member, direct air from the first plenum of a side member to a first set of side member apertures of a side member to a set of support member end apertures to the first support member plenums and through the first set of cage connection apertures.

In certain embodiments, the rack is configured to, when negative air pressure is supplied to the second plenum of a side member, direct air through the second set of cage connection apertures to the second support member plenums to a second set of support member end apertures to a second set of side member apertures of a side member and to the second plenum of a side member.

In some embodiments, a blower is in effective connection with an aperture at the top of the first side member, an aperture at the top of the second side member, or apertures at the top of the first side member and the second side member. Generally, a supply blower is in effective connection with only one of the two plenums in a side member. The plenum in effective connection with the supply blower is typically designated as a supply plenum. The other plenum on that side member is typically designated as an exhaust plenum. In some embodiments, an exhaust blower is in effective connection with only one of the two plenums in the other side member. The plenum in effective connection with the exhaust blower is typically designated as an exhaust plenum. The other plenum on that side member is typically designated as a supply plenum. Generally, supply and exhaust plenums are substantially isolated from each other such that essentially no air is directly exchanged between the two plenums. Each supply plenum of the side members generally is in effective connection with only one set of plenums in the cage support members, also designated as supply plenums. Each exhaust plenum of the side members generally is in effective connection with only one set of plenums in the cage support members, also designated as the exhaust plenums. In such embodiments, the supply plenums and the exhaust plenums are in effective fluid or air connection as air passes in and out of cages. The supply plenum of each cage mount support is in effective fluid or air connection with a cage through a first cage connection aperture which is connected to a supply cage protrusion connector assembly. The exhaust plenum of each cage mount support is in effective fluid or air connection with a cage through a second cage connection aperture which is connected to an exhaust cage protrusion connector assembly.

In some embodiments the pressure across a first support member plenum varies less than about 5%. Generally, air pressure is measured at the cage protrusion connector assemblies. Without being limited by theory, the configuration of the supply plenums allowing for air flow in side member plenums on both sides of the cage support member plenums may contribute to achieving this uniform pressure.

In some embodiments, air flow in the first support member plenum and the second support member plenum is transverse to the air flow across the bottom of one or more cages. Generally air flows through support member plenums that extend substantially the entire length of the support member. Cages are generally inserted in the rack unit such that the longer length of a cage is substantially perpendicular to the longer length of the support member to which a cage is mounted. Generally, air enters a cage from a first support member plenum (supply plenum) through a cage connector protrusion assembly that is engaged with a first cage protrusion in the cage lid (located toward the front of the cage). Supply air generally flows downwards and across the bottom of the cage upwards and out of the cage through a second cage protrusion in the cage lid located toward the rear of the cage. Exhaust air generally flows through the cage connector protrusion assembly that is engaged with a second cage protrusion in the cage lid into a second support member plenum (exhaust plenum) and through the second support member plenum along the length of the support member. Exhaust plenums often extend substantially the entire length of the support member.

Some embodiments are shown in FIGS. 26-30, and 37-46. Rodent containment cage rack 500 sometimes is configured to, when positive air pressure is supplied to the first side member plenum 522 of side member 504 direct air from the first side member plenum 522 of side member 504 to the first set of side member apertures 526 of a side member 504 to a set of support member end apertures 518 to the first support member plenums 508 and through the first set of cage connection apertures 512. Cage rack 500 sometimes also is configured to, when negative air pressure is supplied to the second side member plenum 524 of side member 506, direct air through a second set of cage connection apertures 514 to second support member plenums 510 to a second set of support member end apertures 520 to a second set of side member apertures 528 of side member 506 and to the second side member plenum 524 of side member 506.

Positive air pressure is provided by modular supply blower system 600, which is in effective connection with cage rack 500, in some embodiments. Negative air pressure is provided by modular exhaust blower system 700, which is in effective connection with cage rack 500, in certain embodiments. In certain embodiments, rack 500 includes modular supply blower system 600 and modular exhaust blower system 700. Blower 600, 700 is in effective connection to first side member upper aperture 532, second side member upper aperture 534, or first side member upper aperture 532 and second side member upper aperture 534.

With reference to FIGS. 22-23, 30, 35, 52-54, and 59-61, rack 500 also includes cage protrusion connection assembly 800, 800' each assembly including nozzle 834 in effective connection with the cage connection apertures 512, 514. In some embodiments, cage rack 500 includes cages 20. Air enters each cage 20 effectively through an aperture of the first set of cage connection aperture 512 and exits cage 20 effectively through an aperture of the second set of cage connection apertures 514 in certain embodiments. Cages 20 are engaged with cage protrusion connection assemblies 800, 800' in effective connection with the first set of cage connection apertures 512 and the second set of cage connection apertures 514, in some embodiments. Air flow in the first support member plenum 508 and the second support member plenum 510 generally is transverse to the air flow across the bottom of the cages 20.

With reference to FIGS. 26, 27, 38, 48A-48B, 49A-49B, 50A-50B and 51 in some embodiments, blower 600 is in effective connection with rack 500 via supply air connector plate 584. In certain embodiments, blower 700 is in effective connection with rack 500 via exhaust air connector plate 586. Cage rack 500 also includes a first air connection plate 584 including an aperture 585 in effective connection with an upper end aperture 532 of a first side member plenum 522 of side member 504 and also includes a second air connection plate 586 including aperture 587 in effective connection with upper end aperture 534 of a second side member plenum 524 of opposite side member 506, in some embodiments. Air connector plates 584 and 586 also include air connector plate mating pins 588, 588', and in some embodiments, blower support protrusion 590 and power supply support recesses 592. Air connector plate mating pins 588 in conjunction with blower support protrusion 590 secure and support blower 600, 700 on cage rack 500 and also allow for proper alignment of blower 600, 700 with side member upper apertures 532, 534, in some embodiments. In certain embodiments, air connector plate mating pins 588' secure and support blowers 600, 700 on cage rack 500 and also allow for proper alignment of blowers 600, 700 with side member upper apertures 532, 534, in some embodiments. Power supply support recesses 592 secure and support power supply 740 adjacent to blower 700 (see FIGS. 48A-48B, 49A-49B and 51) Air connector plates 584, 586 are permanently secured to rack 500, in some embodiments, and in certain embodiments air connector plates 584, 586 are permanently secured to rack 500 via a gasket intermediary.

Cage Connector Assemblies

A cage connection aperture in a cage mount support member often is in effective connection with a cage connector assembly that facilitates airflow between a cage and a rack member. In some embodiments, each cage connection aperture is in effective connection with one cage connector assembly. A cage connector assembly can be directly connected to a cage connection aperture, in certain embodiments. A cage connector assembly sometimes is indirectly connected to and associated with a cage connection aperture, and often is connected to a cage mount support member in proximity to a cage connection aperture, in certain embodiments. In some embodiments, a cage includes one or more protrusions (e.g., an upward extending protrusion in the lid of a cage), where each protrusion includes an aperture that allows for air flow into the cage or from the cage. In the latter embodiments, a cage connector assembly in a rack can be referred to as a "cage protrusion connector assembly."

A cage connector assembly can be of any suitable configuration for facilitating airflow between a rack member and a cage. In some embodiments a cage connector assembly includes a cage connector component, a nozzle and one or more seals (e.g., gaskets). The cage connector component in some embodiments includes a body and an orifice in the body. A cage connector can be of any suitable geometry for interaction with a cage member (e.g., a cage protrusion) and non-limiting examples of a body surface or cross section include circular; oval; rectangular; square; rhomboid; variants of rectangular, square and rhomboid geometries having bevels, curved edges and/or curved corners; the like; and combinations of the foregoing. An orifice can be of any suitable shape, non-limiting examples of which are circular and oval. A circular or substantially circular orifice can be defined by any suitable radius, which radius often is selected to allow for the cage connector assembly to interact with a cage member. An orifice can be defined by a radius that permits insertion of a portion or all of the conical into a cage connector assembly interior. In some embodiments, the radius of a cage connector component orifice is about 0.05 inches to about 0.70 inches (e.g., about 0.06, 0.07, 0.08, 0.09, 0.10, 0.20, 0.325, 0.350, 0.375, 0.40, 0.50 or 0.60 inches). A cage protrusion in some embodiments is a conical protrusion comprising an aperture at its apex, or other protrusion comprising a taper and an aperture.

A cage connector component of a cage connector assembly can be manufactured from one or more suitable materials. A cage connector component sometimes is manufactured from one or more polymers (e.g., described herein), and often is rigid or substantially rigid, thereby contributing to a shell or shell-like structure of the cage connector component. In some embodiments, the cage connector component is manufactured from nylon and is about 10% to about 50% glass filled (e.g., about 15%, 20%, 25%, 30%, 35%, 40% or 45% glass filled). A cage connector often is manufactured from a material that can withstand washing and/or autoclave conditions (e.g., repeated exposure to heat, humidity, spraying and/or rinsing).

In certain embodiments, a cage connector assembly includes one or more fasteners extending from a first surface of the body. The one or more fasteners often are configured to engage fastener counterparts of one or more other assembly components (e.g., gasket or gaskets), and in embodiments that include two or more fasteners, the fasteners sometimes are disposed around the body perimeter and/or around the orifice. Any suitable fastener can be utilized, non-limiting examples of which include reversible, non-reversible, threaded, non-threaded, deflectable, non-deflecting, male, female, the like and combinations of the foregoing. In some embodiments, a fastener is a barbed fastener that optionally can be deflected. A fastener generally is configured to fasten one or more assembly components and sometimes is configured to also engage a cage connector assembly with cage mount support member.

In certain embodiments, a cage connector includes a member that aligns other components of the cage connector assembly. Any suitable alignment member can be utilized, non-limiting examples of which include a tab, pin and rod.

A cage connector component does not directly engage a portion of a cage in some embodiments, and in certain embodiments, a portion of a cage connector component directly engages a portion of a cage (e.g., when the cage is moved into its destination, or docked position, for use in the rack). In some embodiments, a cage connector component is configured to position a cage in a rack. Such a cage connector component often positions a cage in a rack in concert with other rack members (e.g., guide rails) and sometimes one or more cage connector components are responsible primarily for positioning a cage in a rack (e.g., limiting rearward movement of the cage).

A cage connector component sometimes includes a cage engagement member that contacts a portion of a cage. A cage engagement member sometimes is referred to as a "cage protrusion engagement member" where the cage includes a protrusion that interacts with a cage connector assembly. A cage engagement member often includes a surface, sometimes a projected surface, that conforms to and reversibly mates with (e.g., rests against or contacts) a surface of a cage (e.g., a cage protrusion), and such a surface in a cage connector component sometimes is configured to position a cage in a rack. The geometry of a cage engagement member often is determined by the corresponding geometry of a cage member with which the cage engagement member interacts. Non-limiting examples of a cage engagement member geometry and/or surface include flat, curved, tapered, flared, frustrum, conical, the like, and combinations and portions thereof. In non-limiting examples, a cage protrusion that interacts with a cage connector component is substantially conical, and the corresponding surface of the cage engagement surface in cage connector subcomponent (e.g., the projected surface) is curved with a substantially similar or substantially identical radius and taper as the corresponding surface of the conical protrusion of the cage with which it contacts. In some embodiments, a cage engagement member (e.g., a projected surface) of a cage connector component extends from a second surface of the cage connector component opposite the first side of the component, and can extend any suitable maximum length from the surface of the second side (e.g., about 0.01 to about 3 inches (e.g., about 0.05, 0.1, 0.5, 0.6, 0.7, 0.8, 0.9, 1, 1.1, 1.2, 1.3, 1.4, 1.5 or 2 inches; or about 0.094 or about 0.095 inches)). An interaction with a cage member (e.g., cage protrusion) with a surface (e.g., a projected surface) of a cage connector assembly is described in greater detail hereafter.

A cage connector assembly generally comprises a connector gasket (e.g., cage protrusion connector gasket) in some embodiments. A connector gasket generally is configured to sealing connect with a cage connector component and can be of any suitable geometry, non-limiting examples of which include circular; oval; rectangular; square; rhomboid; variants of rectangular, square and rhomboid geometries having bevels, curved edges and/or curved corners; the like; and combinations of the foregoing. In some embodiments, the term "sealing connection" as used herein refers to an air-tight seal or substantially air-tight seal between two structures.

A connector gasket can be manufactured from a suitable material, which material often is flexible, semi-flexible, substantially flexible, deformable, semi-deformable and/or substantially deformable. Non-limiting examples of one or more materials that can be included in a connector gasket include plastics, thermoplastics, elastomers, thermoplastic elastomers (TPEs), thermoplastic vulcanizates (TPV; SANTOPRENE TPV), thermoplastic polyurethane (TPU), thermoplastic olefins (TPO), polysulfide rubber, ethylene propylene rubber (e.g., EPM, a copolymer of ethylene and propylene), ethylene propylene diene rubber (e.g., EPDM, a terpolymer of ethylene, propylene and a diene-component), epichlorohydrin rubber (ECO), polyacrylic rubber (ACM, ABR), silicone rubber (SI, Q, VMQ), fluorosilicone Rubber (FVMQ), fluoroelastomers (e.g., FKM, and FEPM, VITON, TECNOFLON, FLUOREL, AFLAS and DAI-EL), perfluoroelastomers (e.g., FFKM, TECNOFLON PFR, KALREZ, CHEMRAZ, PERLAST), polyether block amides (PEBA), chlorosulfonated polyethylene (CSM, e.g., HYPALON), ethylene-vinyl acetate (EVA), synthetic polyisoprene (IR), butyl rubber (copolymer of isobutylene and isoprene, IIR), halogenated butyl rubbers (chloro butyl rubber: CIIR; bromo butyl rubber: BIIR), polybutadiene (BR), styrene-butadiene rubber (copolymer of polystyrene and polybutadiene, SBR), nitrile rubber (copolymer of polybutadiene and acrylonitrile, NBR; Buna N rubbers), hydrogenated nitrile rubbers (HNBR, THERBAN and ZETPOL), chloroprene rubber (CR, polychloroprene, NEOPRENE, BAYPREN) and the like. Non-limiting examples of TPEs include styrenic block copolymers, polyolefin blends, elastomeric alloys, thermoplastic polyurethanes, thermoplastic copolyester and thermoplastic polyamides. Examples of TPE products from the block copolymers group are STYROFLEX (BASF), KRATON (Shell Chemicals), PELLETHANE (Dow chemical), PEBAX, ARNITEL (DSM), HYTREL (Du Pont) and more. Non-limiting examples of commercially available elastomeric alloys include SANTOPRENE (in-situ cross linked polypropylene and EPDM rubber; Monsanto), GEOLAST (Monsanto) and ALCRYN (Du Pont). A connector gasket often is manufactured from a material that that can withstand washing and/or autoclave conditions (e.g., repeated exposure to heat, humidity, spraying and/or rinsing).

A connector gasket is of a suitable thickness to permit sealing engagement of a cage member (e.g., cage protrusion) to a cage connector assembly. A connector gasket can have a nominal, average, mean, maximum or minimum thickness of about 0.01 inches to 1.0 inch (e.g., about 0.02, 00.3, 0.04, 0.05, 0.06, 0.07, 0.08, 0.09, 0.1, 0.2, 0.3, 0.4, 0.5, 0.6, 0.7, 0.8, 0.9 inches thick). In some embodiments, the connector gasket has a minimum thickness of about 0.02 inches to about 0.07 inches (e.g., about 0.03, 0.04, 0.05 or 0.06 inches; or about 0.047 inches) and a maximum thickness of about 0.1 to about 0.2 inches (e.g., 0.11, 0.12, 0.13, 0.14, 0.15, 0.16, 0.17, 0.18 or 0.19 inches; or about 0.156 inches). A connector gasket generally includes an orifice that often is concentric with the orifice in a cage connector component. The orifice in a connector gasket can be of any suitable shape, non-limiting examples of which are circular and oval. A circular or substantially circular orifice can be defined by any suitable radius, which radius often is selected to allow for the connector gasket to sealing engage with a cage member. In embodiments where the cage member is a conical protrusion, for example, an orifice in the connector gasket can be defined by a radius that permits insertion of a portion or all of the conical protrusion into a cage connector assembly interior, and allows for sealing connection of the connector gasket to the conical protrusion. In some embodiments, the radius of the gasket orifice is about 0.20 to about 0.25 inches (e.g., about 0.21, 0.22, 0.23 or 0.24 inches; or about 0.227 inches). A connector gasket may include an annular flange disposed around the gasket orifice configured to permit sealing attachment of the gasket to a cage member (e.g., cage projection). An annular flange can have a shape and surface that permits sealing attachment of the gasket to a cage member, non-limiting examples of which surface include flat, curved, tapered, flared, frustrum, conical, the like, and combinations and portions thereof. A connector gasket orifice may include, in some embodiments, an annular bevel disposed around the orifice.

A connector gasket may include an alignment feature that permits alignment of the gasket with the cage connector component (e.g., a bore configured to receive a pin in the cage connector component). A connector gasket, in some embodiments, may include one or more fasteners adapted to fasten to one or more fasteners in the cage connector component (non-limiting examples of fasteners are described above with respect to the cage connector component). In some embodiments, a fastener in a connector gasket is one or more slots or channels disposed near or around the gasket orifice configured to receive a fastener in a cage connector component of the assembly. In certain embodiments, a connector gasket includes one or more alignment features for a nozzle component of a cage connector assembly, non-limiting examples of which include grooves, apertures, pins, tabs, the like and combinations thereof.

A connector gasket is in sealing connection with a nozzle component of a cage connection assembly, in some embodiments. A nozzle is of any shape suitable to permit airflow from a rack to a cage and/or from a cage to a rack, and non-limiting examples of the shape of a nozzle body include substantially cylindrical structures or other structures having a circular, oval, rectangular, square or rhomboid cross-section, and a wall or walls that are parallel, tapered or flared and optionally include a bevel, curved edge, taper, flair, and the like, for example. A nozzle generally includes one or more orifices through which air may flow from a cage to a rack or from a rack to a cage. A nozzle can include any suitable number of orifices (e.g., about 1, 2, 3, 4, 5, 6, 7, 8, 9, 10, 11, 12, 13, 14, 15, 16, 17, 18, 19 or 20 or more orifices). In embodiments where a nozzle includes one orifice, the orifice often is concentric with the orifice of a connection gasket and cage connector component of the assembly. Where a nozzle includes two or more orifices, the orifices may be arranged in any suitable configuration to permit airflow between a cage and a rack. In certain embodiments, two or more orifices are arranged regularly on a nozzle surface (e.g., the midpoints of the orifices are substantially equidistant from one another); sometimes are arranged regularly around a center-point of a nozzle surface (e.g., the distance between each orifice midpoint to the nozzle surface center-point is substantially the same for two or more or all of the orifices in the nozzle), and/or sometimes are arranged regularly around the perimeter of a nozzle surface.

A nozzle orifice may include an annular flange disposed around the orifice, which flange often extends towards the connector gasket and the cage connector component. A nozzle orifice may be in association with a bushing in some embodiments. A bushing may be manufactured from any suitable material, non-limiting examples of which include a metal (e.g., brass) or polymer or the like and combinations of the foregoing. A bushing may be flush-mounted with a nozzle in some embodiments, and in certain embodiments, a nozzle may be cast with an integrated bushing (e.g., polymer of the nozzle may cover the bushing). The effective radius of a nozzle orifice (e.g., with or without a bushing) is selected to permit suitable airflow and/or air pressure from a rack to a cage or from a cage to a rack. In some embodiments, the radius of a nozzle is about 0.005 to about 0.50 inches (e.g., about 0.01, 0.02, 0.03, 0.04, 0.05, 0.06, 0.07, 0.08, 0.09, 0.1, 0.2, 0.3 or 0.4; about 0.344 inches) and the radius of a bushing orifice sometimes is about 0.005 inches to about 0.1 inches (e.g., about 0.01, 0.02, 0.03, 0.04, 0.05, 0.06, 0.07, 0.08, 0.09; or about 0.079 inches).

A nozzle may include an annular beveled surface, or an annular curved surface defined by a radius, in conjunction with a top and/or bottom surface of the nozzle. In some embodiments, the edge of the beveled surface or curved surface may be interrupted by a cylindrical protrusion that substantially defines a portion or all of an orifice perimeter (e.g., where an orifice is disposed towards the outer perimeter of a nozzle surface). A cylindrical protrusion in some embodiments is substantially circular in cross section, the cross section sometimes is circular or oval, and the sides of a cylindrical protrusion sometimes are substantially parallel or include or consist of a bevel, flair or taper. In the latter embodiments, the cylindrical protrusion can include an edge and the edge can meet another edge of the bevel at a corner on the exterior of the nozzle. The cylindrical protrusion also may project from an interior surface of the nozzle in some embodiments, and such a cylindrical protrusion may comprise a rib that projects from all or a portion of the cylindrical protrusion.

An orifice perimeter may be in proximity to a rib that projects from (i) a nozzle surface or surfaces pierced by the orifice, (ii) a cylindrical protrusion, or (iii) a combination of (i) and (ii), in some embodiments. A rib may be of any size and geometry that causes disruption in flow at the nozzle surface from which the rib extends, in some embodiments. A rib may be of any suitable profile (e.g., edge), and the profile sometimes is linear, curved, zigzag, S-shaped, J-shaped or T-shaped. A rib profile (e.g., edge) sometimes is semi-circular and the radius of the inner wall of the rib facing an orifice sometimes is substantially the same as the radius of the orifice (e.g., the inner wall of the rib is substantially coextensive with the orifice perimeter), and sometimes the radius of the inner wall of the rib facing an orifice is larger than the radius of the orifice (e.g., the inner wall of the rib is offset from the orifice perimeter). Whether or not the rib is substantially coextensive with or offset from the orifice perimeter, a rib can circumscribe about 10% to about 100% of the orifice perimeter (e.g., about 20%, 30%, 40%, 45%, 50%, 55%, 60%, 70%, 80% or 90% of the orifice perimeter) in some embodiments. A rib can project from a nozzle surface or projected cylinder junction any suitable distance, which distance may be uniform or varied (e.g., stepped or gradual increases or decreases in rib height). A rib can project from a nozzle surface and/or from a projected cylinder junction a maximum distance of about 0.005 inches to about 0.5 inches (e.g., a maximum rib height of about 0.006, 0.007, 0.008, 0.009, 0.01, 0.02, 0.03, 0.04, 0.05, 0.06, 0.07, 0.08, 0.09, 0.1, 0.15, 0.20, 0.25, 0.30, 0.40 or 0.45 inches) in some embodiments. In embodiments where a nozzle includes a rib that projects from each or two nozzle surfaces or projected cylinder junction (e.g., on a nozzle exterior and on a nozzle interior) the ribs can project from a nozzle surface and/or from a projected cylinder junction the same or different maximum distance.

A nozzle can be manufactured from any suitable material, non-limiting examples of which include rigid and substantially rigid polymers (e.g., nylon) that optionally may be impregnated, mixed or coated with another material (e.g., about 10% to about 50% glass filled nylon). A nozzle may include one or more alignment features that facilitate alignment with a connector gasket, as described above (e.g., tabs or other alignment features).

A cage connector assembly also may include a mount seal or mount gasket (also referred to herein as a "nozzle gasket") that permits sealing connection of the cage connector assembly to a cage mount support member. A mount gasket can be of a suitable geometry to permit such a sealing connection, non-limiting examples of which include circular; oval; rectangular; square; rhomboid; variants of rectangular, square and rhomboid geometries having bevels, curved edges and/or curved corners; the like; and combinations of the foregoing. A mount gasket is of a suitable thickness to permit sealing engagement of a cage connector assembly to a cage mount support member. A connector gasket can have a nominal, average, mean, maximum or minimum thickness of about 0.01 inches to 0.1 inch (e.g., about 0.02, 0.03, 0.04, 0.05, 0.06, 0.07, 0.08, 0.09 inches thick). In some embodiments the maximum thickness of the connector gasket is about 0.063 inches. A mount gasket is manufactured from a suitable material, examples of which are provided above with respect to the connector gasket. A mount gasket may include an alignment feature that permits alignment of the gasket with the cage connector component (e.g., a bore configured to receive a pin in the cage connector component). A mount gasket generally includes an orifice that often is concentric with the orifice in a cage connector component, connector gasket and/or nozzle. The orifice in a mount gasket can be of any suitable shape, non-limiting examples of which are circular and oval. In some embodiments, the radius of the mount gasket orifice is about 0.1 inches to about 1.0 inches (e.g., about 0.2, 0.3, 0.4, 0.5, 0.6, 0.7, 0.8 or 0.9 inches). The inner surface of the orifice of the mount gasket often is in contact (e.g., sealing contact) with a surface of the nozzle in the cage connector assembly.

When the mount gasket is positioned in a cage connection assembly, the perimeter of the orifice in the mount gasket may be juxtaposed with one or more fasteners of the cage connector component in an orientation that permits the one or more fasteners to position and/ore secure the mount gasket in the assembly. In certain embodiments, the one or more fasteners of the cage connector component extend beyond the proximal surface of the mount gasket such that the same one or more fasteners can facilitate connection of the cage connector assembly to a cage mount support member (e.g., connected via machined slots or holes in the cage mount support member). In certain embodiments, one or more fasteners other than the one or more fasteners of the cage connector component can be utilized to mount the cage connector assembly to a cage mount support member. A cage connector assembly may be mounted to a wall surface of a cage mount support member, in some embodiments, and in certain embodiments, a cage connector assembly may be mounted within a wall recess or boss in a cage mount support member. When mounted to a cage mount support member, the orifice of a nozzle (e.g., effective orifice (e.g., bushing orifice) can be in effective connection with (e.g., in proximity to; in air communication with), or in direct connection with, a cage connector aperture in the cage mount support. A rack may include one, two, three, four or more cage connector assemblies for each cage docking site in the rack (i.e., one cage can connect to the rack at each cage docking site).

A cage connector assembly often is configured to (i) in part facilitate engagement of a cage to a rack, (ii) in part position a cage in a rack, and (iii) facilitate airflow into a cage from a rack or from a cage to a rack. In certain embodiments, a rail guide lead-in member is engaged by a cage flange by a user and the cage is translated by the user towards the rear of a rack on rail surfaces. During this translation, a side surface of a cage protrusion projecting from the top of the cage can engage a lead-in surface of a cage protrusion connector component in a cage protrusion connector assembly. Continued translation of the cage towards the rear of the rack often causes the cage protrusion to translate downward (e.g., deflect downward) and the lid of the cage to flex. Further translation of the cage towards the rear of the rack causes a top terminus of the cage protrusion side surface to move past the orifice edge of the cage protrusion connector component and the cage protrusion can translate upwards. In some embodiments, the cage protrusion springs upwards and the cage lid flexes. Engagement of the cage protrusion often results in a portion of the cage protrusion being inserted within the interior of the cage protrusion connector assembly. In some embodiments, a portion of a cage protrusion connector gasket is in sealing connection with a portion of a cage protrusion side surface after the cage protrusion translates upwards and a portion of it is within the interior of the cage protrusion connector assembly.

Contact of the cage protrusion connector gasket with a portion of the cage protrusion may be sufficient to position the cage in the rack and facilitate airflow between the rack and the cage. In some embodiments, a member of the cage protrusion connector assembly includes a surface that contacts a portion of a cage protrusion surface and interferes with further translation of the cage towards the rear of the rack. In certain embodiments, a cage protrusion connector component includes a projected surface that rests against a portion of a cage protrusion surface and functions as a positive stop by interfering with further translation of the cage towards the rear of the rack. In some embodiments, such a positive stop in the cage protrusion connector assembly functions as the sole stop that interferes with further translation of the cage towards the rear of the rack (e.g., there are no stops in a cage guide rail on a rack that interferes with rearward translation of a cage. Some or all of the cage connector assemblies in a rack comprise a positive stop, in certain embodiments.

After a cage projection has been engaged in its destination, or docked position, for use in a rack, the cage may be disengaged by reversing the engagement process described above. A cage can be engaged into, and disengaged from, its destination for use in a rack multiple times.

In some embodiments as shown in FIGS. 22-23, 30, 35, 52-56, and 59-61. rodent containment cage rack 500 includes a first set of cage connection apertures 512 and a second set of cage connection apertures 514, each of which is in effective connection with cage protrusion connector assemblies 800, 800', in some embodiments. Cage protrusion connector assembly 800, 800' includes a cage protrusion connector including a body 802, 802', an orifice 804, 804' in body 802, 802', one or more fasteners 808, 808' on a first side 806, 806' of body 802,802' and a projected surface 812, 812' disposed around a portion of orifice 804, 804' on a second side 810, 810' of body 802, 802', in certain embodiments. In some embodiments, one, two or more fasteners 808, 808' are disposed around orifice 804, 804'. Projected surface 812, 812' is configured to contact a portion of cage protrusion 860, 860', in certain embodiments. Projected surface 812, 812' also is configured to position cage 20 in rail guide 552, in some embodiments. Pin 814, 814' extends from the first side 806, 806' of body 802, 802', in certain embodiments.

Cage protrusion connector assembly 800, 800' includes protrusion connector gasket 816, 816' in sealing connection with body 802, 802' of protrusion connector assembly 800, 800', in some embodiments. Protrusion connector gasket 816, 816' includes a protrusion connector gasket orifice 818, 818' concentric with orifice 804, 804' in the protrusion connector 800, 800', an annular flange 820, 820' around the protrusion connector gasket orifice 818, 818' on a first surface of the protrusion connector gasket 822, 822', one or more grooves 826, 826' on a second surface 824, 824' of the protrusion connector gasket 816, 816', and one or more channels 828, 828' configured to receive the one or more fasteners 808, 808' of protrusion connector assembly 800, 800', in certain embodiments. In some embodiments, protrusion connector gasket 816, 816' includes bore 830, 830' configured to receive pin 814, 814'. Annular flange 820, 820' includes surface 832, 832' configured to sealingly engage with a surface 864, 864' of cage protrusion 860, 860', in certain embodiments.

Figure 64A:
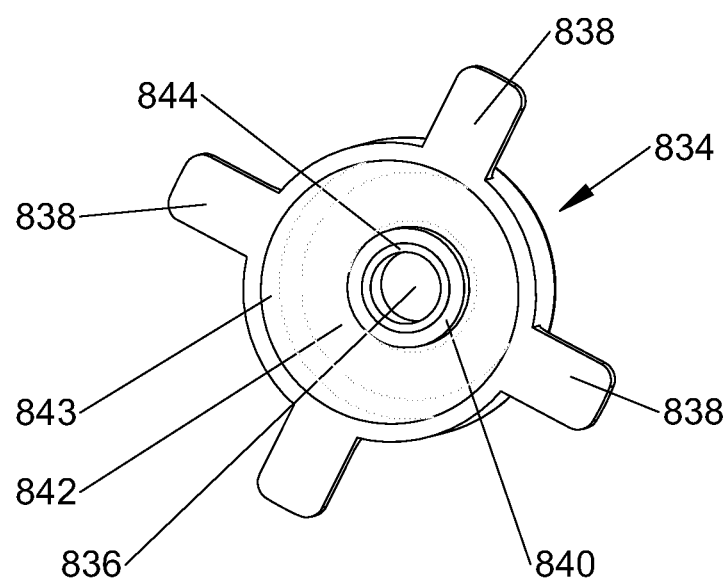
FIGS. 64A and 64B illustrate non-limiting bottom isometric views of nozzle embodiments described herein.

Cage protrusion 860, 860' extends from the lid of cage 20, in some embodiments. Cage protrusion connector assembly 800, 800' includes nozzle 834, 834' in sealing connection with protrusion connector gasket 818, 818', in certain embodiments. Nozzle 834 includes nozzle orifice 836 concentric with orifice 818 in protrusion connector gasket 816 and one or more tabs 838 configured to rest in the one or more grooves 826 of protrusion connector gasket 816, in some embodiments. Nozzle 834 also includes curved or radiused edge 843 in certain embodiments. Nozzle 834 includes nozzle annular flange 840 disposed around the nozzle orifice 836 on a first side 842 of nozzle 834 opposite to the first side 806 of the protrusion connector body 802, in certain embodiments. Nozzle 834 includes bushing 844 disposed around nozzle orifice 836 on a second side 846 of nozzle 834 opposing the first side 842 of nozzle 834, in some embodiments. The underside of single orifice nozzle 834 is illustrated in FIG. 64A.

Figure 64B:
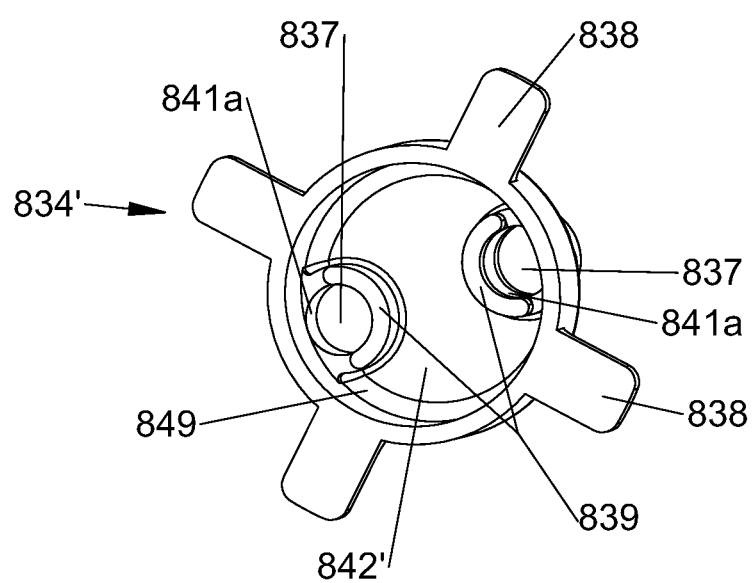

Nozzle 834' includes two or more nozzle orifices 837 concentric with cylindrical protrusions 841a. Each cylindrical protrusion 841a includes cylindrical protrusion edge 841b and corner 841c formed at the junction of cylindrical protrusion edge 841b and curved or radiused edge 843. Body orifice 818' in protrusion connector gasket 816' and one or more tabs 838' are configured to rest in the one or more grooves 826' of protrusion connector gasket 816', in some embodiments. Nozzle 834' also includes beveled or curved surface 849 in certain embodiments. Nozzle 834' includes nozzle annular flange 840' disposed around the nozzle orifice 837 on a first side 842' of nozzle 834' opposite to the first side 806' of the protrusion connector body 802', in certain embodiments. Nozzle 834' includes one or more bushings 845 disposed around the one or more nozzle orifices 837 on a second side 847 of nozzle 834' opposing the first side 842' of nozzle 834', in some embodiments. In some embodiments including two or more nozzle orifices 837, nozzle 834' includes cylindrical projection or protrusion 841a that substantially defines a portion or all of an orifice perimeter. Nozzle 834' also includes nozzle rib 839 projecting from nozzle surface 847 or cylindrical projection 841a in proximity to orifice 837, in certain embodiments. In some embodiments, rib 839 has a semi-circular profile. In certain embodiments, an edge 841b of rib 839 is coextensive with a portion of orifice 837 perimeter. In some embodiments, rib 839 circumscribes a portion of an orifice perimeter. The underside of dual orifice nozzle 834' is illustrated in FIG. 64B.

Cage protrusion connector assembly 800, 800' includes nozzle gasket 848, 848' in sealing connection with nozzle 834, 834', in certain embodiments, and in some embodiments, nozzle gasket 848, 848' include bore 850, 850' configured to receive pin 814, 814'. In some embodiments, protrusion connection gasket 818 include optional annular bevel 852, 852'.

Cage protrusion connector assembly 800, 800' is connected to a lower surface 516 of support member 502 in effective connection with each of the cage connection apertures 512, 514, in certain embodiments. One or more fasteners 808, 808' on the first side 806, 806' of cage protrusion connector body 802, 802' are fastened to fasteners on the wall or in the wall of support member 502, in some embodiments.

Controller Boards

Cage rack controller boards generally provide information for power distribution, air flow and/or cage configuration, provide a conduit for communication between various cage rack components, and in some embodiments provide a user interface for entry of information pertinent to operation of the cage rack in a given configuration. In some embodiments a cage rack can include any suitable number of controller boards and/or circuit board hubs, and in certain embodiments a cage rack includes a master rack controller functionally associated any number of controller boards and/or circuit boards or circuit board hubs in a suitable combination (e.g., 3, 4, 5, 6, 7, 8, 9, 10, or more circuit board hubs and/or controller boards, including a master controller). Cage racks described herein often have 1 blower controller board for each modular blower system in effective communication with a cage rack. Cage racks described herein generally include up to 1 rack mounted circuit board hub for each modular blower system in effective connection with the cage rack. Cage racks described herein typically include a rack controller (e.g., hand held controller, rack mounted controller, master controller, user control interface), which is operably connected to the blower control boards and circuit board hubs, and functions to (i) send and/or receive data, fan curves, user input information, (ii) interpret data received from other control/circuit boards and/or user input, and (iii) store information about rack configuration, ambient pressure and the like, (iv) the like and combinations thereof. In some embodiments, a cage rack has a rack mounted circuit board hub in functional association with each air connector plate. In certain embodiments, a cage rack has a blower control board in functional association with each modular blower system. In some embodiments, the blower control boards are functionally and/or physically associated with a circuit board hub.

In certain embodiments cage rack controller boards include independent circuit boards with one or more functions, and in some embodiments cage rack controller boards include a master controller board which controls the functions of other functionally associated circuit boards. In certain embodiments a circuit board includes a circuit board hub, for functional association with one or more other controller boards or a master rack controller. In certain embodiments a rack controller is functionally associated with one or more blower controllers, one or more circuit board hubs, or one or more blower controllers and one or more circuit board hubs. Communication between the various control boards is by wired communication media, in some embodiments, and in certain embodiments communication between one or more boards is by wireless communications (e.g., Wi-fi, Bluetooth, and the like).

Circuit Board Hub

A circuit board hub can generally include one or more receivers or connections for electrical power and one or more communication media and identifiers. Identifiers can encode any information related to a rack and cages. In a certain embodiments, an identifier encodes information related to the configuration of the cages in a rack, and/or the number of racks on a trolley (e.g., single cage rack embodiment, dual cage rack embodiment). Such information can be communicated to a fan unit such that it adjusts accordingly. In some embodiments, a circuit board hub is in effective connection to a rack unit. In certain embodiments the circuit board hub includes an identifier for the configuration of the cages in a rack and/or the number of racks on a trolley, a receiver for electrical power, a receiver for communication medium and a connector for a control.

Figure 77:
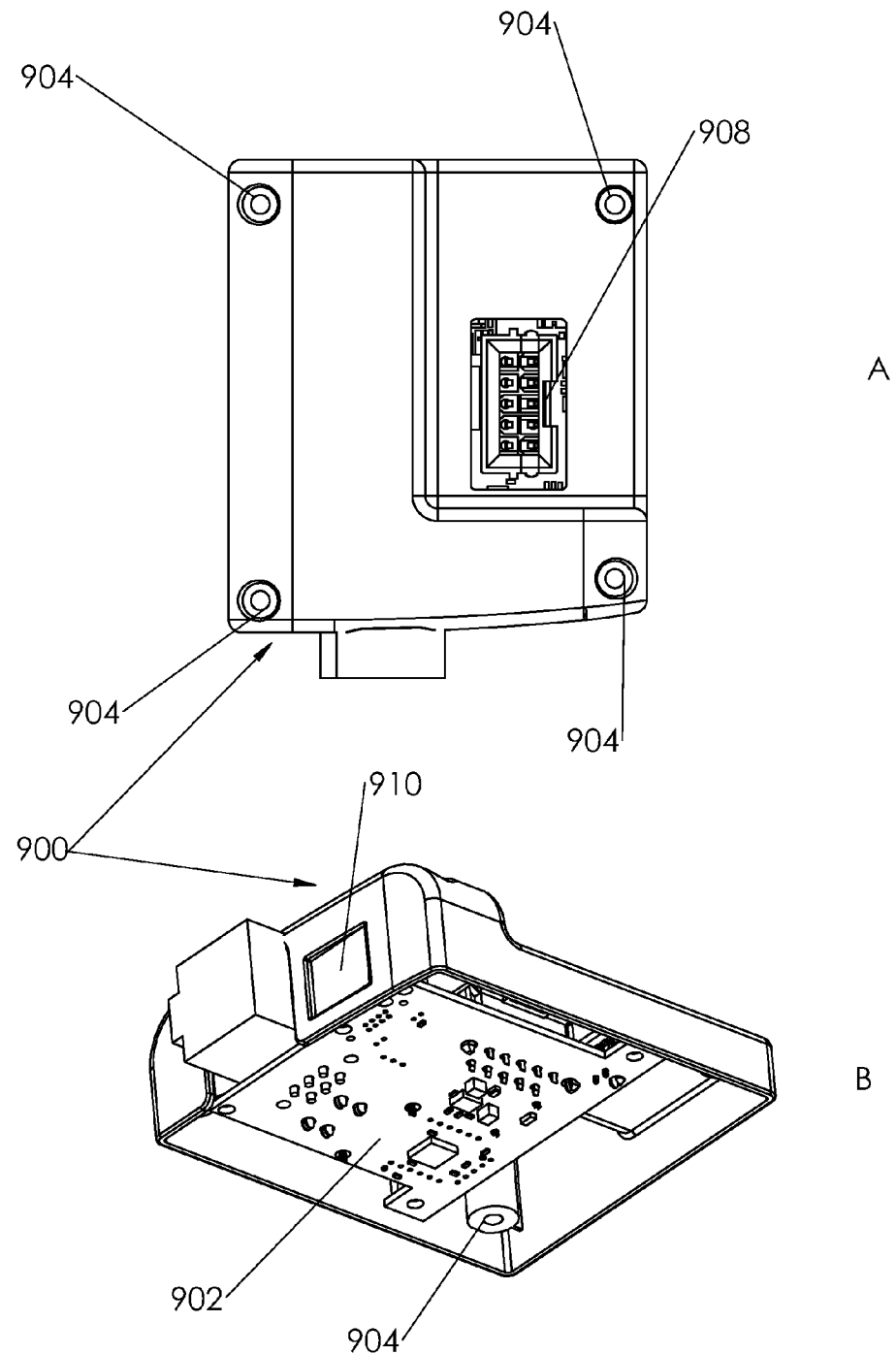
FIGS. 77A and 77B illustrate top and isometric views of an alternate rack mounted circuit board hub embodiment. Differences between embodiments illustrated in FIGS. 77A and 77B and FIGS. 47A and 47B include the rack mounted circuit board hub 900' illustrated in FIGS. 77A and 77B lack eSATA ports 912 and Deutsch receptacle 906 present in circuit board 900 illustrated in FIGS. 47A and 47B.
Figure 78:
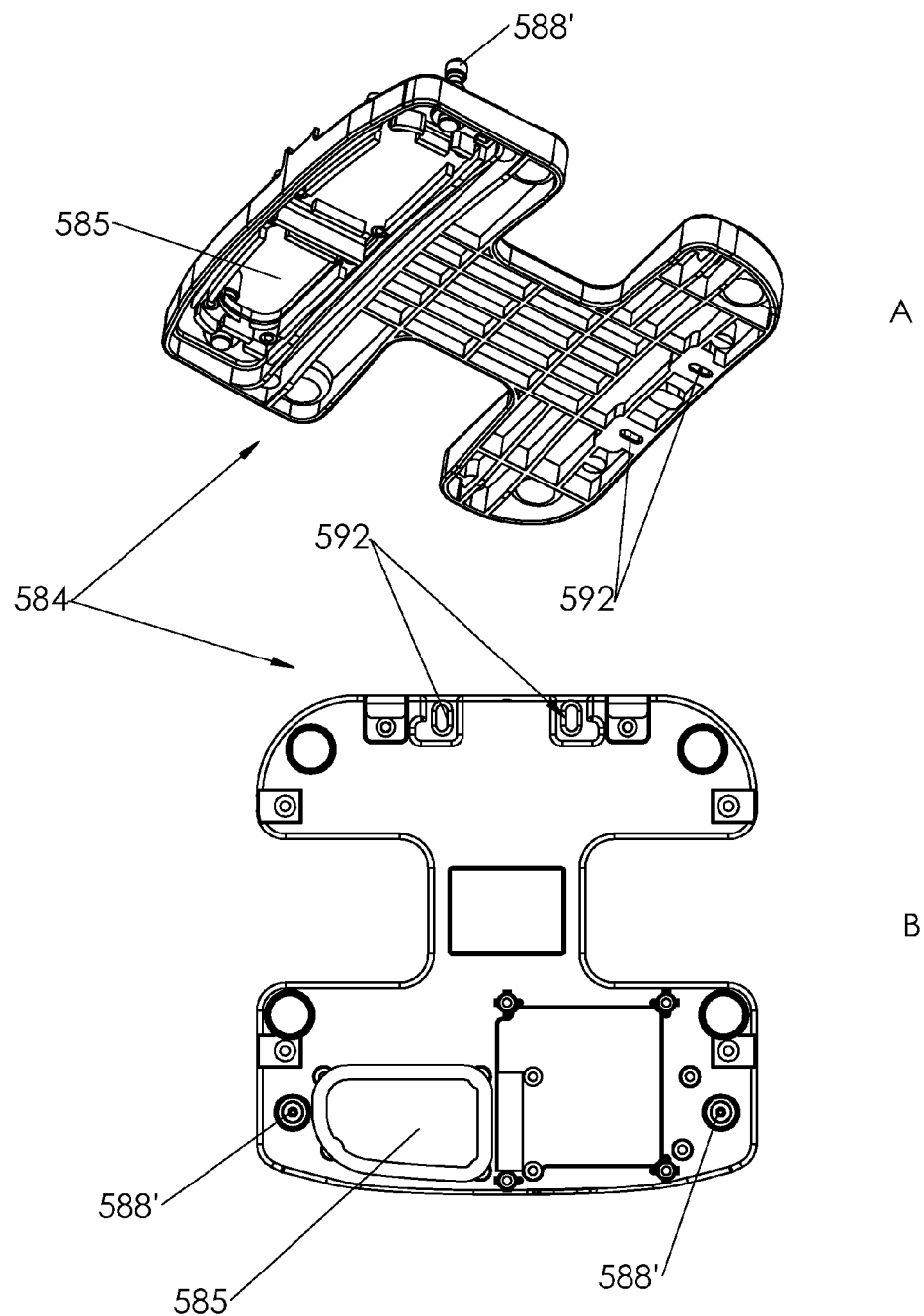
FIGS. 78A and 78B, and FIGS. 79A and 79B illustrate top and isometric views of an air connector plate embodiment that can be used to connect a modular supply or modular exhaust blower embodiment to cage rack embodiments described herein. Differences between embodiments illustrated in FIGS. 78A, 78B, 79A and 79B include the orientation of the air outlet channel. Differences between embodiments illustrated in FIGS. 78A, 78B, 79A and 79B and 48A, 48B, 49A and 49B include the configuration of the air connector plate mating pins and blower support protrusion.
Figure 79:
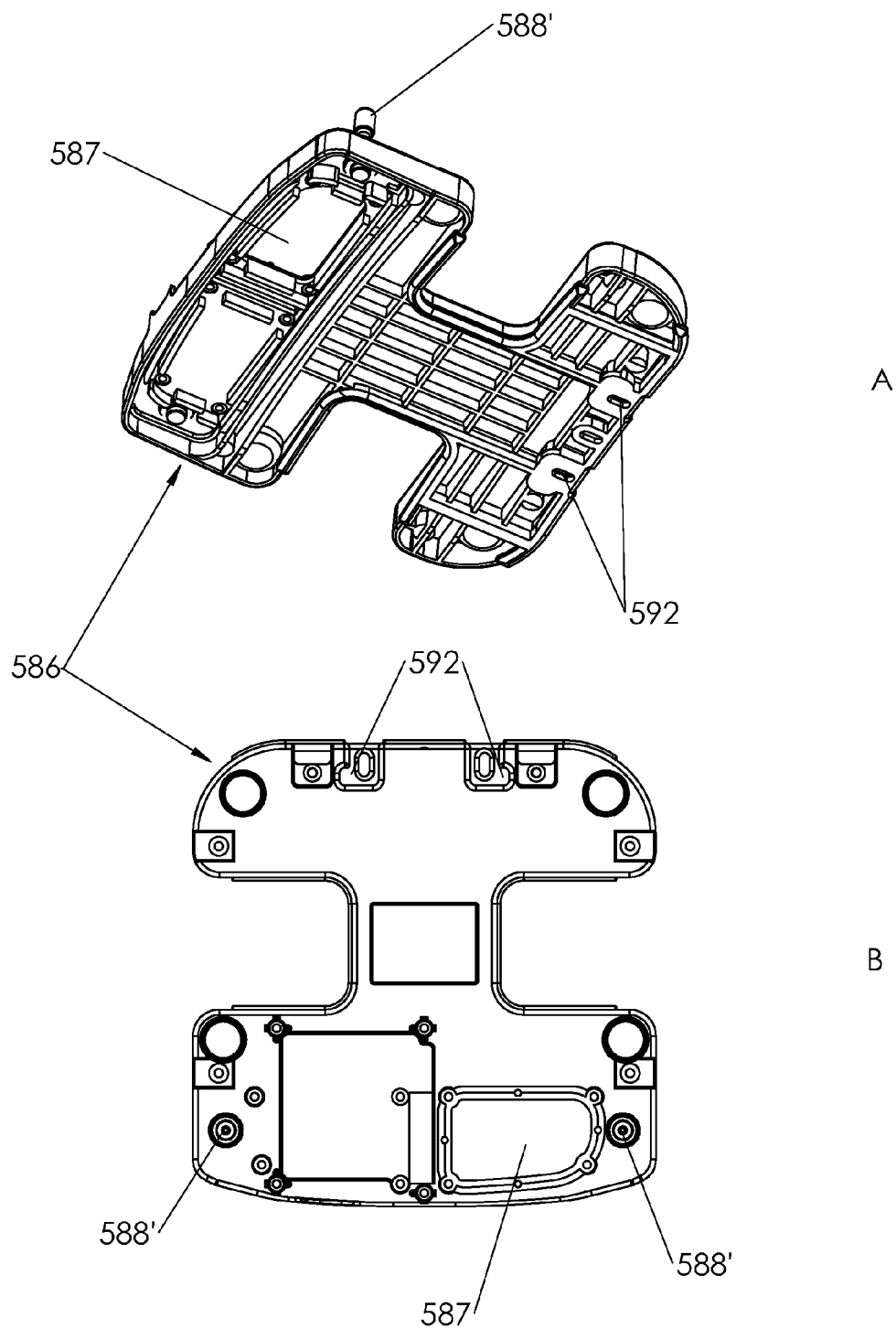
Figure 80:
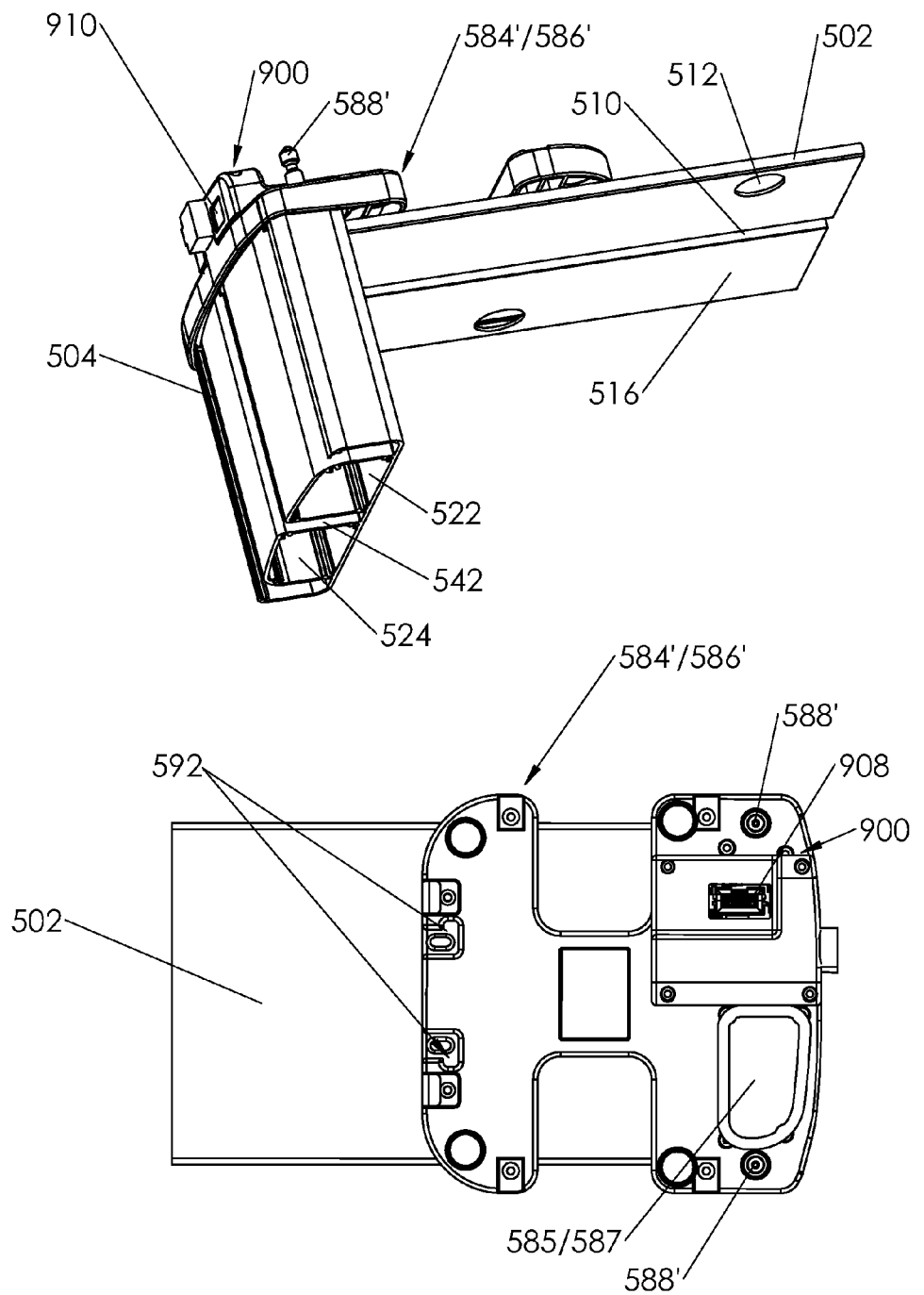
FIGS. 80A and 80B illustrate top and bottom isometric views of an air connector plate embodiment in effective connection with a support member and a side member. Also illustrated in 80B is a circuit board embodiment described herein. Differences between embodiments illustrated in FIGS. 80A and 80B and FIGS. 50A and 50B include the configuration of the air connector plate mating pins 588, 588' and circuit board embodiment 900, 900'.
Figure 81:
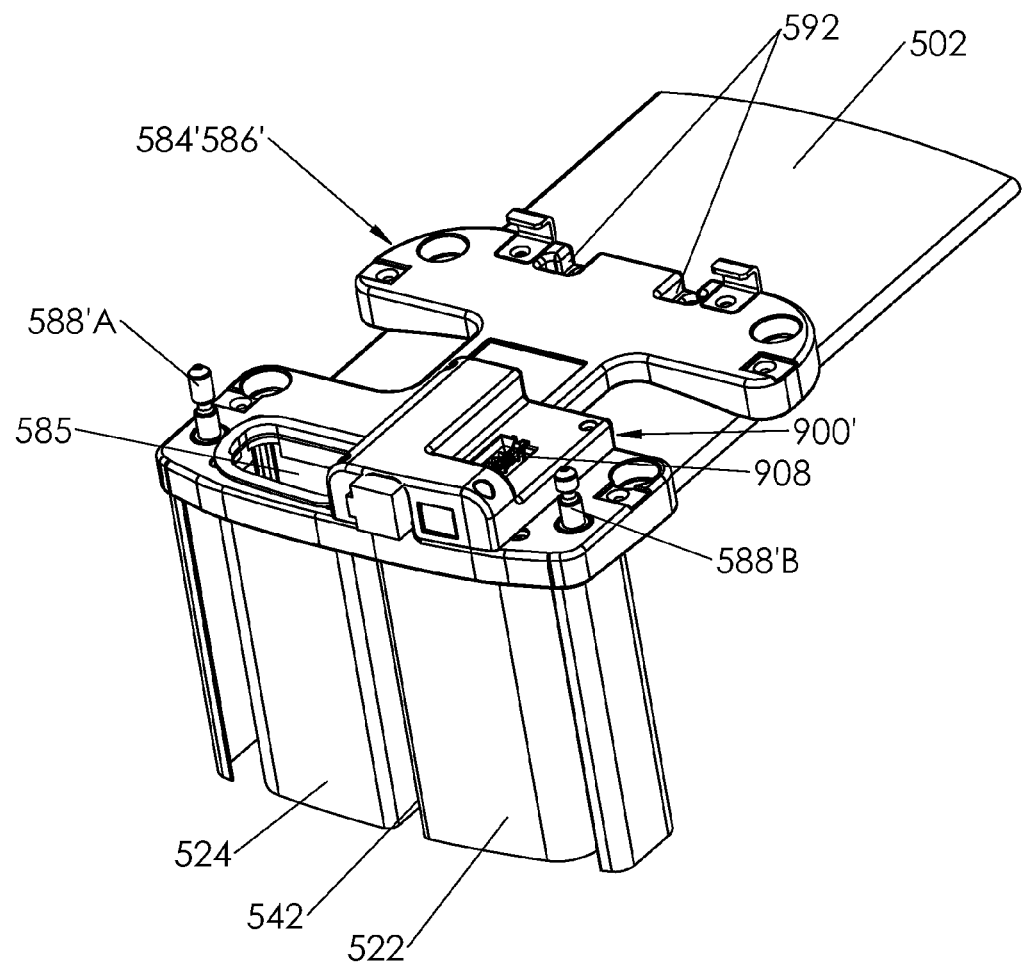
FIG. 81 illustrates a top isometric view of an air connector plate embodiment in effective connection with a support member and a side member. Also illustrated in FIG. 81 is a circuit board embodiment described herein. Differences between embodiments illustrated in FIG. 81 and FIG. 51 include the configuration of the air connector plate mating pins 588, 588' and circuit board embodiment 900, 900'.
Figure 83:
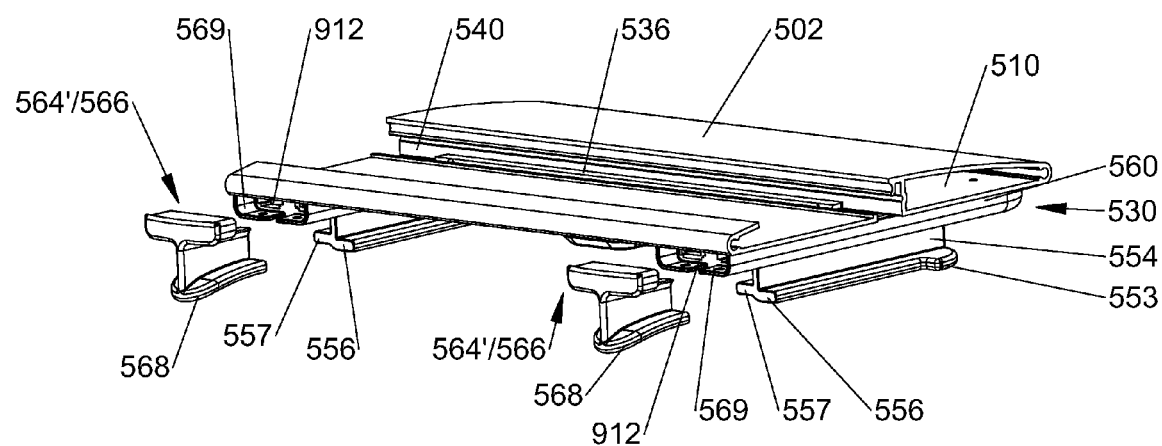
FIG. 83 illustrates a partial cutaway isometric view of a support member embodiment in effective connection with a cage mount assembly embodiment, including a cage mount front module plug embodiment. A portion of the top of a plenum has been removed to visualize the communication medium channel contained in the support member embodiment. Differences between embodiments illustrated in FIG. 83 and FIG. 57 include the configuration of the cage mount assembly. Alternate cage mount assembly 530' includes cage mount guide rail stop 553, as illustrated in FIG. 83. Cage mount assembly 530 illustrated in FIG. 57 does not include cage mount guide rail stop 553.
Figure 84:
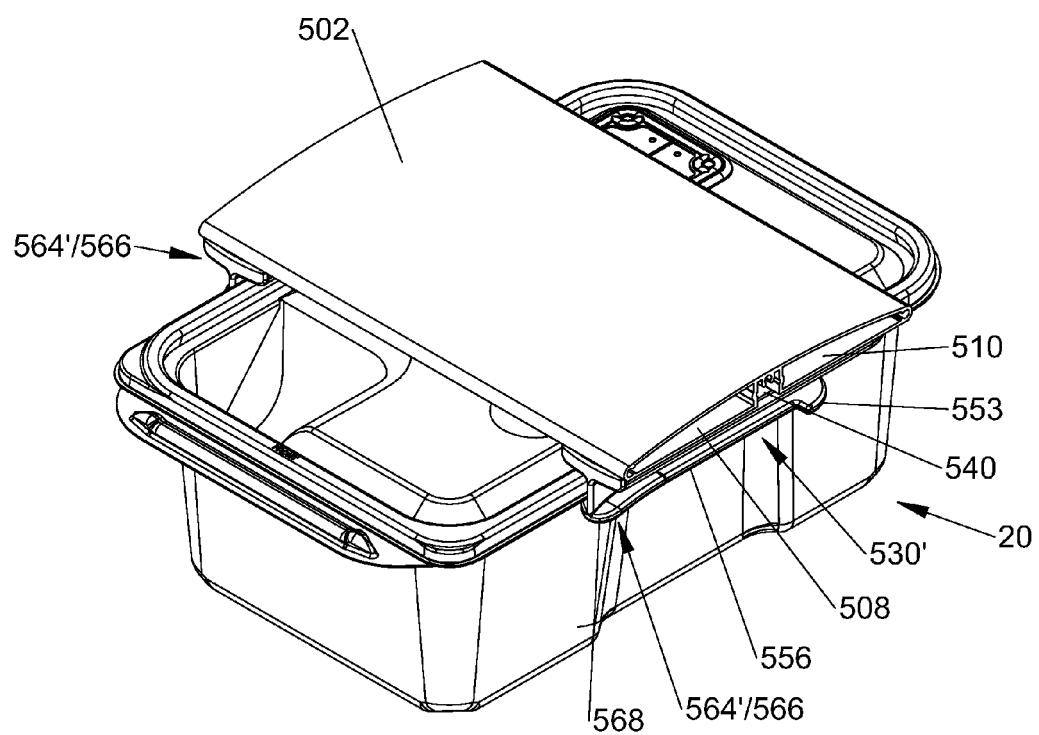
FIG. 84 illustrates a partial cutaway isometric view of a cage embodiment in effective connection with a support member embodiment, held between two cage mount assembly embodiments. Differences between embodiments illustrated in FIG. 84 and FIG. 58 include the configuration of the cage mount assemblies and cage mount front modules (e.g., plug 566, readers 564, 564'). Alternate cage mount assembly 530' includes cage mount guide rail stop 553, as illustrated in FIG. 84. Cage mount assembly 530 illustrated in FIG. 58 does not include cage mount guide rail stop 553. In some embodiments, cage mount front module (e.g., reference character 562 in FIG. 61A-B) is cage mount front module reader 564' in some embodiments, and in certain embodiments, cage mount front module is cage mount front module plug 566. The cage mount front module illustrated in FIG. 58 is a cage mount front module plug 566.
Figure 85:
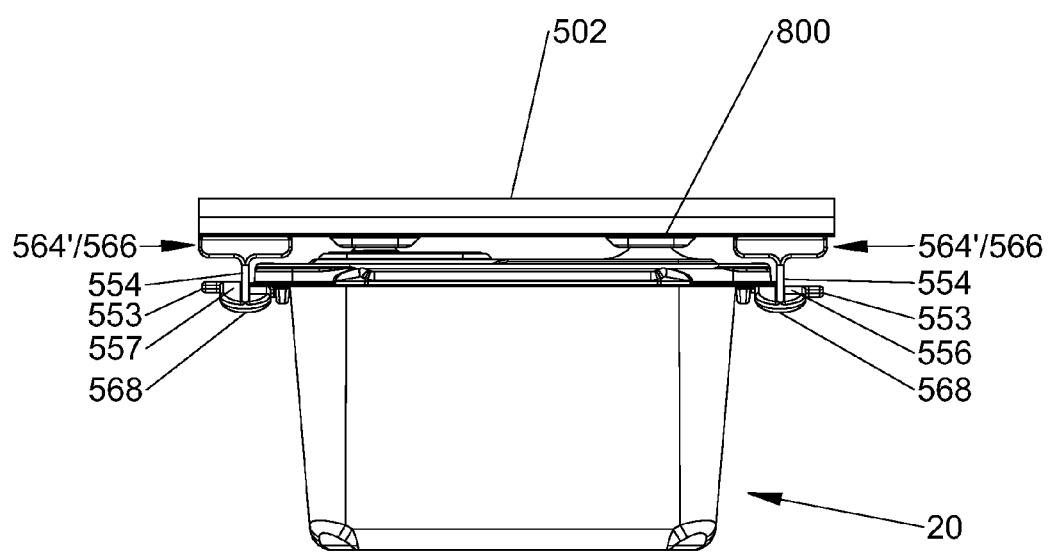
FIG. 85 illustrates a front view of a cage embodiment in effective connection with a support member embodiment, held between two cage mount assembly embodiments. The view illustrated in FIG. 85 shows only a single cage mounted into a single cage slot of a rack embodiment described herein. Differences between embodiments illustrated in FIG. 85 and FIG. 59 include the configuration of the cage mount assemblies and cage mount front modules. The alternate cage mount assembly illustrated in FIG. 85 includes cage mount guide rail stop 553. The cage mount assembly illustrated in FIG. 59 does not include cage mount guide rail stop 553. In some embodiments, cage mount front module (e.g., reference character 562 in FIG. 61A-B) is cage mount front module reader 564' in some embodiments, and in certain embodiments, cage mount front module is cage mount front module plug 566. The cage mount front module illustrated in FIG. 59 is a cage mount front module plug 566.
Figure 87A:
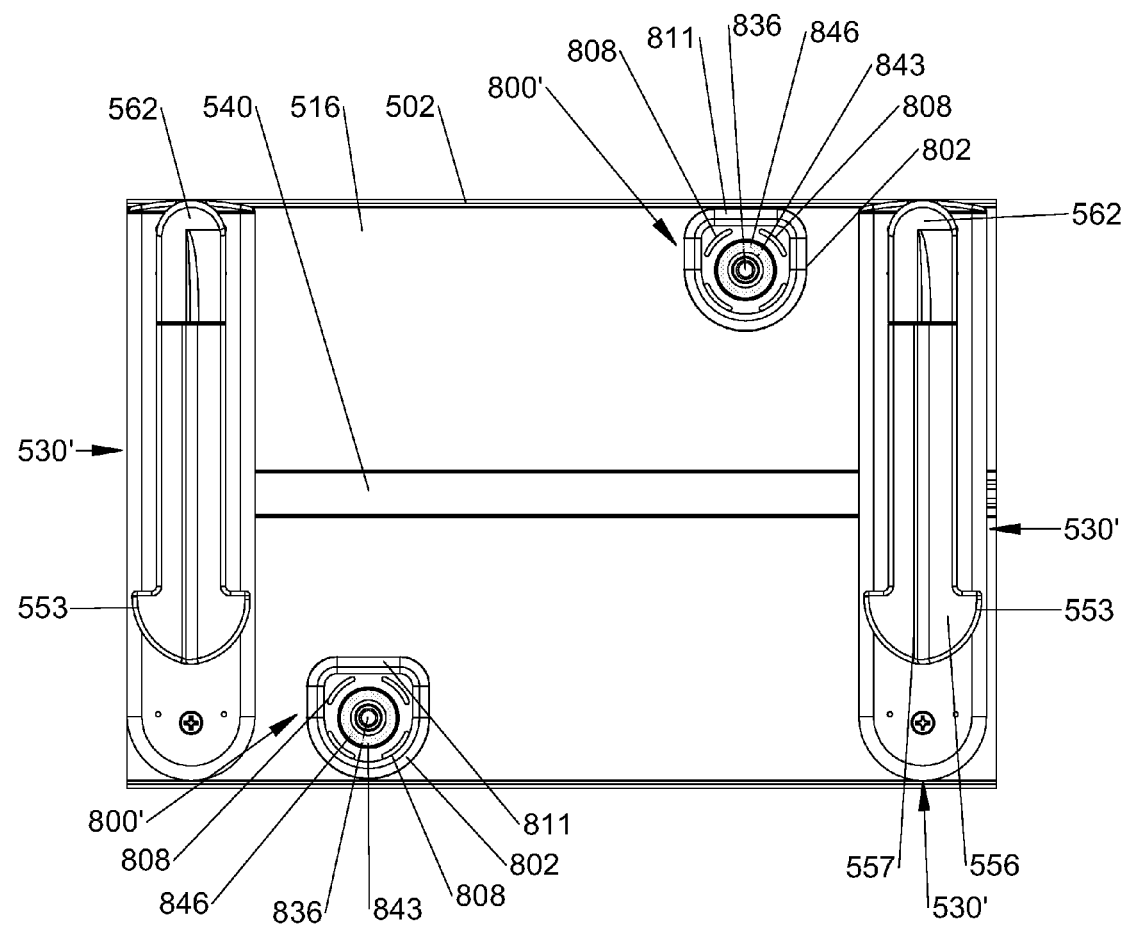
FIGS. 87A and 87B are bottom views representing a single cage position in a support member embodiment including cage mount assemblies and cage protrusion connection assemblies.
Figure 87B:
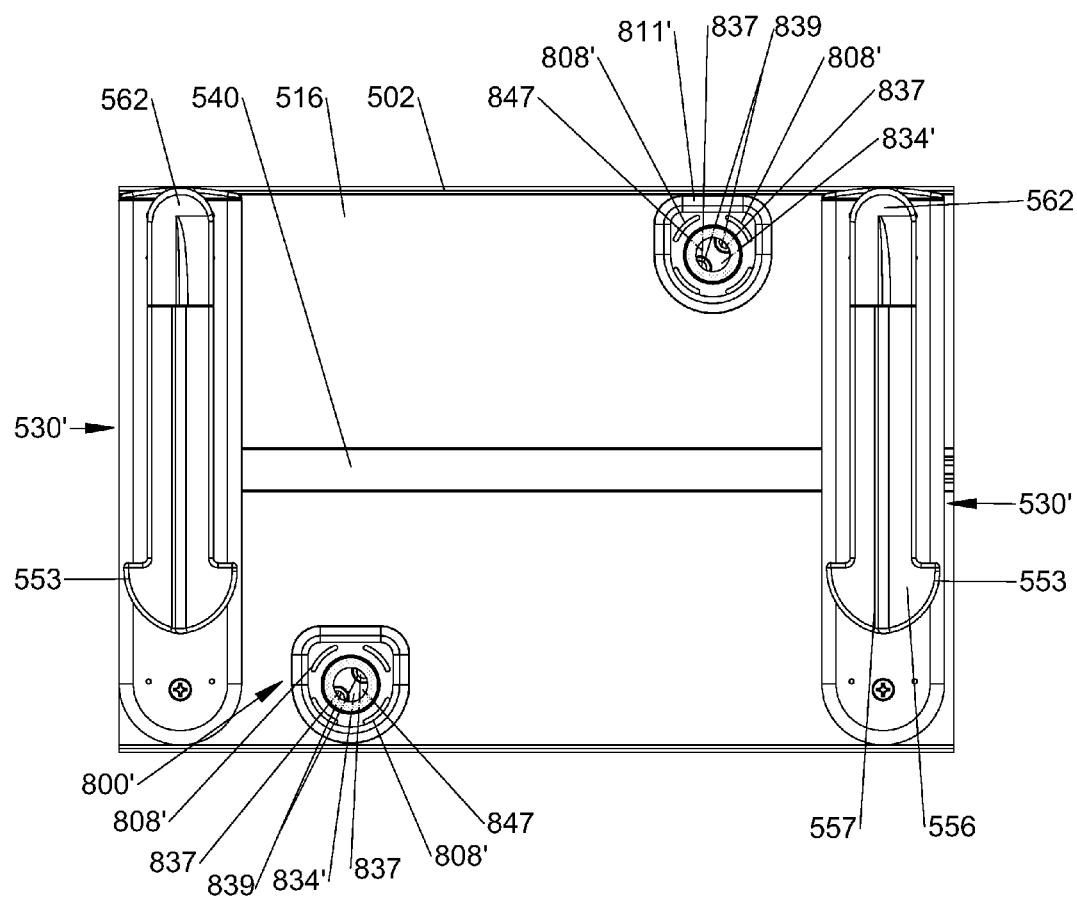

With reference to FIGS. 24-27, 36-37, 47A-47B, 50A-50B, 51, 56-57, 60, 70-71, 77A-77B, 80A-80B and 81 circuit board hub 900, 900' attached to rodent containment cage 500 includes an identifier for the cage configuration of cages 20 in rack 500, in some embodiments. In certain embodiments the identifier includes circuit board 902. Circuit board hub 900 also includes a receiver for wiring from the rack, a connector for a control unit and a receiver for electrical power. In some embodiments, the receiver for wiring from the rack includes communication medium receptacle 912, and in certain embodiments, communication medium receptacle 912 is an eSATA receptacle. In embodiments illustrated in FIGS. 70-71 and 77, an eSATA communication medium receptacle is present but not visible in the views FIGS. 70-71 and 77. In some embodiments, a connector for a control unit includes controller port 910, and in certain embodiments, controller port 910 is a category 5 twisted pair high signal integrity (e.g., CAT5 or CAT-5) cable receiver or port. In some embodiments, a receiver for electrical power includes a Deutsch receptacle 906. In certain embodiments (e.g., embodiments illustrated as 900') a Deutsch receptacle 906 is not included. Circuit board hub 900 also includes bores 904 for mounting to air connector plate 584, 586, and blind mate connector 908.

Circuit board hub 900, 900' functions to (i) distribute power from power supply 740, via power supply wires 742 and (ii) distribute signal and information from various sensors or control boards (e.g., blower control boards 920, other circuit board hubs 900, 900', master controller board 930, and combinations of the foregoing). Information is distributed between various controller boards using communications recommended standard 485 (e.g., RS-485) bridge. Circuit board hub 900, 900' also includes a 12 volt (12V) power input and 3.3V buck mode switching power supply (not shown) to supply power to cage mount front module readers 564, as well as a 3.3V logic level serial bus (TTL) interface for communication with cage mount front module readers 564.

Blower Control Board

A blower control board can generally include one or more receivers or connections for electrical power and one or more communication media and identifiers. Identifiers can encode any information related to a rack and cages. In a certain embodiments, an identifier encodes information related to the configuration of the cages in a rack, the number of racks on a trolley (e.g., single cage rack embodiment, dual cage rack embodiment), and/or the number of blowers in effective connection with the rack. Such information can be communicated to a fan unit such that it adjusts accordingly.

In some embodiments, a blower control board is in effective connection to a modular blower system which in turn is in effective connection with a rack unit.

With reference to FIGS. 45A-45B, 46A-46B, 74, 75A-75B, and 76A-76B blower control board 920 includes connector 922, which functions to functionally and physically connect blower control board 920 and circuit board hub 900, 900'. Blower control board 920 also includes a connector (not shown) which functionally and operationally connects pressure sensor ports 616, 716 (see FIGS. 43A, 43B, 44A and 44B) to blower control board 920 in modular blower system 600, 700 base 620, 621, 720, 721. Blower control board 920 functions to control the flow of air into and out of cage rack 500 by monitoring differential pressure developed by fan units 604, 704 of modular blower system supply blower 600 and exhaust blower 700. Fan 604, 704 (see FIGS. 42A and 42B) speed is regulated via proportional/integral servo software algorithms by matching fan speed to a differential pressure set point. In some embodiments fan speed curves are stored in blower control board 920, and in certain embodiments fan speed curves are stored in rack controller 930.

Blower control board 920 includes a 12V power input and an RS-485 communication bridge to allow communication via an American standard code for information interchange (e.g., ASCII) Modbus. ASCII modbus is a serial communications protocol often utilized to enable communications between electrical components in the same network. Blower control board 920 also determines functional status of fans 604, 704 by monitoring fan tachometers to sense a locked fan rotor. Identification of a locked fan rotor initiates a shutdown of the inoperative fan and/or entire modular blower system if the blower in question has only 1 fan, and also communicates an error message to rack control board 930.

Rack Controller Board

A rack controller board can generally include one or more receivers or connections for electrical power and one or more communication media and identifiers. Identifiers can encode any information related to a rack and cages. In a certain embodiments, an identifier encodes information related to the configuration of the cages in a rack, the number of racks on a trolley (e.g., single cage rack embodiment, dual cage rack embodiment), and/or the number of blowers in effective connection with the rack. Such information can be communicated to a fan unit such that it adjusts accordingly. In some embodiments, a rack controller board is in effective connection to a (i) on or more circuit board hubs, (ii) one or more modular blower systems which in turn are in effective connection with a rack unit (iii) one or more cage mount front module readers, and (iv) a power supply.

With reference to FIGS. 26-30, rack controller 930 functions are the master controller for all systems included in cage rack 500 (e.g., cage ID readers, modular blower systems, power distribution, communications, the like and combinations thereof). Rack controller 930 includes a 12V power input for supplying power to the graphical user interface utilized by a user to monitor rack status and/or input information. Rack controller 930 also includes wired and wireless communications capability (e.g., RS-485, Wi-fi, respectively) and a USB host port.

Rack controller 930 functions to calculate the appropriate differential pressure to each blower control board from user flow and differential flow set points. Rack controller 930 can store user input information in some embodiments, and in certain embodiments also logs various operational parameters of cage rack 500 including, but not limited to actual air flow, pressure values, error alarms or messages. Rack controller 930 can use information obtained from various identifiers for calculations used in rack operation. In some embodiments, an identifier may monitor cage conditions such as air pressure in a cage rack. In certain embodiments, an identifier may be determined using data from other identifiers, and in some embodiments, an identifier may be used to initiate changes to cage conditions based on data obtained or determined from other identifiers (e.g., change fan speed based on differential air pressure measurements).

Sensors

Sensors may be included of any variety of configurations or types that may be used to monitor conditions within each individual cage supported by the rack system. Some of the cages status parameters that may be monitored within each cage interior by remote sensors or other means may include the presence or level of viruses or bacteria, heat, noise, ammonia levels, carbon dioxide levels, carbon monoxide levels, humidity levels, air pressure levels, and the like. Sensors may monitor visual movement, olfactory changes, tactile changes, as well as auditory levels. Other parameters that may be monitored may include total animal weight within each cage, animal physical activity and/or body heat within each cage or other animal behavior or dynamics within each cage. Thus sensors may be in the form of a video camera, heat sensor, weighing apparatus and the like. For some embodiments, sensors that determine one or more of the above parameters may be disposed within each cage but also may be disposed within a conduit of the shelf assembly or plenum adjacent the shelf assembly. In certain embodiments, a rack includes an airflow or air pressure sensor. The sensor sometimes may be in connection with one or more tubes, conduits and/or metering nozzles. Any desired sensor or sensors may be disposed within the supply and exhaust passageways of the plenum, within the conduits an of the shelf assembly, within an interior volume of the cage assembly or at any other suitable position within the rack assembly.

Each sensor also may be operatively coupled to the controller in order to communicate the sensor's reading to the controller such that the sensor's data may then be processed and displayed on the graphic user interface. The information received from sensors and the information received from identifiers may be used together by the controller in order to locate cages or produce reports/status and the like to maintenance personnel.

An example of a sensor may be seen in FIGS. 8 and 21. FIG. 8 shows a perspective view of an embodiment of a cage 20 assembly suitable for use with the modular rack system 210. The sensor 140 is a remote sensor which monitors the cage interior. FIG. 21 shows a bottom view of the shelf 300 assembly of FIG. 6. Sensors 340 are disposed within the supply and exhaust passageways of the rack assembly and monitor airflow. These sensors may be directly coupled to the controller. FIG. 21 also shows the rim or lip portion 308 which extends around the perimeter of the shelf 300. The reader shelf mount 408 is fastened onto the rim 308. Also shown is the frame member 278 of the shelf 300 with a rail 276. In some embodiments, sensors can be disposed within the supply and exhaust passageways of rack embodiment 500 (e.g., within support member plenums 508, 510, side member plenums 522, 524 or support member plenums and side member plenums).

Some of the cage status parameters that may be monitored within each cage interior by remote sensors or other means may include the presence or level of viruses or bacteria, ammonia levels, carbon dioxide levels, carbon monoxide levels, humidity levels, air pressure levels, and the like. Cage content identifier data also aids in monitoring caged animals as well as the cage environment. Other parameters that may be monitored by sensors and/or identifiers may include total animal weight within each cage, animal physical activity within each cage or other animal behavior or dynamics within each cage.

Processors, Controllers and Servers

An animal containment system can include one or more processors, controllers and servers (e.g., main, local or remote server) in a convenient and suitable combination and configuration to carry out functions described herein. Systems described herein can allow for lab personnel to have the ability to reliably and conveniently monitor the interior conditions of each individual cage supported by a rack system with cage status information being conveniently and efficiently displayed.

In some embodiments, the rack system includes a controller and/or main/local server that may be coupled with, or be in wireless communication with, a blower assembly, one or more sensors, one or more readers and one or more indicators which are in association with identifiers in order to manage, maintain, track, and monitor a plurality of cages within the system. Identifiers provide data regarding the contents of the cage, data regarding the animals, inventory of non-cage items used for maintenance, cage components, users and/or maintenance personnel, location of the cages and the like. Sensors can include any of a variety of configurations or types that may be used to monitor conditions within each individual cage supported by the rack system (e.g., described in section herein entitled "Sensors"). The data obtained by the controller from the identifiers, sensors and/or other sources may be processed by a computing system disposed within the controller or any other suitable location in the system that may include a processor and data storage device and then displayed to a user. A display can be by an indicator (e.g., described herein) and/or on a graphic user interface in a convenient visual display format.

For some embodiments, a graphic user interface may contemporaneously display an icon or the like for each containment cage supported by a given rack system. For some embodiments, the icons displayed on the graphic user interface may be positioned on the screen in a configuration corresponding to the configuration of the actual cages of the rack system. In other words, a facsimile of a front view of a side of the actual rack system may be displayed on the screen of the graphic user interface such that lab personnel may immediately and intuitively assess the status of any of the cages on the rack system. The physical location of cages needing immediate attention may be identified to lab personnel by indicators/readers positioned on the shelf of each cage or in the vicinity of each cage. For some embodiments, the indicators and/or cage icons of the graphic user interface may use a color coded display to efficiently and rapidly convey cage status information to lab personnel. For example, if parameters are being monitored and processed are directed to determining the appropriate time to change a disposable cage to a new unused cage, different colors displayed by the indicators or graphic cage icons may be used to indicate the proximity of a necessary change. If the indicator and/or graphic cage icon color is green, no change is necessary, if the color is yellow, a change may be necessary soon and a red color may be used to indicate the need for an immediate cage change. If the color coding of the indicators near the cages and/or cage icons in a display on a graphic user interface is directed to cage change status information, lab personnel may select either or both of these parameter and view the indicators and/or icons at once to determine whether any cage changes are immediately necessary based on the presence of any red colored indicators and/or icons on the display. A similar scheme may be used for other parameters such as ammonia levels. If the lab technician selects ammonia level status, the color coding of the indicators/icons may then be switched to indicate whether ammonia levels are low, high or intermediate based on the different colors. Color coding may be used to indicate the need for attention by a veterinary professional for some embodiments.

A controller also may have such features as wireless access to an intranet or internet or other wireless device(s). The controller may either directly or indirectly be connected to a printer for printing reports, summary of experiments, documentation, inventory lists, bills, spreadsheets and the like. The controller may support video and audio functions as well as automated features such as sending an automated audio message or attached documents to a specified phone or emails, faxes and the like in response to an emergency situation, an alert, a warning or as a reminder or for monthly billing, inventory statements, summary of experiments, animal health status and the like. An electronic log of persons accessing the controller, time, duration and operations performed as well as information monitored by the identifiers and/or sensors may be stored in the controller's data storage. The display also may have a touch screen as well as a virtual keyboard displayed on the screen or a manual keyboard as part of the device and a speaker for voice recognition/input. The controller of each rack also may be in direct or wireless connection to a rack server. The rack server and/or management software system may coordinate schedules for all cages within the rack, manage maintenance, monitor all identifiers and sensors, and efficiently process all information through a user friendly display similar to those of the individual controllers. In some embodiments, the rack server and/or management software system may add information to one or more cages in a rack system, where the added information is added to the management software regarding cage component information, or directly to the cage by means of a read/write capable identifier.

Data from each identifier, which is manually recorded and/or detected by a reader or device, and each sensor can be received by or coupled to the controller to be processed and displayed on the graphic user interface.

As used herein, software or software modules refer to computer readable program instructions that, when executed by a processor, perform computer operations. Typically, software is provided on a program product containing program instructions recorded on a computer readable storage medium, including, but not limited to, magnetic media including floppy disks, hard disks, and magnetic tape; and optical media including CD-ROM discs, DVD discs, magneto-optical discs, and other such media on which the program instructions can be recorded. Software may be a computer program used to direct the operation of a computer. Software may be anything that is not hardware but is used with hardware. Software may be downloadable, portable, installed and/or accessed via an internet/wireless connection.

An algorithm stored in software and/or memory can be of any suitable type. In mathematics, computer science, and related subjects, an algorithm may be an effective method for solving a problem using a finite sequence of instructions. Algorithms are used for calculation, data processing, and many other fields. Each algorithm can be a list of well-defined instructions for completing a task. Starting from an initial state, the instructions may describe a computation that proceeds through a well-defined series of successive states, eventually terminating in a final ending state. The transition from one state to the next is not necessarily deterministic, for example, some algorithms incorporate randomness. By way of example, without limitation, the algorithm(s) can be search algorithms, sorting algorithms, merge algorithms, numerical algorithms, graph algorithms, string algorithms, modeling algorithms, computational genometric algorithms, combinatorial algorithms, machine learning, cryptography, data compression algorithms and parsing techniques and the like. An algorithm can include one or more algorithms working in combination. An algorithm can be of any suitable complexity class and/or parameterized complexity. An algorithm can be used for calculation or data processing, or used in a deterministic or probabilistic/predictive approach to a method in some embodiments. Any processing of data, such as by use with an algorithm, can be utilized in a computing environment, by use of a programming language such as C, C++, Java, Perl, Python, Fortran, and the like. The algorithm can be modified to include margin of errors, statistic analysis, statistical significance as well as comparison to other information or data sets (for example in using a neural net or clustering algorithm).

A database stored in software and/or memory can be of any suitable type. A database may be a comprehensive, systematic collection of related data organized for or manipulated to convenient, immediate access. A database also may be one or more large structured sets of persistent data, usually associated with software to update and query the data. A simple database might be a single file containing many records, each of which contains the same set of fields where each field is a certain fixed width. A database also may be a collection of nodes managed and stored in one place and all accessible via the same server. Links outside this may be "external", and those inside may be "internal". A database may be accessed and or stored in any manner, such as it may be downloadable, portable, installed and/or accessed via an internet/wireless connection. One or more databases may be used separately and in conjunction with one other. A database may be of any size, storing any amount of information or data. A database may store a few kilobytes of information or up to several thousand terabytes of data. A database may be one component of a database management system. Any type of database may be used, such as an analytic database, an operational database, hierarchical database, network database, relational database, and the like or combinations thereof.

Systems, machines or hardware discussed herein may further include general components of computer systems, such as, for example, network servers, laptop systems, desktop systems, handheld systems, personal digital assistants, computing kiosks, and the like. Hardware may be the mechanical equipment necessary for conducting an activity, usually distinguished from the theory and design that make the activity possible. In a computer system, hardware may include any mechanical, magnetic, electronic and or electrical device that comprises a computer system, such as the CPU, disk drives, keyboards, speakers, printers and screens/ monitors. The computer system may include one or more input means such as a keyboard, touch screen, mouse, concept keyboards, light pens, tracker balls, joysticks, graphic tablets, scanners, digital cameras, video digitizers and voice recognition devices. or other means to allow the user to enter data into the system. The system may further include one or more output means such as a CRT or LCD display screen, speaker, FAX machine, impact printer, inkjet printer, black and white or color laser printer or other means of providing visual, auditory or hardcopy output of information. Electronic storage mediums that may be used to provide instructions/data to the controller and/or main or local server or provide storage/transportation from the controller/main/local server may be for example, a removable storage device, CD-ROMS, a hard disk installed in hard disk drive, signals, magnetic tape, DVDs, optical disks, flash drives, RAM or floppy disk, and the like.

The input and output means may be connected to a central processing unit which may comprise among other components, a microprocessor for executing program instructions and memory for storing program code and data. In some embodiments the methods may be implemented as a single user system located in a single geographical site. In other embodiments methods may be implemented as a multi-user system. In the case of a multi-user implementation, multiple central processing units may be connected by means of a network. The network may be local, encompassing a single department in one portion of a building, an entire building, span multiple buildings, span a region, span an entire country or be worldwide. The network may be private, being owned and controlled by the provider or it may be implemented as an internet based service where the user accesses a web page to enter and retrieve information.

The present methods may be implemented using hardware, software or a combination thereof and may be implemented in a computer system or other processing system. An example computer system may include one or more processors. A processor can be connected to a communication bus. The computer system may include a main memory, preferably random access memory (RAM), and can also include a secondary memory. The secondary memory can include, for example, a hard disk drive and/or a removable storage drive, representing a floppy disk drive, a magnetic tape drive, an optical disk drive, memory card etc. The removable storage drive reads from and/or writes to a removable storage unit in a well-known manner. A removable storage unit includes, but is not limited to, a floppy disk, magnetic tape, optical disk, etc. which is read by and written to by, for example, a removable storage drive. As will be appreciated, the removable storage unit includes a computer usable storage medium having stored therein computer software and/or data.

The computer system may also include a communications interface. A communications interface allows software and data to be transferred between the computer system and external devices. Examples of communications interface can include a modem, a network interface (such as an Ethernet card), a communications port, a PCMCIA slot and card, a wireless digital controller, etc. Software and data transferred via communications interface are in the form of signals, which can be electronic, electromagnetic, optical or other signals capable of being received by communications interface. These signals are provided to communications interface via a channel. This channel carries signals and can be implemented using wire or cable, fiber optics, a phone line, a cellular phone link, an RF link, an IR link, and other communications channels. Thus, in one example, a communications interface may be used to receive signal information to be detected by the signal detection module.

Figure 10:
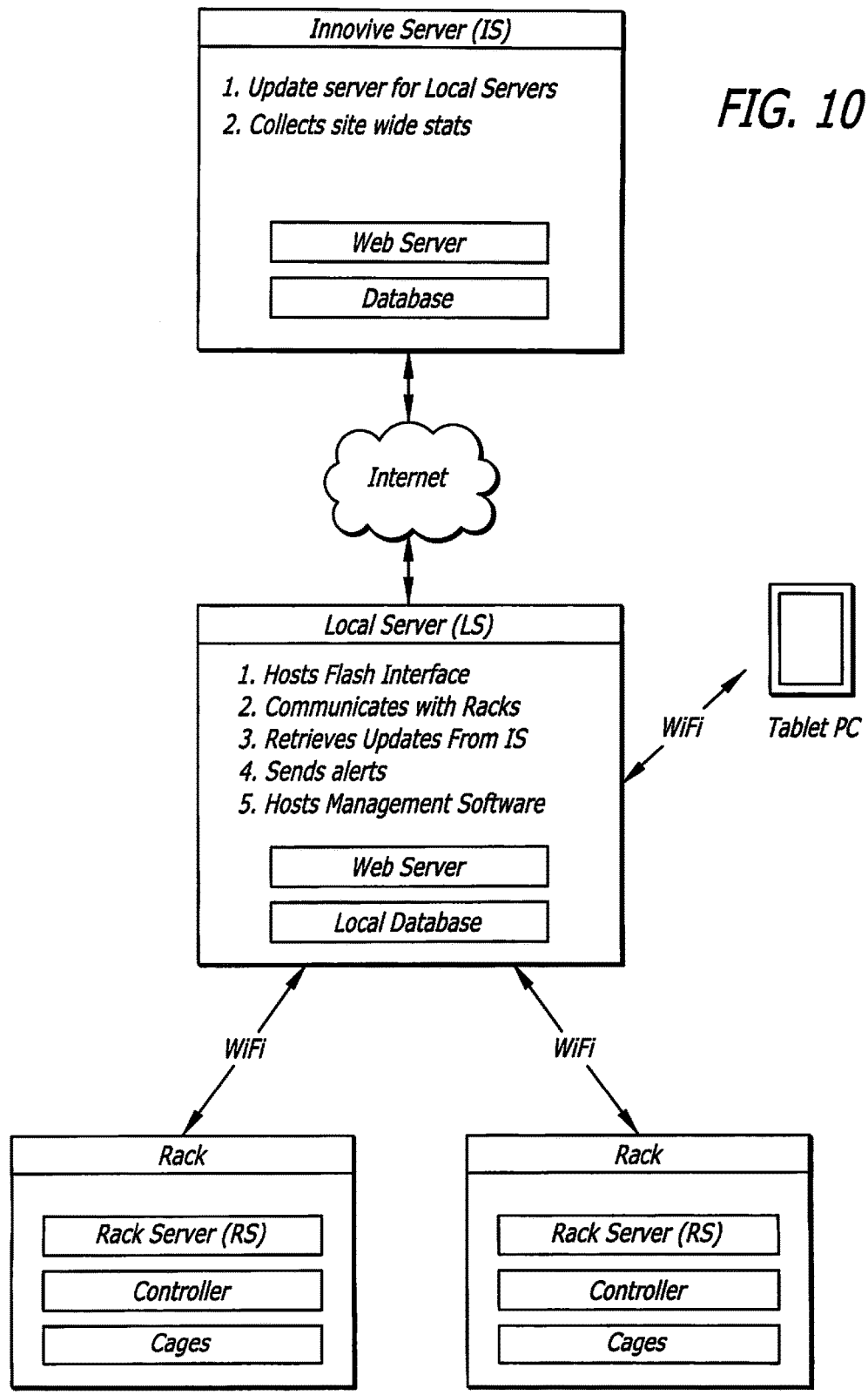
FIG. 10 is an embodiment of an architecture system for the operational rack system.

FIG. 10 illustrates the system architecture of the controller 230 embodiment which maintains information regarding containment cage status. The three levels of servers for the rack, local and main servers can each act alone or in combination with each other. FIG. 10 shows an example of two rack systems each having their own rack server (RS), controller 230, and one or more cage assemblies. The rack systems may be connected either by hardware or wireless connection (as depicted in FIG. 10) to one or more local servers (LS). The local server (LS) may serve several functions or be programmable to have additional functions. The local server may host any type of user interface, such as a flash interface, communicate with one or more rack systems, retrieve updates from a main server, send or generate alerts (e.g., alarm by room, alarm by build, alarm by site, administrative communication (e.g., pages, texts, email)), report generic status to the main server, function as a web server and local database, provide backup to the individual rack servers, provide extra memory for the controller, and host a management software system. The local server also may be directly connected or wirelessly connected to a user friendly portable device such as a smart phone or tablet personal computer, which may be handheld and easily accessed by users while performing maintenance on cages within a rack system. Such a feature provides easy of use in order to maintain a log of services and/or costs per cage or update information into the database. The local server can have a programmable processor that monitors the rack settings as well as log maintenance and export the information into a graphical display, such as a bar graph which can be viewed on a viewing device, a digital controller, a smart phone or table PC, for example. The main server (for example an Innovive Server—IS) may be wireless in communication to the local server in order to send updates or maintain programs or functions for each server. The main server may also collect site wide status for various locations and provide a hosting network as well as a management software system. The main server may also act as a web server, offer customer support when a need arises and maintains a backup database and/or extra memory space. A rack system need not use a local server or main server but be self sufficient. In another embodiment, one or more rack assemblies may only use one local server. In yet another embodiment, a rack system may use only a main server without a local server. Any combination of system architecture is possible.

Management Software

Any type of software that can manage, handle, direct and/or control maintenance of the cage system may be used. Such management software may have specific modules that perform certain functions, or the software may utilize or access other sources or software that can either perform tasks and/or give data which aids in managing the cage system. The management software may be stored/housed and/or accessed within a main, local and/or remote server. The management software also may be located in the controller. The software may also include other software, which performs such tasks as scheduling, cost control, budget management and billing, tracking, relational database management, communication, documentation or reporting, and/or administration systems or user access, which may be used to manage one or more cage racks/systems found in one or more locations. For example, the software system may track all animal colony information and related research data, from animal information (e.g. names, date of birth, genotypes, pedigree, or any other defined field), cages information (e.g. location, setup date, transferring history, cleaning schedule etc.), experiments, measurements, and the like. Scheduling may include sending convenient reminders with e-mail options may aid in managing the animals/cages and experiments more efficiently. Scheduling also may include management of support personal and/or resources (re-order reminders, stock levels of one or more cage components, and the like). Use of the software system may reduce cost, for example by removing extra cages or animals not in use.

Identifier data and information from other sources may be used alone or in combination with identifier data which may include caged animals or specimen housed within the cage, or environmental conditions or cage/rack information. For example, information from the controller regarding the current environmental conditions of the caged animals may be cross referenced via the internet for information regarding appropriate oxygen, ammonium, and carbon dioxide levels for particular animals in order to determine whether the caged environment is appropriate and to notify maintenance personnel. Such current environmental conditions may be received by the controller from a sensor. Information about the number of animals in a cage and the type of animals in a cage may be send to the controller from a cage content identifier. Other data sources, such as simulated data or database information, for example, may be received or downloaded from another computer or processor or by any known method such as for example, via the internet, via wireless access, via hardware such as a flash drive, manual input, voice recognition, laser scanning, bar code scanning, and the like. Such external information may be accessed, cross-referenced, integrated, manipulated, compared and downloaded with the internal information in the controller and/or local server manually by a person, automatically via a machine, programming and/or an algorithm, or in response to an alert or certain threshold indicators such as a sensor or on a by need basis, for example. Prediction algorithms may be used in order to determine significance or give meaning to the data collected under variable conditions that may be weighed independently of or dependently upon each other.

The data or information gathered from the various identifiers such as the cage content, cage user, cage component, and/or cage condition identifiers may be reported, documented and/or displayed in any form (i.e. digital data) and transformed or created into representations of that data, such as for example into a graph, a 2D graph, a 3D graph, and a 4D graph, a picture, a pictograph, a chart, a bar graph, a pie graph, a diagram, a flow chart, a scatter plot, a map, a histogram, a density chart, a function graph, a circuit diagram, a block diagram, a bubble map, a constellation diagram, a contour diagram, a cartogram, spider chart, Venn diagram, nomogram, and combination thereof.

It may be appreciated that many applications of the present invention could be formulated. The management software may access or include any other system, hardware or software for exchanging or processing data or transacting business, such as the Internet, an intranet, an extranet, WAN, LAN, satellite communications, and/or the like. The users may interact with the system via any input device such as a keyboard, mouse, kiosk, personal digital assistant (e.g., Palm Pilot), handheld computer, cellular phone, smart phone, tablet and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. The software system may be shared with group members while having full security control. Because the software system is portable and/or accessible anywhere with internet connection, the information/data stored/accessed will be accurate, with no synchronization needed.

Processing Data/Statistical Analysis

A management software system may be included in a system and can use any variety of statistical analysis software and/or modules to help properly manage the cage system. Statistical methods, algorithms and/or software modules can be applied to process data collected by the identifiers, sensors and other sources described herein. The controller, main, and/or local server may aid in applying such statistical methods, algorithms, and/or software modules to the gathered data in order to pre-process or standardized or normalize it in order to process it into a format that is understandable or can conform and hence be compared with other data. One or more of statistics, probability theory, data mining, pattern recognition, artificial intelligence, adaptive control, theoretical computer science or any algorithm can be employed for recognizing complex patterns and making intelligent decisions or connections within the data, for example.

The data or information gathered from various identifiers such as the cage content identifiers, cage user identifiers, cage component identifiers, and/or cage condition identifiers may be pre-processed, standardized or normalized to conform to a particular standard. For example, a pre-processing step sometimes aids in normalizing data when tracking environmental conditions over a particular period of time when comparing two different animal types which require different amounts of oxygen. Pre-processing may involve removing irrelevant data, outliers, or false-positives, for example. Normalization can be carried out in a variety of manners. For example, oxygen requirement data can be normalized across all samples by subtracting the mean or by dividing the oxygen values by the standard deviation to obtain centered data of standardized variance. Other examples of normalizing data is by using the log median intensity protocol, applying a median intensity normalization protocol in which raw intensities for all spots in each sample are normalized by the median of the raw intensities, or using the Z-score mean absolute deviation of log intensity protocol, for example. In some embodiments, intensity background correction is used to normalize measurements.

Statistical analysis or comparison may alert a user or personnel of human error. For example, when an animal has been placed in the wrong cage location based on past/current weight change at a specific cage location within rack after cages have been taken out of the rack for maintenance, statistical analysis software, algorithms and/or software modules may identify the two or more cages which were switched from their previous location within the rack. In other embodiments, statistical analysis may detect when a soiled component is reused or not changed out within a cage after maintenance has been performed based on weight or odor of the soiled component verses a new component. Such analysis may aid in identifying anomalies or experimental errors, for example, when one experimental animal is not performing as expected, genetic lineage, cage history, vet history and the like may aid in excluding that animal from the experiment.

Electronic Modules

An electronic, computer or digital module may be a separate component that can be interchangeable with other electronic modules, or optionally embodied in software, that is stored on a program product. An electronic module may be a self-contained segment designed to perform a particular task and/or part of a program that performs a distinct function. A module also may be a plug-in hardware unit, and/or a downloadable, portable, installed software program and/or accessed via an internet/wireless connection. Modules may reside in or be part of the management software system, controller, local server and/or main server.

The management software system, controller, local server and/or main server may have any modules necessary to maintain, manage, locate/track, and/or monitor the cages in a cage rack system. Modules may include a receiving module, an association module and a data display module and the like.

A receiving module may receive any type of data, signal, and/or information by any manner. By "receiving" or "obtaining" information is meant receiving, providing and/or accessing the signal information by computer communication means from a local, or remote site, human data entry, or any other method of receiving signal information. The information may be generated in the same location at which it is received, provided, accessed, or it may be generated in a different location and transmitted to the receiving, provided or accessed location. Received information may be stored locally, remotely, off-site, or transmitted elsewhere. The information may be digital or electronic information.

A receiving module may receive all information detected by readers in connection with the controller on the cage rack system as well as handheld readers or readers functioning remotely. Information detected by readers may be identifier data such as cage content data which relates to the occupancy of the animal cage such as the number and type of animals in a cage, the owner of a cage, the age of an animal, the sex of an animal, the pedigree of an animal, the experimental procedure planned for an animal, the observations/notes by a cage user, and the like. Readers may also detect cage user data which may contain information regarding users or personnel of the rack system or of one or more cages such as the personnel accessing a cage, the time of cage access, the date of cage access, the purpose of cage access and the like. Readers may also detect cage component data which may label or identify which object the identifier is located on, for example a cage lid component, a cage base component, an air supply component, an air exhaust component, a water supply component, a sensor component, a filter component, a baffle component or a feeder or components of a cage and the like. Readers may also detect cage condition data which may contain information regarding any conditional changes made to the inside or outside of the cage itself or any materials used in maintenance of the cages, such as a food change, a water change, a medicine administered to the occupants of the cage, a bedding material change, a filter change, a syringe administered to one or more animals, a glove used by personnel cleaning the cages, cleaning supplies used to clean the cages or the like. Cage condition data may also contain a time/date stamp of when the non-cage material was used or administration of a procedure in the cage or when the cage was maintained.

A receiving module may receive all information from all other sources of the cage rack system, such as the sensors, manual entry by a user, electronic messages to the system (i.e. emails, audio messages, faxes, document upload and the like), internet access and the like. Thus the receiving module may have access to or be in communication with or receive information from variety of different hardware and software components.

An association module may have access to data or information received by the receiving module in order to sort, track, manage, maintain, and establish relationships between the data. By "associating" or make an "association" and the like, is meant connecting, joining, linking, accompanying, sharing or making a relationship between objects, data and the like. An association module may be similar to or work in collaboration with a relational database. A relational database is an electronic database comprising data of related information, which allows links to be established between separate data that have matching fields, and responds to queries by a user regarding the data. Thus an association module receives data from the receiving module, associates the data into a relational database, and can identify objects and/or data or relationships in the data for the entire database.

For example, associations may be based on cage content data and/or cage content identifiers also known as cage card data/identifiers. The cage content data relates to the occupants of the animal cage and all cage content identifiers track actions, events, history and the like to be processed into or be added to the cage content data. Cage content data may begin with all the information on the physical cage card of each cage but additionally may contain more information regarding the occupants. All other identifiers (cage component, cage condition and cage user) and all other data (cage component, cage condition and cage user) may be associated with their corresponding cage content data and/or cage content identifier.

For example, a cage content identifier may be located on the front side of the cage bottom as well as on the flange of the cage bottom or on the flange of the corresponding cage lid, such that the identifiers for the lid, bottom and cage content may be in-line and easily detected by a reader mounted to the shelf of the cage. The receiving module receives the three identifiers' information from the reader, which may record time/date of when the cage was returned to the shelf, such that the association module then has access to the information. The association module then associates all the information based on or linked to the cage content identifier. If the cage bottom is changed and a new cage bottom identifier is detected by the reader with the cage lid identifier and the cage content identifier, the new cage bottom identifier will then be associated with that cage content identifier. The change in bottom identifiers will be processed or recorded/tracked as a change in a cage component, and specifically with a cage bottom. Such recording/tracking may aid in keeping accurate inventory of cage and non-cage items. Another example may involve a cage user such that when a user or lab personnel accesses a cage, the user must identify him or herself to the system to gain access by any means such as by password, pass code, voice recognition, identify verification and the like. Once the user has successfully accessed the rack system, the cage user identifier has been received by the receiving module, the association module having access to this information will associate the user with whichever cage content identifier is detected until the user logs out of the system. Such that if the user accesses two cages, then the user's cage user identifier will be associated with those two cage content identifiers within the time frame of when the user was logged into the rack system. Since those two cage content identifiers are associated with other identifiers such as cage component identifiers, then the user accessing the two cages will also be associated to the corresponding cage component identifiers because they are linked together by the cage content identifiers.

The association module may aid in determining user error, for example if two cage lids were accidentally switched, the association module would identify the error because the corresponding cage lid identifiers and their cage content identifiers would be detected at different locations and/or detected by different readers at possibly different times when the cages are place and read by readers into the shelves. A comparison of past associations with current associations also may be performed. A warning of possible human error may be trigger graphically via the controller and/or light indicators on the readers of the cages that were problematic.

Association may be user-defined or pre-programmed. As discussed above, if a cage content identifier and cage component identifier are detected by a reader at the same time/location within a rack system, then they may be associated or linked. This may be an example of a pre-programmed association based on same location and same time detected. Association may be based on identifiers being detected by the same reader, identifiers being detected at relatively the same time period, and the like. Also, a comparison of past associations with current associations also may be performed and pre-programmed. Associations also may be user-defined or re-programmed by approved personnel. If a user is changing cage components, then a re-programming instance may be allowed, for example. Thus the association module associates data or electronic/digital information and may be software based or uses only software.

A data display module may have access to all the associated data or information linked by the associated module in order to display data or organize the data or is a reporting function to the user. A data display module also may be referred to as a reporting module or a documentation module, and in some embodiments may display a report generated from a separate report module. A data display module may present or display data and/or associated data in any form to the user, such that the data presented is virtual, reproducible, orally, tactually, olfactorily, and/or printed representations of associated data by generating a list, an inventory report, security report, productivity report, graphics, a photograph, a virtual display of a rack module, a spreadsheet, a table, a graph, a 2D graph, a 3D graph, 4D graph, a picture, a pictograph, a chart, a bar graph, a pie graph, a diagram, a flow chart, a scatter plot, a map, a histogram, a density chart, a function graph, a circuit diagram, a block diagram, a bubble map, a constellation diagram, a contour diagram, a cartogram, a spider chart, a Venn diagram, a nomogram, combinations thereof and the like. The data display module may display the raw data, which is not associated. For example, the data display module may display a cage content identifier, cage component identifier, cage user identifier and cage condition identifier. The data display module may also display cage content data, cage component data, cage user data and cage condition data. The data display module may organize the associated date into easily recognizable, parsed, structured, and defined data such that the user may analyze the data in a managed fashion. For example, the data display module may display cage component identifier data recorded by date or by a time interval, such as one month. The data display module carries out a reporting or documenting function that may be user-defined and/or pre-programmed. The reports or documents that the data display module presents to the user may be static or manipulated and reformulated. The data display module may present specific reports based on user criteria and/or user query. The data display module, similar to the association module, may receive a request by a user to display information. The data display module may then access the relational or associated database, make associations with the data based on the user's query and present the data to the user. The date display module may use both software and hardware components, such as a database, printer, speaker, mister and the like.

The reports and other various forms of displayed and/or organized data may be presented to the user in a variety of ways. For some embodiments, a graphic user interface may contemporaneously display an icon or the like for each containment cage supported by a given rack system. For some embodiments, the icons displayed on the graphic user interface may be positioned on the screen in a configuration corresponding to the configuration of the actual cages of the rack system. In other words, a facsimile of a front view of a side of the actual rack system may be displayed on the screen of the graphic user interface such that lab personnel may immediately and intuitively assess the status of any of the cages on the rack system. The physical location of cages needing immediate attention may be identified to lab personnel by indicators/readers positioned on the shelf of each cage or in the vicinity of each cage. For some embodiments, the indicators and/or cage icons of the graphic user interface may use a color coded display to efficiently and rapidly convey cage status information to lab personnel. For example, if parameters are being monitored and processed are directed to determining the appropriate time to change a disposable cage to a new unused cage, different colors displayed by the indicators or graphic cage icons may be used to indicate the proximity of a necessary change. If the indicator and/or graphic cage icon color is green, no change is necessary, if the color is yellow, a change may be necessary soon and a red color may be used to indicate the need for an immediate cage change. If the color coding of the indicators near the cages and/or cage icons in a display on a graphic user interface is directed to cage change status information, lab personnel may select either or both of these parameter and view the indicators and/or icons at once to determine whether any cage changes are immediately necessary based on the presence of any red colored indicators and/or icons on the display. A similar scheme may be used for other parameters such as ammonia levels. If the lab technician selects ammonia level status, the color coding of the indicators/icons may then be switched to indicate whether ammonia levels are low, high or intermediate based on the different colors. Color coding may be used to indicate the need for attention by a veterinary professional for some embodiments.

A numeric display of the total number of cages requiring veterinary attention and the total number of cages requiring changing also may be shown both as a graphic display on the controller and digitally on the indicator/reader of each cage in the rack system. In another embodiment, numbers may be displayed within each cage icon in the controller to represent the number of animals housed within each cage. Such a display will quickly aid a user to determine which cages are empty, for example. Other features may include a password protection, messages, date/time display, menu, alerts and the like.

The graphic display on the controller may also show the air changes per hour "ACH" value which may be adjusted by toggling up and down arrows on the screen. The differential pressure between the supply conduits and the exhaust conduits indicated as "DIFF PRES" also may be displayed which is indicative of whether the cage assembly interiors have a net positive or negative pressure with respect to the ambient atmosphere. The "DIFF PRES" display also includes up and down arrows for adjustment of the relative pressures for achieving either positive or negative internal pressure within the cage assemblies. The date, time and other information also may be shown for reference by lab personnel. For some controller embodiments, various levels of access to the controller parameters and output may be controlled by requiring a passcode. For example, a pop up menu prompting a user passcode, that, when entered, will permit user access to the controller system for making adjustments and resetting parameters. Other pop up menus options may include "Configuring Your Rack", "Configuring Cage Change Schedule" and other options. Access to such configuration settings may be restricted by the passcode access to only veterinary professionals or any other suitable level or group of personnel.

Figure 11:
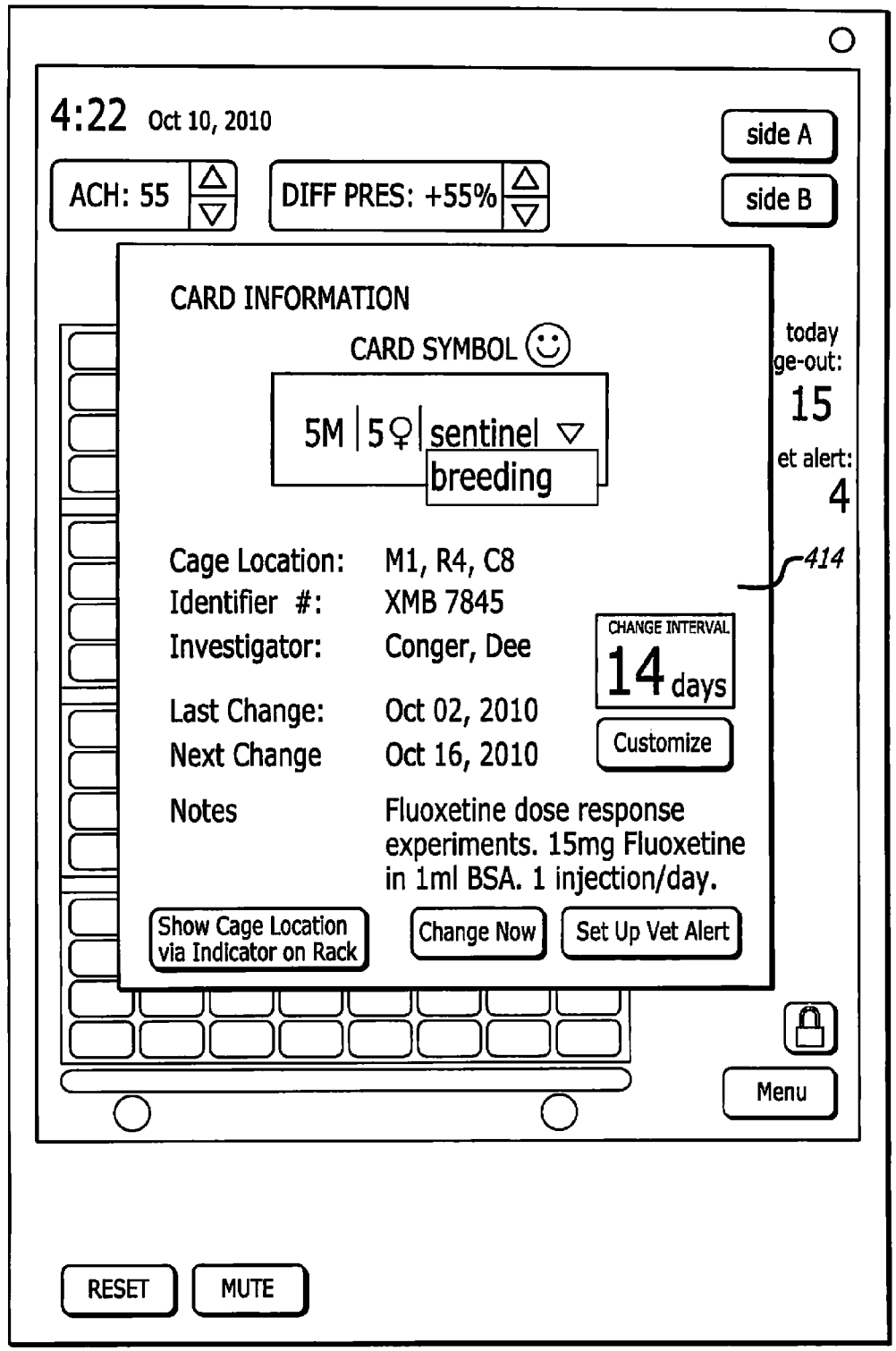
FIG. 11 is a diagrammatic screen shot of an embodiment of a controller displaying cage card information.

FIG. 11 illustrates a screen shot of a graphic user interface embodiment for a controller showing information about a cage within rack, i.e. cage card information, cage card symbol, identifier number, cage location within the rack, change interval, ACH and DIF PRES (actual and differential/target) percentages, display settings/schedule and customize rack background. In FIG. 11, an elevation view facsimile of "side A" of a rack system having four rack modules in a vertically stacked configuration is shown in the background screen. A side selector switch may be toggled to switch from displaying information regarding cages on "side A" of the rack system to "side B" of the rack system. FIG. 11 illustrates a controller displaying data gathered and processed from identifiers (such as cage location, cage card information, and the like), sensors (air pressure), and maintenance personnel (notes).

Figure 12:
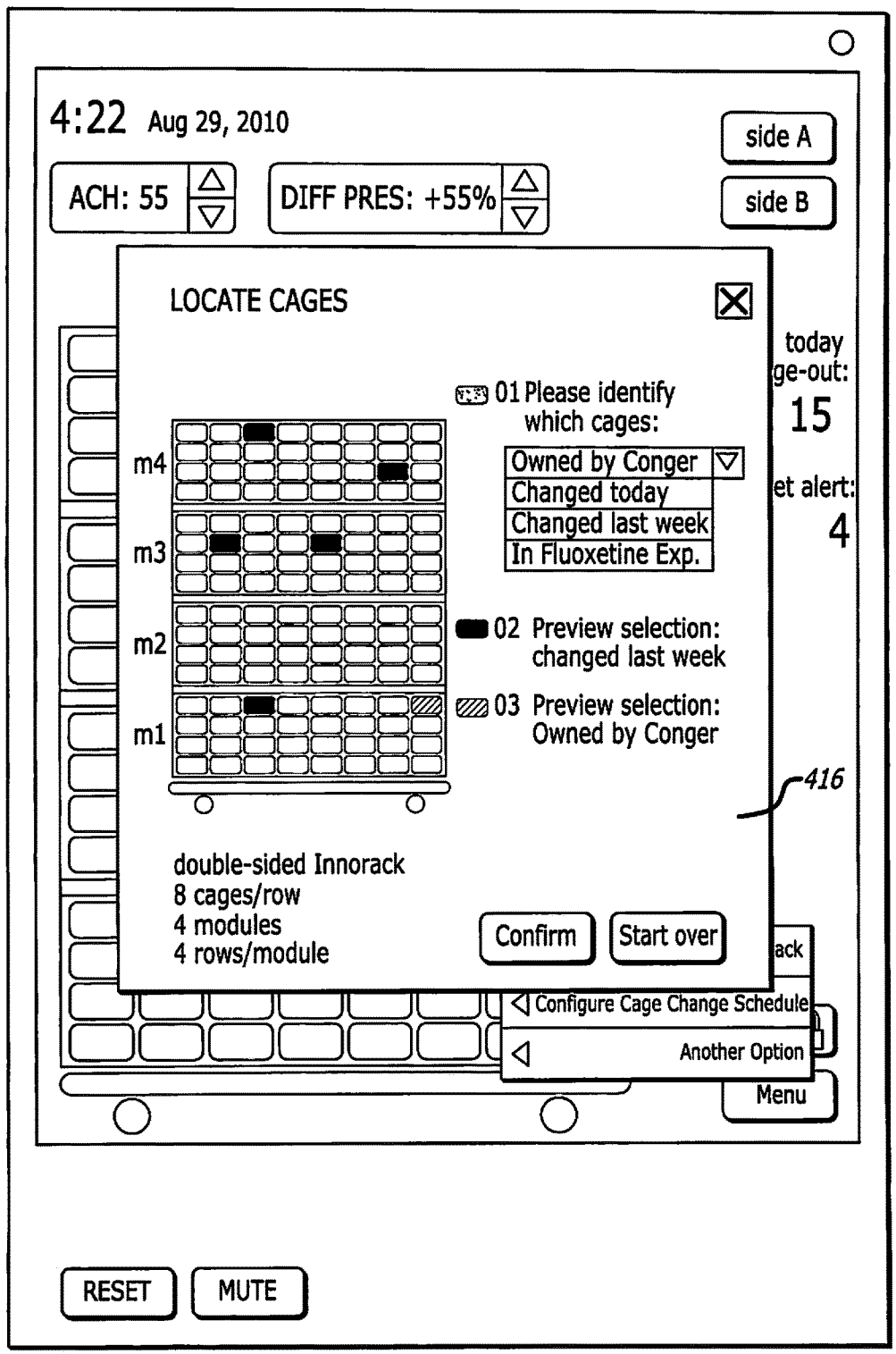
FIG. 12 is a diagrammatic screen shot of an embodiment of a controller displaying a cage locator query function.

FIGS. 12-18 illustrate more screen shots of a graphic user interface embodiments displaying a variety of information regarding containment cage status, location, inventory and reports/documentation. FIG. 12 shows a diagrammatic screen shot embodiment of the controller illustrating the cage locator query function. A pop up display 416 of the "Locate Cage" option is shown with three selections. Selection 01 is the current option where the user is prompted with "Please identify which cages:" and to select from the drop down menu, with the options "Owned by Conger, Changed today, Changed last week, and In Fluoxetine Exp." Once the user makes a selection, cages on the controller screen that match the criteria will be displayed with polka dots/texture. Selection 02 is a previous selection by the user which displays cages changed last week and has the cages color coded black. Selection 03 is also a previous selection by the user, which displays cages owned by Conger and has the cages color coded with striped lines. To the left of the selections is a facsimile of a front view of a side of the actual rack system where cages are color coded based on user selection and location of the cages. Indicators on the shelves of the rack system can also show location of cages based on user queries. Indicators as shown in FIGS. 5A-C, also may be color coded similar to the controller facsimile of FIG. 12, such that these indicators on the cage rack may show the user where cages are located based on their queries. If a user is interested in a particular cage shown on the controller facsimile, they may select that cage which will display the cage card information as shown in FIG. 11 where more information can be found, including a written description of the cage location in terms of M (modules; up to four modules can be on a rack), R (rows; up to 4 rows per module) and C (cages; up to eight cages per row). There is also a button with the option "Show Cage Location via Indicator on Rack," where the selected cage's indicator will light up or be visually seen by the user on the cage rack once the button is selected/activated.

Figure 13:
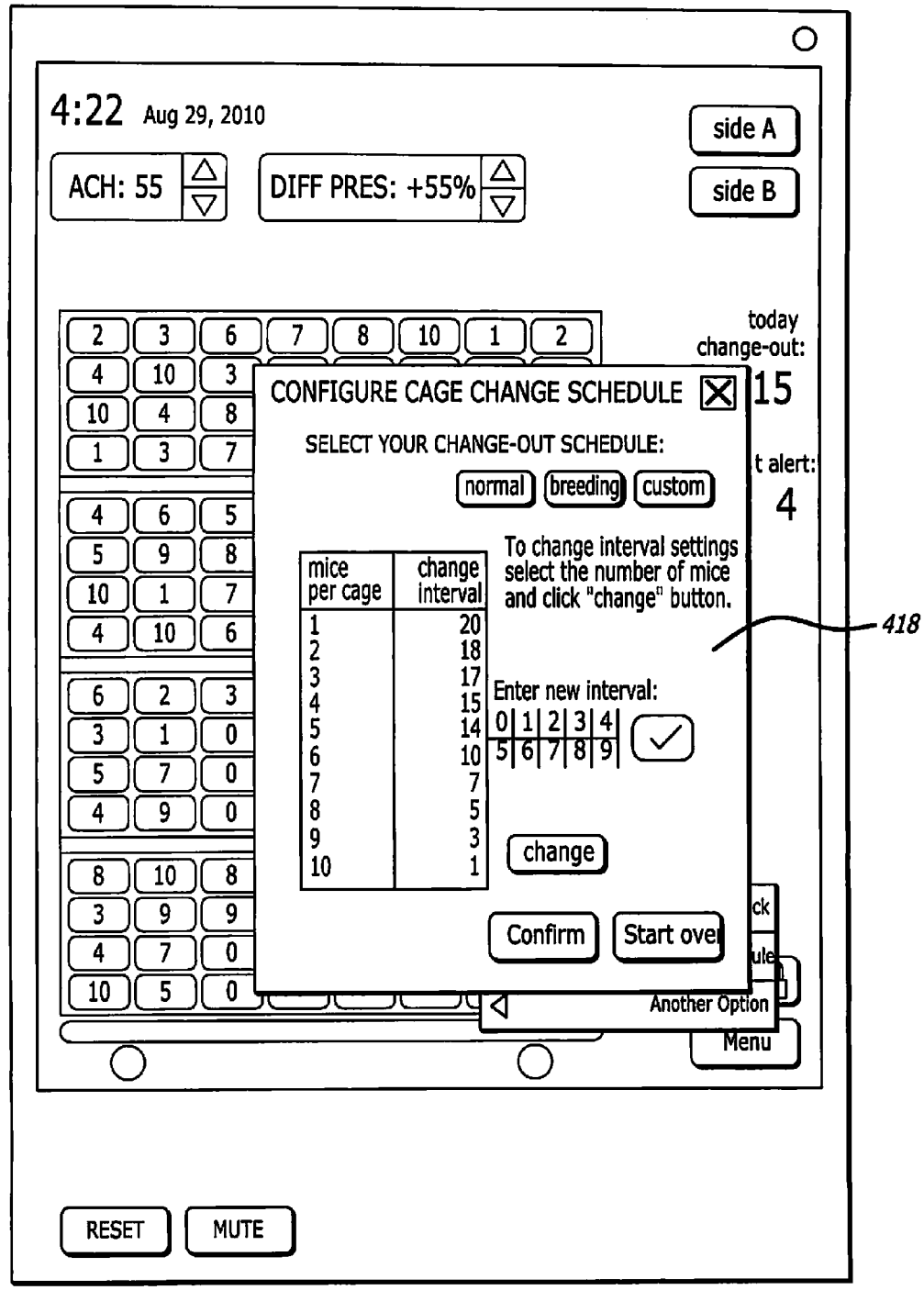
FIG. 13 is a diagrammatic screen shot of an embodiment of a controller displaying a cage change schedule.

FIG. 13 shows a diagrammatic screen shot embodiment of the controller illustrating a cage change schedule. FIG. 13 illustrates a pop up menu 418 corresponding to the "Configure Cage Change Schedule" option. The change schedule menu includes a variety of change schedule options such as "normal", "breeding" and "custom". A look up chart showing number of mice per cage versus change interval is also displayed. In the background, a facsimile of a front view of a side of the actual rack system is displayed with numbers in each cage, detailing the number of mice currently in each cage.

Figure 14:
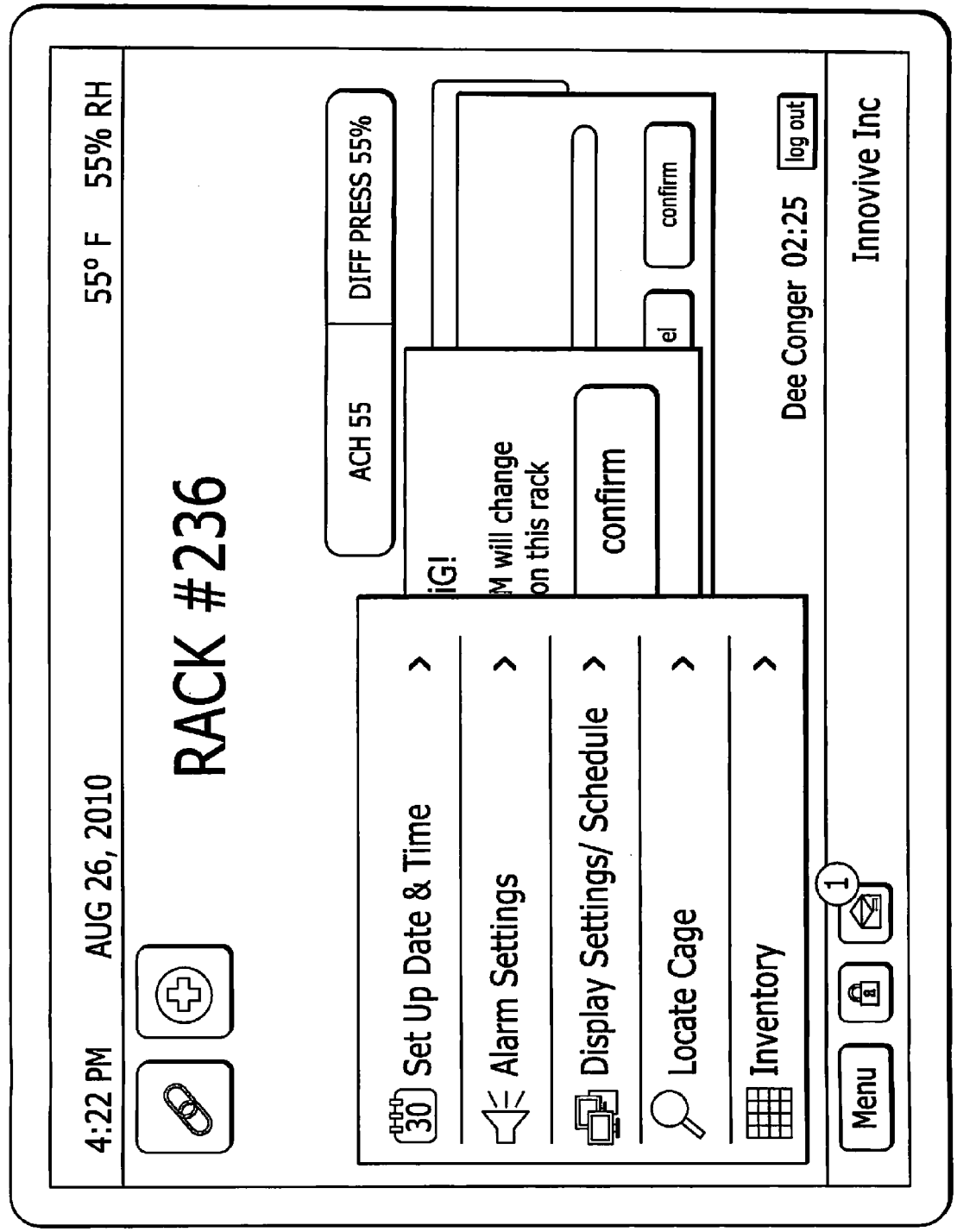
FIG. 14 is a diagrammatic screen shot of an embodiment of a controller displaying a selection of options.

FIG. 14 shows a diagrammatic screen shot embodiment of the controller illustrating a selection of options. FIG. 14 illustrates a screen shot of a graphic user interface embodiment for a controller showing information about a rack, i.e. rack #236, the ACH, DIFF PRESS percentages, a warning pop up window, as well as a menu pop up where setting may be updated such as date, time, alarm settings, display settings/schedule, locate cage and inventory. Other features may include a password protection, messages, menu and the like.

Figure 15:
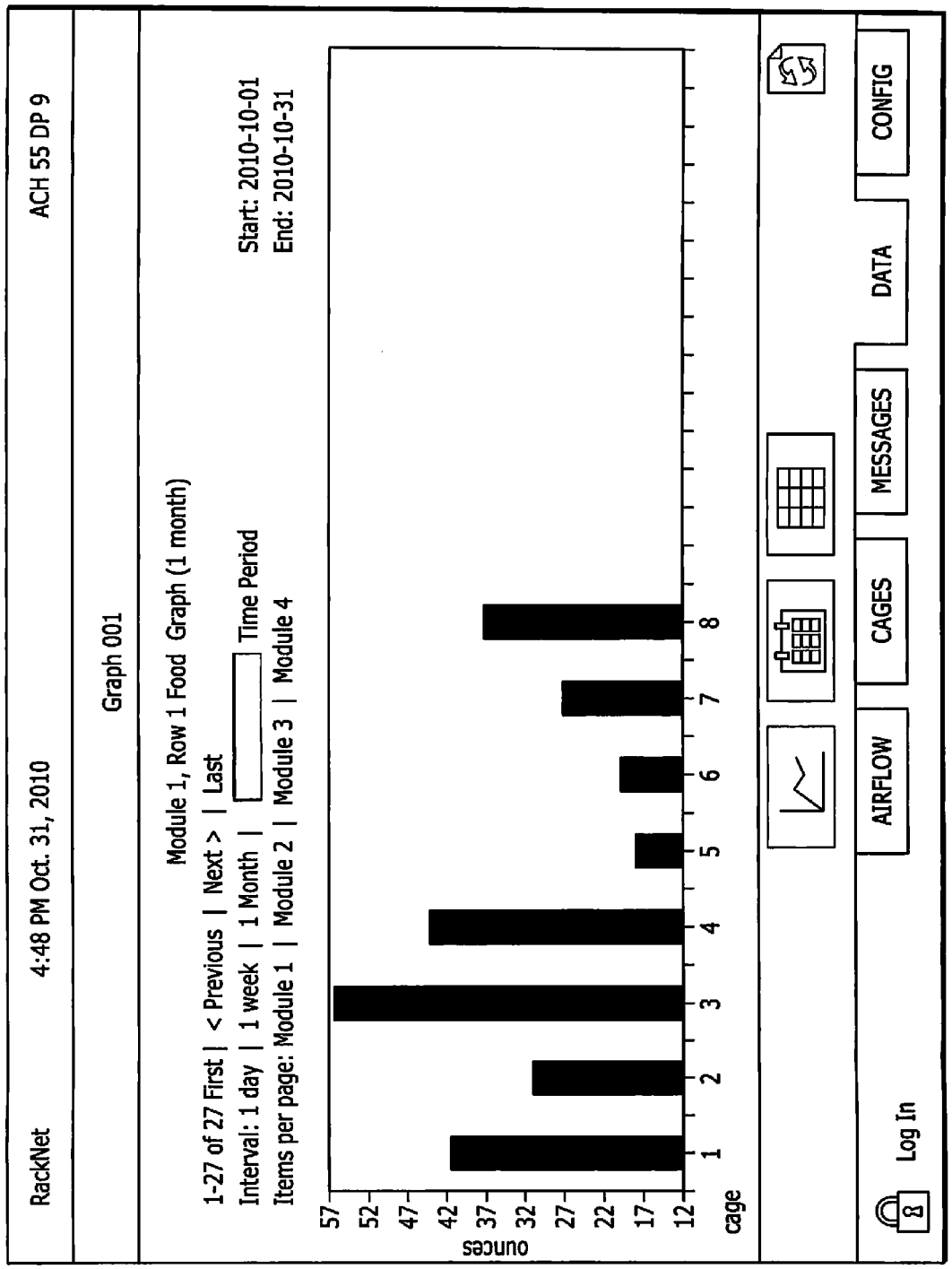
FIG. 15 is a diagrammatic screen shot of an embodiment of a controller displaying an inventory of food in a bar graph format.

FIG. 15 shows a diagrammatic screen shot embodiment of the controller illustrating an inventory of food as a bar graph. As seen in FIG. 14, a user option from the menu pop up is inventory. FIG. 15 shows an inventory of food for one month for cages in module 1, row 1, where the individual cages 1-8 are listed on the X-axis of the bar graph and ounces of food are listed on the Y-axis. Other time intervals may be selected such as one day, one week, and a user may type in another time interval selection, for example. Other modules also may be selected for the inventory graph, such as module 1, module 2, module 3 and/or module 4. Other displays of the inventory may be shown, as indicated by the graph format buttons, such as a line graph, calendar display or chart.

FIG. 16 shows a diagrammatic screen shot embodiment of the controller illustrating associated cage components. A summary of cage components (i.e. cage lid and cage bottom) which are associated with a particular cage card is displayed. Location of the cage at M1, R4 and C8 is also shown along with the identifier number: XMB 7845 and cage card symbol (smiley face). If other cage components were associated with this particular cage or cage card or cage content, then they would be listed on this screen.

FIG. 17 shows a diagrammatic screen shot embodiment of the controller illustrating an inventory summary over a one month time period. FIG. 17 shows a chart or list of racks, descriptions of the racks, number of cages per rack, number of cage lids, number of cage bottoms, status of rack, change frequency, and alarm setting for maintenance. A user may plan to order a certain number of cage lids and/or bottoms depending on this inventory summary. Cage bottoms may be more frequently changed out verses cage lids, depending on factors such as activity of the animals, number of animals per cage and the like.

FIG. 18 shows a diagrammatic screen shot embodiment of the controller illustrating airflow data in a list form. FIG. 18 illustrates a schedule or history of each rack, i.e. rack #1, which may include information for type (i.e. ACH or DP), value, time, and reference number for a history of the last 5 minutes, last hour, last 6 hours, last 12 hours, last day, last week, last month, all and the like.

Figure 19:
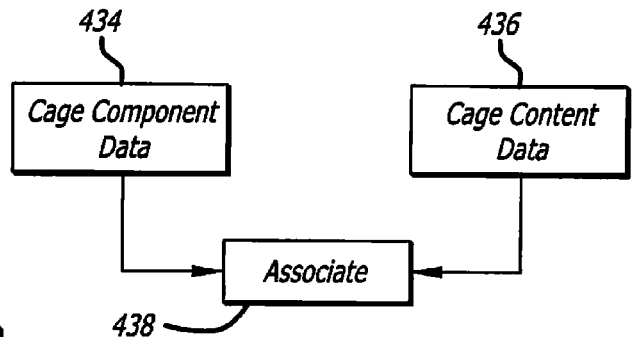
FIG. 19 is an embodiment of an operational procedure for association of data.

FIG. 19 shows an embodiment of an association of data and/or identifier. A cage component identifier and corresponding cage content identifier have been received by the receiving module and associated together by an association module. Data from these identifiers have also been associated because their identifiers correspond to each other based on location within the rack system. An association module performs the task illustrated by FIG. 19 such that the cage component data 434 and cage content data 436 are associated 438. Association may be user-defined or pre-programmed.

Figure 20:
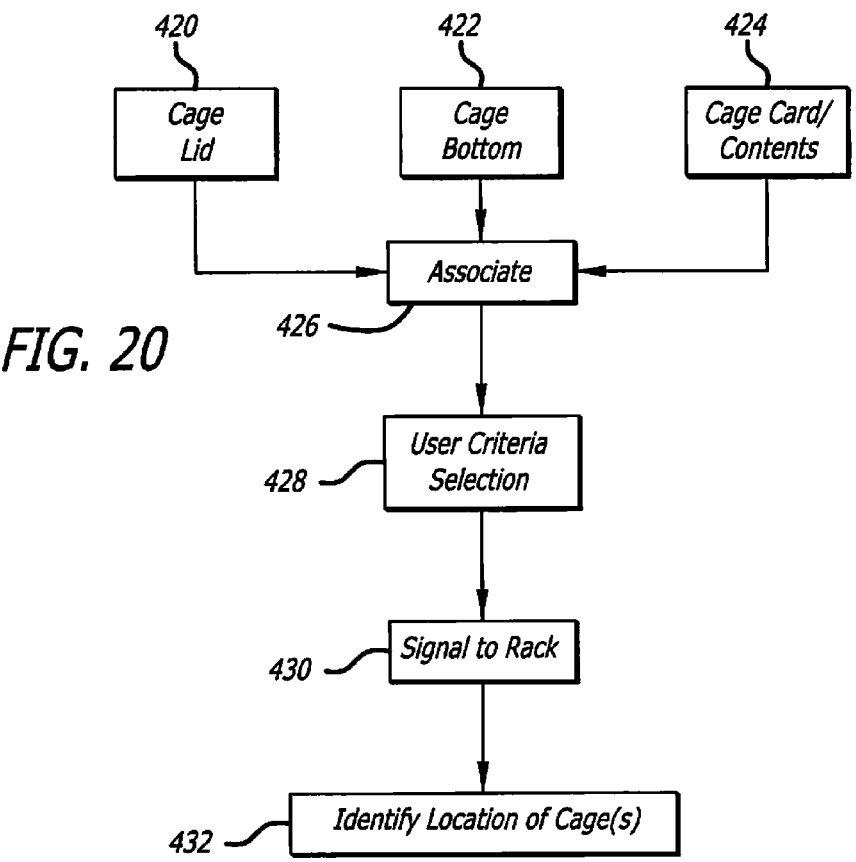
FIG. 20 is an embodiment of an operational procedure for locating specified cages based on user criteria.

FIG. 20 shows an operational procedure for locating specified cages based on user criteria. Cage lid 420, cage bottom 422 and cage card/content 424 are associated together 426 by an association module. A user selects a criteria 428 in order to locate one or more specific cages. The association module alone or in combination with the management software parses the associated information/data based on the user's criteria to identify the cage(s). A signal 430 is relayed to the cage rack system in order to identify the physical location of the cage(s) 432 by an indicator/reader in the vicinity of the cage(s). The signal 430 also may be relayed to the controller for a virtual graphic display to identify the location of the cage(s) 432.

EXAMPLES OF EMBODIMENTS

Listed hereafter are non-limiting examples of certain embodiments of the technology.

A1. A rodent containment cage system, comprising:
a first cage component comprising a first detectable identifier and a second cage component comprising a second detectable identifier, the second cage component covering the first detectable identifier; and
a detector, whereby the detector is configured to detect the first detectable identifier and the second detectable identifier.

A2. The system of embodiment A1, wherein the first cage component, second cage component, or first cage component and second cage component includes two or more identifiers.

A3. The system of embodiment A1, wherein the identifier is selected from the group consisting of bar codes, serial numbers, radio frequency identifiers, discoloring polymers, reflective identifiers, non-reflective identifiers, magnetic identifiers, symbolic codes, chemical sensor identifiers, or combinations thereof.

A4. The system of embodiment A3, wherein the identifier serves as a clocking identifier, a cage position identifier, a content identifier, or combination thereof.

A5. The system of embodiment A1, wherein the detector is in effective connection with a rack.

A6. The system of embodiment A5, wherein the detector is attached to a shelf in the rack and the first and second cage components engage with the shelf.

A7. The system of embodiment A5, wherein the rack comprises a shelf that includes a channel into which a portion of the cage can slide and the detector is located on the shelf in proximity to the channel and is configured to detect the first and second detectable identifiers when the cage is slid into the channel and the first and second detectable identifies pass the detector.

A8. The system of embodiment A7, wherein the detector is attached to a side of the shelf in the rack and the first and second cage components each include a flange whereby a surface of each flange of the first and second cage component contacts each other when the cage components are engaged and identifiers are located on the flange of each cage component, and the detector is in-line with the flanges and identifiers on the cage components for detection.

A9. The system of embodiment A1, wherein the detector employs materials selected from the group consisting of mechanical, magnetic, magnetic optical, optical, automatic, chemical sensing, fluorescence sensing components or combinations thereof.

A10. The system of embodiment A1, wherein the detector is located in a handheld device.

A11. The system of embodiment A1, wherein the detector is located on a cage component.

A12. The system of embodiment A1, wherein the cage component is selected from the group consisting of a cage lid component, cage base component, air supply or air exhaust component, water supply component, sensor component, filter component, baffle component or feeder component.

A13. The system of embodiment A12, wherein one or more cage components are substantially transparent.

A14. The system of embodiment A8, wherein one or more identifiers are located on back of a cage component, on the side or sides of a cage component, on top of a cage component, on one or more flanges of a cage component, on a non-cage item, on a rack component, juxtaposed to another identifier, overlapping another identifier, or combinations thereof.

A15. The system of embodiment A1, wherein the identifier is placed on one or more cage components by a process selected from the group consisting of heat, ink jet, embossing, laser impression, sticker, adhesive, discoloring polymers, magnets, or fasteners.

A16. The system of embodiment A5, which further comprises a display wherein:
the display is located on a rack of the system; or
the display is located in a location remote from the rack.

A17. The system of embodiment A1, which further comprises one or more indicators on a rack of the containment cage system.

A18. A rodent containment cage system, comprising:
one or more cage components comprising a first detectable identifier and a second detectable identifier, and
a detector, whereby the detector is configured to detect the first detectable identifier or the second detectable identifier.

A18.1. A rodent containment cage system of embodiment A18, wherein the cage component is cage lid.

A18.2. A rodent containment cage system of embodiment A18, wherein the cage component is cage base.

A18.3. A rodent containment cage system of embodiment A18, wherein the cage components are a cage lid and a cage base.

A19. The rodent containment cage system of embodiment A18, wherein the detector is attached to a cage mount assembly.

A20. The rodent containment cage system of embodiment A19, wherein the detector is part of the front module of a cage mount assembly.

A21. A rodent containment cage system, comprising:
one or more cage components comprising a first detectable identifier and a second detectable identifier, and
a first detector and a second detector, whereby the first detector is configured to detect the first detectable identifier and the second detector is configured to detect the second detectable identifier.

A21.1. A rodent containment cage system of embodiment A21, wherein the cage component is cage lid.

A21.2. A rodent containment cage system of embodiment A21, wherein the cage component is cage base.

A21.3. A rodent containment cage system of embodiment A21, wherein the cage components are a cage lid and a cage base.

A22. The rodent containment cage system of any one of embodiments A21.1 to A21.3, wherein the first and second detectable identifiers are on opposite sides along the length of a cage.

A23. The rodent containment cage system of embodiment A22, wherein the first and second detectors are on adjacent cage mount assembles attached to a cage rack.

A24. The rodent containment cage system of embodiment A23, wherein the first detector is configured to detect the first detectable identifier and the second detector is configured to detect the second detectable identifier when a cage is slid into the cage mount assemblies.

A25. A rodent containment cage system, comprising:
a cage component comprising a detectable identifier, and
a first detector configured to detect the identifier.

A26. A rodent containment cage system of embodiment A25, wherein the cage component is cage lid.

A27. A rodent containment cage system of embodiment A25, wherein the cage component is cage base.

A28. The rodent containment cage system of embodiment A25, wherein the detector is attached to a cage mount assembly.

A29. The rodent containment cage system of embodiment A28, wherein the detector is part of the front module of a cage mount assembly.

A30. The rodent containment cage system of embodiment A28, wherein the detector is configured to detect the detectable identifier when a cage comprising the cage component with the identifier is slid into the cage mount assemblies.

B1. A rodent containment cage, comprising:
a base comprising a first detectable identifier; and
a lid comprising a second detectable identifier, affixed to the base, and covering the first detectable identifier, whereby the second detectable identifier is located in proximity to the first detectable identifier.

B2. The containment cage of embodiment B1, wherein a detector is configured to detect the first detectable identifier and the second detectable identifier.

B3. The containment cage of embodiment B1, wherein the base or lid includes two or more identifiers.

B4. The containment cage of embodiment B1, wherein the identifier is selected from the group consisting of bar codes, serial numbers, radio frequency identifiers, discoloring polymers, reflective identifiers, non-reflective identifiers, electromagnetic identifiers, magnetic identifiers, symbolic codes, chemical sensor identifiers, or combinations thereof.

B5. The containment cage of embodiment B1, wherein the identifier serves as a clocking identifier, a cage position identifier, a content identifier, or combination thereof.

B6. The containment cage of embodiment B1, wherein the detector is in effective connection with the cage.

B7. The containment cage of embodiment B1, wherein the detector is located on a cage component.

B8. The containment cage of embodiment B1, wherein the base, lid or both are substantially transparent.

B9. The containment cage of embodiment B2, wherein one or more identifiers are located on back of the base or lid, on the side or sides of the base or lid, on top of the base or lid, on one or more flanges of the base or lid, juxtaposed to another identifier, overlapping another identifier, or combinations thereof.

B10. The containment cage of B1, wherein the identifier is placed on one or more cage components by a process selected from the group consisting of heat, ink jet, embossing, laser impression, sticker, adhesive, discoloring polymers, magnets, or fasteners.

B11. The containment cage of B1, wherein the detector is connected to a shelf in a rack.

B12. A rodent containment cage, comprising:
one or more components with a first detectable identifier and second detectable identifier.

B12.1. A rodent containment cage of embodiment B12, wherein the cage component is cage lid.

B12.2. A rodent containment cage of embodiment B12, wherein the cage component is cage base.

B12.3. A rodent containment cage of embodiment B12, wherein the cage components are a cage lid and a cage base.

B13. The rodent containment cage of any one of embodiments B12.1 to B12.3, wherein the first and second detectable identifiers are on opposite sides along the length of a cage.

B14. The containment cage of embodiment B12, wherein the first identifier and the second identifier are the same.

B15. The containment cage of embodiment B12, wherein the first identifier and the second identifier are different.

B16. The containment cage of embodiment B12, wherein the first and second detectable identifiers comprise bar codes.

B16.1. The containment cage of embodiment B16, wherein the first and second detectable identifiers generate a unique identifier when detected together.

B17. A rodent containment cage, comprising a component with a first detectable identifier.

B18. A rodent containment cage of embodiment B17, wherein the cage component is a cage lid.

B19. A rodent containment cage of embodiment B17, wherein the cage component is a cage base.

C1. A method for detecting identifiers on a rodent containment cage, comprising:

engaging a cage with a shelf of a rack, the cage comprising a base that includes a first detectable identifier and lid that includes a second detectable identifier, and the shelf comprising a detector; and sliding the cage into the shelf, whereby the first detectable identifier and the second detectable identifier are detected by the detector as they pass the detector when the cage is slid into the shelf.

C2. The method of embodiment C1, wherein the lid covers the first detectable identifier and first detectable identifier is detected through lid.

C3. The method of embodiment C2, wherein the detector is an optical reader, the first detectable identifier and the second detectable identifier are configured for optical detection, and the lid is substantially transparent.

C3.1. The method of embodiment C3, wherein the lid is substantially transparent to some electromagnetic radiation but not all electromagnetic radiation.

C4. The method of embodiment C1, wherein the first detectable identifier and the second detectable identifier are arranged in-line.

C4.1. The method of embodiment C4, wherein the first detectable identifier and the second detectable identifier include regions of overlap.

C5. The method of embodiment C1, wherein the lid or the base includes two or more detectable identifiers.

C6. The containment cage of embodiment C5, wherein the detectable identifier is selected from the group consisting of bar codes, serial numbers, radio frequency identifiers, discoloring polymers, reflective identifiers, non-reflective identifiers, electromagnetic identifiers, magnetic identifiers, symbolic codes, chemical sensor identifiers, or combinations thereof.

C7. The containment cage of embodiment C1, wherein the detectable identifier serves as a clocking identifier, a cage position identifier, a content identifier, or combination thereof.

C8. The containment cage of embodiment C1, wherein the shelf further comprises a channel and the cage slides into the shelf by engaging the channel.

C9. A method for detecting identifiers on a rodent containment cage, comprising:

engaging a cage with rail guides on adjacent first and second cage mount assemblies of a rack, the cage comprising a first detectable identifier and a second detectable identifier, and the first and second cage mount assemblies each comprising a detector; and sliding the cage into the cage mount assemblies thereby contacting the cage lid with the rail guides of the first and second cage mount assemblies, whereby the first detectable identifier is detected by the detector on the first cage mount assembly and the second detectable identifier is detected by the detector on the second cage mount assembly as each identifier passes each detector when the cage is slid into the first and second cage mount assemblies.

C10. The containment cage of embodiment C9, wherein the detectable identifiers comprise bar codes.

C11. A method for detecting an identifier on a rodent containment cage, comprising:

engaging a cage with a rail guide on a cage mount assembly of a rack, the cage comprising a detectable identifier and the cage mount assembly comprising a detector; and sliding the cage into the cage mount assembly thereby contacting the cage lid with the rail guide of the cage mount assembly, whereby the detectable identifier is detected by the detector on the first cage mount assembly as the identifier passes the detector when the cage is slid into the cage mount assembly.

D1. A rodent containment cage system, comprising:

a rack that includes a cage, the cage including a base that comprises a first detectable identifier, a lid that comprises a second detectable identifier, and a third detectable identifier in association with the lid and/or the base that includes cage content information;

a shelf connected to the rack and in association with the cage, the shelf including a detector configured to detect the first detectable identifier, the second detectable identifier and the third detectable identifier; and a processor in effective communication with the detector that associates the cage content information with the first detectable identifier and the second detectable identifier.

D2. The system of embodiment D1, further comprising a controller in effective communication with the processor and configured to receive association information from the processor.

D3. The system of embodiment D2, further comprising an indicator in effective communication with the controller, the indicator configured to identify one or more cage components in association with the cage content information or subset thereof.

D4. The system of embodiment D3, wherein the indicator identifies one or more cage components by a visual, auditory, tactile indicator or combinations thereof.

D5. The system of embodiment D4, wherein the indicator is a visual light display.

D6. The system of embodiment D4, wherein the indicator is a LED display.

D7. The system of embodiment D4, wherein the indicator is integrated into the detector.

D8. The system of embodiment D4, wherein the indicator is integrated into the rack.

D9. The system of embodiment D1, wherein the cage and/or the lid is in association with a card that comprises cage content information.

D10. The system of embodiment D1, wherein the lid covers the first detectable identifier and first detectable identifier is detected through the lid.

D11. The system of embodiment D1, wherein the first detectable identifier and the second detectable identifiers are arranged in-line or overlapping one another.

D12. The system of embodiment D1, wherein the second detectable identifier and the third detectable identifiers are arranged in-line or overlapping one another.

D13. The system of embodiment D1, wherein the first detectable identifier and the third detectable identifiers are arranged in-line or overlapping one another.

D14. The system of embodiment D1, further comprising a card that comprises cage content information.

D15. The system of embodiment D2, wherein the controller is located in a location on the rack and/or remote from the rack.

E1. A method for associating cage content information with one or more cage components in a rodent containment system, comprising:
detecting a first detectable identifier in association with a cage base, a second detectable identifier in association with a cage lid, and a third detectable identifier in association with the lid and/or the base that includes the cage content information, by a detector in association with a shelf that is connected to a rack; and
transmitting the first detectable identifier, the second detectable identifier and the third detectable identifier to a processor configured to associate the cage content information of the third detectable identifier with the first detectable identifier and/or the second detectable identifier.

E2. The method of embodiment E1, further comprising associating via the processor the cage content information of the third detectable identifier with the first detectable identifier and/or the second detectable identifier, thereby producing an association.

E3. The method of embodiment E1, further comprising transmitting the association from the processor to a controller.

E4. The method of embodiment E3, further comprising transmitting the association from the controller to an indicator and identifying one or more cage components in association with the cage content information or subset thereof.

F1. A method for associating parts of a rodent containment cage system, comprising:
receiving cage component data obtained from a detectable identifier; receiving cage content data; and
associating the cage component data with the corresponding cage content data, thereby generating an association.

F2. The method of embodiment F1, wherein the cage component data is from an identifier detected by a detector.

F3. The method of embodiment F1, wherein the cage content data is from a detectable identifier and/or manual input.

F4. The method of any one of embodiments F1 to F3, further comprising receiving cage condition data and associating the cage condition data with the corresponding cage content data and/or cage component data, thereby generating an association.

F5. The method of embodiment F4, wherein the cage condition data is from a detectable identifier and/or manual input.

F6. The method of any one of embodiments F1 to F5, further comprising receiving cage user data and associating the cage user data with the corresponding cage content data, corresponding cage component data and/or corresponding cage condition data, thereby generating an association.

F7. The method of embodiment F6, wherein the cage user data is from a detectable identifier and/or manual input.

F8. The method of any one of embodiments F1 to F7, further comprising reporting the association.

F9. The method of embodiment F8, wherein the association includes an association between the cage component data and the corresponding cage content data.

F10. The method of embodiment F8, wherein the association includes an association between the cage condition data and the corresponding cage content data and/or the corresponding cage component data.

F11. The method of embodiment F8, wherein the association includes an association between the cage user data, and the corresponding cage content data, the corresponding cage condition data and/or the corresponding cage component data.

F12. The method of any one of embodiments F8 to F11, wherein the reporting is user-defined.

F13. The method of any one of embodiments F8 to F11, wherein the reporting is pre-programmed.

F14. The method of embodiment any one of embodiments F8 to F13, wherein the reporting is selected from the group consisting of cage indicators, graphics, inventory reports, security reports and productivity reports.

F15. The method of embodiment F4, wherein the cage condition data is selected from the group consisting of a food change, a water change, a medicine administered, a bedding material change, a filter change, a syringe administered, a glove used, and combinations thereof.

F16. The method of embodiment F14, wherein the cage condition data is given a time stamp and/or date stamp when the cage condition data is received.

F17. The method of embodiment F6, wherein the cage user data is selected from the group consisting of a personnel accessing the cage, a time of cage access, a date of cage access, a purpose of cage access, and combinations thereof.

F18. The method of embodiment F1, wherein the cage component is selected from the group consisting of a cage lid component, a cage base component, an air supply component, an air exhaust component, a water supply component, a sensor component, a filter component, a baffle component, a feeder and combinations thereof.

F19. The method of embodiment F1, wherein the cage content data is selected from the group consisting of number of animals, and type of animal in a cage, animal identifier, an owner of the cage, an age of an animal, a sex of an animal, a pedigree of an animal, an experimental procedure on an animal, an observations by a cage user, and combinations thereof.

F20. The method of embodiment F2, wherein the detector is connected to a shelf in a rack of the system.

G1. A computer program product, comprising a computer usable medium having a computer readable program code embodied therein, the computer readable program code adapted to be executed to implement a method for associating parts of a rodent containment cage system, the method comprising:
receiving cage component data obtained from a detectable identifier;
receiving cage content data; and
associating the cage component data with the corresponding cage content data, thereby generating an association.

G2. The program product of embodiment G1, wherein the cage component data is from an identifier detected by a detector.

G3. The program product of embodiment G1, wherein the cage content data is from a detectable identifier and/or manual input.

G4. The program product of any one of embodiments G1 to G3, further comprising receiving cage condition data and associating the cage condition data with the corresponding cage content data and/or cage component data, thereby generating an association.

G5. The program product of embodiment G4, wherein the cage condition data is from a detectable identifier and/or manual input.

G6. The program product of any one of embodiments G1 to G3, further comprising receiving cage user data and associating the cage user data with the corresponding cage content data, corresponding cage component data and/or corresponding cage condition data, thereby generating an association.

G7. The program product of embodiment G6, wherein the cage user data is from a detectable identifier and/or manual input.

G8. The program product of any one of embodiments G1 to G7, further comprising reporting the association.

G9. The program product of embodiment G8, wherein the association includes an association between the cage component data and the corresponding cage content data.

G10. The program product of embodiment G8, wherein the association includes an association between the cage condition data and the corresponding cage content data and/or the corresponding cage component data.

G11. The program product of embodiment G8, wherein the association includes an association between the cage user data, and the corresponding cage content data, the corresponding cage condition data and/or the corresponding cage component data.

G12. The program product of any one of any one of embodiments G8 to G11, wherein the reporting is user-defined.

G13. The program product of any one of any one of embodiments G8 to G11, wherein the reporting is pre-programmed.

G14. The program product of any one of any one of embodiments G8 to G13, wherein the reporting is selected from the group consisting of cage indicators, graphics, inventory reports, security reports and productivity reports.

G15. The program product of embodiment G4, wherein the cage condition data is selected from the group consisting of a food change, a water change, a medicine administered, a bedding material change, a filter change, a syringe administered, a glove used, and combinations thereof.

G16. The program product of embodiment G15, wherein the cage condition data is given a time stamp and/or date stamp when the cage condition data is received.

G17. The program product of embodiment G6, wherein the cage user data is selected from the group consisting of a personnel accessing the cage, a time of cage access, a date of cage access, a purpose of cage access, and combinations thereof.

G18. The program product of embodiment G1, wherein the cage component is selected from the group consisting of a cage lid component, a cage base component, an air supply component, an air exhaust component, a water supply component, a sensor component, a filter component, a baffle component, a feeder component and combinations thereof.

G19. The program product of embodiment G1, wherein the cage content data is selected from the group consisting of number of animals in a cage, type of animals in a cage, animal identifier, an owner of the cage, an age of an animal, a sex of an animal, a pedigree of an animal, an experimental procedure on an animal, an observations by a cage user, and combinations thereof.

G20. The method of embodiment G2, wherein the detector is connected to a shelf in a rack of the system.

G21. The program product of embodiment G1, wherein the computer program product is stored on a removable storage device selected from the group consisting of a floppy disk, a hard disk, a magnetic tape, a CD-ROM disc, a DVD disc, a magneto-optical disc, or a USB drive.

H1. A computer program product, comprising a computer usable medium having a computer readable program code embodied therein, the computer readable program code including distinct software modules adapted to be executed to implement a method for associating parts of a rodent containment cage, the method comprising:
   i. receiving, by a receiving module, cage component data obtained from a detectable identifier;
   ii. receiving, by the receiving module, cage content data; and
   iii. associating the cage component data with the corresponding cage content data, thereby generating an association, by an associating module.

H2. The program product of embodiment H1, wherein the cage component data is from an identifier detected by a detector.

H3. The program product of embodiment H1, wherein the cage content data is from a detectable identifier and/or manual input.

H4. The program product of any one of embodiments H1 to H3, further comprising receiving cage condition data and associating the cage condition data with the corresponding cage content data and/or cage component data, thereby generating an association.

H5. The program product of embodiment H4, wherein the cage condition data is from a detectable identifier and/or manual input.

H6. The program product of any one of embodiments H1 to H5, further comprising receiving cage user data and associating the cage user data with the corresponding cage content data, corresponding cage component data and/or corresponding cage condition data, thereby generating an association.

H7. The program product of embodiment H6, wherein the cage user data is from a detectable identifier and/or manual input.

H8. The program product of any one of embodiments H1 to H7, further comprising reporting the association of the one or more cage component data with the corresponding cage content data by a reporting module.

H9. The program product of embodiment H8, wherein the association includes an association between the cage component data and the corresponding cage content data.

H10. The program product of embodiment H8, wherein the association includes an association between the cage condition data and the corresponding cage content data and/or the corresponding cage component data.

H11. The program product of embodiment H8, wherein the association includes an association between the cage user data, and the corresponding cage content data, the corresponding cage condition data and/or the corresponding cage component data.

H12. The program product of any one of embodiments H8 to H11, wherein the reporting is user-defined H13. The program product of any one of embodiments H8 to H11, wherein the reporting is pre-programmed.

H14. The program product of embodiment any one of embodiments H8 to H13, wherein the reporting by the reporting module is selected from the group consisting of cage indicators, graphics, inventory reports, security reports and productivity reports.

H15. The program product of embodiment H4, wherein the cage condition data is selected from the group consisting of a food change, a water change, a medicine administered, a bedding material change, a filter change, a syringe administered, or a glove used.

H16. The program product of embodiment H14, wherein the cage condition data is given a time/date stamp when the cage condition data is performed.

H17. The program product of embodiment H6, wherein the cage user data is selected from the group consisting of a personnel accessing the cage, a time of cage access, a date of cage access, or a purpose of cage access.

H18. The program product of embodiment H1, wherein the cage component is selected from the group consisting of a cage lid component, a cage base component, an air supply component, an air exhaust component, a water supply component, a sensor component, a filter component, a baffle component or a feeder.

H19. The program product of embodiment H1, wherein the cage content data is selected from the group consisting of a number and type of animals in a cage, an owner of the cage, an age of an animal, a sex of an animal, a pedigree of an animal, an experimental procedure on an animal or an observations by a cage user.

H20. The method of embodiment H2, wherein the detector is connected to a shelf in a rack of the system.

H21. The program product of embodiment H1, wherein the computer program product is stored on a removable storage device selected from the group consisting of a floppy disk, a hard disk, a magnetic tape, a CD-ROM disc, a DVD disc, a magneto-optical disc, or a USB drive.

I1. A system that associates cage content data with cage component data in a rodent containment system comprising a programmable processor, the system comprising a processor that implements a computer program product of any one of embodiments G1 to G20 or H1 to H20.

I2. The system of embodiment I1, wherein the cage component data is from an identifier detected by a detector.

I3. The system of embodiment I1, wherein the cage content data is from a detectable identifier and/or manual input.

I4. The system of any one of embodiments I1 to I3, further comprising receiving cage condition data and associating the cage condition data with the corresponding cage content data and/or cage component data, thereby generating an association.

I5. The system of embodiment I4, wherein the cage condition data is from a detectable identifier and/or manual input.

I6. The system of any one of embodiments I1 to I5, further comprising receiving cage user data and associating the cage user data with the corresponding cage content data, corresponding cage component data and/or corresponding cage condition data, thereby generating an association.

I7. The system of embodiment I6, wherein the cage user data is from a detectable identifier and/or manual input.

I8. The system of any one of embodiments I1 to I7, further comprising reporting the association.

I9. The system of embodiment I8, wherein the association includes an association between the cage component data and the corresponding cage content data.

I10. The system of embodiment I8, wherein the association includes an association between the cage condition data and the corresponding cage content data and/or the corresponding cage component data.

I11. The system of embodiment I8, wherein the association includes an association between the cage user data, and the corresponding cage content data, the corresponding cage condition data and/or the corresponding cage component data.

I12. The system of any one of embodiments I8 to I11, wherein the reporting is user-defined.

I13. The system of any one of embodiments I8 to I11, wherein the reporting is pre-programmed.

I14. The system of embodiment any one of embodiments I8 to I13, wherein the reporting is selected from the group consisting of cage indicators, graphics, inventory reports, security reports and productivity reports.

I15. The system of embodiment I4, wherein the cage condition data is selected from the group consisting of a food change, a water change, a medicine administered, a bedding material change, a filter change, a syringe administered, a glove used, and combinations thereof.

I16. The system of embodiment I14, wherein the cage condition data is given a time stamp and date stamp when the cage condition data is received.

I17. The system of embodiment I6, wherein the cage user data is selected from the group consisting of a personnel accessing the cage, a time of cage access, a date of cage access, a purpose of cage access, and combinations thereof.

I18. The system of embodiment I1, wherein the cage component is selected from the group consisting of a cage lid component, a cage base component, an air supply component, an air exhaust component, a water supply component, a sensor component, a filter component, a baffle component, a feeder and combinations thereof.

I19. The system of embodiment I1, wherein the cage content data is selected from the group consisting of number of animals in a cage, type of animals in a cage, animal identifier, an owner of the cage, an age of an animal, a sex of an animal, a pedigree of an animal, an experimental procedure on an animal, an observations by a cage user, and combinations thereof.

I20. The system of embodiments I4 or I6, further comprising a detector in association with a rack that detects an identifier associated with the cage component data, the cage content data, the cage condition data and/or the cage user data.

I21. The system of embodiment I1, further comprises a controller;
    the controller is located on a rack of the system; and
    the controller is located in a location remote from the rack.

I22. The system of embodiment I1, further comprises one or more indicators on the rack.

J1. A rodent containment cage rack, comprising:
    a plurality of cage mount support members each disposed between and connected to a first side member and a second side member,
    each support member comprising a wall that contains, or walls that contain, a first support member plenum and a second support member plenum substantially extending the length of the support member,
    each support member comprising a first set of cage connection apertures and a second set of cage connection apertures in the wall or walls of a lower surface of a support member, each aperture of the first set of cage connection apertures is in connection with the first support member plenum, and each aperture of the second set of cage connection apertures is in connection with the second support member plenum;

each support member comprising a first set of support member end apertures in connection with the first support member plenum and a second set of support member end apertures in connection with the second support member plenum, each of which end apertures is at the end of each support member that connects to a side member;

each side member comprising a wall that contains, or walls that contain, a first side member plenum and a second side member plenum substantially extending the length of the side member, and each side member comprising a first set of side member apertures and a second set of side member apertures in the wall or walls of the side member, one or more apertures of the first set of side member apertures are in connection with the first side member plenum and are in effective connection with one or more apertures of the first set of support member end apertures, and one or more apertures of the second set of side member apertures are in connection with the second side member plenum and are in effective connection with one or more apertures of the second set of support member end apertures.

J2. The rodent containment cage rack of embodiment J1, whereby each first support member plenum is in effective connection with each first side member plenum and each second support member plenum is in effective connection with each second side member plenum.

J3. The rodent containment cage rack of embodiment J1, wherein the support member apertures are regularly spaced across the transverse axis of the support member.

J4. The rodent containment cage rack of embodiment J1, comprising a nozzle at each aperture in the support member.

J5. The rodent containment cage rack of embodiment J1, further comprising a plurality of cage mounts on a bottom surface of each support member.

J5.1. The rodent containment cage rack of embodiment J5, wherein each cage mount comprises a rail configured to slidingly receive a cage member and a protrusion configured to stop slideable movement of the cage member.

J5.2. The rodent containment cage rack of embodiment J5.1, wherein the cage mount comprises a detector configured to detect a detectable identifier on a cage component slidingly engaged with the cage mount.

J6. The rodent containment cage rack of embodiment J1, comprising a first air connection plate comprising an aperture in effective connection with an aperture on the upper end of a first side member plenum of a side member and comprising a second air connection plate comprising an aperture in effective connection with an aperture on the upper end of a second side member plenum on the opposite side member.

J7. The rodent containment cage rack of embodiment J1, wherein each support member and each side member comprises a channel configured to receive a communication medium.

J8. The rodent containment cage rack of embodiment J7, which channel comprises a communication medium.

J9. The rodent containment cage rack of embodiment J1, wherein the rack is configured to, when positive air pressure is supplied to the first side member plenum of a side member, direct air from the first side member plenum of a side member to the first set of side member apertures of a side member to a set of support member end apertures to the first support member plenums and through the first set of cage connection apertures.

J10. The rodent containment cage rack of embodiment J1, wherein the rack is configured to, when negative air pressure is supplied to the second side member plenum of a side member, direct air through the second set of cage connection apertures to the second support member plenums to a second set of support member end apertures to the second set of side member apertures of a side member and to the second side member plenum of a side member.

K1. A rodent containment cage rack, comprising:
a plurality of cage mount support members, which contain a communication medium, each disposed between and connected to a first side member and a second side member and a first side member and a second side member which contain a communication medium.

K2. The rodent containment cage rack of embodiment K1, wherein the communication mediums in the support members are in effective communication with the communication mediums in the side members.

K3. A rodent containment cage rack, comprising:
a plurality of cage mount support members each disposed between and connected to a first side member and a second side member,
each support member comprising a channel adapted to contain communication mediums;
each support member comprising an end aperture at each end which the support member connects to the side member;
each side member comprising a channel adapted to contain communication mediums.

K3.1. The rodent containment cage rack of embodiment K3, wherein the channels contain communication mediums.

K3.2. A rodent containment cage rack, comprising:
a plurality of cage mount support members each disposed between and connected to a first side member and a second side member,
each support member comprising a wall that contains, or walls that contain, a first support member plenum and a second support member plenum substantially extending the length of the support member,
each support member comprising a first set of cage connection apertures and a second set of cage connection apertures in the wall or walls of a lower surface of a support member, each aperture of the first set of cage connection apertures is in connection with the first support member plenum, and each aperture of the second set of cage connection apertures is in connection with the second support member plenum;

each support member comprising a first set of support member end apertures in connection with the first support member plenum and a second set of support member end apertures in connection with the second support member plenum, each of which end apertures is at the end of each support member that connects to a side member;

each side member comprising a wall that contains, or walls that contain, a first side member plenum and a second side member plenum substantially extending the length of the side member, each side member comprising a first set of side member apertures and a second set of side member apertures in the wall or walls of the side member, one or more apertures of the first set of side member apertures are in connection with the first side member plenum and are in effective connection with one or more apertures of the first set of support member end apertures, and one or more apertures of the second set of side member apertures are in connection with the second side member plenum and are in effective connection with one or more apertures of the second set of support member end apertures; and each support member and each side member comprising a channel configured to receive communication mediums.

K.3.3. The rodent containment cage rack of embodiment K3.2, which channel comprises communication mediums.

K.3.4. A rodent containment cage rack, comprising:
  a plurality of cage mount support members each disposed between and connected to a first side member and a second side member,
  each support member comprising a wall that contains, or walls that contain, a first support member plenum and a second support member plenum substantially extending the length of the support member,
  each support member comprising a first set of cage connection apertures and a second set of cage connection apertures in the wall or walls of a lower surface of a support member, each aperture of the first set of cage connection apertures is in connection with the first support member plenum, and each aperture of the second set of cage connection apertures is in connection with the second support member plenum;
  each support member comprising a first set of support member end apertures in connection with the first support member plenum and a second set of support member end apertures in connection with the second support member plenum, each of which end apertures is at the end of each support member that connects to a side member;
  each side member comprising a wall that contains, or walls that contain, a first side member plenum and a second side member plenum substantially extending the length of the side member,
  each side member comprising a first set of side member apertures and a second set of side member apertures in the wall or walls of the side member, one or more apertures of the first set of side member apertures are in connection with the first side member plenum and are in effective connection with one or more apertures of the first set of support member end apertures, and one or more apertures of the second set of side member apertures are in connection with the second side member plenum and are in effective connection with one or more apertures of the second set of support member end apertures; and
  each support member and each side member comprises communication mediums.

K3.5. The rodent containment cage rack of embodiment K3.4, which communication mediums are contained in a channel in each support member and each side member.

K3.6. The rodent containment cage rack of any one of embodiments K3.2, K3.3 and K3.4 wherein the channel in each support member is disposed between the first support member plenum and the second support member plenum.

K3.7. The rodent containment cage rack of any one of embodiments K3.2, K3.3 and K3.4 wherein the channel in each side member is disposed between the first side member plenum and the second side member plenum.

K4. The rodent containment cage rack of any one of embodiments K2 to K3.6, wherein the communication mediums in the side members are in effective connection with the communication mediums in the support members.

K5. The rodent containment cage rack of any one of embodiments K2 to K3.7, further comprising a plurality of cage mounts on a bottom surface of each support member.

K5.1. The rodent containment cage rack of embodiment K5, wherein each cage mount comprises a rail configured to slidingly receive a cage member and a protrusion configured to stop slideable movement of the cage member.

K5.2. The rodent containment cage rack of embodiment K5.1, wherein the cage mount comprises a detector configured to detect a detectable identifier on a cage component slidingly engaged with the cage mount.

K6. The rodent containment cage rack of any one of embodiments K5 to K5.2, wherein each cage mount has a channel adapted to contain communication mediums.

K7. The rodent containment cage rack of embodiment K6, wherein the communication mediums in the support member are in communication with the communication mediums in the cage mounts.

L1. A rodent containment cage rack, comprising:
  a plurality of cage mount support members each disposed between and connected to a first side member and a second side member,
  each support member comprising a wall that contains, or walls that contain, a first support member plenum and a second support member plenum substantially extending the length of the support member,
  each support member comprising a first set of cage connection apertures and a second set of cage connection apertures in the wall or walls of a lower surface of a support member, each aperture of the first set of cage connection apertures is in connection with the first support member plenum, and each aperture of the second set of cage connection apertures is in connection with the second support member plenum;
  each support member comprising a first set of support member end apertures in connection with the first support member plenum and a second set of support member end apertures in connection with the second support member plenum, each of which end apertures is at the end of each support member that connects to a side member;
  each side member comprising a wall that contains, or walls that contain, a first side member plenum and a second side member plenum substantially extending the length of the side member;
  each side member comprising a first set of side member apertures and a second set of side member apertures in the wall or walls of the side member, one or more apertures of the first set of side member apertures are in connection with the first side member plenum and are in effective connection with one or more apertures of the first set of support member end apertures, and one or more apertures of the second set of side member apertures are in connection with the second side member plenum and are in effective connection with one or more apertures of the second set of support member end apertures; and
  the rack is configured to, when positive air pressure is supplied to the first side member plenum of a side member, direct air from the first side member plenum of a side member to the first set of side member apertures of a side member to a set of support member end apertures to the first support member plenums and through the first set of cage connection apertures.

L2. A rodent containment cage rack, comprising:
  a plurality of cage mount support members each disposed between and connected to a first side member and a second side member,
  each support member comprising a wall that contains, or walls that contain, a first support member plenum and a second support member plenum substantially extending the length of the support member,
  each support member comprising a first set of cage connection apertures and a second set of cage connection apertures in the wall or walls of a lower surface of a support member, each aperture of the first set of cage connection apertures is in connection with the first support member plenum, and each aperture of the second set of cage connection apertures is in connection with the second support member plenum;

each support member comprising a first set of support member end apertures in connection with the first support member plenum and a second set of support member end apertures in connection with the second support member plenum, each of which end apertures is at the end of each support member that connects to a side member;

each side member comprising a wall that contains, or walls that contain, a first side member plenum and a second side member plenum substantially extending the length of the side member;

each side member comprising a first set of side member apertures and a second set of side member apertures in the wall or walls of the side member, one or more apertures of the first set of side member apertures are in connection with the first side member plenum and are in effective connection with one or more apertures of the first set of support member end apertures, and one or more apertures of the second set of side member apertures are in connection with the second side member plenum and are in effective connection with one or more apertures of the second set of support member end apertures; and the rack is configured to, when negative air pressure is supplied to the second side member plenum of a side member, direct air through the second set of cage connection apertures to the second support member plenums to a second set of support member end apertures to the second set of side member apertures of a side member and to the second side member plenum of a side member.

L3. A rodent containment cage rack, comprising:

a plurality of cage mount support members each disposed between and connected to a first side member and a second side member, each support member comprising a wall that contains, or walls that contain, a first support member plenum and a second support member plenum substantially extending the length of the support member, each support member comprising a first set of cage connection apertures and a second set of cage connection apertures in the wall or walls of a lower surface of a support member, each aperture of the first set of cage connection apertures is in connection with the first support member plenum, and each aperture of the second set of cage connection apertures is in connection with the second support member plenum;

each support member comprising a first set of support member end apertures in connection with the first support member plenum and a second set of support member end apertures in connection with the second support member plenum, each of which end apertures is at the end of each support member that connects to a side member;

each side member comprising a wall that contains, or walls that contain, a first side member plenum and a second side member plenum substantially extending the length of the side member;

each side member comprising a first set of side member apertures and a second set of side member apertures in the wall or walls of the side member, one or more apertures of the first set of side member apertures are in connection with the first side member plenum and are in effective connection with one or more apertures of the first set of support member end apertures, and one or more apertures of the second set of side member apertures are in connection with the second side member plenum and are in effective connection with one or more apertures of the second set of support member end apertures; and the rack is configured to, when positive air pressure is supplied to the first side member plenum of a side member, direct air from the first side member plenum of a side member to the first set of side member apertures of a side member to a first set of support member end apertures to the first support member plenums and through the first set of cage connection apertures; and the rack is configured to, when negative air pressure is supplied to the second side member plenum of a side member, direct air through the second set of cage connection apertures to the second support member plenums to a second set of support member end apertures to the second set of side member apertures of a side member and to the second side member plenum of a side member.

L4. The rack of embodiment L1 or L3, comprising a blower in effective connection with the rack that provides the positive air pressure.

L5. The rack of embodiment L2 or L3, comprising a blower in effective connection with the rack that provides the negative air pressure.

L6. The rack of embodiment L4 or L5, wherein the blower is in effective connection to an aperture at the top of the side member, the second side member, or the first side member and the second side member.

L7. The rack of any one of embodiments L1, L3, L4 and L6, wherein the pressure across a first support member plenum varies less than 5%.

L8. The rack of embodiment L7, wherein the rack comprises cage protrusion connection assemblies each comprising a nozzle in effective connection with the cage connection apertures and the pressure is measured at the assemblies.

L9. The rack of any one of embodiments L1 to L8, comprising one or more cages.

L10. The rack of embodiment L9, wherein air enters each cage effectively through an aperture of the first set of cage connection apertures and exits the cage effectively through an aperture of the second set of cage connection apertures.

L11. The rack of embodiment L10, wherein the one or more cages are engaged with cage protrusion connection assemblies in effective connection with the first set of cage connection apertures and the second set of cage connection apertures.

L12. The rack of embodiment L10 or L11, wherein the air flow in the first support member plenum and the second support member plenum is transverse to the air flow across the bottom of the one or more cages.

M1. A modular blower system comprising independent modules, which modules comprise:
  an air intake or air exhaust unit; and
  a fan unit; and
  a filter unit; and
  which modules are stacked in series.

M1.1. The modular blower of embodiment M1, wherein the modules are vertically stacked.

M1.2. The modular blower of embodiment M1, wherein the modules are horizontally stacked.

M1.3. The modular blower of embodiment M1, that comprises an air intake unit.

M1.4. The modular blower of embodiment M1.3, wherein the air intake unit comprises a pre-filter and a baffle.

M2. The modular blower of embodiment M1, wherein the edges of the stacked units are contiguous.

M2.1. The modular blower of embodiment M1 or M2, wherein the sidewalls of the units are contiguous.

M3. The modular blower of embodiment M1, that comprises an air exhaust unit.

M4. The modular blower of embodiment M3, wherein the air exhaust unit comprises an air outlet structure attached to a sidewall.

M4.1. The modular blower of embodiment M3, wherein the outlet structure is perpendicular to a sidewall of the air exhaust unit.

M5. The modular blower of embodiment M1.3, wherein the air intake unit is connected to the fan unit, and the fan unit is connected to the filter unit.

M6. The modular blower of embodiment M5, wherein the filter unit comprises a HEPA filter.

M7. The modular blower of embodiment M3, wherein the air exhaust unit is connected to the fan unit, and the fan unit is connected to the filter unit.

M8. The modular blower of embodiment M7, wherein the filter unit comprises a HEPA filter.

M9. The modular blower of embodiment M8, wherein the filter unit comprises a pre-filter upstream of the HEPA filter.

M10. The modular blower of embodiments M1, further comprising a base.

M11. The modular blower of embodiment M1, attached to a rodent containment cage rack.

M12. A modular blower system comprising independent modules, which modules comprise:
  a fan unit; and
  a filter unit; and
  which modules are stacked in series.

M12.1. The modular blower of embodiment M12, wherein the modules are vertically stacked.

M12.2. The modular blower of embodiment M12, wherein the modules are horizontally stacked.

N1. A circuit board hub attached to a rodent containment rack comprising:
  a connector or receiver for electrical power and communication mediums and
  an identifier for the cages attached to the rack.

N2. A circuit board hub of embodiment N1, comprising:
  an identifier is for the configuration of the cages in the rack;
  a receiver for communication medium; and
  a connector for a control unit; and
  a receiver for electrical power.

O1. The rodent containment cage rack of embodiment J1 or J2, wherein each of the first set of cage connection apertures and each of the second set of cage connection apertures is in effective connection with a cage protrusion connector assembly.

O2. The rodent containment cage rack of embodiment O1, wherein the cage protrusion connector assembly comprises a protrusion connector comprising a body, and an orifice in the body.

O2.1. The rodent containment cage rack of embodiment O1 or O2, wherein the cage protrusion connector assembly comprises one or more fasteners on a first side of the body.

O2.2. The rodent containment cage rack of any one of embodiments O1 to O2.1, wherein the cage protrusion connector assembly comprises a projected surface disposed around a portion of the orifice on a second side of the body.

O3. The rodent containment cage rack of any one of embodiments O1 to O2.2, wherein the one or more fasteners are two or more fasteners disposed around the orifice.

O4. The rodent containment cage rack of embodiment O2.1 or O3, wherein the projected surface is configured to contact a portion of a cage protrusion.

O4.1 The rodent containment cage of embodiment O4, wherein the projected surface is configured to position the cage in the rail guide.

O5. The rodent containment cage rack of any one of embodiments O2 to O4, which comprises a pin extending from the first side of the body.

O6. The rodent containment cage rack of any one of embodiments O2 to O5, which cage protrusion connector assembly comprises a protrusion connector gasket in sealing connection with the body of the protrusion connector.

O7. The rodent containment cage rack of embodiment O6, which protrusion connector gasket comprises a protrusion connector gasket orifice concentric with the orifice in the protrusion connector, an annular flange around the protrusion connector gasket orifice on a first surface of the protrusion connector gasket, one or more grooves on a second surface of the protrusion connector gasket, and one or more channels configured to receive the one or more fasteners of the protrusion connector.

O8. The rodent containment cage rack of embodiment O6 or O7, which protrusion connector gasket comprises a bore configured to receive the pin of embodiment O5.

O9. The rodent containment cage rack of embodiment O7 or O8, which annular flange comprises a surface configured to sealingly engage with a surface of a cage protrusion.

O10. The rodent containment cage rack of embodiment O5 or O9, wherein the cage protrusion extends from a cage lid.

O11. The rodent containment cage rack of any one of embodiments O6 to O10, which cage protrusion connector assembly comprises a nozzle in sealing connection with the protrusion connector gasket.

O12. The rodent containment cage rack of embodiment O11, wherein the nozzle comprises a nozzle orifice concentric with the orifice in the protrusion connector gasket and one or more tabs configured to rest in the one or more grooves of the protrusion connector gasket.

O12.1. The rodent containment cage rack of embodiment O11, wherein the nozzle comprises two or more nozzle orifices.

O12.2. The rodent containment cage rack of embodiment O12 or O12.1, wherein the nozzle comprises a cylindrical projection that substantially defines a portion or all of an orifice perimeter.

O12.3. The rodent containment cage rack of any one of embodiments O12 to O12.2, wherein the nozzle comprises a rib projecting from a nozzle surface or cylindrical projection in proximity to an orifice.

O12.4. The rodent containment cage rack of embodiment O12.3, wherein the rib has a semi-circular profile.

O12.5. The rodent containment cage rack of embodiment O12.4, wherein an edge of the rib is coextensive with a portion of an orifice perimeter.

O12.6. The rodent containment cage rack of embodiment O12.5, wherein the rib circumscribes a portion of an orifice perimeter.

O13. The rodent containment cage rack of embodiment O12, which nozzle comprises an annular flange disposed around the nozzle orifice on a first side of the nozzle opposite to the first side of the protrusion connector body.

O14. The rodent containment cage rack of any one of embodiments O12 to O13, which nozzle comprises a bushing disposed within a nozzle orifice.

O15. The rodent containment cage rack of any one of embodiments O11 to O14, which cage protrusion connector assembly comprises a nozzle gasket in sealing connection with the nozzle.

O16. The rodent containment cage rack of embodiment O15, which nozzle gasket comprises a bore configured to receive the pin of embodiment O5.

O17. The rodent containment cage rack of any one of embodiments O1 to O16, which cage protrusion connector assembly is connected to a surface of the wall of the support member in effective connection with each of the cage connection apertures.

O18. The rodent containment cage rack of O17, wherein the one or more fasteners on the first side of the cage protrusion connector body are fastened to fasteners on the wall or in the wall of the support member.

Drawing Elements

Provided hereafter is a listing of some elements shown in the drawings.

| Item name and/or description | Call out/ reference number |
|---|---|
| Rodent containment cage rack | 500 |
| Support members | 502 |
| $1^{st}$ side member | 504 |
| $2^{nd}$ side member | 506 |
| $1^{st}$ support member plenum | 508 |
| $2^{nd}$ support member plenum | 510 |
| $1^{st}$ set of cage connection apertures | 512 |
| $2^{nd}$ set of cage connection apertures | 514 |
| Lower surface of support member | 516 |
| $1^{st}$ support member end aperture | 518 |
| $2^{nd}$ support member end aperture | 520 |
| $1^{st}$ side member plenum | 522 |
| $2^{nd}$ side member plenum | 524 |
| $1^{st}$ side member apertures | 526 |
| $2^{nd}$ side member apertures | 528 |
| Nozzle (aperture nozzle) | See cage protrusion connection assembly |
| Cage mount assembly (see below) | 530 |
| $1^{st}$ side member upper aperture | 532 |
| $2^{nd}$ side member upper aperture | 534 |
| Support member communication medium | 536 |
| Side member communication medium | 538 |
| Support member communication medium channel | 540 |
| Side member communication medium channel | 542 |
| Side member communication aperture | 543 |
| Cage mount assembly communication medium channel | 546 |
| Support member wall or walls forming plenum | 550 |
| Side member wall or walls forming plenum | 551 |
| Cage mount guide rail | 552 |
| Cage mount guide rail stem | 554 |
| Cage mount guide rail stop | 553 |
| Cage mount guild rail cross projections | 556, 557 |
| Cage mount channel for comm. media | 558 |
| Cage mount assembly upper surface | 560 |
| Cage mount front module | 562 |
| Cage mount front module reader | 564, 564' |
| Cage mount front module plug | 566 |
| Cage mount front module beveled lip | 568 |
| Front module receptacle | 569 |
| Reader LED's | 565 |
| Communication plugs | 559 |
| Trolley assembly | 570 |
| Trolley frame tube | 572 |
| Trolley plate mounts | 574 |
| casters | 576 |
| Controller - top mounted | 580 |
| Controller side mount | 582 |
| Air connector plate - supply | 584 |
| Air connector plate aperture - supply | 585 |
| Air connector plate - exhaust | 586 |
| Air connector plate aperture - exhaust | 587 |
| Air connector plate mating pins | 588 |
| Blower support protrusion | 590 |
| Power supply support recesses or indents | 592 |
| Modular blower system - blower | 600 |
| Air intake unit | 602 |
| Baffle | 603 |
| Fan unit | 604 |
| Filter unit | 606, 607 |
| Blower edge | 608 |
| Blower sidewall | 610 |
| Baffle prefilter | 612 |
| HEPA filter | 614 |
| Pressure sensor port | 616 |
| Spring loaded connectors | 618 |
| Base | 620, 621 |
| Stacking support protrusion | 622 |
| Blower air channel | 623, 624 |
| Modular blower system - exhaust | 700 |
| Air Exhaust unit | 702 |
| Fan unit | 704 |
| Filter unit | 706, 707 |
| Blower edge | 708 |
| Blower sidewall | 710 |
| Air outlet connector | 712 |
| HEPA filter | 714 |
| Pressure sensor | 716 |
| Spring loaded connectors | 718 |
| Base | 720, 721 |
| Stacking support protrusion | 722 |
| Blower air channel | 723, 724 |
| Exhaust prefilter | 726 |
| Power Supply | 740 |
| Power supply wires | 742 |
| Cage protrusion connection assembly | 800 |
| Body (cone guide assembly body) | 802 |
| Orifice (body orifice) | 804 |
| First side (body first side) | 806 |
| Fasteners (body fasteners) | 808 |
| Second side (body second side) | 810 |
| Cage protrusion connection assembly lead in surface | 811 |
| Projected surface (cone guide stop surface) | 812 |
| Pin | 814 |
| Protrusion connection gasket | 816 |
| Protrusion connection gasket orifice | 818 |
| Annular flange (gasket annular flange) | 820 |
| Protrusion connection gasket $1^{st}$ surface | 822 |
| Protrusion connection gasket $2^{nd}$ surface | 824 |
| Grooves (gasket groove) | 826 |
| Channels (protrusion connection gasket channel) | 828 |
| Protrusion connection gasket bore | 830 |
| Sealing surface | 832 |

-continued

| Item name and/or description | Call out/reference number |
|---|---|
| Nozzle | 834 |
| Nozzle orifice | 836 |
| Nozzle orifice (dual) | 837 |
| Tabs (nozzle tabs) | 838 |
| Nozzle rib | 839 |
| Nozzle annular flange | 840 |
| Cylindrical protrusion | 841a |
| Cylindrical protrusion edge | 841b |
| Corner | 841c |
| Nozzle first side | 842 |
| Beveled or curved surface | 843 |
| Nozzle bushing | 844 |
| Nozzle bushing (dual) | 845 |
| Nozzle second side | 846 |
| Nozzle second side (dual) | 847 |
| Nozzle gasket | 848 |
| Beveled or curved surface (dual) | 849 |
| Nozzle gasket bore | 850 |
| Protrusion gasket annular bevel (optional) | 852 |
| Cage protrusion | 860 |
| Cage protrusion aperture | 862 |
| Cage protrusion side surface | 864 |
| Circuit board hub | 900 |
| Circuit board | 902 |
| Bores for mounting to air connector | 904 |
| Deutsch receptacle | 906 |
| Blind mate connector | 908 |
| Controller port | 910 |
| eSATA plug receptacle | 912 |
| Blower control board | 920 |
| Blower control board connector ( to circuit board hub) | 922 |
| Rack Controller (Master controller) | 930 |
| Rodent containment cage rack | 500 |
| Support members | 502 |
| 1$^{st}$ side member | 504 |
| 2$^{nd}$ side member | 506 |
| 1$^{st}$ support member plenum | 508 |
| 2$^{nd}$ support member plenum | 510 |
| 1$^{st}$ set of cage connection apertures | 512 |
| 2$^{nd}$ set of cage connection apertures | 514 |
| Lower surface of support member | 516 |
| 1$^{st}$ support member end aperture | 518 |
| 2$^{nd}$ support member end aperture | 520 |
| 1$^{st}$ side member plenum | 522 |
| 2$^{nd}$ side member plenum | 524 |
| 1$^{st}$ side member apertures | 526 |
| 2$^{nd}$ side member apertures | 528 |
| Nozzle (aperture nozzle) | See cage protrusion connection assembly |
| Cage mount assembly (see below) | 530 |
| 1$^{st}$ side member upper aperture | 532 |
| 2$^{nd}$ side member upper aperture | 534 |
| Support member communication medium | 536 |
| Side member communication medium | 538 |
| Support member communication medium channel | 540 |
| Side member communication medium channel | 542 |
| Side member communication aperture | 543 |
| Cage mount assembly communication medium channel | 546 |
| Support member wall or walls forming plenum | 550 |
| Side member wall or walls | 551 |

-continued

| Item name and/or description | Call out/reference number |
|---|---|
| forming plenum | |
| Cage mount guide rail | 552 |
| Cage mount guide rail stem | 554 |
| Cage mount guild rail cross projections | 556, 557 |
| Cage mount channel for comm. media | 558 |
| Cage mount assembly upper surface | 560 |
| Cage mount front module | 562 |
| Cage mount front module reader | 564 |
| Cage mount front module plug | 566 |
| Cage mount front module beveled lip | 568 |
| Front module receptacle | 569 |
| Reader LED's | 565 |
| Communication plugs | 559 |
| Trolley assembly | 570 |
| Trolley frame tube | 572 |
| Trolley plate mounts | 574 |
| casters | 576 |
| Controller - top mounted (see circuit board call outs) | 930 |
| Controller side mount | 582 |
| Air connector plate - supply | 584 |
| Air connector plate aperture - supply | 585 |
| Air connector plate - exhaust | 586 |
| Air connector plate aperture - exhaust | 587 |
| Air connector plate mating pins | 588 |
| Blower support protrusion | 590 |
| Power supply support recesses or indents | 592 |
| Modular blower system - blower | 600 |
| Air intake unit | 602 |
| Baffle | 603 |
| Fan unit | 604 |
| Filter unit | 606, 607 |
| Blower edge | 608 |
| Blower sidewall | 610 |
| Baffle pre-filter | 612 |
| HEPA filter | 614 |
| Pressure sensor port | 616 |
| Spring loaded connectors | 618 |
| Base | 620, 621 |
| Stacking support protrusion | 622 |
| Blower air channel | 623, 624 |
| Modular blower system - exhaust | 700 |
| Air Exhaust unit | 702 |
| Fan unit | 704 |
| Filter unit | 706, 707 |
| Blower edge | 708 |
| Blower sidewall | 710 |
| Air outlet connector | 712 |
| HEPA filter | 714 |
| Pressure sensor | 716 |
| Spring loaded connectors | 718 |
| Base | 720, 721 |
| Stacking support protrusion | 722 |
| Blower air channel | 723, 724 |
| Exhaust pre-filter | 726 |
| Stabilizing connector | 727 |
| Power Supply | 740 |
| Power supply wires | 742 |
| Cage protrusion connection assembly | 800 |
| Body (cone guide assembly body) | 802 |
| Orifice (body orifice) | 804 |
| First side (body first side) | 806 |

-continued

| Item name and/or description | Call out/reference number |
|---|---|
| Fasteners (body fasteners) | 808 |
| Second side (body second side) | 810 |
| Cage protrusion connection assembly lead in surface | 811 |
| Projected surface (cone guide stop surface) | 812 |
| Pin | 814 |
| Protrusion connection gasket | 816 |
| Protrusion connection gasket orifice | 818 |
| Annular flange (gasket annular flange) | 820 |
| Protrusion connection gasket 1$^{st}$ surface | 822 |
| Protrusion connection gasket 2$^{nd}$ surface | 824 |
| Grooves (gasket groove) | 826 |
| Channels (protrusion connection gasket channel) | 828 |
| Protrusion connection gasket bore | 830 |
| Sealing surface | 832 |
| Nozzle | 834 |
| Nozzle orifice | 836 |
| Nozzle orifice (dual) | 837 |
| Tabs (nozzle tabs) | 838 |
| Nozzle rib | 839 |
| Nozzle annular flange | 840 |
| Cylindrical protrusion | 841a |
| Cylindrical protrusion edge | 841b |
| Corner | 841c |
| Nozzle first side | 842 |
| Beveled or curved surface | 843 |
| Nozzle bushing | 844 |
| Nozzle bushing (dual) | 845 |
| Nozzle second side | 846 |
| Nozzle second side (dual) | 847 |
| Nozzle gasket | 848 |
| Beveled or curved surface (dual) | 849 |
| Nozzle gasket bore | 850 |
| Protrusion gasket annular bevel (optional) | 852 |
| Cage protrusion | 860 |
| Cage protrusion aperture | 862 |
| Cage protrusion side surface | 864 |
| Circuit board hub | 900 |
| Circuit board | 902 |
| Bores for mounting to air connector | 904 |
| Deutsch receptacle | 906 |
| Blind mate connector | 908 |
| Controller port | 910 |
| eSATA plug receptacle | 912 |
| Blower control board | 920 |
| Blower control board connector ( to circuit board hub) | 922 |
| Rack Controller (Master controller) | 930 |

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

What is claimed is:

1. A method for detecting one or more identifiers on a rodent containment cage, comprising:
engaging the rodent containment cage with a first cage mount assembly and a second cage mount assembly of a rack, wherein the cage contacts the first cage mount assembly and the second cage mount assembly;
the first cage mount assembly comprises an attached detector and the second cage mount assembly comprises an attached detector;
the cage comprises a first cage component comprising one or more detectable identifiers, whereby when the cage is engaged with and contacts the first cage mount assembly and the second cage mount assembly, the detector attached to the first cage mount assembly, or the detector attached to the second cage mount assembly detects the one or more detectable identifiers.

2. The method of claim 1, wherein each of the one or more detectable identifiers is configured to serve as a clocking identifier, a cage position identifier, a content identifier, or a combination thereof.

3. The method of claim 1, wherein the one or more detectable identifiers are selected from the group consisting of a bar code, a serial number, a discoloring polymer, a reflective identifier, a non-reflective identifier, a symbolic code, a radio frequency identifier, a magnetic identifier, a chemical sensor identifier, and a combinations thereof.

4. The method of claim 1, wherein the detector attached to the first cage mount assembly and the detector attached to the second cage mount assembly employ materials selected from the group consisting of a magnetic optical sensing component, an automatic sensing component, a fluorescence sensing component, a mechanical sensing component, a magnetic sensing component, an optical sensing component, a chemical sensing component and a combination thereof.

5. The method of claim 1, wherein the detector attached to the first cage mount assembly and the detector attached to the second cage mount assembly are selected from the group consisting of a pen type reader, a laser scanner, a charged coupled device (CCD) reader, a camera based reader, a magnetic reader or a radio frequency identifier (RFID) reader.

6. The method of claim 1, wherein the first cage component is selected from the group consisting of a cage lid component, a cage base component, an air supply or air exhaust component, a water supply component, a sensor component, a filter component, a baffle component, a feeder component, and a bedding component.

7. The method of claim 6, wherein the first cage component is a cage base component.

8. The method of claim 7, wherein the cage comprises a cage lid.

9. The method of claim 8, wherein the first cage mount assembly and second cage mount assembly each comprise a rail guide which contacts the cage lid when the cage is engaged with the first cage mount assembly and the second cage mount assembly.

10. The method of claim 1, wherein the one or more detectable identifiers comprise a first detectable identifier and a second detectable identifier arranged in-line.

11. The method of claim 1, wherein the one or more detectable identifiers comprise a first detectable identifier and a second detectable identifier that include regions of overlap.

12. The method of claim 1, wherein the detector attached to the first cage mount assembly is part of a front module of the first cage mount assembly and the detector attached to the second cage mount assembly is part of a front module of the second cage mount assembly.

13. The method of claim 1, wherein the detector attached to the first cage mount assembly and the detector attached to the second cage mount assembly comprise an optical detector, and the one or more detectable identifiers are for optical detection.

14. The method of claim 13, wherein the one or more detectable identifiers are bar codes.

15. The method of claim 1, wherein:
the first cage component comprises a first detectable identifier;
the cage comprises a second cage component; and
the second cage component comprises a second detectable identifier; whereby when the cage is engaged with and contacts the first cage mount assembly and the second cage mount assembly, the detector attached to the first cage mount assembly detects the first detectable identifier and the second detectable identifier, or the detector attached to the second cage mount assembly detects the first detectable identifier and the second detectable identifier, or the detector attached to the first cage mount assembly detects the first detectable identifier and the detector attached to the second cage mount assembly detects the second detectable identifier.

16. The method of claim 15, wherein the first and second cage components are selected from the group consisting of a cage lid component, a cage base component, an air supply or air exhaust component, a water supply component, a sensor component, a filter component, a baffle component, a feeder component, and a bedding component.

17. The method of claim 15, wherein the first cage component is a cage base component and the second cage component is a cage lid or the first cage component is a cage lid component and the second cage component is a cage base component.

18. The method of claim 17, wherein the first cage mount assembly and second cage mount assembly each comprise a rail guide which contacts the cage lid when the cage is engaged with the first cage mount assembly and the second cage mount assembly.

19. The method of claim 15, wherein the first and second detectable identifiers are configured to serve as a clocking identifier, a cage position identifier, a content identifier, or a combination thereof.

20. The method of claim 15, wherein the first and second detectable identifiers are selected from the group consisting of a bar code, a serial number, a discoloring polymer, a reflective identifier, a non-reflective identifier, a symbolic code, a radio frequency identifier, a magnetic identifier, a chemical sensor identifier, and a combination thereof.

21. The method of claim 15, wherein the detector attached to the first cage mount assembly and the detector attached to the second cage mount assembly employ materials selected from the group consisting of a magnetic optical sensing component, an automatic sensing component, a fluorescence sensing component, a mechanical sensing component, a magnetic sensing component, an optical sensing component, a chemical sensing component and a combination thereof.

22. The method of claim 15, wherein the detector attached to the first cage mount assembly and the detector attached to the second cage mount assembly are selected from the group consisting of a pen type reader, a laser scanner, a charged coupled device (CCD) reader, a camera based reader, a magnetic reader or a radio frequency identifier (RFID) reader.

23. The method of claim 15, wherein the first detectable identifier and second detectable identifier are arranged in-line.

24. The method of claim 15, wherein the first detectable identifier and the second detectable identifier include regions of overlap.

25. The method of claim 15, wherein the detector attached to the first cage mount assembly is part of a front module of the first cage mount assembly and the detector attached to the second cage mount assembly is part of a front module of the second cage mount assembly.

26. The method of claim 15, wherein the detector attached to the first cage mount assembly and the detector attached to the second cage mount assembly comprise an optical detector and the first and second detectable identifiers are for optical detection.

27. The method of claim 26, wherein the first and second detectable identifiers are bar codes.

28. The method of claim 1, wherein the one or more detectable identifiers comprise a first detectable identifier and a second detectable identifier, whereby when the cage is engaged with and contacts the first cage mount assembly and the second cage mount assembly, the detector attached to the first cage mount assembly detects the first detectable identifier and the detector attached to the second cage mount assembly detects the second detectable identifier.

* * * * *